United States Patent
Dulberg et al.

(10) Patent No.: US 11,816,981 B2
(45) Date of Patent: Nov. 14, 2023

(54) TRAFFIC MONITORING AND MANAGEMENT SYSTEMS AND METHODS

(71) Applicant: D.R ROADS A.I LTD., Kyriat Matalon (IL)

(72) Inventors: Roni Dulberg, Even Yehuda (IL); Roman Rabinovich, Petach Tikva (IL); Boris Oklander, Haifa (IL)

(73) Assignee: D.R Roads A.I Ltd., Kyriat Matalon (IL)

( * ) Notice: Subject to any disclaimer, the term of this patent is extended or adjusted under 35 U.S.C. 154(b) by 62 days.

(21) Appl. No.: 16/616,223

(22) PCT Filed: May 23, 2018

(86) PCT No.: PCT/IB2018/000632
§ 371 (c)(1),
(2) Date: Nov. 22, 2019

(87) PCT Pub. No.: WO2018/215833
PCT Pub. Date: Nov. 29, 2018

(65) Prior Publication Data
US 2020/0242922 A1 Jul. 30, 2020

Related U.S. Application Data

(60) Provisional application No. 62/616,558, filed on Jan. 12, 2018, provisional application No. 62/510,015, filed on May 23, 2017.

(51) Int. Cl.
*G08G 1/01* (2006.01)
*G08G 1/04* (2006.01)
(Continued)

(52) U.S. Cl.
CPC ......... *G08G 1/0141* (2013.01); *B60W 30/00* (2013.01); *B60W 30/08* (2013.01); *B60W 40/00* (2013.01);
(Continued)

(58) Field of Classification Search
CPC ...... B60W 30/00; B60W 30/08; B60W 40/00; B60W 40/10; G08G 1/0116; G08G 1/012;
(Continued)

(56) References Cited

U.S. PATENT DOCUMENTS 7,755,510 B2 * 7/2010 Bilimoria ............... G08G 1/22
701/119
9,440,535 B2 * 9/2016 Schofield ............. B60Q 1/1423
(Continued)

OTHER PUBLICATIONS

Improving Traffic Flow Efficiency by In-Car Advice on Lane, Speed, and Headway. Wouter J. Schakel and Bart Van Arem, Member, IEEE Transactions on Intelligent Transportation System, Vol. 15, No. 4, Aug. 2014.
(Continued)

*Primary Examiner* — Peter D Nolan
*Assistant Examiner* — Wae L Louie
(74) *Attorney, Agent, or Firm* — PEARL COHEN ZEDEK LATZER BARATZ LLP

(57) ABSTRACT

Systems and methods for detecting electromagnetic emissions to monitor and manage road traffic. In one implementation, a system is provided for determining at least one of location, speed, and direction of vehicles on a roadway. The system comprising at least one receiver configured for placement at one or more fixed locations along the roadway to detect a plurality of non-reflected electromagnetic emissions originating from a plurality of vehicles. The system further comprise at least one processor configured to receive signal information from the at least one receiver and to identify in the plurality of non-reflected electromagnetic
(Continued)

emissions an electromagnetic waveform of a vehicle. The at least one processor may calculate at least one of a Doppler effect, a phase difference, or a time difference of non-reflected electromagnetic emissions associated with the identified electromagnetic waveform, and determine at least one of a location, speed, and direction of the vehicle.

20 Claims, 65 Drawing Sheets

(51) Int. Cl.
| | |
|---|---|
| G08G 1/042 | (2006.01) |
| G08G 1/08 | (2006.01) |
| G08G 1/16 | (2006.01) |
| B60W 30/00 | (2006.01) |
| B60W 40/00 | (2006.01) |
| B60W 40/10 | (2012.01) |
| B60W 30/08 | (2012.01) |

(52) U.S. Cl.
CPC ............ *B60W 40/10* (2013.01); *G08G 1/012* (2013.01); *G08G 1/0116* (2013.01); *G08G 1/0145* (2013.01); *G08G 1/04* (2013.01); *G08G 1/042* (2013.01); *G08G 1/08* (2013.01); *G08G 1/166* (2013.01)

(58) Field of Classification Search
CPC ........ G08G 1/0145; G08G 1/04; G08G 1/042; G08G 1/08; G08G 1/166
See application file for complete search history.

(56) References Cited

U.S. PATENT DOCUMENTS

| | | | | |
|---|---|---|---|---|
| 9,646,496 | B1* | 5/2017 | Miller | H04W 4/029 |
| 9,965,951 | B1* | 5/2018 | Gallagher | G08G 1/065 |
| 10,019,904 | B1* | 7/2018 | Chan | G06Q 10/0635 |
| 2003/0005759 | A1* | 1/2003 | Breed | G08G 1/096783 |
| | | | | 73/146 |
| 2003/0146871 | A1* | 8/2003 | Karr | G01S 5/0009 |
| | | | | 342/465 |
| 2008/0133136 | A1* | 6/2008 | Breed | G05D 1/0274 |
| | | | | 340/901 |
| 2010/0052945 | A1* | 3/2010 | Breed | G01S 17/89 |
| | | | | 340/903 |
| 2013/0113618 | A1* | 5/2013 | Flanagan | E01F 9/559 |
| | | | | 340/539.1 |
| 2014/0210646 | A1* | 7/2014 | Subramanya | G06V 20/52 |
| | | | | 348/148 |
| 2014/0306834 | A1* | 10/2014 | Ricci | G08B 25/016 |
| | | | | 340/902 |
| 2014/0335897 | A1* | 11/2014 | Clem | H04W 4/021 |
| | | | | 455/456.3 |
| 2016/0133131 | A1* | 5/2016 | Grimm | G08G 1/0141 |
| | | | | 701/117 |
| 2016/0155334 | A1 | 6/2016 | Jansson et al. | |
| 2017/0113665 | A1* | 4/2017 | Mudalige | G08G 1/166 |
| 2017/0197617 | A1* | 7/2017 | Penilla | H04W 4/029 |
| 2017/0357862 | A1* | 12/2017 | Tatsubori | G08G 1/0141 |
| 2018/0053405 | A1* | 2/2018 | de Azevedo | G08G 1/123 |
| 2019/0122543 | A1* | 4/2019 | Matus | G08G 1/096741 |
| 2019/0291727 | A1* | 9/2019 | Shalev-Shwartz | G08G 1/166 |

OTHER PUBLICATIONS

International Search Report for PCT Application No. PCT/IB2018/000632 dated Nov. 5, 2018.

Extended European Search Report for EP Application 18805595.8 dated Feb. 12, 2021.

\* cited by examiner

1700

1701 — Receive signal information from at least one receiver configured to detect a plurality of non-reflected electromagnetic emissions generated by the range-determining systems of a plurality of individual vehicles 1702 — Analyze the plurality of non-reflected electromagnetic emissions to associate groups of non-reflected electromagnetic emissions with individual vehicles 1703 — Determine movements of the plurality of vehicles on the roadway 1704 — Cause a transmitter to transmit signals to one or more of the plurality of individual vehicles via their respective range determining systems

FIG. 17

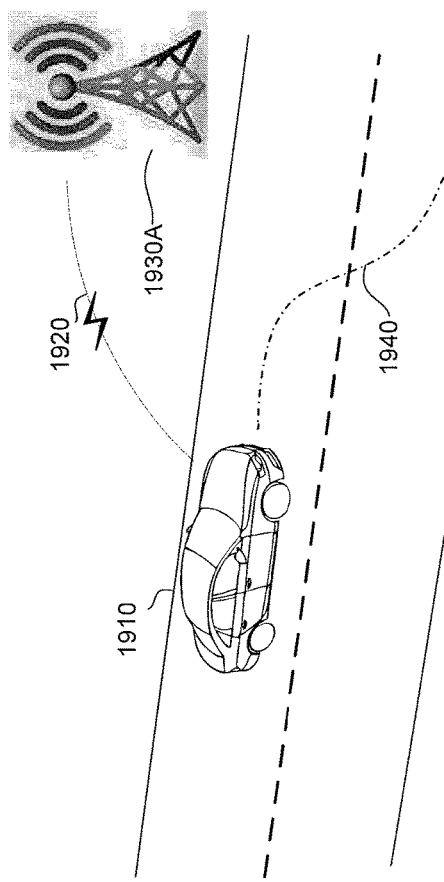
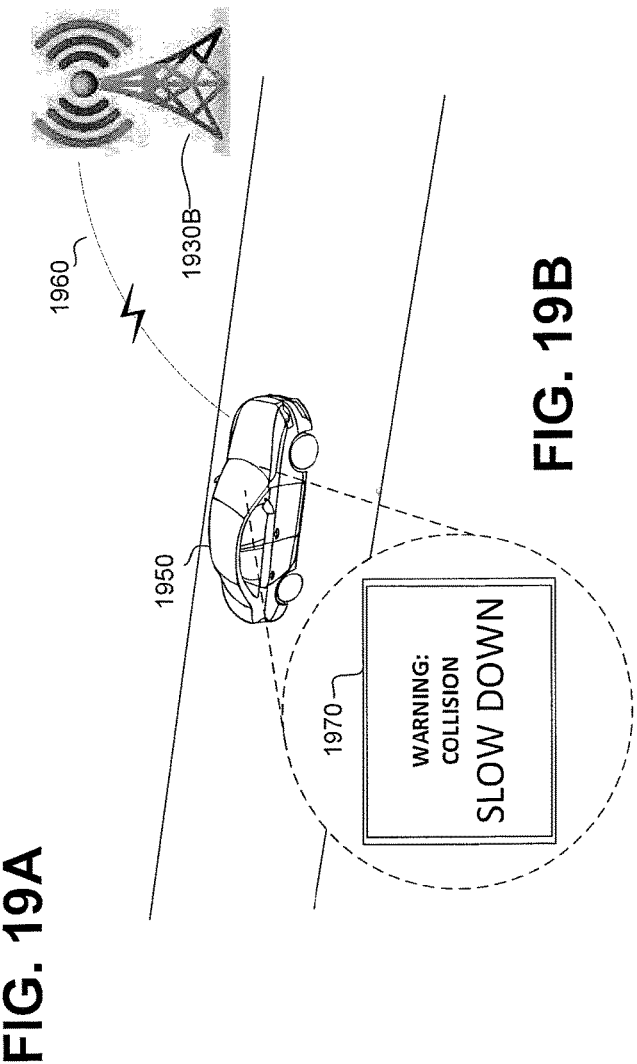
FIG. 19A
FIG. 19B

TRAFFIC MONITORING AND MANAGEMENT SYSTEMS AND METHODS

CROSS-REFERENCE TO RELATED APPLICATIONS

This application is a National Phase Application of PCT International Application No. PCT/IB2018/000632, International Filing Date May 23, 2018, claiming the benefit of U.S. Provisional Patent Applications No. 62/510,015, filed May 23, 2017, and No. 62/616,558, filed Jan. 12, 2018, both of which are hereby incorporated by reference.

BACKGROUND

I. Technical Field

The present disclosure generally relates to systems and methods for monitoring and managing road traffic, and in particular to systems and methods for detection and analysis of electromagnetic emissions to monitor and manage road traffic.

II. Background Information

The current road infrastructure of traffic signs and traffic lights was adopted after the introduction of the horseless carriage. Its main purpose was (and still is) to create a common language—a Lingua Franca—for road users. Looking forward, an adjustment in the road infrastructure is needed as the current road infrastructure of traffic signs and traffic lights is designed for human drivers. As more varied types of entities share the roads, a holistic approach is needed for better mediating between cars (particularly autonomous vehicles) and other road users, such as motorcycles, personal transporters, bicycles, and pedestrians.

Modern vehicles have one or more systems that generate electromagnetic emissions. For example, in some countries, reverse parking systems or rear view systems are mandatory on all new vehicles to ensure road safety. These systems emit electromagnetic pulses and measure the return interval between the transmitted and reflected signal to calculate object distances. Typically, these systems are manufactured to have a unique "fingerprint" to avoid situations where signals from neighboring systems interfere. The changing landscape of road users and recent developments in big data technology present an opportunity to a new road infrastructure that can track a large number of road users in in an area of interest (e.g., intersections, highways, tunnels, and more).

The systems and methods of the present disclosure involve a novel approach for managing road traffic using infrastructure that monitors the road users through their electromagnetic emissions.

SUMMARY

Embodiments consistent with the present disclosure provide systems and methods for detecting electromagnetic emissions to monitor and manage road traffic and to mediate between road users in real time. For example, consistent with the disclosed embodiments, the system is configured to detect electromagnetic emissions from road users, such as vehicles and pedestrians.

In one embodiment, a system for determining at least one of location, speed, and direction of vehicles on a roadway is disclosed. The system may include at least one receiver configured for placement at one or more fixed locations along the roadway to detect a plurality of non-reflected electromagnetic emissions originating from a plurality of vehicles on the roadway. The system may also include at least one processor configured to receive signal information from the at least one receiver and to identify in the plurality of non-reflected electromagnetic emissions, based on the signal information, an electromagnetic waveform of one of the plurality of vehicles. The at least one processor is further configured to calculate at least one of a Doppler effect, a phase difference, or a time difference of non-reflected electromagnetic emissions associated with the identified electromagnetic waveform of the one vehicle. The at least one processor is also configured determine at least one of a location, speed, and direction of the one vehicle on the roadway based on the at least one calculated Doppler effect, phase difference, or time difference of the non-reflected electromagnetic emissions associated with the identified electromagnetic waveform of the one vehicle.

In another embodiment, a method for determining at least one of location, speed, and direction of vehicles on a roadway is disclosed. The method may include: receiving signal information from at least one receiver configured for placement at one or more fixed locations along the roadway to detect a plurality of non-reflected electromagnetic emissions originating from a plurality of vehicles on the roadway; identifying in the plurality of non-reflected electromagnetic emissions, based on the signal information, an electromagnetic waveform of one of the plurality of vehicles; calculating at least one of a Doppler effect, a phase difference, or a time difference of non-reflected electromagnetic emissions associated with the identified electromagnetic waveform of the one vehicle; and determining at least one of a location, speed, and direction of the one vehicle on the roadway based on the at least one calculated Doppler effect, phase difference, or time difference of the non-reflected electromagnetic emissions associated with the identified electromagnetic waveform of the one vehicle.

In another embodiment, a system for determining at least one of location, speed and direction of vehicles on a roadway is disclosed. The system may include at least one receiver configured to detect a plurality of non-reflected electromagnetic emissions originating from a plurality of vehicles on a road. The system may also include at least one processor configured to receive signal information from the at least one receiver and to analyze the plurality of non-reflected electromagnetic emissions based on the received signal information to identify a first subset of electromagnetic emissions including a first electromagnetic waveform associated with a first vehicle, and to identify a second subset of electromagnetic emissions including a second electromagnetic waveform associated with a second vehicle. The at least one processor is further configured to determine from the first subset of electromagnetic emissions including the first electromagnetic waveform at least one of a location, speed, and direction of the first vehicle on the road, and determine from the second subset of electromagnetic emissions including the second electromagnetic waveform, at least one of a location, speed, and direction of the second vehicle on the road.

In another embodiment, a method for determining at least one of location, speed, and direction of vehicles on a roadway is disclosed. The method may include: receiving signal information from at least one receiver configured to detect a plurality of non-reflected electromagnetic emissions originating from a plurality of vehicles on a road; analyzing the plurality of non-reflected electromagnetic emissions based on the received signal information to identify a first subset of electromagnetic emissions including a first electromagnetic waveform associated with a first vehicle, and to identify a second subset of electromagnetic emissions including a second electromagnetic waveform associated with a second vehicle; determining from the first subset of electromagnetic emissions including the first electromagnetic waveform at least one of a location, speed, and direction of the first vehicle on the road; and determining from the second subset of electromagnetic emissions including the second electromagnetic waveform, at least one of a location, speed, and direction of the second vehicle on the road.

In one embodiment, a system may use emissions signals emitted by vehicles' onboard range-determining systems aboard individual vehicles to determine information about simultaneous movements of a plurality of vehicles on a roadway. The system may include at least one receiver configured for mounting in a vicinity of a roadway and to detect a plurality of non-reflected electromagnetic emissions generated by the range-determining systems aboard a plurality of individual vehicles simultaneously navigating the roadway and at least one processor. The at least one processor may be configured to receive signal information from the at least one receiver and to: analyze the plurality of non-reflected electromagnetic emissions from the range-determining systems aboard the plurality of individual vehicles, based on the received signal information, to associate groups of non-reflected electromagnetic emissions with individual vehicles; and determine, from the associated groups of non-reflected electromagnetic emissions, movements of the plurality of vehicles on the roadway.

According to an aspect of the present disclosure, a system is disclosed for managing vehicle traffic in an intersection. The system may comprise at least one receiver configured to be located in an area of the intersection to detect a plurality of non-reflected electromagnetic emissions originating from a plurality of vehicles moving in differing directions in a vicinity of the intersection. The system may comprise at least one processor configured to receive signal information from the at least one receiver and to identify in the plurality of non-reflected electromagnetic emissions electromagnetic waveforms associated with the plurality of vehicles, wherein each identified electromagnetic waveform is associated with one of the plurality of vehicles. The at least one processor may calculate a first value associated with at least one of a Doppler effect, a phase difference, or a time difference of non-reflected electromagnetic emissions corresponding to a first electromagnetic waveform of a first vehicle approaching the intersection from a first direction. The at least one processor may further calculate a second value associated with at least one of a Doppler effect, a phase difference, or a time difference of non-reflected electromagnetic emissions corresponding to a second electromagnetic waveform of a second vehicle approaching the intersection from a second direction, different from the first direction, identify from the first calculated value and the second calculated value a potential collision course between the first vehicle and the second vehicle, and initiate a collision avoidance action when a potential collision course is identified.

Another aspect of the present disclosure is directed to a method for managing vehicle traffic in an intersection. The method may include detecting, in an area of the intersection, a plurality of non-reflected electromagnetic emissions originating from a plurality of vehicles moving in differing directions in a vicinity of the intersection. The method may further include receiving signal information; identifying in the plurality of non-reflected electromagnetic emissions electromagnetic waveforms associated with the plurality of vehicles, wherein each identified electromagnetic waveform is associated with one of the plurality of vehicles; calculating a first value associated with at least one of a Doppler effect, a phase difference, or a time difference of non-reflected electromagnetic emissions corresponding to a first electromagnetic waveform of a first vehicle approaching the intersection from a first direction; calculating a second value associated with at least one of a Doppler effect, a phase difference, or a time difference of non-reflected electromagnetic emissions corresponding to a second electromagnetic waveform of a second vehicle approaching the intersection from a second direction, different from the first direction; identifying from the first calculated value and the second calculated value a potential collision course between the first vehicle and the second vehicle; and initiating a collision avoidance action when a potential collision course is identified.

According to an aspect of the present disclosure, a system is disclosed for managing pedestrian and automobile traffic in an intersection. The system may comprise at least one receiver configured to detect a plurality of electromagnetic emissions in at least a first band associated with personal mobile communications devices of a plurality of pedestrians and detect a plurality of electromagnetic emissions in at least a second band associated with a plurality of automobiles, wherein the at least a second band is in a different electromagnetic spectrum area than the at least the first band. The system may comprise at least one processor configured to configured to receive signal information from the at least one receiver. The at least one processor may determine from the plurality of electromagnetic emissions in the at least the first band, locations of pedestrians in a vicinity of the intersection and determine from the plurality of electromagnetic emissions in the at least the second band, locations of automobiles in a vicinity of the intersection. The at least one processor may further use the determined location information of the pedestrians and the location information of the automobiles to manage traffic in the intersection.

Another aspect of the present disclosure is directed to a method for managing pedestrian and automobile traffic in an intersection. The method may include detecting a plurality of electromagnetic emissions in at least a first band associated with personal mobile communications devices of a plurality of pedestrians and detecting a plurality of electromagnetic emissions in at least a second band associated with a plurality of automobiles, wherein the at least a second band is in a different electromagnetic spectrum area than the at least the first band. The method may further include receiving signal information; determining from the plurality of electromagnetic emissions in the at least the first band, locations of pedestrians in a vicinity of the intersection; determining from the plurality of electromagnetic emissions in the at least the second band, locations of automobiles in a vicinity of the intersection; and using the determined location information of the pedestrians and the location information of the automobiles to manage traffic in the intersection.

According to an aspect of the present disclosure, a system is disclosed for predicting a possible collision between moving road users in a roadway area and for sending remedial action signals to the moving road users. The system may comprise at least one sensor configured to be fixedly mounted in a vicinity of the roadway area. The system may comprise at least one processor configured to be fixedly mounted in the vicinity of the roadway area, to receive signal information from the at least one sensor. The at least one processor may determine a speed and a trajectory of a first moving road user in the roadway area based on the received signal information and determine a speed and a trajectory of a second moving road user in the roadway area based on the received signal information. The at least one processor may further determine based on the determined speeds and the trajectories that a collision is likely between the first moving road user and the second moving road user. The at least one processor may further wirelessly send to at least one of the first moving road user and the second moving road user a remedial action signal for causing a change associated with at least one of the first moving road user and the second moving road user to avoid the likely collision.

Another aspect of the present disclosure is directed to a method for predicting a possible collision between moving road users in a roadway area and for sending remedial action signals to the moving road users. The method may include receiving signal information, determining a speed and a trajectory of a first moving road user in the roadway area based on the received signal information, and determining a speed and a trajectory of a second moving road user in the roadway area based on the received signal information. The method may further include determining based on the determined speeds and the trajectories that a collision is likely between the first moving road user and the second moving road user; and sending wirelessly to at least one of the first moving road user and the second moving road user a remedial action signal for causing a change associated with at least one of the first moving road user and the second moving road user to avoid the likely collision.

According to an aspect of the present disclosure, a system is disclosed for managing vehicle traffic in an intersection. The system may comprise at least one receiver configured to detect a plurality of electromagnetic emissions originating from vehicles in a vicinity of the intersection. The system may comprise at least one processor configured to configured to receive signal information from the at least one receiver, wherein the signal information is representative of at least some of the plurality of electromagnetic emissions. The at least one processor may determine substantially in real-time locations of a plurality of vehicles approaching the intersection based on the received signal information. The at least one processor may further identify a vehicle type for each of the plurality of vehicles approaching the intersection and may retrieve from a memory a traffic-priority-level for each of the plurality of vehicles approaching the intersection, wherein the plurality of vehicles approaching the intersection includes at least one first vehicle associated with a first traffic-priority-level and at least one second vehicle associated with a second traffic-priority-level having a traffic-priority level greater than the first traffic-priority-level. The at least one processor may further determine a traffic management action based on the determined locations and the traffic-priority-levels of the plurality of vehicles approaching the intersection and may initiate the traffic management action to enable the at least one second vehicle to cross the intersection earlier than if the at least one second vehicle would have been associated with the first traffic-priority-level.

Another aspect of the present disclosure is directed to a method for managing traffic in an intersection. The method may include detecting a plurality of electromagnetic emissions originating from vehicles in a vicinity of the intersection. The method may further include receiving signal information, wherein the signal information is representative of at least some of the plurality of electromagnetic emissions. The method may further include determining substantially in real-time locations of a plurality of vehicles approaching the intersection based on the received signal information. The method may further include identifying a vehicle type for each of the plurality of vehicles approaching the intersection. The method may further include retrieving from a memory a traffic-priority-level for each of the plurality of vehicles approaching the intersection, wherein the plurality of vehicles approaching the intersection includes at least one first vehicle associated with a first traffic-priority-level and at least one second vehicle associated with a second traffic-priority-level having a traffic-priority level greater than the first traffic-priority-level. The method may further include determining a traffic management action based on the determined locations and the traffic-priority-levels of the plurality of vehicles approaching the intersection. The method may further include initiating the traffic management action to enable the at least one second vehicle to cross the intersection earlier than if the at least one second vehicle would have been associated with the first traffic-priority-level.

According to an aspect of the present disclosure, a system is disclosed for managing traffic in a road area. The system may comprise at least one receiver configured to detect a plurality of electromagnetic emissions originating from a plurality of road-vehicles driving in the road area. The system may comprise at least one processor configured to receive signal information from the at least one receiver, wherein the signal information is representative of at least some of the plurality of electromagnetic emissions. The at least one processor may determine, from the signal information representative of at least some of the plurality of electromagnetic emissions, a velocity and a heading for at least some of the plurality of road-vehicles. The at least one processor may further determine, at least in part from the signal information representative of at least some of the electromagnetic emissions which of the plurality of vehicles in the road area is a manually driven vehicle. The at least one processor may further selectively send control signals including vehicle control signals to at least one of the determined autonomous vehicles or traffic flow control signals to at least one traffic light in the in the road area, wherein the control signals are determined based on a first set of traffic-management rules when the at least one processor determines that all of the plurality of vehicles are autonomous, and wherein the control signals are determined based on a second set of traffic-management rules when the at least one processor determines that at least one of the plurality of vehicles is manually driven.

Another aspect of the present disclosure is directed to a method for managing traffic in a road area. The method may include detecting a plurality of electromagnetic emissions originating from a plurality of road-vehicles driving in the road area. The method may further include receiving signal information, wherein the signal information is representative of at least some of the plurality of electromagnetic emissions. The method may further include determining, from the signal information representative of at least some of the plurality of electromagnetic emissions, a velocity and a heading for at least some of the plurality of road-vehicles. The method may further include determining, at least in part from the signal information representative of at least some of the electromagnetic emissions, which of the plurality of road-vehicles in the road area is an autonomous vehicle. The method may further include determining, at least in part from the signal information representative of at least some of the electromagnetic emissions which of the plurality of vehicles in the road area is a manually driven vehicle. The method may further include sending selectively control signals including vehicle control signals to at least one of the determined autonomous vehicles or traffic flow control signals to at least one traffic light in the in the road area, wherein the control signals are determined based on a first set of traffic-management rules when the at least one processor determines that all of the plurality of vehicles are autonomous, and wherein the control signals are determined based on a second set of traffic-management rules when the at least one processor determines that at least one of the plurality of vehicles is manually driven.

According to an aspect of the present disclosure, a system is disclosed for remotely controlling movements of autonomous vehicles in an area of interest. The system may comprise at least one sensor configured to detect autonomous vehicles within the area of interest. The system may comprise at least one processor configured to receive signal information from the at least one sensor and may also receive travel-related information from each autonomous vehicle in the area of interest. The at least one processor may exercise at least partial control over each of the autonomous vehicles in the area of interest to facilitate safe navigation through the area of interest, wherein the exercise of at least partial control includes transmission of control signal to each of the autonomous vehicles to remotely control each of the autonomous vehicles. The at least one processor may further cease transmission of control signals to each of the autonomous vehicles when each of the autonomous vehicles exits the area of interest, to thereby permit each of the autonomous vehicles to resume full autonomous self-control Another aspect of the present disclosure is directed to a method for remotely controlling movements of autonomous vehicles in an area of interest. The method may include detecting autonomous vehicles within the area of interest, receiving signal information, and receiving travel-related information from each autonomous vehicle in the area of interest. The method may include exercising at least partial control over each of the autonomous vehicles in the area of interest to facilitate safe navigation through the area of interest, wherein the exercise of at least partial control includes transmission of control signal to each of the autonomous vehicles to remotely control each of the autonomous vehicles. The method may further include ceasing transmission of control signals to each of the autonomous vehicles when each of the autonomous vehicles exits the area of interest, to thereby permit each of the autonomous vehicles to resume full autonomous self-control.

In an embodiment, a system for using a distance-measuring beacon detector of a road vehicle as a mechanism to convey a message to the road vehicle may include: at least one receiver configured to be located in a vicinity of a roadway and to detect non-reflected electromagnetic emissions originating from the distance-measuring beacon detector of the road vehicle; at least one transmitter configured to be located in the vicinity of the roadway; and at least one processor configured to receive signal information from the at least one receiver. The at least one processor may be configured to: associate the detected non-reflected electromagnetic emissions with the road vehicle; and cause the transmitter to transmit the message to the road vehicle via the distance measuring beacon detector of the road vehicle.

In another embodiment, a computer implemented method for using a distance-measuring beacon detector of a road vehicle as a mechanism to convey a message to the road vehicle may include the steps of: detecting, by at least one receiver, non-reflected electromagnetic emissions originating from the distance measuring beacon detector of the road vehicle; receiving, by a processor, signal information from the at least one receiver; associating the detected non-reflected electromagnetic emissions with the road vehicle; and causing a transmitter to transmit the message to the road vehicle via the distance measuring beacon detector of the road vehicle.

In an exemplary embodiment, a dual usage beacon system for a vehicle may be configured to determine distance to an object in a path of the vehicle and to receive messages originating from outside the vehicle. The system may include: at least one beacon configured to emit a first electromagnetic signal; at least one antenna associated with the at least one beacon and configured to receive a reflection of the first electromagnetic signal from an object in a path of the vehicle; and at least one processor. The at least one processor may be configured to: obtain from the at least one antenna associated with the beacon at least one signal representative of the received reflection of the first electromagnetic signal; determine based on the obtained at least one signal representative of the received reflection of the first electromagnetic signal a distance between the vehicle and the object in a path of the vehicle; obtain from the at least one antenna associated with the beacon, at least a second signal representative of a non-reflected electromagnetic signal not associated with the first electromagnetic signal, the at least a second signal including a message sent by at least one transmitter of a traffic control system, the at least one transmitter being fixedly mounted in a vicinity of a roadway area; and execute a vehicle control action based on the message.

In another embodiment, a dual usage beacon system for a vehicle may be configured to determine distance to an object in a path of the vehicle and to transmit at least one message to a traffic control system. The system may include: at least one beacon configured to emit a first electromagnetic signal and a second electromagnetic signal, wherein the first electromagnetic signal is configured for use in determining a distance between the vehicle and the object in the path of the vehicle, and wherein the second electromagnetic signal is configured for use in conveying the at least one message to a traffic control system; at least one antenna associated with the beacon and configured to receive a reflection of the first electromagnetic signal from the object in the path of the vehicle; and at least one processor. The at least one processor may be configured to: obtain from the at least one antenna associated with the at least one beacon a signal representative of the received reflection of the first electromagnetic signal; determine from the obtained signal representative of the received reflection of the first electromagnetic signal a distance between the vehicle and the object in the path of the vehicle; determine the at least one message for use by a traffic control system; and cause the at least one beacon to emit the second electromagnetic signal for use one or more traffic control systems, wherein the second electromagnetic signal includes the at least one message.

In some embodiments, an apparatus for enabling a road-vehicle to communicate with a road traffic management system may be provided. The apparatus may include a housing; an electrical interface associated with the housing, the electrical interface being configured to convey energy from the road-vehicle to the apparatus; and a transmitter configured to emit modulated electromagnetic signals for detection by the road traffic management system, wherein the modulated electromagnetic signals are configured to convey information identifying the road-vehicle as a manually-driven vehicle and enable the traffic management system to monitor movement of the road-vehicle.

Some disclosed embodiments may include a vehicle comprising a chassis and a transmission system for enabling the vehicle to communicate with a road traffic management system. The transmission system may include a housing; an electrical interface associated with the housing, the electrical interface being configured to convey energy from the road-vehicle to the apparatus; and a transmitter configured to emit modulated electromagnetic signals for detection by the road traffic management system, wherein the modulated electromagnetic signals are configured to convey information identifying the vehicle as a manually-driven vehicle and enable the traffic management system to monitor movement of the vehicle.

Some embodiments may include a system for monitoring road traffic. The system may include at least one receiver configured to be fixedly positioned in a vicinity of an area of interest on a roadway and to detect a plurality of non-reflected electromagnetic emissions originating from road users in the area of interest; at least one processor configured to receive signal information from the at least one receiver, wherein the signal information is representative of the plurality of non-reflected electromagnetic emissions, and to: determine, based on the signal information representative of the plurality of non-reflected electromagnetic emissions, instantaneous velocities and locations of a plurality of road users; determine substantially in real-time, based on the determined instantaneous velocities and locations of at least two of the plurality of road users, that the at least two road users are involved in an accident; and automatically forward a report with a location of the accident to an emergency dispatch system.

Some embodiments may include a method for monitoring road traffic, where the method includes receiving signal information representative of the plurality of non-reflected electromagnetic emissions, wherein the non-reflected electromagnetic emissions originate from road users in an area of interest; determining, based on the signal information representative of the plurality of non-reflected electromagnetic emissions, instantaneous velocities and locations of a plurality of road users; determining, based on the determined instantaneous velocities and locations of at least two of the plurality of road users, that the at least two road users are involved in an accident; and automatically forwarding a report with a location of the accident to an emergency dispatch system.

Embodiments of the disclosure can provide a system for re-creating roadway incidents. The system can include: at least one receiver configured to be fixedly positioned in a vicinity of an area of interest on a roadway and to detect a plurality of non-reflected electromagnetic emissions originating from a plurality of road users in the area of interest; and at least one processor configured to receive signal information from the at least one receiver, the signal information being representative of at least some of the detected plurality of non-reflected electromagnetic emissions. The at least one processor can be further configured to: identify, in the signal information representative of at least some of the plurality of the non-reflected electromagnetic emissions, a specific electromagnetic waveform associated with each of the plurality of road users; determine for each of the plurality of road users at least one of a location, speed, and direction, at least in part based on frequencies of the plurality of non-reflected electromagnetic emissions and the specific electromagnetic waveform; aggregate and store information about the determined at least one of a location, speed, and direction, for each of the plurality of road users; receive a request, after a roadway incident, to re-create movement of road users on the roadway during a time period associated with the roadway incident; and upon receipt of the request, use the aggregated and stored information from the electromagnetic waveforms to re-create the roadway incident.

Embodiments of the disclosure can further provide a method for re-creating roadway incidents. The method can include: detecting a plurality of non-reflected electromagnetic emissions originating from a plurality of road users driving in the area of interest to generate signal information being representative of at least some of the detected plurality of non-reflected electromagnetic emissions; identifying, in the signal information representative of at least some of the plurality of the non-reflected electromagnetic emissions, a specific electromagnetic waveform associated with each of the plurality of road users; determining for each of the plurality of road users at least one of a location, speed, and direction, at least in part based on frequencies of the plurality of non-reflected electromagnetic emissions and the specific electromagnetic waveform; aggregating and storing information about the determined at least one of a location, speed, and direction, for each of the plurality of road users; and receiving a request, after a roadway incident, to re-create movement of road users on the roadway during a time period associated with the roadway incident; and upon receipt of the request, using the aggregated and stored information from the electromagnetic waveforms to re-create the roadway incident.

Embodiments of the disclosure may include a system for electromagnetically monitoring parking spaces in an area of interest. The system can include: at least one receiver configured to be fixedly mounted in the vicinity of the area of interest and to detect a plurality of electromagnetic emissions originating from a plurality of vehicles; at least one processor configured to receive signal information from the at least one receiver, the signal information being representative of at least some of the detected plurality of electromagnetic emissions. The at least one processor can be further configured to: determine, based on the received signal information, frequencies of the plurality of electromagnetic emissions originating from the plurality of vehicles; determine at least in part based on the determined frequencies associated with the plurality of electromagnetic emissions originating from the plurality of vehicles, whether any of the plurality of vehicles has vacated a parking space; and if any of the plurality of vehicles is determined to have exited a parking space, inform a vehicle in search of a parking space of at least one parking spot location vacated by at least one of the plurality of vehicles.

Embodiments of the disclosure further provide a method for electromagnetically monitoring parking spaces in an area of interest. The method can include: detecting a plurality of electromagnetic emissions originating from a plurality of vehicles to generate signal information being representative of at least some of the detected plurality of electromagnetic emissions; determining, based on the received signal information, frequencies of the plurality of electromagnetic emissions originating from the plurality of vehicles; determining at least in part based on the determined frequencies associated with the plurality of electromagnetic emissions originating from the plurality of vehicles, whether any of the plurality of vehicles has vacated a parking space; and in response to the determination that any of the plurality of vehicles have exited a parking space, informing a vehicle in search of a parking space of at least one parking spot location vacated by at least one of the plurality of vehicles.

Embodiments of the disclosure also provide a non-transitory computer readable medium that stores a set of instructions that is executable by at least one processor of an electric system to cause the system to perform a method for electromagnetically monitoring parking spaces in an area of interest. The method can include: detecting a plurality of electromagnetic emissions originating from a plurality of vehicles to receive signal information being representative of at least some of the detected plurality of electromagnetic emissions; determining, based on the received signal information, frequencies of the plurality of electromagnetic emissions originating from the plurality of vehicles; determining at least in part based on the determined frequencies associated with the plurality of electromagnetic emissions originating from the plurality of vehicles, whether any of the plurality of vehicles has vacated a parking space; and in response to the determination that any of the plurality of vehicles have exited a parking space, informing a vehicle in search of a parking space of at least one parking spot location vacated by at least one of the plurality of vehicles.

The disclosed embodiments may include a system for providing driving route alternatives may include a memory configured to store data defining roadways in a geographical area, wherein the stored data includes map data and regulatory data associated with the geographical area. The system may also include a communications interface configured to: receive a travel request from a user, wherein the travel request includes information indicative of a desired destination and information indicative of a current location of the user derived at least partially from positioning system information; and wherein the communications interface is also configured to receive current traffic information from a plurality of local traffic management systems, each local traffic management system monitoring traffic of a separate section of the geographical area. The system may also include at least one processor configured to access the memory, receive information from the communications interface, and: identify at least two route alternatives for use in transporting the user to the desired destination; determine cost information associated with each of the at least two route alternatives based, at least in part, on the stored data; determine an estimated time of arrival (ETA) based on the current traffic information for each of the at least two route alternatives; and cause a representation of the at least two route alternatives including the determined cost information and the determined ETA for enabling the user to select a driving route to the desired destination.

The disclosed embodiments may also include a method for providing driving route alternatives. The method may include: receiving a travel request from a user, wherein the travel request includes information indicative of a desired destination and information indicative of a current location of the user; receiving current traffic information from a plurality of local traffic management systems, each local traffic management system monitoring traffic of a separate section of the geographical area; identifying at least two route alternatives for use in transporting the user to the desired destination; determining cost information associated with each of the at least two route alternatives; determining an estimated time of arrival (ETA) based on the current traffic information for each of the at least two route alternatives; and causing a representation of the at least two route alternatives including the determined cost information and the determined ETA for enabling the user to select a driving route to the desired destination.

The disclosed embodiments may include a non-transitory computer readable medium that stores a set of instructions that is executable by at least one processor of an electric system to cause the system to perform a method for providing driving route alternatives, the method comprising: receiving a travel request from a user, wherein the travel request includes information indicative of a desired destination and information indicative of a current location of the user; receiving current traffic information from a plurality of local traffic management systems, each local traffic management system monitoring traffic of a separate section of the geographical area; identifying at least two route alternatives for use in transporting the user to the desired destination; determining cost information associated with each of the at least two route alternatives; determining an estimated time of arrival (ETA) based on the current traffic information for each of the at least two route alternatives; and causing a representation of the at least two route alternatives including the determined cost information and the determined ETA for enabling the user to select a driving route to the desired destination.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 17 is a flowchart of an example process for using emissions signals emitted by vehicles' onboard range-determining systems aboard individual vehicles to determine information about simultaneous movements of a plurality of vehicles on a roadway consistent with disclosed embodiments.

FIGS. 19A and 19B are diagrammatic representations of various examples of collision avoidance actions consistent with disclosed embodiments;

DETAILED DESCRIPTION

Figure 1:
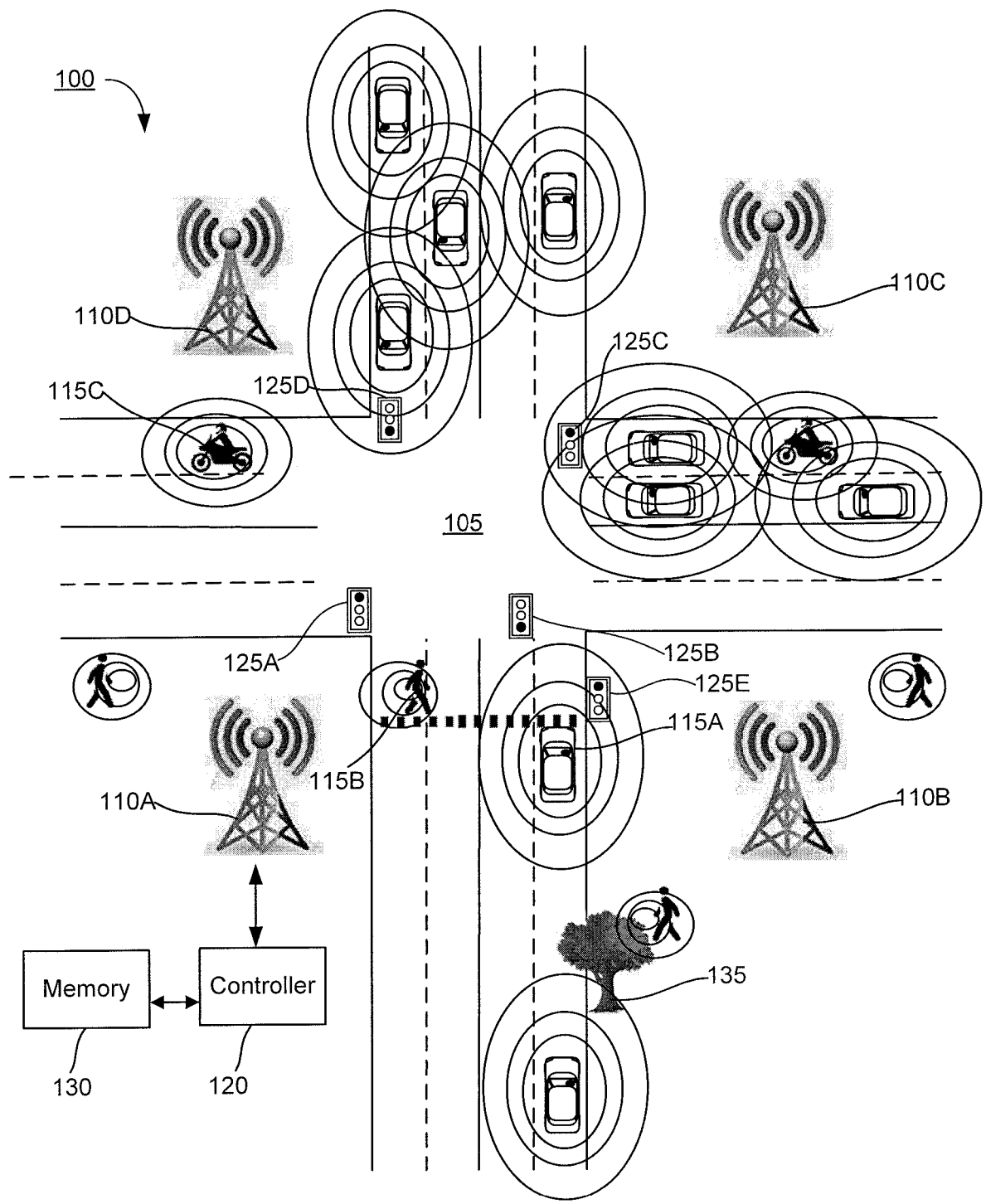
FIG. 1 is a schematic illustration of an example of a local system deployed in an intersection consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

System Overview and Terminology

Systems and methods are provided herein for detecting electromagnetic emissions to monitor and manage road traffic and mediate between road users in real time. The detected electromagnetic emissions may be utilized in a number of ways. Among other uses, the systems and methods can use the detected electromagnetic emissions to determine real time data about road users to generate a live and dynamic map. The systems and methods can use the detected electromagnetic emissions to initiate passive or active measures to avoid collision between road users. The systems and methods can use the detected electromagnetic emissions to manage traffic flow in intersections and other road features. The systems and methods can use the detected electromagnetic emissions to deter or prevent cyber-attacks on road vehicles.

As used in the present disclosure, the term "electromagnetic emissions" may refer to any form of electromagnetic emissions having any wavelength, frequency, energy, power, polarization, and/or spatial or temporal profile. In some embodiments, the electromagnetic emissions may be emitted from a mobile electronic device belonging to a road user and may include any observable or measurable characteristic emanating from a vehicle or from a device within the vehicle. In some cases, the electromagnetic emissions may be emitted from the vehicle's radar, the vehicle's engine, the vehicle's battery, a passenger's cell phone, a passenger's wearable device, or from any other electromagnetic sources emanating from a component associated with the vehicle or being transported by the vehicle. While the systems and methods described throughout the disclosure are configured to detect general electromagnetic emissions, in some cases, the disclosed systems and methods may be configured to detect Radio Frequency (RF) emissions from road users. The term "road users" may refer to any entity that may be found on or in proximity to a road. Examples of road users may include any type of a wheeled motor vehicle, cyclists with wearable devices, pedestrians with smartphones, animals with smart collars, among others. The terms "road agents" and "entities" may also be used interchangeably in this disclosure with reference to the road users.

Systems in accordance with the present disclosure may include multiple receivers for detecting electromagnetic emissions (e.g., non-reflected emissions) originating from road users. As used in the present disclosure, the term "receiver" or "EM sensor" broadly includes any device, element, or system capable of measuring properties (e.g., power, frequency, phase, pulse timing, pulse duration) of electromagnetic emissions and to generate an output relating to the measured properties. While any suitable frequency band of operation may be employed, in some embodiments, the receivers may be configured to have a reception band located between 400 MHz and 95 GHz. For example, some receivers may have a reception bandwidth of about 2 GHz which is placed within the range 400 MHz and 95 GHz. The placement can be dynamically changed in order to cover the entire spectrum. Alternatively, a set of receivers may be used to generate receiver channels, where each receiver channel is centered in different spectrum range, so that together they cover multiple different spectral bands. In some embodiments, the receivers may be configured to detect electromagnetic emissions in specific reception bands associated with different types of road users. For example, the receivers may detect electromagnetic emissions in a first reception band associated with personal mobile communications devices of road users (e.g., between 2.4 GHz and 2.4835 GHz) and in a second reception band associated with electronics incorporated into a plurality of automobiles (e.g., between 76 GHz and 81 GHz). The receivers may be configured to detect non-reflected electromagnetic emissions originating from a moving emission source associated with the road user. The term "detecting non-reflected electromagnetic emissions" or "detecting direct electromagnetic emissions" may refer to an operation in which the detected electromagnetic emissions originate directly from a source not associated with the receiver/detector of the electromagnetic emissions (e.g., contrary to LIDAR, RADAR, or other techniques in which a radiation source associated with a detector emits radiation and monitors reflections from various objects in order to interpret information about an environment about the source/detector). Instead, detecting non-reflected electromagnetic emissions or direct electromagnetic emissions may refer to techniques for observing and/or characterizing electromagnetic emissions from a source that moves together with the road user, agent, vehicle, etc. that produces the observed electromagnetic emissions (e.g., observing electromagnetic emissions that originate from an EM emitter moving independently relative to an EM detector or that originate from an EM emitter remotely located relative to the detector).

In one embodiment, the receivers may be placed near road intersections or a road periphery. Additionally, the receivers may be configured for placement at fixed locations along the roadway. The term "placement at a fixed location along the roadway" means that during the detection of the plurality of electromagnetic emissions, the positions of the receivers relative to the respective roadway does not change. In one embodiment, a receiver consistent with the disclosure may be mounted on a traffic light, a lamppost, a billboard, a cellular antenna, among others. In another embodiment, a mobile receiver may be provided. The mobile receiver may be temporarily deployed along the roadway, for example, near construction areas or parades. In any event, during the detection of the plurality of electromagnetic emissions the mobile receiver may be stationary.

Figure 6:
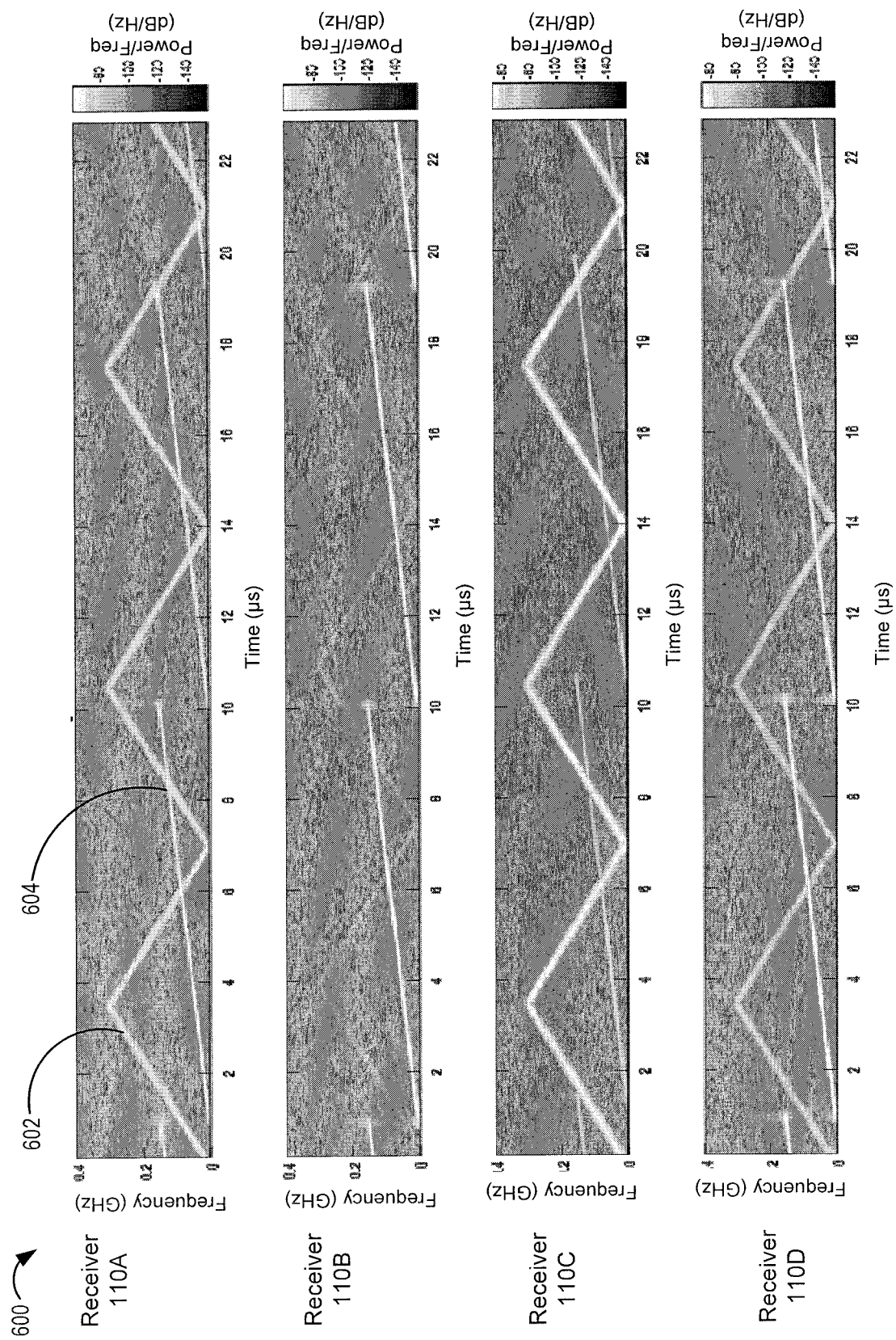
FIG. 6 is an example of the signal information from receivers of a local system detecting emissions of two road users, consistent with disclosed embodiments.

A system in accordance with the present disclosure may be configured to analyze the detected non-reflected electromagnetic emissions to identify an electromagnetic fingerprint for each road user. The term "electromagnetic fingerprint" or "electromagnetic waveform" refers to any information derivable from the detected electromagnetic emissions of a road user that can uniquely identify the road user or at least some equipment component, subpart, etc. associated with the road user. Examples of two electromagnetic waveform of two different road users are shown in FIG. 6. In one embodiment, the electromagnetic fingerprint may be fixed, and the system can use the electromagnetic waveform to detect the road user in different remote locations, for example, different intersections. In another embodiment, the electromagnetic waveform may be dynamic and the system can monitor the changes of the electromagnetic waveform while the road user is in the coverage area of the receivers. Consistent with embodiments of the disclosure, the system may be configured to use the detected non-reflected electromagnetic emissions to calculate values representing a plurality of moving entities on a roadway. The calculated values may include, e.g., the location, the speed, and/or the movement direction of each of the moving entities on the roadway. The system may calculate the values using the Doppler Effect, the phase difference, or the time difference of non-reflected electromagnetic emissions, among other characteristics.

A system in accordance with the present disclosure may be configured to initiate traffic management actions based on the detected electromagnetic emissions of multiple road users. The term "traffic management action" broadly includes any action that may lead to a change at least one operational characteristic of at least one road user. In one embodiment, the traffic management action may include indirect actions. Examples of indirect traffic management actions may include altering a traffic signal (e.g., from green light to red light), sending a warning message to at least one road user, and more. In another embodiment, the traffic management action may include direct actions. Examples of direct traffic management actions may include sending a control signal to a road user causing a change in navigation parameters (stopping, slowing, turning, etc.) associated with the road user. In one embodiment, the traffic management action may include a collision prevention action to prevent a possible collision between, for example, two or more road users (e.g., control signals being sent to at least one of the two or more road users to cause a navigational change in the receiving at least one road user in order to avoid a collision between the two or more road users). In another embodiment, the type of the collision prevention action may be determined by the type of the road user. For example, for autonomous vehicles, the system may serve as a Local Positioning System (LPS) and physically guide autonomous vehicles in the intersection. For manually driven vehicles, the system may serve as ADAS system by providing it with geo-location information and accurate data about the vehicles' driving surrounding and deliver warning signals to the human driver. In one embodiment, the system may generate a synthetic signal that will cause an alert to events that may not be captured by the vehicles themselves. For example, the system can detect a person (carrying a smartphone) that is about to cross the road from an area undetectable to a human driver—with or without assistance systems. In addition, the system can send messages to human drivers that they should drive at a certain speed or at a certain lane.

A system in accordance with the present disclosure may be configured to assist autonomous vehicles in navigating intersections. The term "autonomous vehicle" as used herein generally refers to a vehicle configured for operation, at least over periods of time or in certain geo-fenced areas, without a human deriver and/or supervising the driving environment. Consistent with the present disclosure, the term "autonomous vehicle" also includes semi-autonomous vehicles (also known as "smart vehicles") that operate to some degree in an autonomous fashion. For example, a semi-autonomous vehicle may be one which is capable of receiving instructions (e.g., via a wireless connection or from a human driver) required in order to operate the vehicle in certain situations, such as, when the vehicle can no longer operate autonomously for some reason. In addition, a semi-autonomous vehicle can also be a car that has AEB—automated emergency braking. With reference to the ranking of the Society of Automotive Engineers (SAE), semi-autonomous vehicles may be associated with SAE level of 02 or higher.

In one embodiment, the system may use the detected electromagnetic emissions of multiple road users to generate an accurate, live dynamic map of a road area. Specifically, the system may be configured to detect road users in an area having a width of about 350 meters, 500 meters, 1500 meters, 3000 meters, 5000 meters, or more. Unless indicated otherwise, the term "about" with regards to a numeric value may be understood as including a variance of up to 10% with respect to the stated value. In one example, the map may include accurate information about different road agents. The information may include vehicles' geo-location, trajectory, speed, and acceleration. In one embodiment, the system may generate alerts from the information or share some of the information with road users. In cases where the vehicle can geo-locate itself based on other measures (e.g., GPS), the disclosed system may validate and verify the measurements made by the vehicle itself. Alternatively, disclosed system may correct the vehicle's measurements and notify the vehicle about the discrepancy. This way, the disclosed system can bridge the technological gaps of on-board sensors (radar-cam-Lidar) caused by weather, environmental conditions (e.g., sun gazing and fog). In addition, the system can detect road users out-of-range of current on-board sensors (e.g., detect a moving vehicle from more than 800 meters away from other moving vehicles).

System Overview

FIG. 1 illustrates a local system 100 deployed in an intersection 105 and configured to monitor and manage traffic in intersection 105. In the depicted exemplary configuration, local system 100 includes four receivers 110 for determining at least one of location, speed, and direction of different road users 115. The surroundings of intersection 105 include three types of road users 115: vehicles 115A, pedestrians 115B, and motorcyclists 115C. Each road user 115 may generate electromagnetic emissions represented by three circles surrounding the road user. The electromagnetic emissions may originate from the vehicles' radars, cellular phones, and/or other electronic equipment and devices. In one embodiment, road user 115 may emit various types of electromagnetic emissions. For example, a person driving a vehicle may carry one or more electronic devices (e.g., a smartphone, a wearable device). In this example, road user 115 may emit electromagnetic emissions associated with the vehicle and electromagnetic emissions associated with the one or more electronic devices.

In one embodiment, local system 100 may include one or more receivers 110 that passively achieve understanding of what is happening on the road by intercepting the electromagnetic emissions of road users 115. The one or more receivers 110 may be configured to detect and analyze the electromagnetic emissions of road users 115 in order to, for example, generate a highly accurate, live dynamic map of the area of intersection 105. In the illustrated exemplary configuration, the intersection area may be monitored by four receivers (namely 110A, 110B, 110C, and 110D); however, in other configurations an intersection area may be monitored by fewer receivers 110 (or more). In one configuration, local system 100 may have a single receiver 110 to cover an area of interest. The different components and the operation of receivers 110 are described in greater detail below with reference to FIG. 2.

Consistent with the present disclosure, the generated signals from each receiver 110 may be conveyed to a controller 120. Specifically, the generated signals may be fed into controller 120 that may include at least one processor configured to execute a scene analysis and to initiate traffic management actions. In one example, the traffic management actions may include, for example, controlling traffic lights 125A, 125B, 125C, 125D, and 125E. In one embodiment, controller 120 may transform traffic in intersection 105 from liquid dynamics (i.e., a red traffic light or a stop sign acts like a dam stopping the flow) to a slot-based mechanism where each road user 115 is assigned a specific route synchronized with the routes of other road users 115. In another embodiment, controller 120 may improve the traffic flow in intersection 105 and increase the average throughput of intersection 105 (i.e., the average number of vehicles crossing an intersection in a predefined period of time), for example, by 10%, 20%, 30%, or more. One way in which controller 120 may increase the average throughput of intersection 105 is by changing the traffic lights based on the real traffic conditions as opposed to predefined scheduling regime. Another way in which controller 120 may increase the average throughput of intersection 105 is by transmitting messages to at least some of the vehicles approaching intersection 105 causing them to adjust their location based on the determined locations of other road users.

The at least one processor associated with controller 120 may constitute any physical device having an electric circuit that performs a logic operation on input or inputs. For example, the at least one processor may include one or more integrated circuits (IC), including Application-specific integrated circuits (ASIC), microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. In one embodiment, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically, or by other means that permit them to interact.

Consistent with the present disclosure, the instructions executed by at least one processor may, for example, be pre-loaded into a memory 130 integrated with or embedded into controller 120 or may be stored in a separate memory. Memory 130 may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In one embodiment, memory 130 may be configured to store data defining roadways in an area of interest (e.g., the surroundings of intersection 105). The stored data may include map data and regulatory data. In addition, memory 130 may be configured to store data associated with vehicles types and details about their associated radar system, the placement and/or geographical location of receivers 110 in intersection 105, and more. In another embodiment, memory 130 may store past movements of vehicles in an intersection. The stored data may be used as an input to an Artificial Intelligence (AI) machine for determining information about intersection 105, such as lane lines, driving habits, danger level, and more. In addition, the stored data may be deleted after a predetermined period of time. For example, memory 130 may store information (e.g., the location, the speed, and/or direction) for road users 115 crossing intersection 105 in the last 48 hours, in the last 24 hours, or in the last 12 hours. In one use case, after a collision, police investigators may use the stored information to re-create the accident.

In the situation illustrated in FIG. 1, there are two pedestrian-vehicle cases that may result in a collision. The first case includes a pedestrian crossing the road when a traffic light 125E is red and vehicles arriving from the other side of the intersection. The second case includes a pedestrian about to cross a road not in an existing crosswalk and which may be undetectable by an approaching vehicle due to a tree 135. In both of these cases, local system 100 can detect the movement of the pedestrians (assuming they are carrying any device generating electromagnetic transmissions) and trigger one or more traffic management actions to prevent a collision. For example, in the first case, local system 100 can change the light in traffic light 125D to red; and in the second case, local system 100 can send the relevant vehicle a warning message about an approaching pedestrian behind the tree. A person skilled in the art would recognize that these pedestrian-vehicle cases are only examples, the disclosed system can be used to prevent collisions involving any type of road users.

Figure 2:
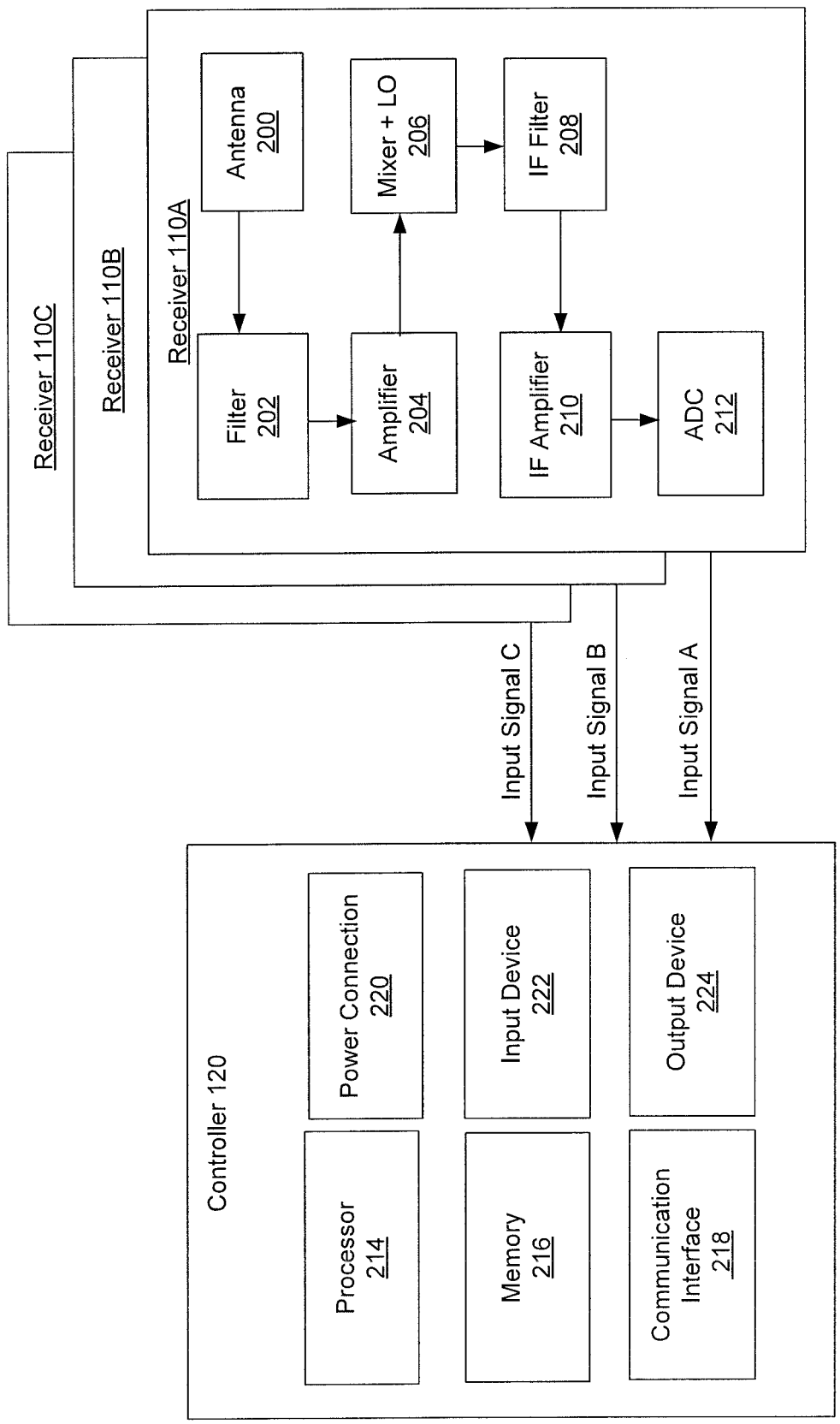
FIG. 2 is a schematic illustration of several exemplary components of the local system illustrated in FIG. 1 consistent with the disclosed embodiments.

FIG. 2 is a block diagram illustrating the components of exemplary configuration of local system 100, consistent with disclosed embodiments. In this exemplary configuration, local system 100 includes three receivers 110 configured to work in the RF band (namely, receiver 110A, receiver 110B, receiver 110C). Each receiver 110 may include an RF antenna 200, an RF band-path filter 202, an amplifier 204, a mixer and Local Oscillator (LO) 206, an intermediate frequency (IF) filter 208, an IF amplifier 210, and an analog-to-digital converter (ADC) 212. As will be appreciated by a person skilled in the art having the benefit of this disclosure, numerous variations and/or modifications may be made to receiver 110. Not all components are essential for the operation of receiver 110, and the components may be rearranged into a variety of configurations while providing the functionality of the disclosed embodiments.

Consistent with the present disclosure, each receiver 110 may operate as follows. First, RF antenna 200 may generate input signals in response to RF emissions from road users 115. The RF signal may be filtered by filter 202 which may allow the frequency of the desired radio transmission to pass through and block signals at all other frequencies. Thereafter, the power of the input signal is amplified in amplifier 204 to reduce or prevent signal decay as the signal propagates through receiver 110. The amplified RF signal may be shifted down to a lower intermediate frequency (IF), using mixer and LO 206. Specifically, the input signal may be mixed in a nonlinear circuit with another signal generated by the local oscillator (LO). The down-converted signal may be filtered and amplified again in the IF stage using IF filter 208 and IF amplifier 210. At this stage the IF analog signal may be digitized by ADC 212. The digitized input signal may be conveyed to controller 120 for processing and extraction of the desired information. Examples of the signal information that may be conveyed to controller 120 from each receiver are depicted in FIG. 6.

As shown in FIG. 2, controller 120 includes a processor 214, a memory device 216 (e.g., memory 120), a communication interface 218 (for example, a modem, Ethernet card, or any other interface configured to exchange data over a wireless network), a power connection 220 for connecting controller 120 with an external power source or an external device (not shown), an input device 222 (for example, keyboard, touch screen, a microphone, a camera), and an output device 224 (for example, a speaker or a display). The various components in controller 120 may be coupled by one or more communication buses or signal lines. One skilled in the art will appreciate that the configuration of controller 120 may have numerous variations and modifications. Some controllers 120 may include additional components (e.g., a backup power source and various sensors), while other controllers 120 may include fewer components (e.g., no output device 224). The configuration shown in FIG. 2 should not be considered essential for the operation of controller 120.

In one embodiment, controller 120 may be configured to receive signal information from receivers 110A, 110B, and 110C. A vehicle radar may use pulsed signals with carrier frequencies near 24 GHz or carrier frequencies near 79 GHz, where each pulse carrier can be modulated by a linear frequency modulation of hundreds of MHz. Consistent with embodiments of the disclosure, controller 120 may measure one or more of the following parameters: carrier radio frequency (Fe), pulse amplitude (PA), pulse width (PW), time of arrival (TOA). Based on these measurements the location (LOC) of a road user can be calculated, for example, by the using a multilateration method described below. Furthermore, modulation on the pulse (MOP) is another parameter that can be used to identify a particular emitter and also can be used to determine the linear frequency modulation rate or phase coding of a pulse compression (PC). In some systems, additional signal parameters, such as polarization, may be measured. These parameters measured on a single intercepted signal may be referred to as pulse descriptor word (PDW).

The methods for measuring the above parameters may be based on but not limited to the fast Fourier transformation (FFT) and the short-time Fourier transformation (STFT). The system may measure the carrier frequency, amplitude, modulation on pulse, and the time of pulse arrival. For the location estimation, the system may use any multilateration techniques known in the art, such as time-difference of arrival (TDOA) and frequency difference of arrival (FDOA) described in the background section. The choice of specific technique depends on the types of applied sensors and the system configuration.

In one embodiment, local system 100 may use two multilateration techniques together to improve location accuracy of road users 115. The first technique is measuring the Time Difference Of Arrival (TDOA) of signals from an emitter at three or more synchronized sensors. In the TDOA technique, the time difference in reception of a signal received at multiple spaced sensing nodes may be used to define a hyperboloid upon which the emitter of interest is located. The second technique is measuring the Frequency Difference Of Arrival (FDOA) and it differs from TDOA in a number of additional requirements. For instance, the observation points must be in relative motion with respect to the emitter. Additionally, the radio frequency of the emitter's emissions should be known to the system. In the FDOA technique, the location of the emitter can be estimated with knowledge of the observation points' location, the vector velocities, and the observed relative Doppler shifts between pairs of locations.

Figure 3:
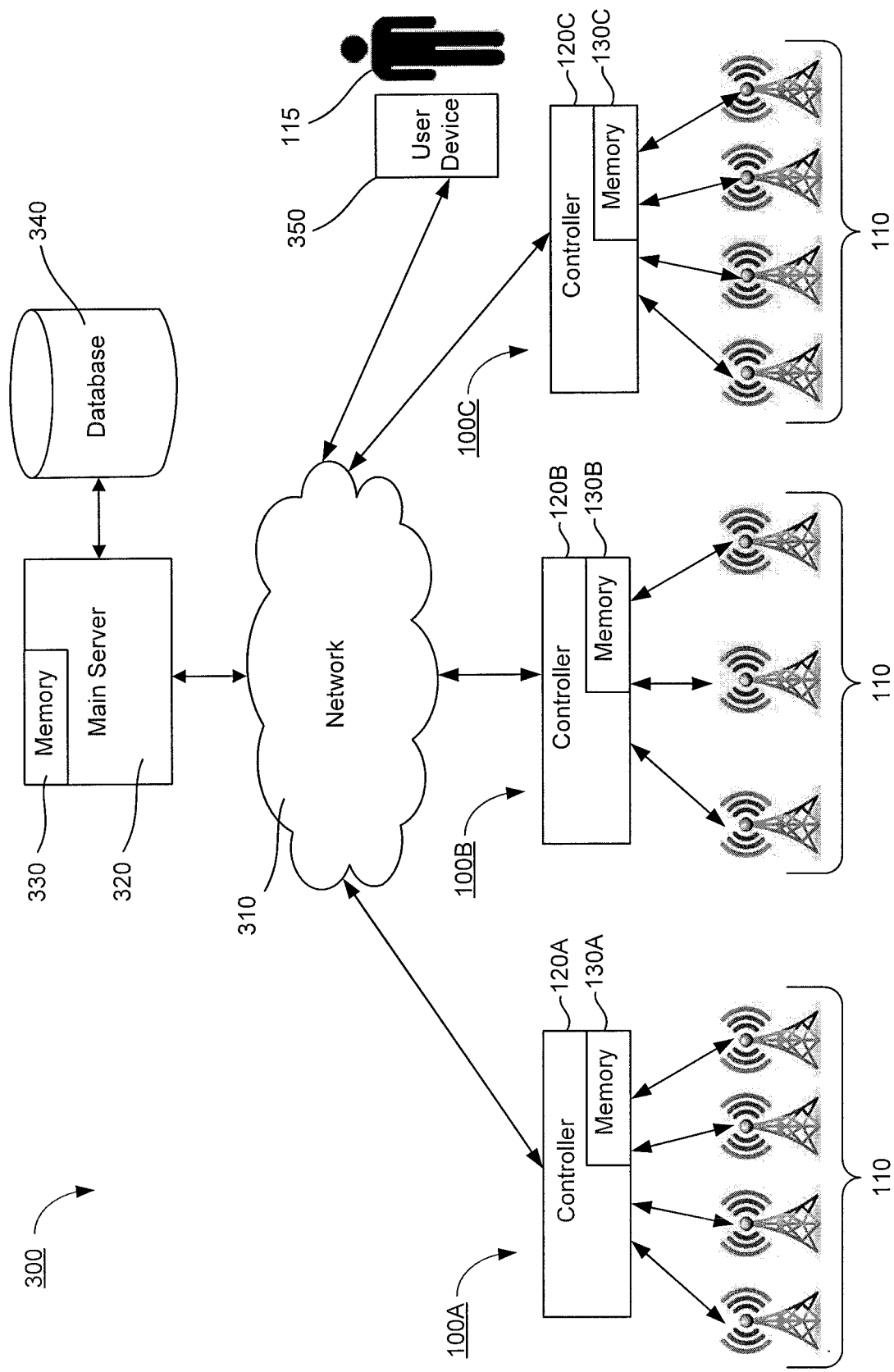
FIG. 3 is a schematic illustration of an example of a regional system configured to monitor and manage road traffic in geographic areas using multiple local systems consistent with the disclosed embodiments.

FIG. 3 illustrates a regional system 300 configured to monitor and manage traffic in a geographic area (e.g., a city or a municipal district) using multiple local systems 100. In one embodiment, regional system 300 may generate a dynamic map of the geographic area and may present to road users 115 route alternatives based on data aggregated using local systems 100. FIG. 3 illustrates only three local systems 100; however, as will be apparent to persons skilled in the art, the number of local systems 100 is not limited. In fact, as the number of local systems 100 grows, regional system 300 may manage the traffic in a given geographic area more efficiently. Consistent with the present disclosure, each local system 100 may be deployed in proximity of an area of interest (e.g., an intersection, an interchange, a roundabout, a highway exit, etc.). In addition, the number of receivers 110 per local system 100 may vary based on the topography, the layout of area of interest, the type of receivers 110 being used, and more.

According to one embodiment, the components of regional system 300 may communicate with each other via a network 310. The term "network" refers to a communication network that connects two or more entities located remotely from each other. In one embodiment, network 310 may be any type of network configured to provide communications between components of regional system 300. Specifically, real time updates from local systems 100A, 100B, and 100C may be simultaneously transmitted to a main server 320. In one example, network 310 may be any type of network (including infrastructure) that provides communications, exchanges information, and/or facilitates the exchange of information, such as the Internet, a Local Area Network, wireless network (e.g., a Wi-Fi/302.11 network), or other suitable connections that enables the sending and receiving of information between the components of regional system 300. In other embodiments, one or more components of regional system 300 may communicate directly through dedicated communication links (shown and not shown), such as, for example, a telephone network, an extranet, an intranet, the Internet, satellite communications, off-line communications, wireless communications, transponder communications, a local area network (LAN), a wide area network (WAN), and a virtual private network (VPN).

Consistent with the present disclosure, each local system 100 may exchange raw or processed data with main server 320 via respective communication links. Main server 320 may include one or more servers connected by network 310. In one example configuration, main server 320 may implement the methods described herein using customized hard-wired logic, one or more Application Specific Integrated Circuits (ASICs) or Field Programmable Gate Arrays (FPGAs), firmware, and/or program logic which in combination with the computer system cause main server 320 to be a special-purpose machine. According to one embodiment, the methods herein are performed by main server 320 in response to a processing device executing one or more sequences of one or more instructions contained in a memory device (e.g., memory 330). In some embodiments, the memory device may include operating system programs that perform operating system functions when executed by the processing device. By way of example, the operating system programs may include Microsoft Windows™, Unix™, Linux™, Apple™ operating systems, personal digital assistant (PDA) type operating systems, such as Apple iOS, Google Android, or other types of operating systems. In another example configuration, main server 320 may be a cloud server that aggregates data determined by controller 120 and can map the traffic in the geographic area. The term "cloud server" refers to a computer platform that provides services via a network, such as the Internet. When main server 320 is a cloud server it may use virtual machines that may not correspond to individual hardware. Specifically, computational and/or storage capabilities may be implemented by allocating appropriate portions of desirable computation/storage power from a scalable repository, such as a data center or a distributed computing environment.

As depicted in FIG. 3, main server 320 may be coupled to one or more physical or virtual storages such as database 340. Main server 320 can access database 340 to retrieve map data, regulatory data, and indications of past locations of at least some of road users 115. Database 340 may be a volatile or non-volatile, magnetic, semiconductor, tape, optical, removable, non-removable, or other type of storage device or tangible or non-transitory computer-readable medium. Database 340 may also be part of main server 320 or separate from main server 320. When database 340 is not part of main server 320, database 340 and main server 320 may exchange data via a communication link. Database 340 may include one or more memory devices that store data and instructions used to perform one or more features of the disclosed embodiments. In one embodiment, database 340 may include any suitable databases, ranging from small databases hosted on a work station to large databases distributed among data centers. Database 340 may also include any combination of one or more databases controlled by memory controller devices or software, such as document management systems, Microsoft SQL databases, SharePoint databases, Oracle™ databases, Sybase™ databases, or other relational databases.

Consistent with the present disclosure, local system 100 and/or regional system 300 may provide information directly to a user device 350 associated with road user 115. The term "user device" refers to a device including a processing unit and having computing capabilities and may include one or more processors configured to execute software instructions stored in memory. Some examples of user device 350 include a PC, a laptop, a tablet, a smartphone, and a smart vehicle. User device 350 may include software that when executed by a processor performs Internet-related communication, content display processes, and/or navigation procedures. For instance, user device 350 may execute browser or related mobile display software that generates and displays interfaces including content on a display device included in, or associated with, user device 350. User device 350 may include a mobile device that executes mobile device applications and/or mobile device communication software that allows user device 350 to communicate with components over network 310 and generates and displays content in interfaces via a display device included in user device 350.

In one embodiment, regional system 300 may utilize passive sensing of the EM signals emitted by road users 115. Multiple arrays of receivers 110 fixed in specific locations may be used to simultaneously intercept electromagnetic emissions. By analyzing and superimposing the acquired signals, an accurate geo-location of the EM emitters may be calculated and tracked over time. The geo-locations of the EM emitters from multiple local systems 100 may be conveyed toward main server 320 to generate a regional live dynamic map with accurate relative positioning of various road users 115 from different locations. The live dynamic map of the road is a new layer of information that can be utilized in several ways. For example, the dynamic map may be shared with road users 115 via any available communication (e.g., DSRC, 5G, etc.). In one embodiment, the map may provide road users 115 with accurate relative positioning information and may enable autonomous road users to interact with other road users. In another example, the dynamic map may be analyzed by the disclosed systems in order to detect dangerous situations. Whenever the regional system 300 and/or local system 100 detects a dangerous situation, the system may send warning information directly to the vehicles, for example, in a Vehicle-to-Infrastructure (V2I) framework. Some advantages of using regional system 300 relative to separated local systems 100 include a faster detection of a problem and response in case of emergency, and prioritizing unique road users 115, for example, first responders in emergency.

Figure 4:
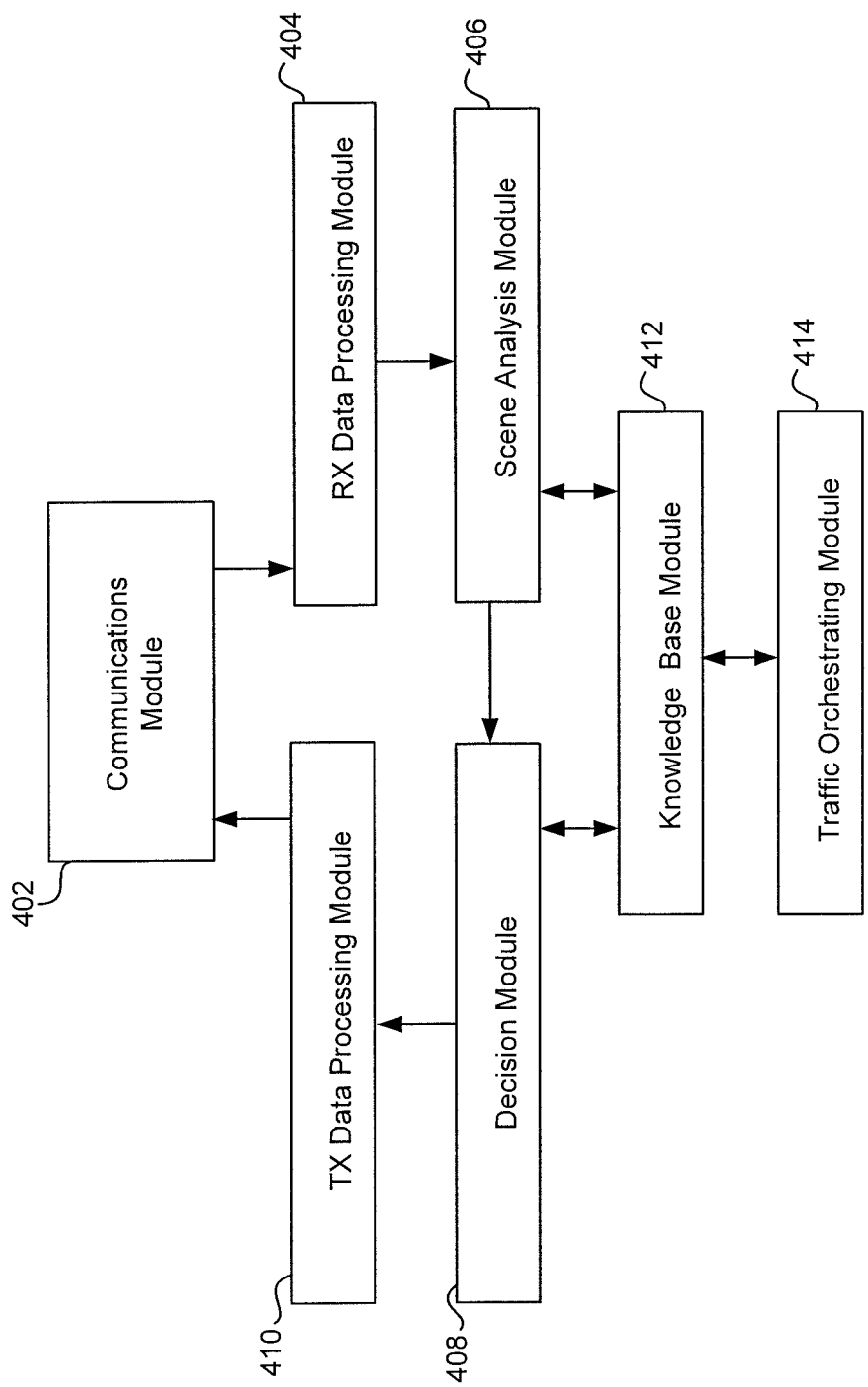
FIG. 4 is a schematic illustration of exemplary memory modules storing instructions for monitoring and managing road traffic consistent with the disclosed embodiments.

FIG. 4 is an exemplary block diagram of software modules for performing one or more operations in local system 100 and regional system 300. Consistent with disclosed embodiments, the software modules may be accessed by a processing device (e.g., controller 120 or main server 320). As discussed above, the processing device may include various devices, such as a central processing unit (CPU), support circuits, digital signal processors, integrated circuits, memory, or any other types of devices for signal processing and analysis. In one embodiment, the software modules may be accessed by the processing device. As shown in FIG. 4, the software modules may include a communications module 402, a RX data processing module 404, a scene analysis module 406, a decision module 408, a TX data processing module 410, a knowledge base module 412, and a traffic orchestrating module 414. In some configurations, all the software modules may be stored in a single memory device, for example, memory 330. Alternatively, the software modules may be stored in several separated memory devices. For example, some software modules may be stored in memory 330 and other software modules may be stored in memory 130. In one embodiment, each memory 130 of each local system 100 may include modules 402-412 and memory 330 of regional system 300 may include traffic orchestrating module 414. Further, controller 120 or main server 320 may execute the instructions stored in any of modules 402-414 no matter where they are actually stored.

Communications module 402 may store software instructions which, when executed by the processing device (e.g., controller 120 or main server 320), enable transmission and receipt of data from other components of local system 100 or regional system 300. For example, the received data may include signals representing electromagnetic emissions from road users 115, and the transmitted data may be associated with traffic management actions. In one embodiment, the transmitted data may include control signals or messages configured to be received by different types of road users or by traffic lights. In one example, when the control signal is directed to walking pedestrian, communications module 402 may transmit a text message to the a communication device associated with the pedestrian. In another example, when the control signal is directed to a vehicle, communications module 402 may relay the control signal as a RF waveform message. In another example, when the control signal is directed to a traffic light, communications module 402 may encode the control signal in compliance with a standard Traffic Light Protocol (TLP).

RX data processing module 404 may store software instructions which, when executed by the processing device, enable receiving PDW as an input from communications module 402. The PDW may include one or more of parameters available from an analysis (e.g., a FFT analysis) of the acquired EM signals. The PDW may include carrier radio frequency (Fc), pulse amplitude (PA), pulse width (PW), time of arrival (TOA), and location (LOC). In one embodiment, RX data processing module 404 may process the received PDW, for example, using the Kalman filtering algorithm to output the location of road users 115 to scene analysis module 406. Scene analysis module 406 may store software instructions which, when executed by the processing device, enable receiving from RX data processing module 404 the location of road users 115 and from knowledge base module 412 map data and past locations of at least of road users 115. Consistent with the present disclosure, scene analysis module 406 may process the received data to generate an updated local scene image. In one embodiment, generating an updated local scene image may include mapping emitters to specific road users 115 and estimating essential scene parameters, such as relative distances between road users 115, traffic loads on the various lanes, dangerous situations, etc.

Decision module 408 may store software instructions which, when executed by the processing device, enable receiving from scene analysis module 406 the updated local scene image and receiving additional information from traffic orchestrating module 414. After receiving the information, decision module 408 may detect safety issues and determine traffic management actions to improve the traffic flow. In one embodiment, the determined traffic management actions may be conveyed to traffic orchestrating module 414 via knowledge base module 412 and to road users 115 via TX data processing module 410. TX data processing module 410 may store software instructions which, when executed by the processing device, enable receiving the determined traffic management actions from decision module 408 and transforming them into messages. In one example, when the traffic management actions include changing a traffic light, TX data processing module 410 may generate a control message for the traffic light system. In another example, when the traffic management actions include directing an autonomous vehicle, TX data processing module 410 may generate an RF waveform message.

Knowledge base module 412 may store software instructions which, when executed by the processing device, enable receiving from scene analysis module 406 the local updated scene image, receiving from decision module 408 information and decisions about specific road users 115, and receiving from traffic orchestrating module 414 remote scene images. In one embodiment, knowledge base module 412 may update both the local updated scene image and the remote scene images and share the updated scene images with other modules. Consistent with the present disclosure, knowledge base module 412 may also provide decision module 408 with additional information (e.g., road regulations, prioritizing rules, weather updates, and more) and forward any traffic management action determined by decision module 408 to traffic orchestrating module 414. Traffic orchestrating module 414 may store software instructions which, when executed by the processing device, enable receiving updated scene images associated with all local systems 100 and the determined traffic management actions from decision module 408. In one embodiment, traffic orchestrating module 414 may process the received data to generate a regional scene image and to optimize traffic across the geographic area associated with regional system 300.

Figure 5A:
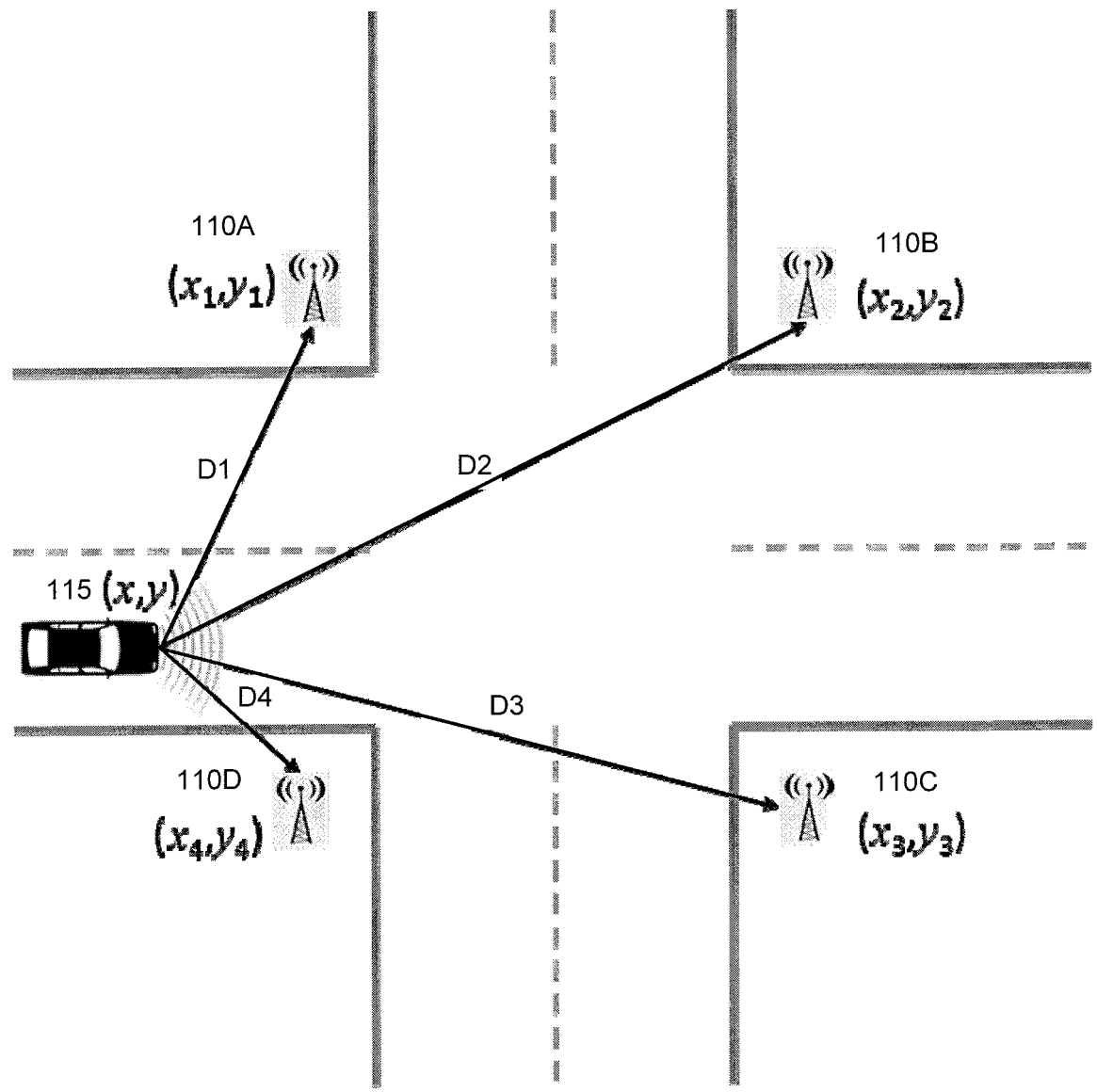
FIGS. 5A and 5B are schematic representations of two examples of techniques for determining a vehicle's location and movement.

FIG. 5A is a schematic illustration of an approach for determining the location and the movement direction of road user 115, consistent with embodiments of the present disclosure. In this approach, each receiver 110 may include an antenna array type, and local system 100 may determine the distances relative to receivers 110 from detected electromagnetic emissions. By triangulation of the distances from the different receivers 110 (or multilateration of the time difference of signal arrivals), the location of the vehicle may be determined. In the depicted example, a road junction is shown with a road user 115 (e.g., a vehicle) located at coordinates (x,y). The four receivers 110A, 110B, 110C, and 110D may be located at their fixed respective locations $x_i, y_i$ (i=1, 2, 3, 4). The coordinates of each receiver 110 may be known to controller 120, and the coordinates of road user 115 may constitute coordinates to be determined. In one embodiment, controller 120 may determine the distances (magnitude and direction) of road user 115 from each receiver 110. In FIG. 5A, the distances from receivers 110 are represented by vectors D1, D2, D3, and D4. Additionally, the coordinates of road user 115 are graphically represented as the intersection point of the vectors D1, D2, D3, and D4. In case local system 100 has only a single receiver 110, controller 120 may still determine the coordinates of road user 115 by multilateration of the time difference of signal arrivals and/or using prior knowledge, such as the direction of the road.

Figure 5B:
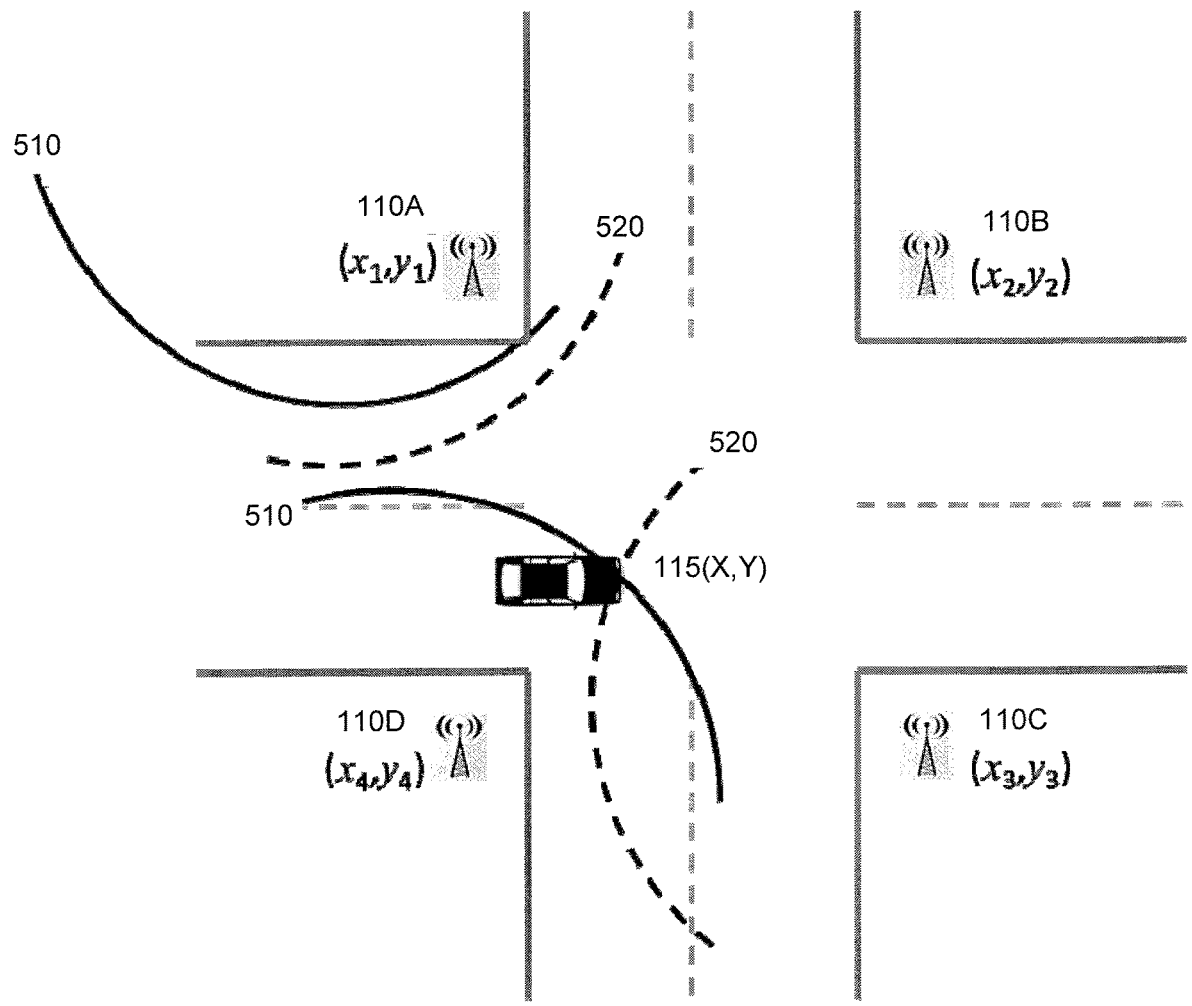

FIG. 5B is a schematic illustration of another approach for determining the location and the movement direction of road user 115, consistent with embodiments of the present disclosure. In this approach, the location of road user 115 may be determined by a number of spatially separated receivers 110 capturing the emitted signals and measuring the time differences of arrival (TDOAs). Measuring the TDOAs between two receivers 110 (e.g., receivers 110A and 110D) may result in a set of possible locations of road user 115 on a first curve 510 having a hyperbolic shape. The TDOAs measurements may be especially suited to the geolocation of high-bandwidth emitters, such as a vehicle's radar. With the introduction of one or more additional receivers 110 (e.g., receiver 110C) additional TDOAs measurements may be received and an additional set of possible locations of road user 115 on a second curve 520 having hyperbolic shape may be determined. Thereafter, the coordinates of road user 115 may be estimated at the intersection of the two curves. As depicted in FIG. 5B, the location of road user 115 may be determined as the intersection point of curve 510 (the solid hyperbola) and curve 520 (the dashed hyperbola). A person skilled in the art would recognize that in order to improve the accuracy, more than two curves may be determined and used to determine the coordinates of road user 115.

An example of the data generated by receivers 110A, 110B, 110C, and 110D is shown in FIG. 6. In the illustrated example, input data 600 includes four data sets from the receivers of local system 100 detecting electromagnetic emissions from two road users 115. The vertical axis represents the frequency of the detected emissions, the horizontal axis represents the time, and the intensity of the signals represents the power of the detected electromagnetic emissions. Each data set includes a first signal 602 corresponding with electromagnetic emissions from a first road user 115 and a second signal 604 corresponding with electromagnetic emissions from a second road user. Since the electromagnetic emissions from the two road users 115 have different characteristics, first signal 602 and second signal 604 behave differently. For example, first signal 602 is a triangle wave and second signal 604 is a sawtooth wave; first signal 602 has a wave period of about 7 μs and second signal 604 has a wave period of about 9 μs; the frequency bandwidth of first signal 602 is about two times the bandwidth of second signal 604. Consistent with the present disclosure, local system 100 may use the different characteristics of the electromagnetic emissions reflected by the generated signals to assign distinct electromagnetic fingerprints to each road user 115.

As discussed above with reference to FIGS. 5A and 5B, the locations of road users 115 can be determined from the detected electromagnetic emissions of road users 115. In one embodiment, the location of road users 115 may be determined using triangulation of the distances from receivers 110 or by multilateration of the time difference of received signals. In one embodiment, the distance of road users 115 from each receiver may be calculated using the time difference of arrival (TDOA) of the electromagnetic emissions. Specifically, the vertical alignment of input data 600 may differ for various receivers 110 because of differences in the arrival time of the electromagnetic emissions. In the depicted example, first signal 602 in the data set from receiver 110B is shifted relative to the input from other receivers. The shift of first signal 602 is clearly shown when time equals to 14 μs, for example. Additionally, second signal 604 in the data set from receiver 110C is shifted a bit relative to the input from other receivers. The shift of second signal 604 is clearly shown when time equals to 10 μs, for example. The shift of first signal 602 in the data set from receiver 110B may indicate that the first road user 115 is farthest away from receiver 110B; and the shift of second signal 604 in the dada set from receiver 110C may indicate that the second road user 115 is farthest away from receiver 110C. Local system 100 may obtain the exact TDOAs of the electromagnetic emissions from receivers 110 to calculate the exact location of the emitting road user.

Consistent with embodiments of the present disclosure, local system 100 may store data points indicative of the determined locations of road users 115 at different times. For example, the data points may be generated by performing the triangulation calculations for determining vehicle locations at any suitable rate. In some cases, vehicle locations may be determined every 0.5 seconds or at higher rates (e.g., every 0.25 seconds, every 0.1 seconds, every 0.01 seconds, etc.). In other cases, the vehicle locations may be determined at lower rates (e.g., every 1 second, 1.5 seconds, etc.). Once local system 100 gains knowledge of the exact locations of road users 115 at different times, local system 100 can determine momentary properties characterizing the movement of road users 115 (such as, velocity, acceleration, and direction) by monitor the exact locations of road users 115 over time. Specifically, the velocity magnitude of road user 115 can be determined by monitoring a distance change over a certain time interval. The acceleration magnitude of road user 115 can be determined in a similar manner or may be calculated as a time derivative of the determined velocity. The direction of road user 115 can be determined comparing locations of road user 115 at different times. The more data points, the more confidence local system 100 has in the momentary properties. In one embodiment, local system 100 is configured to increase the rate of the generation of data points to have a confidence level higher than a predetermined threshold.

In another embodiments, local system 100 can determine general properties of road users 115 from tracking their movement while they are in range of receivers 110. For example, local system 100 can monitor a driving path of road users 115 for at least 50 meters, at least 100 meters, at least 250 meters, or at least 500 meters. Such general properties of road users 115 may include an indication whether each road user 115 is a manual-gear vehicle or an automatic-gear vehicle, an indication whether each road user 115 is a manually-driven vehicle or an autonomous automobile, an indication whether the driver of road users 115 is driving under influence or tired, and more. Specifically, local system 100 may determine the driving path using the determined momentary properties of road user 115 over a period of time. Thereafter, local system 100 may apply one or more pattern recognition algorithms and machine learning algorithms to the driving path to determine characteristics of the driving path. The determined characteristics is used to determine the general properties of road users 115. For example, a driving path of an autonomous vehicle may be smoother and narrower than a driving path of a manually-driven vehicle.

Moreover, as discussed above with reference to FIGS. 5A and 5B, the movement directions of road users 115 can also be determined from the detected electromagnetic emissions of road users 115. For example, by comparing the power levels of received electromagnetic emissions, local system 100 can estimate the movement direction of road users 115. For example, in some cases, road users may have a directional electromagnetic emitter (e.g., a proximity radar motion sensor). Assuming that the first road user 115 is a vehicle with a reverse radar system emitting electromagnetic emissions that translate to first signal 602. The fact that first signal 602 in the data set from receiver 110B is weaker compared to the first signals shown in the data sets from the other receivers, may indicate that the first road user 115 is moving toward receiver 110B and away from the other receivers.

Figure 7:
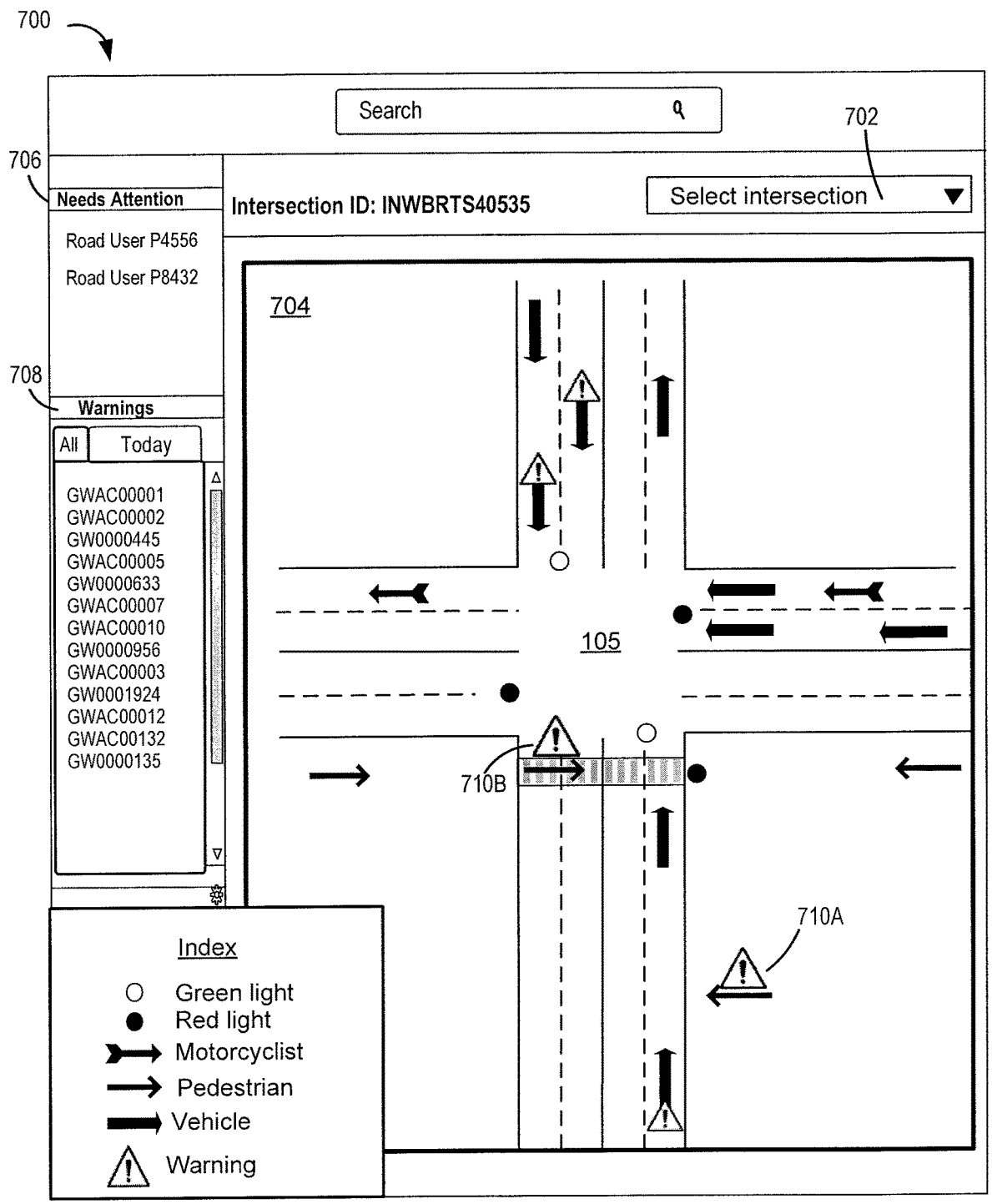
FIG. 7 is a schematic illustration of exemplary graphical user interface for monitoring and managing road traffic consistent with the disclosed embodiments.

FIG. 7 illustrates an exemplary graphical user interface (GUI) 700 for user device 350 to monitor and manage road traffic in a geographic area (e.g., a city or a municipal district). As shown in FIG. 7, GUI 700 may include a selectable list 702 to allow a user to choose the area of interest to be presented on a display area 704. For example, GUI 700 may include a list of intersections that the user can select to receive a real time representation of the selected intersection. In the illustrated example, display area 704 depicts a real time representation of the locations and the movement directions of road users 115 in intersection 105, as shown in FIG. 1.

In one embodiment, each type of road user 115 may be represented by a different visual indicator. For example, different types of arrows may represent different types of road users. As described above, with reference to FIG. 1, there are two pedestrians that may trigger local system 100 to execute traffic management actions. Local system 100 may identify and mark the two pedestrians in display area 702 with warning icons 710A and 710B and highlight other road users 115 that may be affected by these two pedestrians. In the illustrated example, road users 115 that may be affected by these two pedestrians are represented with arrows with warning signs. In one embodiment, GUI 700 may include a list 706 of all the road users that need attention. Selecting a road user from list 706 may focus display area 704 on the selected road user. In addition, GUI 700 may include a list 708 of all the warnings that were issued by local system 100. Selecting a warning from list 708 may provide details on the issued warning.

Monitoring Vehicles' Own Non-Reflected EM Emission for Location Purposes

One implementation of the suggested system may be to monitor the locations of moving vehicles by measuring the electromagnetic emissions originating from the vehicles. As discussed above, the system may also determine the locations of other non-vehicle road users (e.g., pedestrians). Determining the locations and movement of at least vehicles in a road area may provide sufficient data to perform scene analysis for various purposes. In some embodiments, the determination of the locations and movements of vehicles may involve dividing the detected electromagnetic emissions into distinct groups. Each distinct group may correspond to a specific vehicle and may be associated with a specific waveform. For each distinct group, the system may calculate at least one of a Doppler effect, phase difference, or time difference of the electromagnetic emissions, to determine various parameter values. The determined parameter values may include a time-of-arrival, amplitude, carrier frequency, modulation, pulse width, direction of the emitting source from a receiver, distance of the emitting source from the receiver, and more. Thereafter, the system may use the determined parameter values and apply any localization methods known in the art (e.g., multilateration, unilateration, fuzzy locating, trilateration, or triangulation, etc.) to determine substantially in real-time at least the locations of the moving vehicles in the road area.

Figure 8:
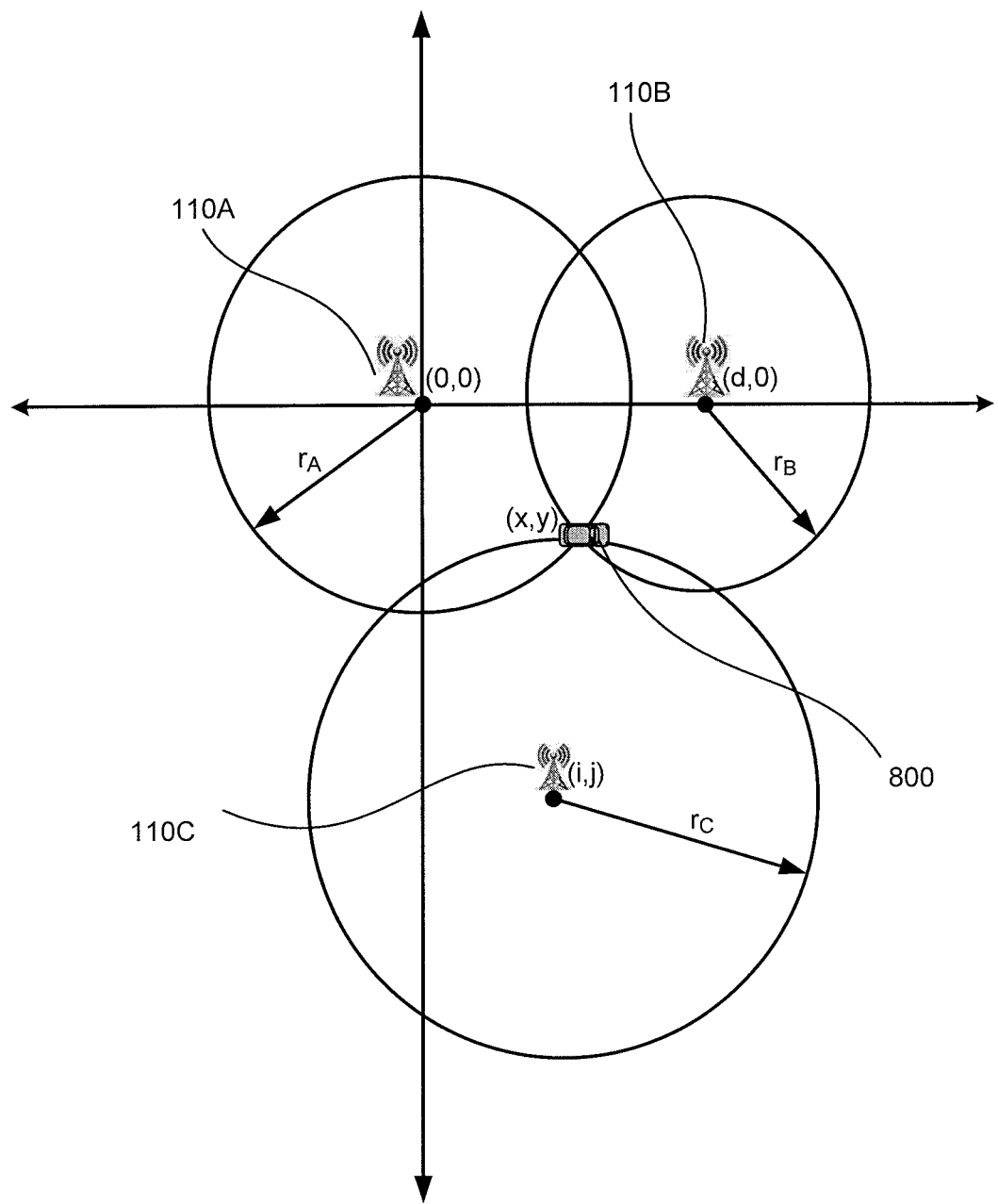
FIG. 8 is a schematic illustration showing a vehicle located at an intersection of three circles that represent the distances from three receivers, consistent with the present disclosure.
Figure 9A:
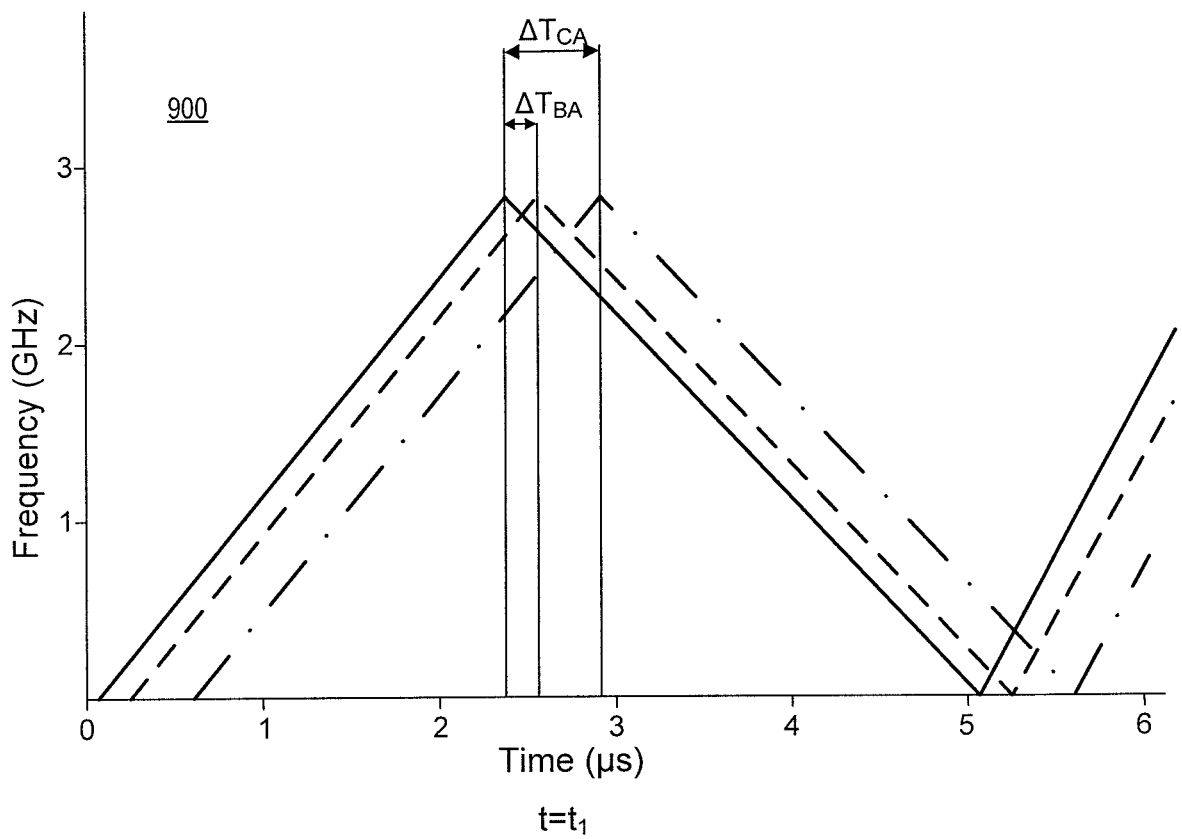
FIGS. 9A and 9B are schematic illustrations showing how the location of the vehicle may be determined by calculating the time difference of signal arrivals, consistent with the disclosed embodiments.
Figure 9B:
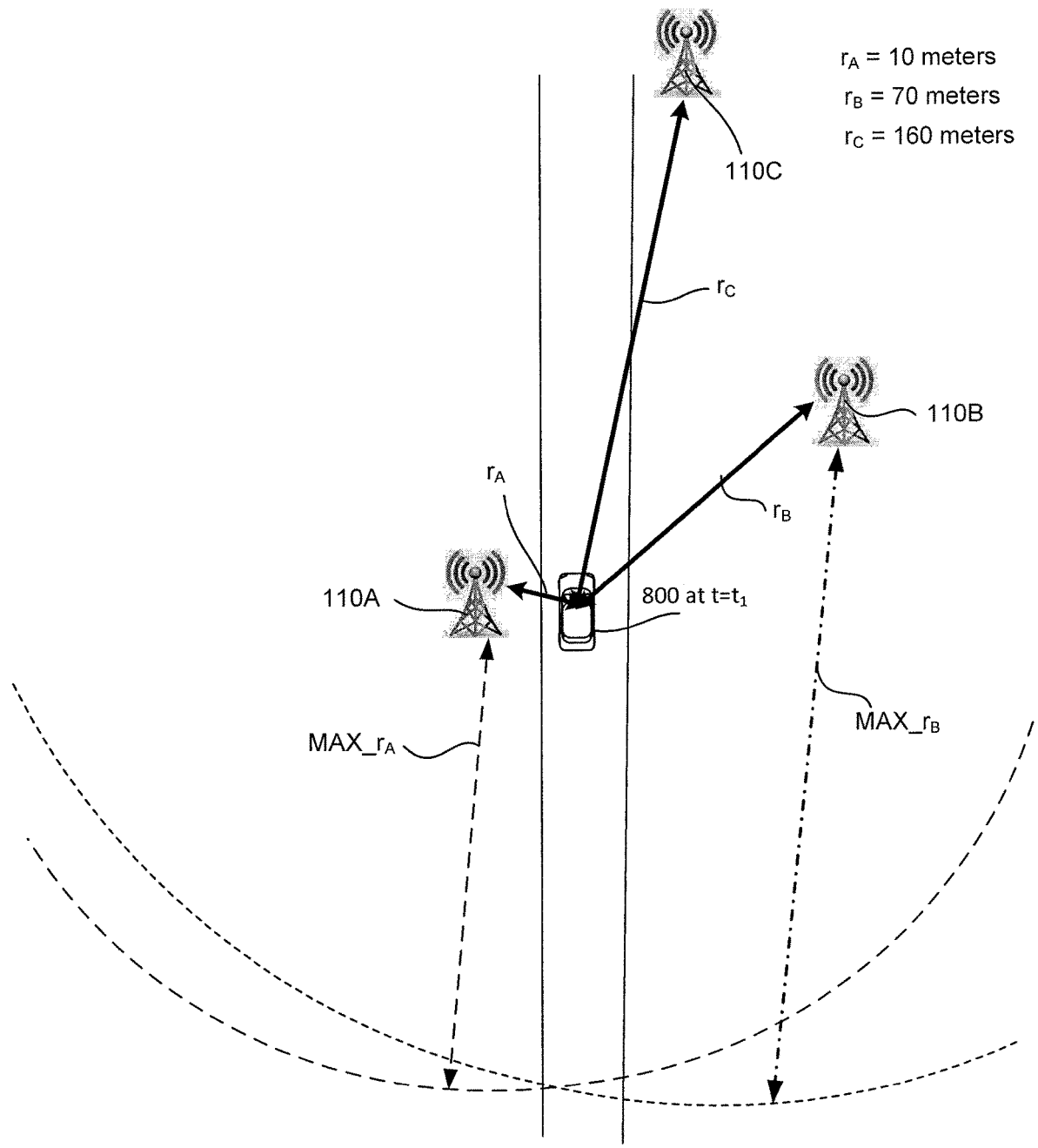
Figure 10A:
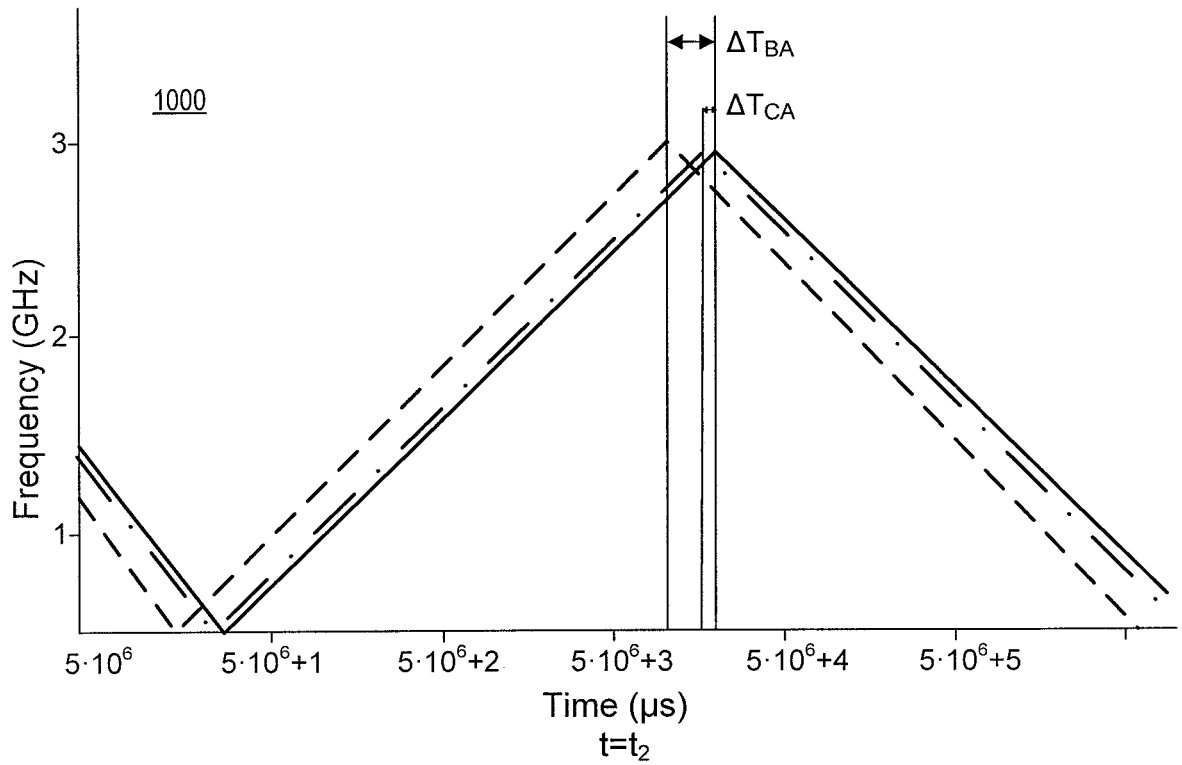
FIGS. 10A and 10B are schematic illustrations showing how the location and speed of the vehicle may be determined five seconds after the situation depicted in FIGS. 9A and 9B.
Figure 10B:
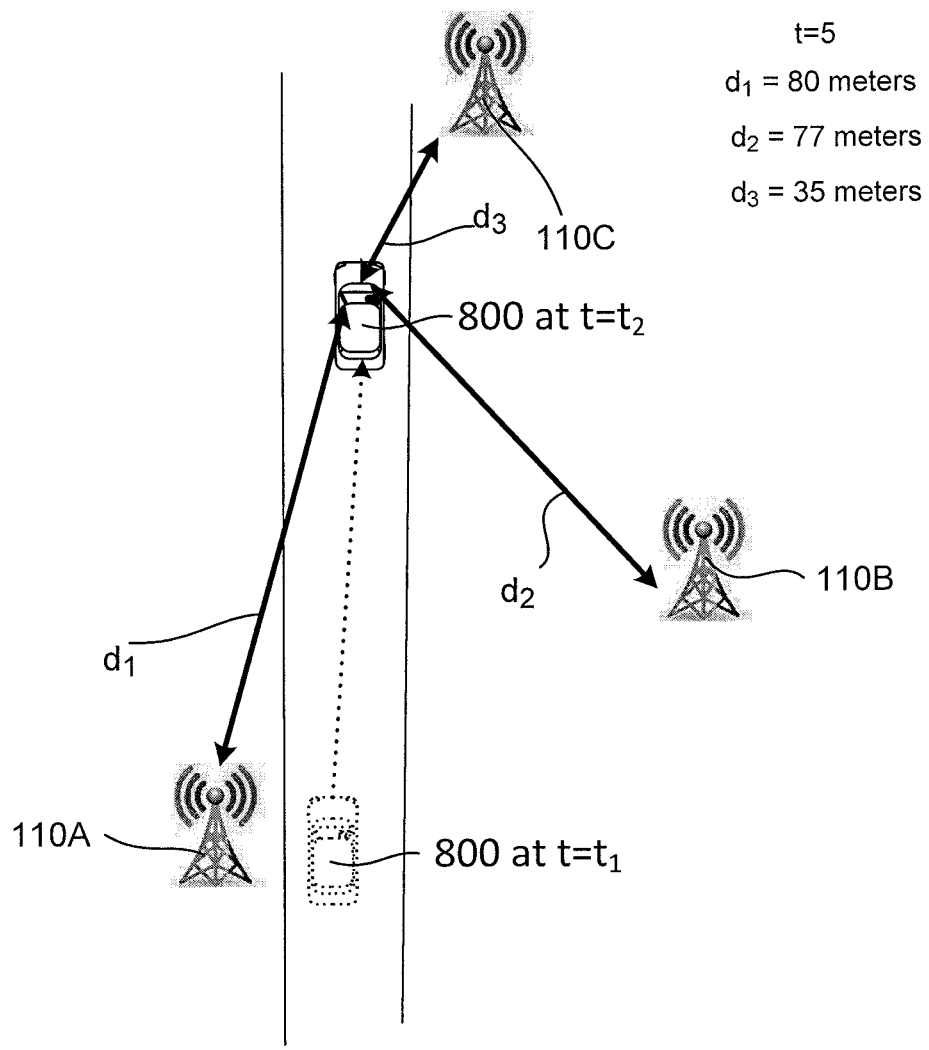

A simplified example for determining the location and movement of a single vehicle is described below with reference to FIGS. 8-10B. FIG. 8 illustrates the location of a vehicle 800 at an intersection of three circles representing the distances from three receivers 110A-C; FIGS. 9A and 9B illustrate how the location of the vehicle may be determined by calculating the time difference of signal arrivals; and FIGS. 10A and 10B illustrate how the location and speed of the vehicle may be determined five seconds after the situation illustrated in FIGS. 9A and 9B.

In FIG. 8 the coordinate system was chosen such that the origin of the coordinate system (0,0) is placed at the location of receiver 110A, the location of receiver 110B is on the x-axis at point (d,0), and the location of receiver 110C is at point (i,j). Since receivers 110A, 110B and 110C are configured for placement at fixed locations along the roadway, the values of i, j, and d may be known. Determining the location of a vehicle 800, in some cases, implies finding the intersection point (x,y) of the three circles surrounding receivers 110A-110C. In other words, the solution of the problem involves calculations of the coordinates x and y based on the parameters' values.

The radius of each circle surrounding a receiver 110 equals to the speed of light (i.e., the velocity of the electromagnetic emissions) multiplied by the time it takes a signal to travel from the intersection point to the corresponding receiver.

$$r_A = \sqrt{x^2+y^2} = C \cdot T_A \quad (1)$$

$$r_B = \sqrt{(x-d)^2+y^2} = C \cdot T_B \quad (2)$$

$$r_C = \sqrt{(x-i)^2+(y-j)^2} = C \cdot T_C \quad (3)$$

Instead of calculating the exact time-of-arrival, the time differences between the signal arrivals (e.g., $\Delta T_{BA}$ and $\Delta T_{CA}$) may be used. The values of $\Delta T_{BA}$ and $\Delta T_{CA}$, as shown in FIG. 9A and FIG. 10A, may be calculated by comparing the received signal information. Using equations (1)-(3), $\Delta T_{BA}$ and $\Delta T_{CA}$ may be represented as follows:

$$\Delta T_{BA} = T_B - T_A = (r_B - r_A)/C = (\sqrt{(x-d)^2+y^2} - \sqrt{x^2+y^2})/C \quad (4)$$

$$\Delta T_{CA} = T_C - T_A = (r_C - r_A)/C = (\sqrt{+(x-i)_2+(y-j)^2} - \sqrt{x^2+y^2})/C \quad (5)$$

Using several algebra steps the coordinates of intersection point (x,y) can be simply represented as follows:

$$x = \frac{-e \pm \sqrt{e^2 - 4wf}}{2w} \quad (6)$$

$$y = g \cdot x + h \quad (7)$$

where:

$$e = d\left[1 - \left(\frac{d}{CT_{BA}}\right)^2\right] - 2gh \quad (8)$$

$$w = -\left[1 - \left(\frac{d}{CT_{BA}}\right)^2 + g^2\right] \quad (9)$$

$$f = \left(\frac{CT_{BA}}{2}\right)^2 \left(1 - \left(\frac{d}{CT_{BA}}\right)^2\right) - h^2 \quad (10)$$

$$g = \left[\Delta T_{BA} \cdot \frac{d}{\Delta T_{CA}} - i\right]/j \quad (11)$$

$$h = \left[i^2 + j^2 - C^2\Delta T_{BA}^2 + C^2\Delta T_{BA}\Delta T_{CA}\left(1 - \left(\frac{d}{CT_{BA}}\right)^2\right)\right]/2j \quad (12)$$

Additional details regarding the methodology described above are available in B. Fang, "Simple solution for hyperbolic and related position fixes," IEEE Trans. Aerosp. Electron. Syst., vol. 26, no. 5, pp. 748-753, September 1990. The Fang article is incorporated by reference.

Consistent with the present disclosure, the signal information received from receivers 110A-110C at moment $t_1$ is illustrated in FIG. 9A. The moment $t_1$ is defined as a time period of about 5 μs, which is a very short period of time during which vehicle 800 (operating within a normal expected velocity range) does not move far. In the illustrated example in FIG. 9A, three input signals from receivers 110A-110C are presented in a single graph 900. The vertical axis of graph 900 represents the frequency of the detected emissions and the horizontal axis of graph 900 represents time. In one embodiment, the system (e.g., local system 100) can identify an electromagnetic waveform of vehicle 800 in the received signal information. In this case, the electromagnetic emissions from vehicle 800 are associated with an electromagnetic waveform in the form of a triangle wave. As shown in graph 900, at moment $t_1$ the electromagnetic emissions from vehicle 800 first reach receiver 110A, thereafter the electromagnetic emissions reach receiver 110B, and next the electromagnetic emissions from vehicle 800 reach receiver 110C. As one skilled in the art will recognize, the order of signal arrival is indicative of the distance from vehicle 800 to each of the receivers. Specifically, in this case vehicle 800 would be closest to receiver 110A and farthest away from receiver 110C. Moreover, the system may determine the exact location of vehicle 800 using equations (6) and (7) above, the known location of receivers 110A-110C, and the calculated values of $\Delta T_{BA}$ and $\Delta T_{CA}$.

FIG. 9B illustrates an example of the location of vehicle 800 at moment $t_1$. The illustrated distances $r_A$, $r_B$, and $r_C$ from vehicle 800 to the corresponding receivers approximately match the values of $\Delta T_{BA}$ and $\Delta T_{CA}$ from FIG. 9A. Consistent with the present disclosure, each of receivers 110A-110C may be configured for mounting on a traffic light, a lamppost, and/or a billboard in proximity to an area of interest. For example, receivers 110A-110C may be fixedly positioned at spatially separated locations near an intersection, a road segment, an interchange, a tunnel, a parking lot, and more. In addition, each of receivers 110A-110C may detect vehicles at a range of at least 50 meters, at least 100 meters, at least 250 meters, at least 500 meters, or at least 750 meters. In some embodiments, the maximum operational range of receivers 110A-110C may be substantially the same. In alternative embodiments, at least one of the receivers in a local system 1000 may have a first maximum operational range greater than a second maximum operational range of at least one other receiver. For example, in a configuration similar to the one illustrated in FIG. 9B, the range of receiver 110B (denoted as MAX_$r_B$) may be greater than the range of receiver 110A (denoted as MAX_$r_A$) and the range of receiver 110C (not shown). Moreover, the first maximum operational range may be determined based on the second maximum operational range. For example, the maximum operational range of receiver 110B may be determined such that both receiver 110A and receiver 110B start covering the road from substantially a same distance.

Consistent with the present disclosure, the signal information received from receivers 110A-110C at moment $t_2$ is illustrated in FIG. 10A. The moment $t_2$ is approximately five seconds after moment $t_1$. Similar to the example illustrated in FIG. 9A, all three input signals are presented in a single graph 1000. The vertical axis of graph 1000 represents the frequency of the detected emissions and the horizontal axis of graph 1000 represents time. As shown in graph 1000, the electromagnetic emissions from vehicle 800 first reach receiver 110C. Then the electromagnetic emissions reach receiver 110B and receiver 110A at similar times (i.e., $\Delta T_{BA}=-0.01$ μs). From the signal arrival times, it may be determined that vehicle 800 is closest to receiver 110C and at similar distances from receiver 110A and receiver 110B. As described above, the system (e.g., local system 100 or regional system 300) may determine the exact location of vehicle 800 using equations (6) and (7) above, the known location of receivers 110A-110C, and the calculated values of $\Delta T_{BA}$ and $\Delta T_{CA}$.

FIG. 10B illustrates an example of the location of vehicle 800 at moment $t_2$. The illustrated distances $r_A$, $r_B$, and $r_C$ from vehicle 800 to the corresponding receivers approximately match the values of $\Delta T_{BA}$ and $\Delta T_{CA}$ from FIG. 10A. Consistent with embodiments of the present disclosure, the system may store data points indicative of the determined locations of vehicle 800 at different times (e.g., $t_1$ and $t_2$). In the illustrated example, the time difference between $t_1$ and $t_2$ is five seconds; however, the vehicle locations may also be determined and stored at higher rates (e.g., every 0.25 seconds, every 0.1 seconds, every 0.01 seconds, etc.). Once the system gains knowledge of the exact location of vehicle 800 at different times, the system can determine momentary properties characterizing the movement of vehicle 800 (such as velocity, acceleration, and direction) by monitoring the location of vehicle 800 over time.

As discussed above, the system may determine at least one of a location, speed, and direction of vehicle 800 using a geolocation technique that involves calculating the time difference of arrival of the electromagnetic emissions associated with the identified electromagnetic waveform of vehicle 800. This geolocation technique is often referred to as time difference of arrival (TDOA). However, consistent with additional embodiments of the present disclosure, local system 100 may also determine the at least one of a location, speed, and direction of a road user (e.g., vehicle 800) using different geolocation techniques.

In a first example, the system may implement a geolocation technique that involves calculating the Doppler effect of electromagnetic emissions associated with the identified electromagnetic waveform of vehicle 800. This geolocation technique is often referred to as frequency difference of arrival (FDOA) or differential Doppler (DD). In this geolocation technique, the location determination may be based on measurements of frequency differences of the signal at different points. In this geolocation technique, however, the observation points must be in relative motion with respect to each other and the road user. This relative motion may result in different Doppler shifts observations of the road user at each location. One way to achieve these measurements is by using airborne observations from an aircraft or a drone flying above an area of interest. Thereafter, the location of vehicle 800 can be determined with knowledge of the observation points' location, the vector velocities, and the observed relative Doppler shifts between pairs of locations. Consistent with the present disclosure, the TDOA and FDOA geolocation techniques can be used together to improve the location accuracy since the results from each technique are independent. By combining TDOA and FDOA measurements, instantaneous geolocation can be performed in two dimensions. In this geolocation technique, the accuracy of the location determination may be related to the signal bandwidth of the road user, the signal-to-noise ratio at each observation point, and the geometry and vector velocities of the emitter and the observation points. Additional details regarding the FDOA geolocation technique are available in Ho et al., "Geolocation of a Known Altitude Object from TDOA and FDOA Measurements", IEEE Trans on Aerospace and Electronic Systems, July 1997. The Ho article is incorporated by reference.

In a second example, the system may implement a geolocation technique that involves calculating the phase difference of electromagnetic emissions associated with the identified electromagnetic waveform of vehicle 800. Specifically, system 100 may include an antenna array that utilizes the phase measurements to determine the angle of arrival (AoA) of a signal. When the distance between the antennas in the array is small, the incident front of the signal may be considered as straight, and the calculation of the AoA may be considered accurate. The signal information from at least two antenna arrays located at different and fixed locations (e.g., receivers 110) allows calculating the geolocation of the road user by geometric triangulation. Additional details regarding the phase difference geolocation technique are available in Chen et al., "Wireless Geolocation with TOA/AOA Measurements using Factor Graph and Sum-product Algorithm, IEEE 60th Vehicular Technology Conference, September 2004. The Chen article is incorporated by reference. In one embodiment, the system may combine the results from any known geolocation technique to improve the accuracy of the location determination.

Generally, the more data points, the more confidence the system has in the determined properties. In one embodiment, the system is configured to increase the rate of the generation of data points to have a confidence level higher than a predetermined threshold. For example, before initiating a traffic management action, the system may reconfirm the accuracy of the determined locations (e.g., by requiring a higher confidence level than the predetermined threshold). In addition, since vehicle 800 is essentially static relative to the speed of the electromagnetic emissions, the system may determine the location of vehicle 800 multiple times by the time vehicle 800 advances even 0.1 meter. Therefore, the system may use statistical tools to improve the accuracy of the location of vehicle 800 and to increase the confidence level.

Figure 11:
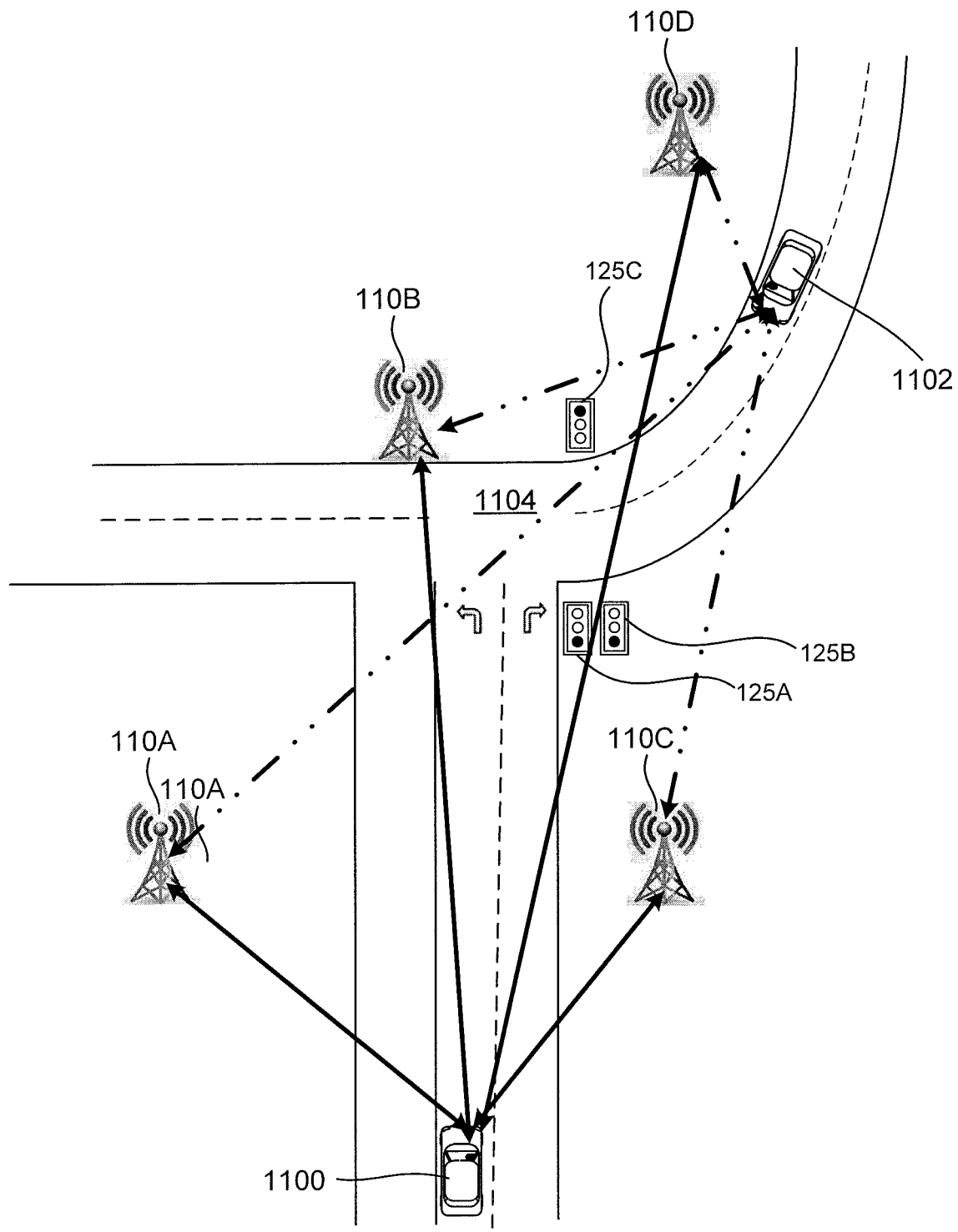
FIG. 11 is a schematic illustration of an example scenario of two vehicles approaching an intersection, consistent with the disclosed embodiments.
Figure 13:
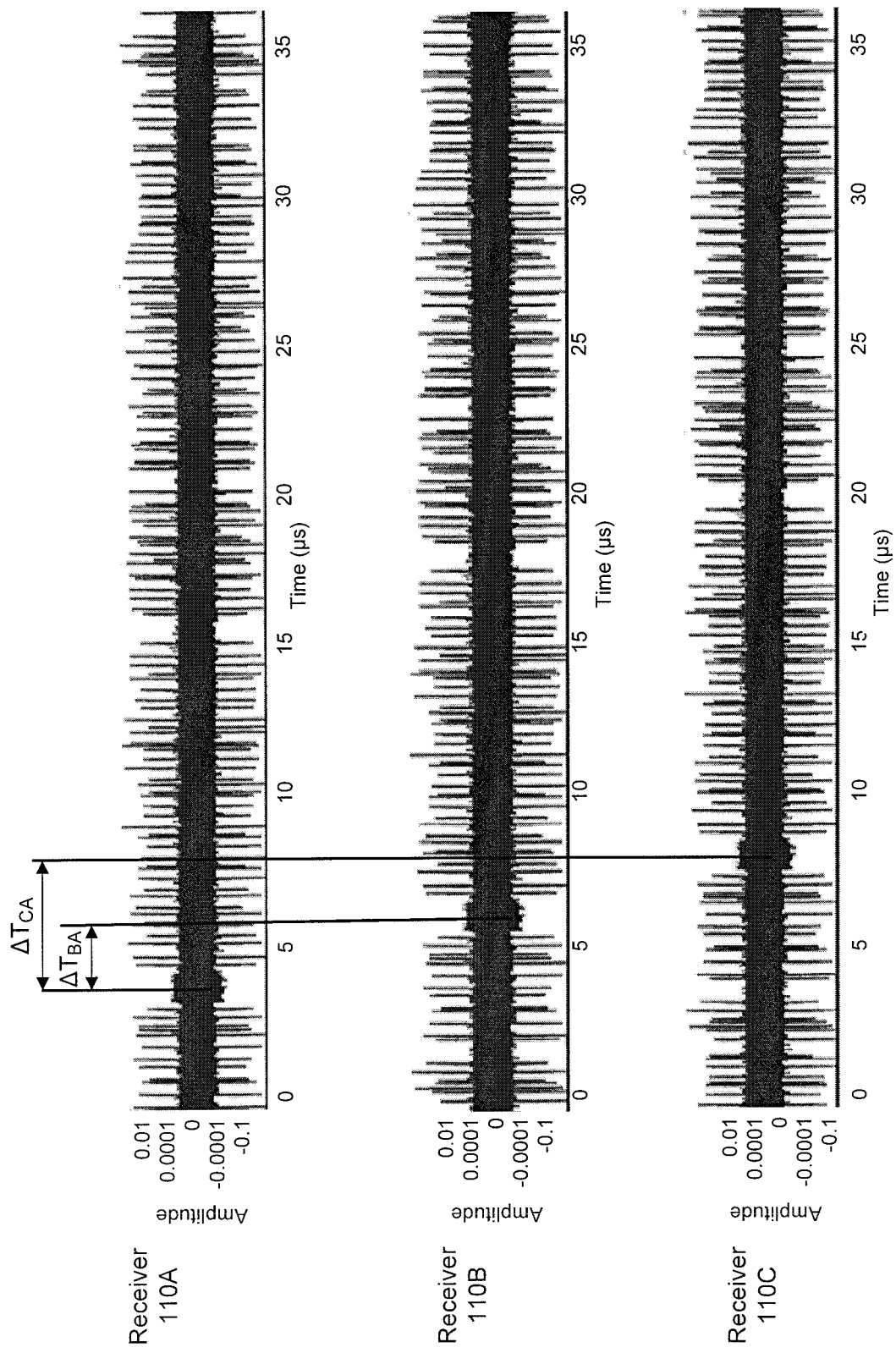
FIG. 13 is an example of the signal information associated with electromagnetic emissions of a non-vehicle road user, consistent with disclosed embodiments.

Reference is now made to FIG. 11, which illustrates an example scenario of a first vehicle 1100 and a second vehicle 1102 approaching intersection 1104 having traffic lights 125A, 125B, and 125C. The signal information illustrated in FIG. 6 may represent the data generated by receivers 110A, 110B, 110C, and 110D. In the context of this example scenario, the system may analyze a plurality of electromagnetic emissions to identify a first subset of electromagnetic emissions (e.g., signal 602) including a first electromagnetic waveform (e.g., the triangle wave of signal 602) associated with first vehicle 1100, and a second subset of electromagnetic emissions (e.g., signal 604) including a second electromagnetic waveform (e.g., the sawtooth wave of signal 604) associated with second vehicle 1102. Consistent with the present disclosure, the electromagnetic emissions may originate from on board communication devices (e.g., a Dedicated Short-Range Communications (DSRC) device), range-determining systems of the vehicles (e.g., radar, Lidar, sonar), components of the vehicles themselves (e.g., engine, a battery), cell phone transmissions, navigational transmitter unique to the vehicle, or electromagnetic sources emanating from a system, subsystem, or component being transported in the vehicles. An example of the signal information associated with electromagnetic emissions from a smartphone is illustrated in FIG. 13 and discussed below. Thereafter, the system (e.g., local system 100 or regional system 300) may determine from the first and second subsets of electromagnetic emissions at least one of the location, the speed, and the direction of first vehicle 1100 and second vehicle 1102.

In the example scenario shown in FIG. 11, both first vehicle 1100 and a second vehicle 1102 may approach one another at a high speed toward intersection 1104 even though traffic light 125C has a red light and second vehicle 1102 should be slowing to a stop. This scenario might occur due to some malfunction of second vehicle 1102. Additionally, in case vehicle 1102 is a manually-driven vehicle, this scenario might occur because the driver of second vehicle 1102 is driving under the influence. In case vehicle 1102 is an autonomous vehicle, this scenario might occur because second vehicle 1102 is experiencing a security breach. Or this scenario might simply occur because the driver of second vehicle 1102 (or the vehicle operating system of second vehicle 1102) failed to spot traffic light 125C. In any event, the system (e.g., local system 110) may determine that there is a likelihood of collision between first vehicle 1100 and second vehicle 1102, based on the received signal information from receivers 110A-110D. In response, the system may send at least one control signal in an attempt to prevent the likely collision.

Consistent with the present disclosure, the control signal that the system is configured to send may be associated with direct and indirect traffic management actions. In some embodiments, the at least one control signal may be received by a traffic light or a traffic sign for altering a traffic signal. For example, the system (e.g., local system 100) may use communications module 402 to send a control signal to traffic light 125A to change the traffic signal from a green light to a red light. In another embodiment, the system may use communications module 402 to send at least one control signal to second vehicle 1102 to influence movement of second vehicle 1102 with respect to first vehicle 1100. Or the system may use communications module 402 to send at least one control signal to first vehicle 1100 to influence movement of first vehicle 1102 with respect to second vehicle 1100. Or the system may use communications module 402 to send control signals to both first vehicle 1100 and second vehicle 1102. For example, the control signal may cause the first vehicle 1100 and/or second vehicle 1102 to slow down, to stop, to accelerate, to change lanes, etc. In another embodiment, the type of the control signal may be determined by the type of vehicle. For example, for autonomous vehicles, the control signal may cause an override of at least one aspect of a vehicle operating system associated with first vehicle 1100 or second vehicle 1102. For manually driven vehicles, the control signal may cause an alarm (e.g., visual, audible, etc.) for the drivers of first vehicle 1100 and/or second vehicle 1102. As mentioned above, the system may use communications module 402 to convey a control signal to a moving vehicle (e.g., first vehicle 1100 or second vehicle 1102) to influence its movement. The control signal may be conveyed to the moving vehicle using different means. In some cases, the vehicle's range-determining system (such as the radar), may be used for wireless communication purposes additionally to object detection. This feature is possible since the operation of the radar system assumes transmission and reception of radio signals. Additional details regarding the dual use of a radar system are available in Takase et al., "A Dual-use Radar and Communication System with Complete Complementary Codes", 15TH International Radar Symposium (IRS), June 2014. The Takase article is incorporated by reference. Accordingly, a vehicle with a dual-use radar system, can receive messages and control signals embedded in messages from local system 100. For example, the system (e.g., local system 100) may transmit one or more messages to the vehicle as modulated information on the carrier signal. Specifically, the system may transmit messages that may describe the situation on the road and assist the vehicle to plan an optimal driving trajectory. In one embodiment, the messages may include at least one of: updates on the self-location of the vehicle, updates on the location of other vehicles, information about obstacles on the road, information about closed lanes, and information about permitted speed.

In other cases, when the vehicle's radar has no communication capabilities, local system 100 may still convey information to the vehicle's radar by transmitting signals simulating reflections from physical objects. Specifically, local system 100 can generate signals having the same waveform as the vehicle's radar and control the time at which these signals are transmitted to the vehicle's radar sensor. By doing so, local system 100 can create a sequence of radar signals that are similar to reflection signals that would be received by it from a real object at a corresponding distance from the vehicle. Therefore, by implementing this approach, local system 100 can generate virtual objects for the driver-assistance system of the vehicle. Examples of these virtual objects are discussed below with reference to FIG. 12B. This method can be used in situation when local system 100 determines that initiating a traffic management action is required to prevent a collision.

Figure 12A:
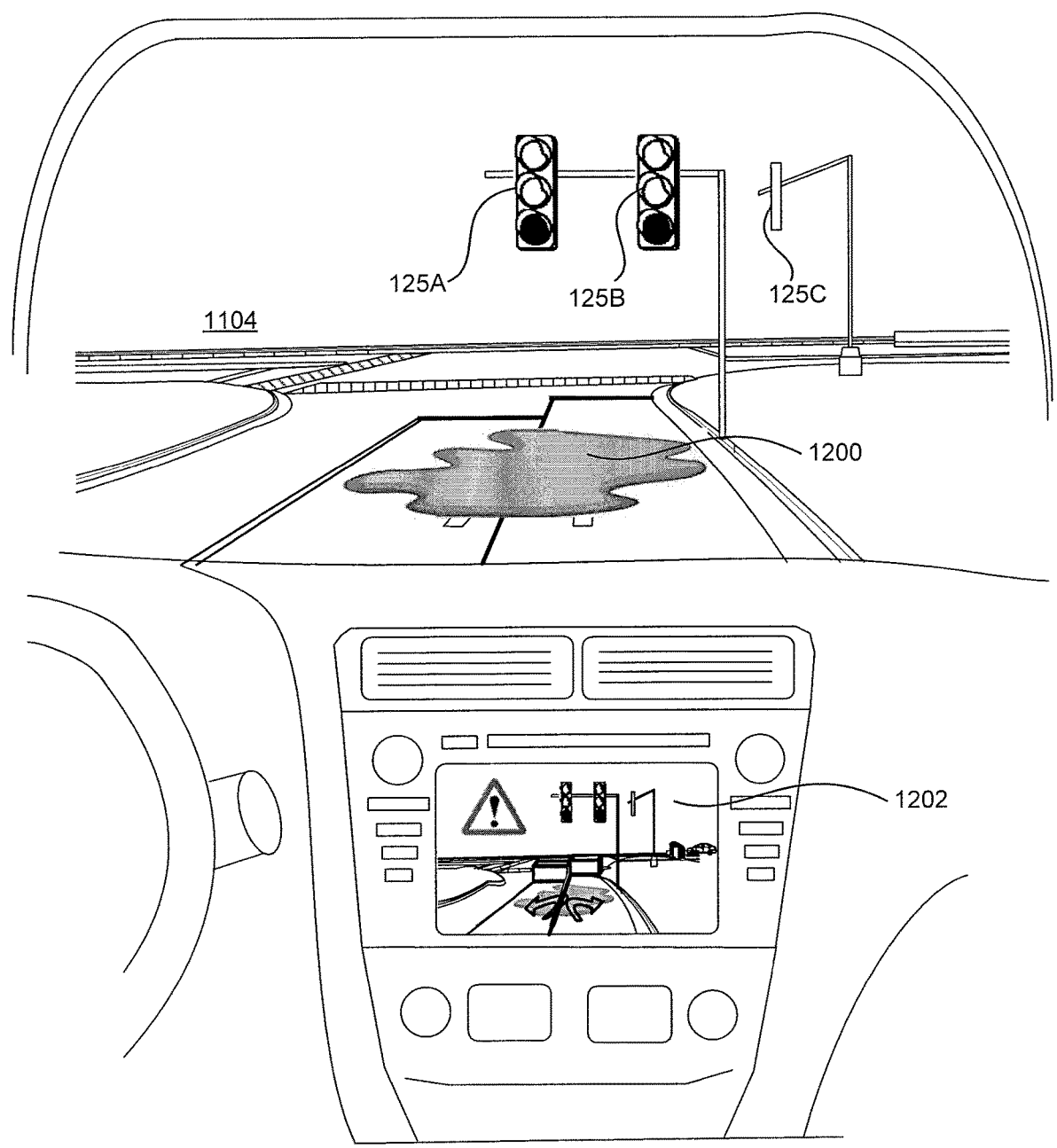
FIG. 12A is a schematic illustration of the intersection depicted in FIG. 11 as shown from one of the vehicles.
Figure 12B:
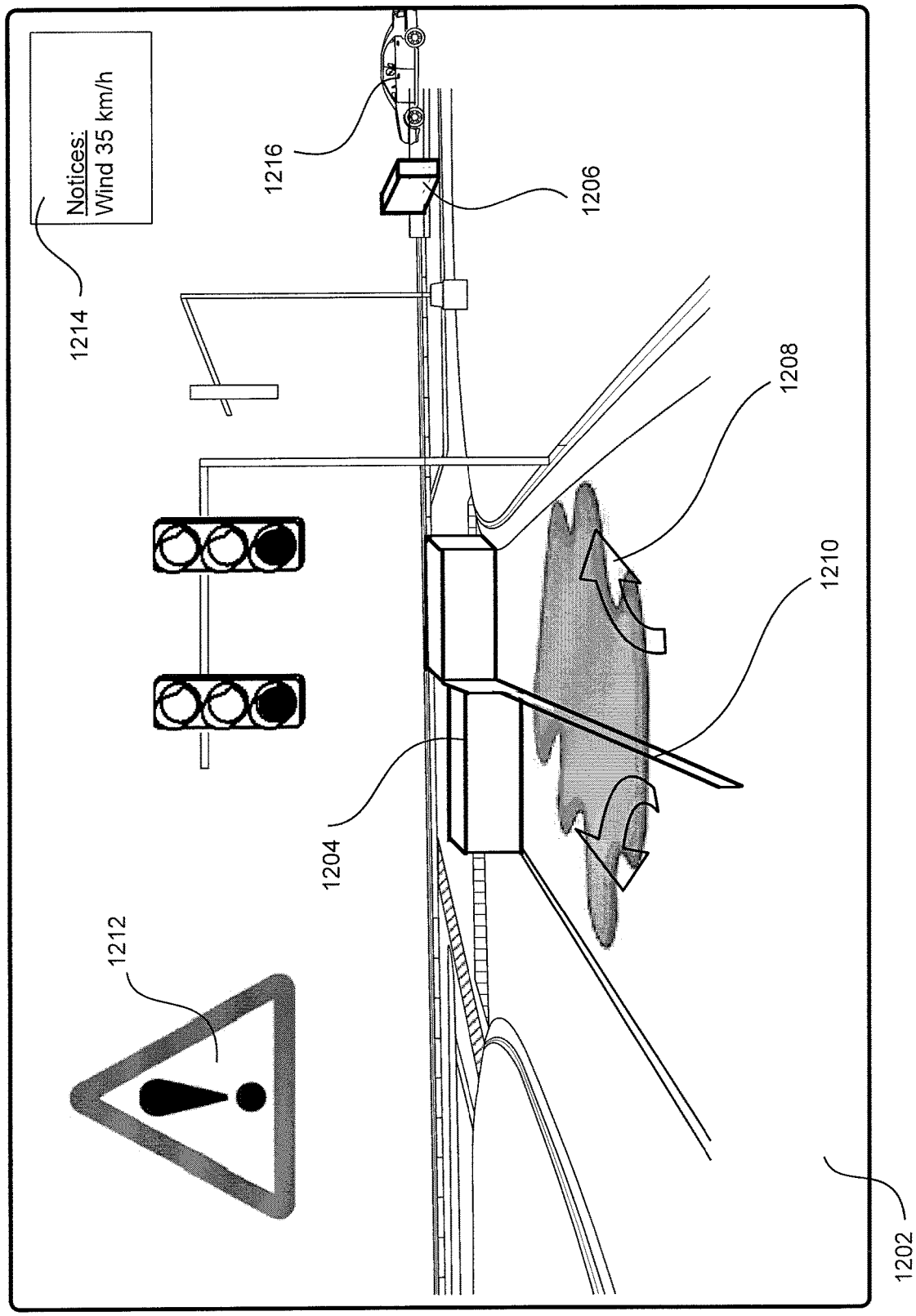
FIG. 12B is a schematic illustration of an example user interface depicted in FIG. 12A and showing virtual objects caused by transmission of control signal, consistent with the disclosed embodiments.

FIG. 12A is a schematic illustration of the intersection depicted in FIG. 11 as shown from first vehicle 1100. FIG. 12A depicts a puddle 1200 at the entrance of intersection 1104 that obstructs a portion of the road surface markings. In one embodiment, first vehicle 1100 may include a user interface 1202 that displays a view captured by a camera of a driver-assistance system, wherein the display may be augmented with content from local system 100. For example, virtual road surface markings, virtual objects, warnings, etc. The display of user interface 1202 is illustrated in FIG. 12B. In another embodiment, first vehicle 1100 may use information received from local system 100 to issue a warning to a driver of the first vehicle in response to virtual objects. In another embodiment, first vehicle 1100 may use information received from local system 100 to automatically alter an operation of the first vehicle without user intervention. Examples of the augmented display, warnings, and control signals will be discussed further in the sections below.

FIG. 12B is an illustration of user interface 1202 that may include notices to the driver of first vehicle 1100, virtual road surface markings, and virtual objects caused by the transmission of one or more control signals from local system 100. With reference to the scenario described above, first vehicle 1100 is about to enter intersection 1104 without knowing that second vehicle 1102 approaches at a speed that prevents it from being able to stop without hitting first vehicle 1100. Consistent with embodiments of the present disclosure, the system may apply traffic management actions based on the detected electromagnetic emissions of first vehicle 1100 and second vehicle 1102 to avoid a collision.

In some embodiments, the system may send at least one control signal that may include a signal designed to produce a response by driver-assistance systems. In some cases, the generated signal may indicate to the driver assistance system the presence of a virtual object in the path of the vehicle. For example, the generated control signal, upon receipt by a driver assist system, may indicate the presence of a virtual object, for example, a virtual barricade 1204 in the path of the vehicle. While barricade 1204 is a virtual object, it may be recognized by a range-determining system of first vehicle 1100 or a processing system capable of automatically causing at least one navigational response by the vehicle (e.g., braking). The presence of virtual barricade 1204 may cause first vehicle 1100 to initiate a full emergency brake and prevent it from entering intersection 1104. Similarly, local system 100 may also send second vehicle 1102 a different control signal that may cause the range-determining system of second vehicle 1102 to respond to a virtual barricade 1206. The above described example is not intended to be limiting. Rather, any type of control signal may be transmitted to vehicles approaching an intersection or any other location proximate to local system 100. Such control signals may cause automated responses in those vehicles either through generation of simulated objects or conditions (as described above). Such control signals may also include command signals (e.g., emergency brake, steer by a certain angle and direction, etc.) or may include information from which a system onboard a vehicle may develop its own response (e.g., a vehicle is approaching at a heading of X and a speed of Y).

Consistent with another aspect of the present disclosure, the system (e.g., local system 100) may include at least one transmitter that enables a bi-directional communication between the system and the vehicles. One advantage of bi-directional communication is that the system can convey information to first vehicle 1100, such as road surface markings, locations of other road users, and environmental data. In one embodiment, the system is configured to store past locations of other vehicles crossing intersection 1104 and to use the stored locations to determine (e.g., infer) locations of road surface markings on the road. For example, the inferred road surface markings (e.g., virtual road surface markings) may include directional arrows 1208, lane border 1210, cross walk, stop line, and more. Specifically, the system can send a control signal when first vehicle 1100 strays from a determined/inferred lane location. In another embodiment, the system may inform first vehicle 1100 about the locations of other road users (e.g., other vehicles or pedestrians). This information may also be used by an existing driver-assistance system to adjust the speed and movement of first vehicle 1100. In another embodiment, the system is configured to send at least one control signal that may cause a warning sign 1212 to appear, for example, in user interface 1202 indicating a hazardous situation. In vehicles without user interfaces connected to a camera of driver-assistance system the warning sign may be audible, an indicator light, symbolic, textual, etc. In another embodiment, the system may provide first vehicle 1100 at least one notice 1214 including environmental data, such as traffic/navigation updates, light conditions, weather conditions, and the like. In another embodiment, user interface 1202 may also present one or more representation 1216 of road users detected by their electromagnetic emissions.

As mentioned above, the system may determine the locations of non-vehicle road users by detecting electromagnetic emissions emitted from an associated electronic device (e.g., a person carrying a smartphone). FIG. 13 depicts the output of receivers 110A-110C having a reception band between 2.4 GHz and 2.4835 GHz. In the example illustrated in FIG. 13, the output of receivers 110A-110C is presented in separated graphs. The vertical axis of each graph represents the amplitude of the detected signals and the horizontal axis of the graph represents time. In this case, the signal information generated from the electromagnetic emissions associated with the smartphone are not periodic, but the system (e.g., local system 100) can still identify the time shifts $\Delta T_{BA}$ and $\Delta T_{CA}$ between the electromagnetic emissions. Thereafter and using the equations presented above (or any other method), the system can determine the exact location of a road user carrying a smartphone.

Figure 14A:
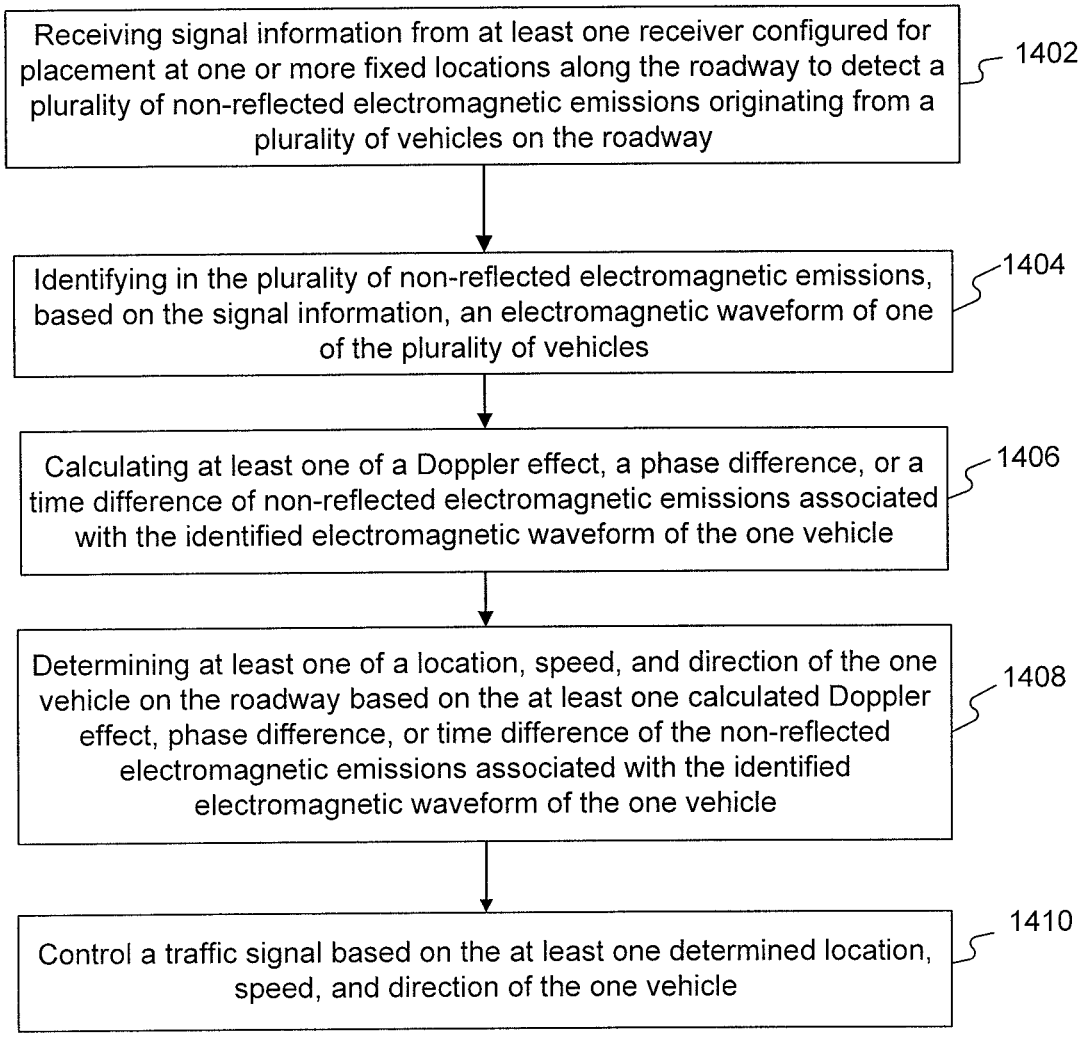
FIG. 14A is a flowchart of an example process for determining at least one of location, speed, and direction of a vehicle, consistent with the disclosed embodiments.

Reference is now made to FIG. 14A, which depicts an exemplary method 1400 for determining at least one of location, speed, and direction of a single vehicle on a roadway consistent with the present disclosure. In one embodiment, all of the steps of method 1400 may be performed by local system 100. In another embodiment, at least one step of method 1400 may be performed by regional system 300. In the following description, reference is made to certain components of local system 100 for purposes of illustration. It will be appreciated, however, that other implementations are possible and that other components from local system 100 or regional system 300 may be utilized to implement the exemplary method. In addition, it will be readily appreciated that the illustrated method can be altered to modify the order of steps, delete steps, or further include additional steps.

At step 1402, a processing device (e.g., controller 120 or main server 320) may receive signal information from at least one receiver (e.g., receiver 110) configured for placement at one or more fixed locations along the roadway to detect a plurality of non-reflected electromagnetic emissions originating from a plurality of vehicles on the roadway. In one embodiment, the non-reflected electromagnetic emissions may include a measurable signal emanating from the one vehicle or from within the one vehicle. For example, the measurable signal may originate from on board communication devices (e.g., a Dedicated Short-Range Communications (DSRC) device), range-determining systems of the vehicles (e.g., radar, Lidar, sonar), components of the vehicles themselves (e.g., engine, a battery), or electromagnetic sources emanating from a system, subsystem, or component being transported in the vehicles.

At step 1404, the processing device may identify in the plurality of non-reflected electromagnetic emissions, based on the signal information, a periodic electromagnetic waveform of one of the plurality of vehicles. The periodic electromagnetic waveform may include any information derivable from the detected electromagnetic emissions of a vehicle that can uniquely identify the one vehicle from among a plurality of vehicles. For example, the identified periodic electromagnetic waveform may be unique in at least one of following, shape, wavelength, amplitude, or phase. In other words, each periodic electromagnetic waveform may be represented by a different wave function. The electromagnetic waveform may be derived from a signal emanating from any equipment component or subpart associated with the vehicles. In one example, the electromagnetic waveform may be derived from a signal emanating from a radar antenna associated with the one vehicle. In another example, the electromagnetic waveform may be derived from a signal emanating from a mobile communications antenna associated with the one vehicle. As described in greater detail below, the processing device may identify in the plurality of non-reflected electromagnetic emissions two electronic waveforms, including a first electromagnetic waveform associated with the one vehicle and a second electromagnetic waveform associated with the non-vehicle road user.

At step 1406, the processing device may calculate at least one of a Doppler effect, a phase difference, or a time difference of non-reflected electromagnetic emissions associated with the identified electromagnetic waveform of the one vehicle. In one embodiment, the processing device may calculate at least two of the Doppler effect, the phase difference, or the time difference of non-reflected electromagnetic emissions. Calculating at least one of the Doppler effect, the phase difference, or the time difference of the non-reflected electromagnetic emissions may be used to determine one or more parameters that characterize the non-reflected electromagnetic emissions associated with the identified electromagnetic waveform of the one vehicle. In one embodiment, the parameters may include the time-of-arrival, the amplitude, the carrier frequency, the modulation, the pulse width, the direction of arrival of the emitting source from a receiver, and the distance of the emitting source from the receiver.

At step 1408, the processing device may determine at least one of a location, speed, and direction of the one vehicle on the roadway based on the at least one calculated Doppler effect, phase difference, or time difference of the non-reflected electromagnetic emissions associated with the identified electromagnetic waveform of the one vehicle. In one example, the processing device may determine the location, the speed, and the direction of the one vehicle on the roadway. Consistent with the present disclosure, the at least one receiver may include a plurality of spatially separated receivers in proximity to an intersection, and the at least one processor is further configured to determine the at least one of a location, speed, and direction of each vehicle approaching the intersection based on signals emitted by each vehicle and received from the plurality of spatially separated receivers. In this case, the received signal information may include input signals from each of the plurality of spatially separated receivers.

As mentioned above, the processing device may identify in the plurality of non-reflected electromagnetic emissions two electronic waveforms, including a first electromagnetic waveform associated with a first vehicle and a second electromagnetic waveform associated with a second vehicle or with a non-vehicle road user. Thereafter, the processing device may determine at least one of a speed, location, and direction of the first vehicle and of the second vehicle or the non-vehicle road user and may send to the first vehicle a control signal based on the determined at least one of a speed, location, and direction of the first vehicle and of the second vehicle or the non-vehicle road user. The processing device may determine if the first vehicle is at least partially autonomously driven or manually-driven and based on that determination decide if the control signal should be a warning message to a driver or a message configured to be received by a vehicle control system for automatically altering an operation of at least one vehicle component without the driver intervention.

At step 1410, the processing device may control a traffic signal based on the at least one determined location, speed, and direction of the one vehicle. In one embodiment, controlling the traffic signal may include changing a traffic light configured to control the traffic flow in a lane associated with the one vehicle. In another embodiment, controlling the traffic signal may include changing a traffic light configured to control the traffic flow in a lane associated with the another vehicle driving in a direction different than the one vehicle.

Figure 14B:
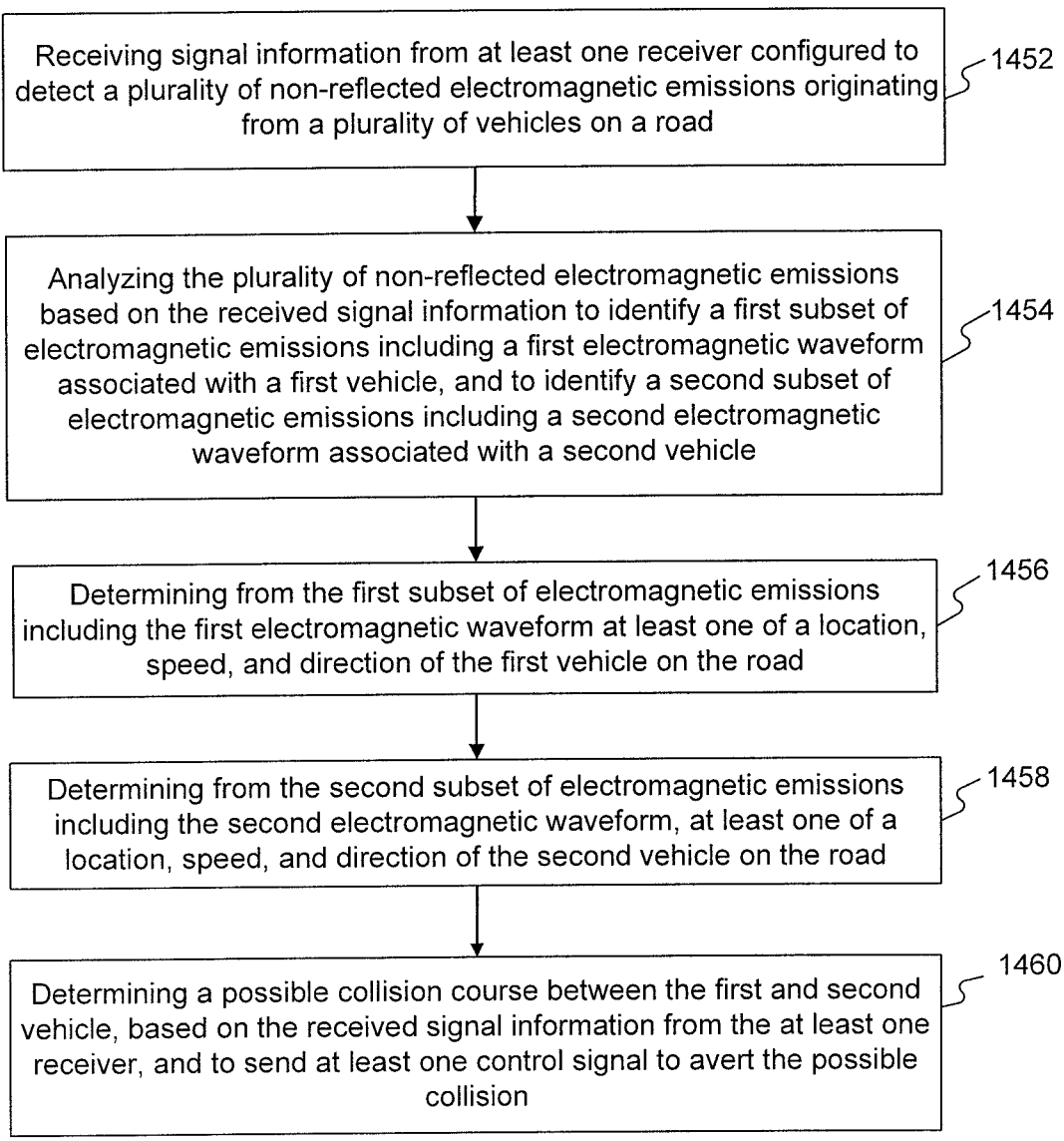
FIG. 14B is a flowchart of an example process for determining at least one of location, speed, and direction of two vehicles, consistent with the disclosed embodiments.

Reference is now made to FIG. 14B, which depicts another exemplary method 1450 for determining at least one of location, speed, and direction of at least two vehicles on a roadway consistent with the present disclosure. In one embodiment, all of the steps of method 1450 may be performed by local system 100. In another embodiment, at least one step of method 1450 may be performed by regional system 300. In the following description, reference is made to certain components of local system 100 for purposes of illustration. It will be appreciated, however, that other implementations are possible and that other components from local system 100 or regional system 300 may be utilized to implement the exemplary method. In addition, it will be readily appreciated that the illustrated method can be altered to modify the order of steps, delete steps, or further include additional steps.

At step 1452, a processing device (e.g., controller 120 or main server 320) may receive signal information from at least one receiver (e.g., receiver 110) configured to detect a plurality of non-reflected electromagnetic emissions originating from a plurality of vehicles on a road. Consistent with the present disclosure, the at least one receiver may be configured to simultaneously detect the plurality of non-reflected electromagnetic emissions from the plurality of vehicles. The term "simultaneously detecting electromagnetic emissions" means that there is at least some amount of overlap in time when electromagnetic emissions from the plurality of vehicles are received. The plurality of vehicles includes more than 10 vehicles, more than 50 vehicles, or more than 100 vehicles. In one embodiment, the at least one receiver may have a reception band within an operational radio-spectrum of vehicles' range-determining systems. For example, the at least one receiver may have a reception band between 76 GHz and 81 GHz or between 23 GHz and 25 GHz. In one embodiment, the at least one receiver may have a reception band within an operational radio-spectrum of personal communication devices and the system is configured to determine at least one of location, speed, and direction of pedestrians carrying personal mobile communications devices. For example, the at least one receiver may have a reception band between 2.4 GHz and 2.4835 GHz.

At step 1454, the processing device may analyze the plurality of non-reflected electromagnetic emissions based on the received signal information to identify a first subset of electromagnetic emissions including a first electromagnetic waveform associated with a first vehicle, and to identify a second subset of electromagnetic emissions including a second electromagnetic waveform associated with a second vehicle. Consistent with the present disclosure, the at least one receiver may include a plurality of spatially separated receivers in proximity to an intersection and the processing device may identify a first and a second subset of electromagnetic emissions including the first and second electromagnetic waveforms in each signal input received from each of plurality of spatially separated receivers. In one embodiment, each of the plurality of spatially separated receivers is configured to detect vehicles at a range of about 50 meters, at a range of about 150 meters, at a range of about 250 meters, at a range of about 500 meters, or more. Upon identifying the first and second subsets of electromagnetic emissions, the processing device may use measurements of the electromagnetic emissions emanating from the plurality of vehicles as received by the plurality of receivers to determine the at least one of a location, speed, and direction of the vehicles on the roadway. Specifically, the processing device may determine time difference of signal arrivals from the measurements of the electromagnetic emissions received at each of the plurality of spatially separated receivers, and determine the locations of the first vehicle and the second vehicle using multilateration (MLAT) of the time difference of signal arrivals.

At step 1456, the processing device may determine from the first subset of electromagnetic emissions, including the first electromagnetic waveform, at least one of a location, speed, and direction of the first vehicle on the road. At step 1458, the processing device may determine from the second subset of electromagnetic emissions, including the second electromagnetic waveform, at least one of a location, speed, and direction of the second vehicle on the road. In one embodiment, the processing device may store locations of each of the plurality of vehicles and use the stored locations to determine a virtual road surface marking on the road. For example, the processing device may use the stored locations to determine a lane location, wherein the stored locations are associated with vehicles' movements during a period of at least three days, a period of at least two weeks, or a period of at least a month. Thereafter, the processing device may send at least one control signal when detecting that the first vehicle on the road strays from the determined lane location. The at least one control signal may include a guidance message (e.g., lane departure warnings) to a driver of the first vehicle. In another embodiment, the processing device may access stored data defining roadways in an area of interest, and wherein the stored data includes map data and regulatory data. The processing device may use the stored locations and the stored data to determine at least one traffic management action, for example, traffic light timing schedule.

At step 1460, the processing device may determine a possible collision course between the first and second vehicle, based on the received signal information from the at least one receiver, and send at least one control signal to avert the possible collision. In one embodiment, the least one control signal is configured to be received by a traffic light or a traffic sign. The term "traffic sign" includes any device used on the highways, roads, bridges, or streets that provides warning, instruction, or information to road users. In one example, the at least one control signal is configured to cause a traffic sign to show either a stop sign or a yield sign. In another embodiment, the at least one control signal may be received by at least the first vehicle to influence movement of the first vehicle with respect to the second vehicle, for example, to change speed or to switch lanes. In yet another embodiment, the at least one control signal may include a first control signal configured to be received by at least the first vehicle, a second control signal configured to be received by at least the second vehicle, and a third control signal configured to be received by a traffic light.

Emissions from Multiple Beacons Used for Relative Motion Detection

A vehicle's own beacon system (e.g., radar, Lidar, sonar systems that operate based on emitting signals and detecting reflections of the emitted signals) may be used by the vehicle for navigation. Additionally, however, the presently disclosed embodiments may include an infrastructure, e.g., local system 100, configured to use the beacon system(s) of one or more vehicles to gain comprehensive data about the simultaneous movements of the one or more vehicles. For example, one or more receivers mounted in the vicinity of a roadway may directly detect electromagnetic emissions from the beacon system(s) of one or more vehicles and use the detected electromagnetic emissions to track, for example, the plurality of vehicles.

Figure 15A:
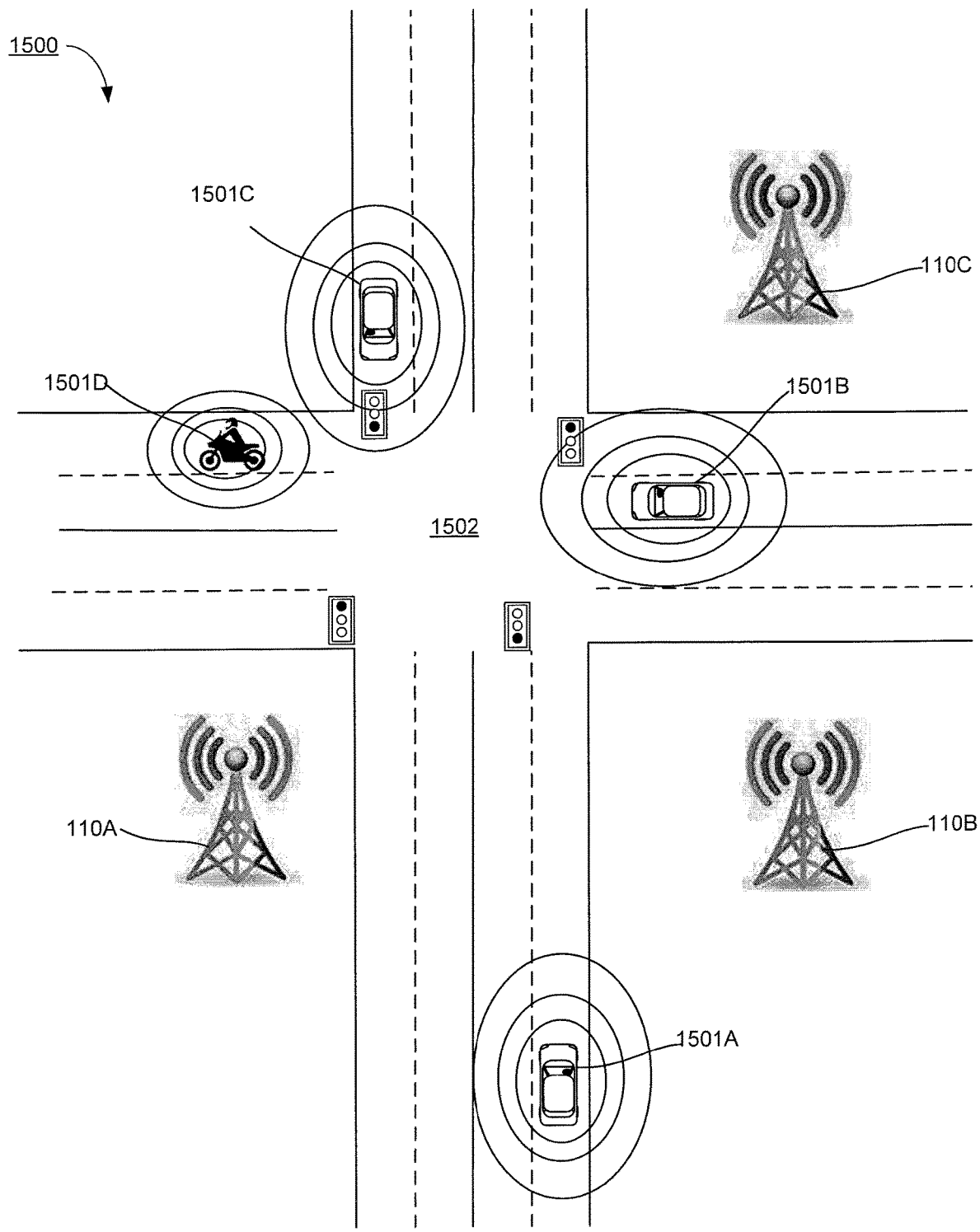
FIGS. 15A and 15B is schematic illustration of an example scenario of a plurality of vehicles in the vicinity of an intersection consistent with disclosed embodiments.

In some embodiments, local system 100 may use signals emitted by one or more vehicles' onboard range-determining systems to determine information about simultaneous movements of a plurality of vehicles on a roadway. For example, FIG. 15A is an illustration of a system 1500 at a time t, for using signals emitted by a plurality of vehicles (e.g., vehicles 1501A-1501D) to gain data about the movement (e.g., determining current positions through triangulation; velocity, acceleration, trajectories, etc. by, for example, tracking positions over time) of the one or more vehicles on a roadway at intersection 1502. The system may include at least one receiver, e.g., receivers 110A-110C, configured for mounting in the vicinity of a roadway and to detect a plurality of non-reflected electromagnetic emissions generated by the range-determining systems aboard a plurality of individual vehicles simultaneously navigating the roadway. Consistent with the present disclosure, each of receivers 110A-110C may be configured for mounting on a traffic light, a lamppost, and/or a billboard in proximity to an area of interest. For example, receivers 110A-110C may be fixedly positioned at spatially separated locations near an intersection, a road segment, an interchange, a tunnel, a parking lot, and more. In addition, each of receivers 110A-110C may detect vehicles at a range of at least 50 meters, at least 100 meters, at least 250 meters, at least 500 meters, or at least 750 meters. In some embodiments, one or more of the receivers 110A-110C may be a passive receiver.

The system 1500 may include a processor configured to receive signal information from the at least one receiver. The processor may analyze a plurality of non-reflected electromagnetic emissions, represented by three circles surrounding the road user, e.g., vehicles 1501A-1501D, from the range-determining systems aboard the plurality of individual vehicles. Consistent with the present disclosure, the electromagnetic emissions may originate from on board communication devices (e.g., a Dedicated Short-Range Communications (DSRC) device), range-determining systems of the vehicles (e.g., radar, Lidar, sonar), components of the vehicles themselves (e.g., engine, a battery), cell phone transmissions, navigational transmitter unique to the vehicle, or electromagnetic sources emanating from a system, subsystem, or component being transported in the vehicles.

Based on the received signal information, the processor may associate groups of non-reflected electromagnetic emissions with individual vehicles based on one or more signal characteristics. In the context of this example scenario, the system 1500 may analyze a plurality of electromagnetic emissions to identify a first group of electromagnetic emissions (e.g., signal 602) including a first electromagnetic waveform (e.g., the triangle wave of signal 602) associated with first vehicle 1501A, a second group of electromagnetic emissions (e.g., signal 604) including a second electromagnetic waveform (e.g., the sawtooth wave of signal 604) associated with second vehicle 1501B, etc. In some embodiments, the signal emitted by the range-determining system of a vehicle may include encoded identifying information such as an electromagnetic fingerprint or type of vehicle. For example, a signal may be encoded to identify a road vehicle as a truck, bus, taxi, emergency vehicle, etc.

In other embodiments, emissions may be grouped by carrier radio frequency (Fc), pulse amplitude (PA), pulse width (PW), and/or time of arrival (TOA). In some embodiments, modulation on the pulse (MOP) is used to identify a particular emitter and/or to determine the linear frequency modulation rate or phase coding of a pulse compression (PC). In some embodiments, the system may measure additional parameters, e.g., polarization. Based on these measurements, the system may determine the location (LOC) of a road user, for example, by the using a multilateration method. These parameters measured by the system on a single intercepted signal (e.g., received by receivers 110A-110C) may be referred to as a pulse descriptor word (PDW).

Figure 15B:
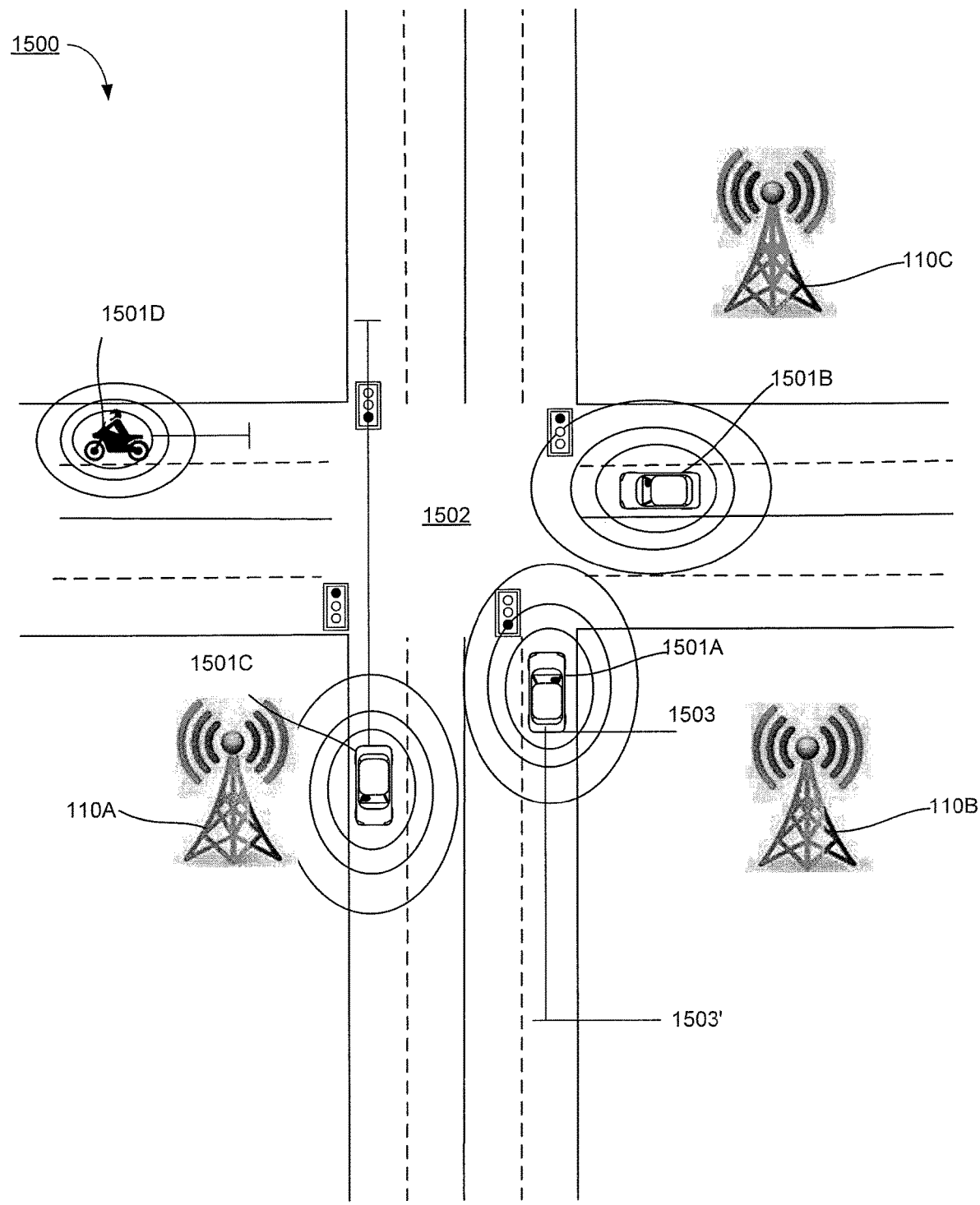

FIG. 15B is an illustration of system 1500 at a time $t_2$ occurring after $t_1$. Thereafter, the system 1500 determine, from the associated groups of non-reflected electromagnetic emissions, movements of the plurality of vehicles on the roadway. For example, one or more of receivers 110A-110C may use location information of vehicle 1501A at point 1503 received at $t_2$ and at point 1503' received at $t_1$ to determine a heading of vehicle 1501A. The time at which vehicle locations is recorded, e.g., the time between $t_1$ and $t_2$, may be a predetermined period of time (e.g., 0.25 seconds, 0.1 seconds, 0.01 seconds, etc.). Once the system 1500 gains knowledge of the exact location of the one or more vehicles 1501A-1501D at different times, the system can determine momentary properties characterizing the movement of the vehicles (such as velocity, acceleration, and direction) by monitoring the location of the vehicles 1501A-1501D over time. In one embodiment, the system may determine at least one of a location, speed, and direction of the one or more vehicles based on at least one of a calculated Doppler effect, phase difference, or time difference of the electromagnetic emissions associated with the identified group of emissions of each vehicle. For example, the processor may use methods as described in detail with reference to FIGS. 8-10B to determine the movement of each vehicle 1501A-1501D in the vicinity of intersection 1502.

Figure 16:
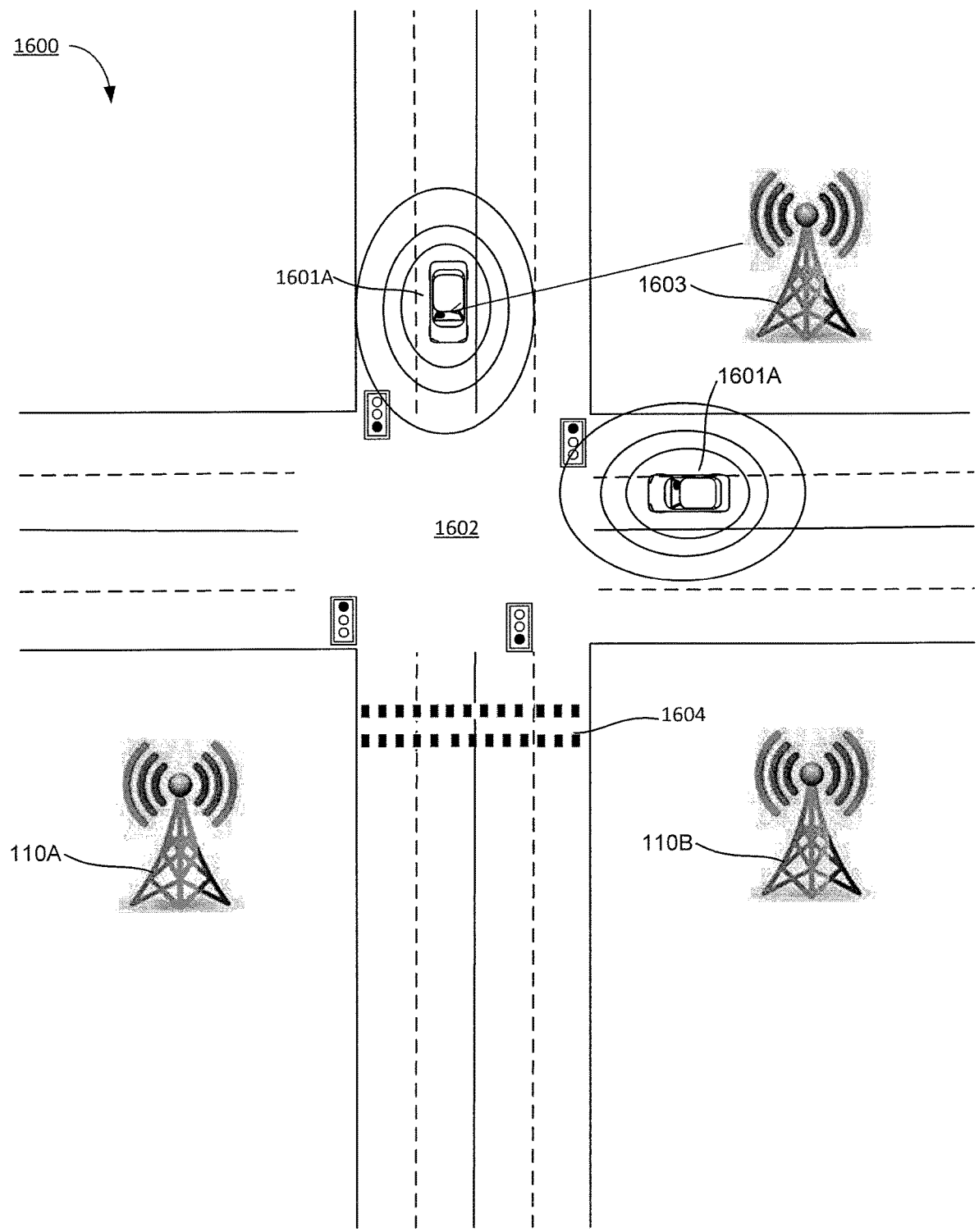
FIG. 16 is schematic illustration of another example scenario of a plurality of vehicles in the vicinity of an intersection consistent with disclosed embodiments.

FIG. 16 is another exemplary embodiment of a system 1600 for using emissions signals emitted by vehicles' onboard range-determining systems aboard individual vehicles, e.g., vehicles 1601A and 1601B, to determine information about simultaneous movements of a plurality of vehicles on a roadway. System 1600 may include receivers 110A and 110B and transceiver 1603, which may be configured to transmit signals to one or more of the plurality of individual vehicles via their respective range-determining systems. In some embodiments, transceiver 1603 may be a transmitter and system 1600 may include one or more transmitters.

In the exemplary scenario, vehicles 1601A and 1601B may be approaching intersection 1602. The system 1600 may receive signal information from receiver 110A via a first communication channel and signal information from receiver 110B via a second communication channel. The system may identify signal information from receivers 110A and 110B corresponding to vehicles 1601A and 1601B. Based on the signal information, the system 1600 may determine the instantaneous location of vehicles 1601A and 1601B.

In some embodiments, the system 1600 may determine, an instantaneous heading of each vehicle by comparing each vehicle's current location with its previous location as described with reference to FIGS. 15A and 15B. Based on the instantaneous headings of vehicles 1601A and 1601B, the system 1600 may determine that there is a likelihood of collision of one or more of the vehicles with another vehicle or virtual object. For example, based on the velocity and direction of vehicle 1601A, the system 1600 may determine a likelihood that the vehicle will stop at the intersection 1602 or that the vehicle 1601A will collide with vehicle 1601B. In another example, the system may determine the location of crosswalk 1604, based on past vehicle movement patterns. The system 1600 may store the location of the crosswalk in a memory or database as a virtual object. System 1600 may determine whether vehicle 1601B is travelling at a speed such that it may stop if a pedestrian enters the crosswalk. In some embodiments, system 1600 may determine the presence and/or movement of one or more pedestrians or other non-vehicle road users from electromagnetic emissions from a cellular phone or smart device associated with the one or more pedestrians.

If the system 1600 determines the vehicle is on a collision course with at least one other road user, transceiver 1603 may transmit signals to one or more of vehicles 1601A and 1601B via each vehicle's range-determining system. The signal may be representative of the virtual object with which the vehicle is on a collision course, e.g., another vehicle or road user. For example, if the vehicle is autonomous, the vehicle's navigational system may implement a navigational change to avoid the virtual object. In some embodiments, if vehicle 1601A or 1601B is autonomous, transceiver 1603 may transmit at least one control signal to influence the movement of the vehicle. In other embodiments, the transmitted signal may cause an alert to be visibly displayed or audibly broadcast to the operator of the vehicle.

FIG. 17 depicts an exemplary method 1700 for using emissions signals emitted by vehicles' onboard range-determining systems aboard individual vehicles to determine information about simultaneous movements of a plurality of vehicles on a roadway. In one embodiment, all of the steps of method 1700 may be performed by local system 100. In another embodiment, at least one step of method 1700 may be performed by regional system 300. In the following description, reference is made to certain components of local system 100 for purposes of illustration. It will be appreciated, however, that other implementations are possible and that other components from local system 100 or regional system 300 may be utilized to implement the exemplary method. In addition, it will be readily appreciated that the illustrated method can be altered to modify the order of steps, delete steps, or further include additional steps.

At step 1701, a processing device (e.g., controller 120 or main server 320) may receive signal information from at least one receiver (e.g., receiver 110) configured for mounting in a vicinity of a roadway and to detect a plurality of non-reflected electromagnetic emissions generated by the range-determining systems aboard a plurality of individual vehicles simultaneously navigating the roadway. In some embodiments the at least one receiver may include a passive receiver. The at least one receiver may be configured to detect signals emanating from a radar antenna associated with at least one vehicle. In one embodiment, the at least one receiver may have a reception band within an operational radio-spectrum of vehicles' range-determining systems. For example, the at least one receiver may have a reception band between 76 GHz and 81 GHz.

At step 1702, the processing device may analyze the plurality of non-reflected electromagnetic emissions from the range-determining systems aboard the plurality of individual vehicles, based on the received signal information, to associate groups of non-reflected electromagnetic emissions with individual vehicles. In some embodiments, the at least one processor is further configured to identify in the plurality of non-reflected electromagnetic emissions an electromagnetic fingerprint associated with each of the plurality of individual vehicles. For example, the processor may identify electromagnetic fingerprints of more than 50 vehicles located between 5 and 500 meters from the at least one receiver and to track movements of the more than 50 vehicles. In some embodiments, the processor may be configured to determine a type of each of the plurality of individual vehicles based on the plurality of non-reflected electromagnetic emissions.

At step 1703, the processing device may determine, from the associated groups of non-reflected electromagnetic emissions, movements of the plurality of vehicles on the roadway. The at least one processor may be configured to determine headings of at least four individual vehicles concurrently driving in differing directions. In other embodiments, the at least one processor may be configured to determine headings of less than four individual vehicles concurrently driving in differing directions. In other embodiments, the processor may be configured to determine headings of one or more vehicles concurrently driving in the same or similar directions.

As mentioned above, the system may include a first receiver and a second receiver substantially spaced apart from the first receiver. The processing device may receive signal information from the first receiver via a first communication channel and may receive signal information from the second receiver via a second communication channel. The processing device may identify in the signal information from the first receiver non-reflected electromagnetic emissions associated with at least a portion of the plurality of individual vehicles, identify in the signal information from the second receiver non-reflected electromagnetic emissions associated with the same portion of the plurality of individual vehicles, and determine an instantaneous location of each of the plurality of individual vehicles based on the signal information from the first receiver together with the signal information from the second receiver. The at least one processor may further be configured to determine an instantaneous heading of each of the plurality of individual vehicles based on the signal information from the first receiver together with the signal information from the second receiver. In some embodiments, the instantaneous heading may be determined based on a comparison of the vehicle's current location and the vehicle's previous location.

At step 1704, the processing device may be configured to cause the transmitter to transmit signals to one or more of the plurality of individual vehicles via their respective range-determining systems. The transmitted signal may include at least one signal representative of a virtual object to trigger a collision avoidance action in at least one of the plurality of individual vehicles receiving the transmitted signals. The processing device may further be configured to transmit the at least one signal representative of the virtual object upon detecting a road user on a collision course with a particular vehicle from among the plurality of individual vehicles. In some embodiments the road user may be a pedestrian carrying a mobile communications device.

Controlling Traffic in Intersections Using Non-Reflected EM

Regarding intersection management, an important consideration, among others, is collision avoidance. Another important consideration, however, is efficiency and potentially maximizing the efficiency of usage of the mutual resource (the public road, the intersection) while minimizing unnecessary stops and while providing the best possible user experience. It could be that the system initiates a control action such as "slow down to 15 MPH" or "move to right lane and maintain your speed" not for collision avoidance but for efficient flow, so that a road user doesn't need to stop and so that use of public spaces may be made more efficient. With smart intersection and lane management techniques of the presently disclosed embodiments, it may be possible that two or three lanes in the future may handle the same throughput of current four-lane road configurations, for example.

In some embodiments, a system is disclosed for controlling vehicle traffic in an intersection using non-reflected electromagnetic emissions and electromagnetic waveforms. As discussed above, electromagnetic emissions may refer to any form of electromagnetic emissions having any wavelength, frequency, energy, power, polarization, and/or spatial or temporal profile, and electromagnetic waveforms may refer to any information derivable from the detected electromagnetic emissions of a road user that can uniquely identify the road user or at least some equipment component, subpart, etc. associated with the road user. The system may improve and maximize the efficiency of traffic flow through the intersection, for example, by minimizing unnecessary stops and balancing the traffic load across various lanes. For example, the system may use control signals for intersection and lane management to enhance the throughput through the intersection.

As used in the present disclosure, the term "intersection" may refer to any road feature involving multiple road users where two or more roads meet or cross. For example, an intersection may refer to a traditional four-way intersection as illustrated in FIG. 18, or may also refer to a three-way intersection, five-way intersection, six-way intersection, other road features (e.g., an interchange, a roundabout, a highway entrance or exit), and the like.

The system may control vehicle traffic in an intersection based on the detected non-reflected electromagnetic emissions by initiating passive or active measures (i.e., collision avoidance actions) to in response to the detected non-reflected electromagnetic emissions. Such active or passive measures may reduce a likelihood of collisions or prevent collisions between road users. For example, active measures may include taking direct control of an autonomous vehicle in order to alter the path and/or velocity of the autonomous vehicle to avoid a collision between road users, while passive measures may include sending a warning message to a road user, or changing a traffic light signal.

Figure 18:
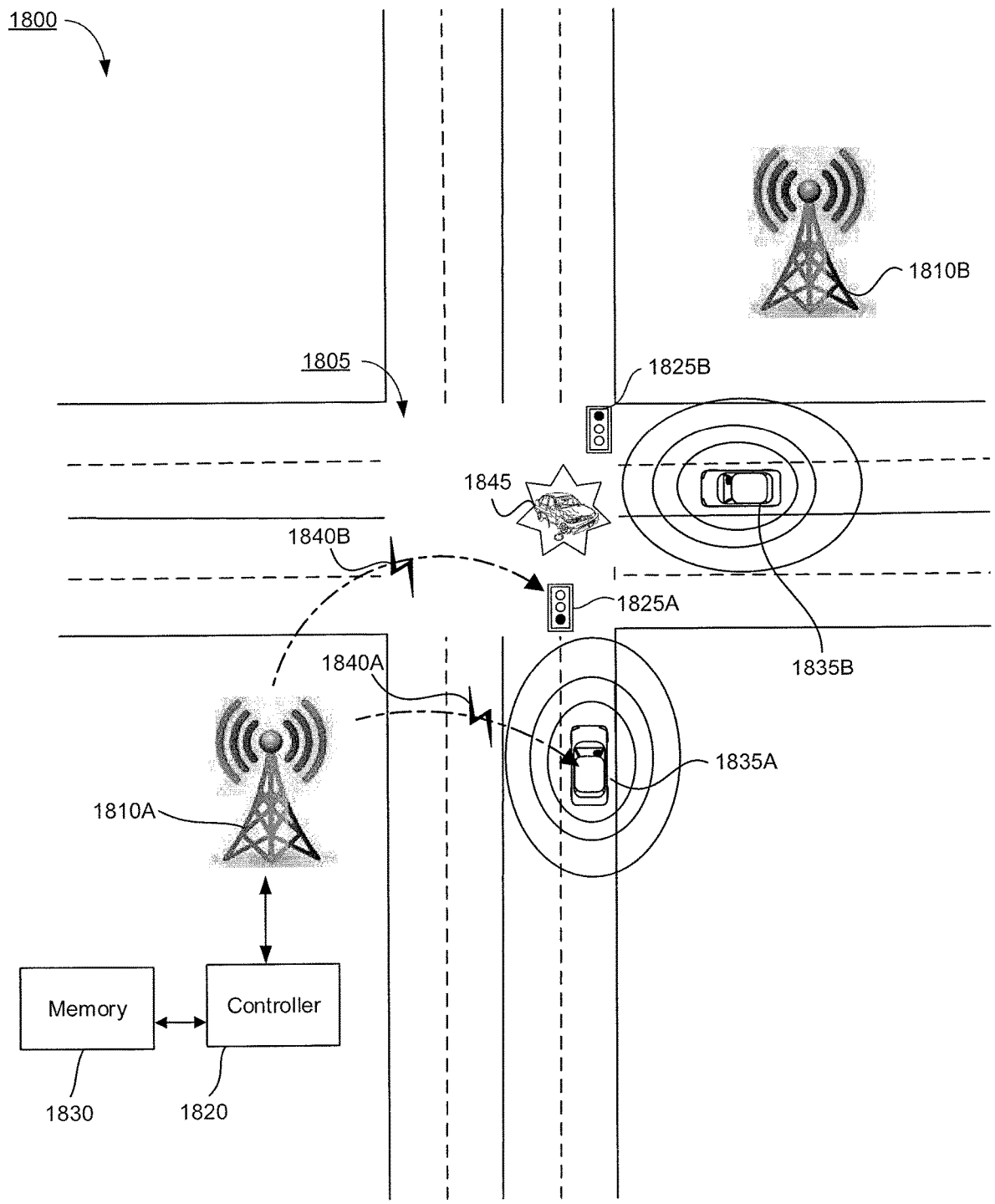
FIG. 18 is a diagrammatic illustration showing an example of a local system for controlling traffic in intersections using non-reflected electromagnetic emissions consistent with disclosed embodiments.

FIG. 18 provides a diagrammatic illustration of an exemplary system 1800 for managing vehicle traffic in an exemplary intersection 1805. The system may include receivers (e.g., receivers 1810A and 1810B) located in an area of the intersection to detect a plurality of non-reflected electromagnetic emissions originating from a plurality of vehicles moving in differing directions in a vicinity of the intersection. At least one processor, which may be contained within controller 1820, may be configured to receive signal information from the receivers. The at least one processor may also be configured to: identify in the plurality of non-reflected electromagnetic emissions electromagnetic waveforms associated with the plurality of vehicles, wherein each identified electromagnetic waveform is associated with one of the plurality of vehicles; calculate a first value associated with at least one of a Doppler effect, a phase difference, or a time difference of non-reflected electromagnetic emissions corresponding to a first electromagnetic waveform of a first vehicle approaching the intersection from a first direction; calculate a second value associated with at least one of a Doppler effect, a phase difference, or a time difference of non-reflected electromagnetic emissions corresponding to a second electromagnetic waveform of a second vehicle approaching the intersection from a second direction, different from the first direction; identify from the first calculated value and the second calculated value a potential collision course between the first vehicle and the second vehicle; and initiate a collision avoidance action when a potential collision course is identified. Examples of the processor's operations are described in greater detail in the sections below.

In some embodiments, the at least one receiver may include additional receivers. For example, as shown in FIG. 18, the system may include a first receiver 1810A and a second receiver 1810B. The second receiver 1810B may be spaced apart from the first receiver 1810A, and the at least one processor may be further configured to combine signal information from the first receiver and from the second receiver to determine an instantaneous location of the first vehicle and an instantaneous location of the second vehicle, consistent with the disclosure above with reference to FIGS. 5A and 5B. For example, an instantaneous location of a vehicle may be determined using various techniques, such as triangulation of the distances between the first receiver 1810A and second receiver 1810B and the time difference of arrival (TDOA) of the electromagnetic emissions to first receiver 1810A and second receiver 1810B. In some embodiments, first receiver 1810A and second receiver 1810B may be configured to detect non-reflected electromagnetic emissions from vehicles located up to about 3000 meters from the intersection. For example, while receivers 1810A and 1810B may be located around intersection 1805, they may simultaneously monitor and receive electromagnetic emissions and data from multiple intersections surrounding intersection 1805.

As discussed above, a controller (e.g., controller 1820) may include at least one processor. The processor may be configured to perform various functions for controlling traffic in intersections using information obtained through non-reflected electromagnetic emissions, described in greater detail below. The disclosed systems may have the ability to identify and track multiple vehicles or other road users simultaneously. For example, in some embodiments, the at least one processor may be further configured to identify electromagnetic waveforms associated with 2, 5, 10, 15, or more than 50 vehicles (or other road users) and to simultaneously track movements of those vehicles (or other road users) in a vicinity of intersection 1805.

As discussed above, system 1800 can determine the general properties of road users from tracking their movement while they are in range of receivers 1810A and 1810B. Such general properties of road users may include an indication whether each road user is a manual-gear vehicle or an automatic-gear vehicle, an indication whether each road user is a manually-driven vehicle or an autonomous automobile, an indication whether the driver of a vehicle is driving under influence or tired, and more. For example, system 1800 may determine the driving path using the determined momentary properties of a road user over a period of time. Thereafter, system 1800 may apply one or more pattern recognition algorithms and machine learning algorithms to the driving path to determine characteristics of the driving path. The determined characteristics may be used to determine the general properties of road users. For example, a driving path of an autonomous vehicle may be smoother than a driving path of a manually-driven vehicle. As a further example, system 1800 may recognize a specific electromagnetic waveform associated with a vehicle that is at least partially autonomously driven. As yet another example, when system 1800 assigns a distinct electromagnetic fingerprint to a road user, one characteristic that system 1800 may associate with the distinct electromagnetic fingerprint is whether the road user is operating an autonomous vehicle.

Consistent with disclosed embodiments, the at least one processor may be further configured to determine based on analysis of a first electromagnetic waveform that the first vehicle is at least partially autonomously driven. The processor may make this determination based on the driving behavior of the vehicle (e.g., a driving path of an autonomous vehicle may be smoother than a driving path of a manually-driven vehicle). The processor may further make this determination based on transmitted signals (e.g., signals capable of identifying a vehicle that is at least partially autonomously driven). Similarly, in a further embodiment, the at least one processor may be further configured to determine based on analysis of the second electromagnetic waveform that a second vehicle is manually-driven. For example, the system may determine whether the vehicle is capable of sending or receiving certain transmitted signals whatsoever. For example, the system may associate a lack of signals coming from a vehicle, in combination with the preceding methods and techniques, and may determine that the vehicle is manually driven In some embodiments, the at least one processor may be configured to access stored data (e.g., stored in memory 1830) associated with the intersection, and wherein the stored data includes map data and regulatory data. For example, map data may include past movements of road users in a vicinity of the intersection, or patterns of movements of road users over a past period of time (e.g., 48 hours, 24 hours, 12 hours). The regulatory data may include information about an intersection such as the speed limit, traffic signs (e.g., stop signs or yield signs), and the like. System 1800 may use this regulatory data to perform traffic control in real time, and may change or may set various rules in the intersection in order to improve traffic flow through the intersection.

In some embodiments, the at least one processor may be further configured to send a first control signal to a first traffic light in the intersection and a second control signal to a second traffic light in the intersection, wherein the first control signal is configured to cause a response in the first traffic light different from a response that the second control signal causes in the second traffic light. For example, as shown in FIG. 18, the first control signal sent to the first traffic 1825A light may be configured to cause a change in the light signal from a green light to red light, and the second control signal sent to the second traffic light 1825B may be configured to cause a change in the light signal from a red light to green light (i.e., a different response than the first traffic light 1825A). Consistent with the present disclosure, system 1800 may cause different responses in a first and second traffic lights as a passive measure to avoid collision 1845 between road users 1835A and 1835B. For example, if system 1800 determines that road user 1835A is likely to run a red light, it may cause a change in the light signal from a green light to a red light in another portion of the intersection to stop traffic to avoid a potential collision with road user 1835A who is likely to ignore the red light. As another example, system 1800 may sense traffic congestion in one or more incoming traffic lanes to the intersection, and may alter the control signals sent to traffic lights 1825A and 1825B to facilitate traffic flow through the intersection.

Consistent with disclosed embodiments, the various control components of system 1800 (e.g., receivers 1810A and 1810B, controller 1820 and associated processor and memory 1830), may operate together to generate a collision avoidance action 1840 between road users 1835A and 1835B. As discussed above, the systems and methods can use the detected electromagnetic emissions to manage traffic flow in a vicinity of the intersection 1805 and other road features. Below, various exemplary collision avoidance actions are described.

In some embodiments, the collision avoidance action 1840B may include altering a state of a traffic signal. For example, the state of a traffic signal may be altered by changing the light (e.g., changing the state of a traffic signal in traffic light 1825A from a green light to a red light).

In other embodiments, the collision avoidance action 1840A may include sending a warning message to at least one of the first vehicle 1835A and the second vehicle 1835B. The warning message may be transmitted through audio (e.g. a warning sound, alarm, or spoken word indicating that a collision is imminent), video (e.g., displaying a warning on a screen already integrated into the vehicle, displaying a warning on a road user's cell phone located in the vehicle), tactile feedback (e.g., causing the seat and/or steering wheel to shake), or any combination of the above.

The collision avoidance actions and associated vehicle control signals sent to a vehicle may be tailored to the specific characteristics and capabilities of the vehicle or user device operated by a road user. For example, as discussed above for autonomous vehicles, the system 1800 may serve as a Local Positioning System (LPS) and physically guide autonomous vehicles in the vicinity of an intersection to allow for efficient traffic flow operation, or may guide to avoid collision. Likewise, as discussed above for manually driven vehicles, the system 1800 may act as an ADAS system by providing it with geo-location information and accurate data about the vehicles' driving surrounding and deliver human-perceptible warning signals to the road user. As mentioned, these human-perceptible warning signals may be transmitted through any combination of audio, video, or tactile feedback.

As a further safety measure, in some embodiments, the collision avoidance action 1840A may include sending a vehicle control signal to at least one of a first vehicle 1835A and a second vehicle 1835B. For example, system 1800 may send a control signal to the first vehicle 1835A in order to change the speed or direction of the vehicle to avoid a collision. In other embodiments, the vehicle control signal may cause the recipient vehicle (e.g., first vehicle 1835A) to change its lane.

In some embodiments, the collision avoidance action may include sending a vehicle control signal to a first vehicle, and wherein the vehicle control signal is configured to be received by a vehicle control system and to automatically cause a change in at least one operational aspect of the first vehicle without user intervention. For example, as illustrated in FIG. 19A, an autonomous vehicle 1910 may receive a vehicle control signal 1920 from receiver 1930A, which causes the vehicle control system to automatically cause a change in at least one operational aspect without user intervention. Upon receiving vehicle control signal 1920 from receiver 1930A, the autonomous vehicle 1910 may automatically steer to the right and change lanes along path 1940 to avoid a potential collision with a stopped car ahead (not pictured), without any intervention from the road user operating autonomous vehicle 1910.

In other embodiments, the collision avoidance action may include sending a vehicle control signal 1960 from receiver 1930B to a second vehicle 1950, and wherein the vehicle control signal 1960 is configured to cause delivery of a human-perceptible message to the road user operating second vehicle 1950. For example, as illustrated in FIG. 19B, a warning message 1970 may be displayed on a screen already integrated into second vehicle 1950 along with human-audible sounds indicating that a collision is imminent. The warning message 1970 may include instructions of what the operator of an action the vehicle should take to prevent or avoid the collision.

Figure 20:
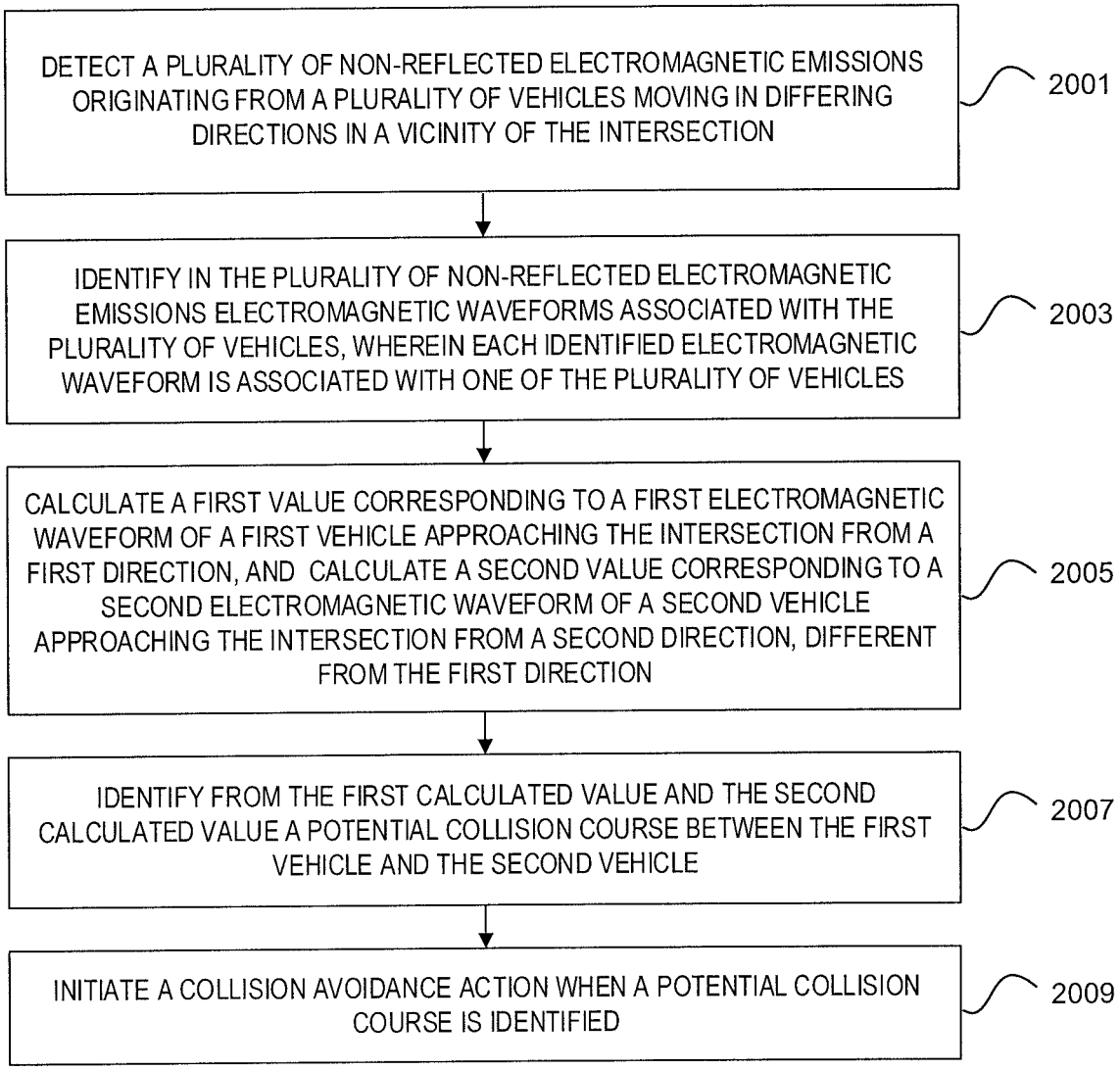
FIG. 20 is a flow chart illustrating an example of a method for controlling traffic in intersections using non-reflected electromagnetic emissions consistent with disclosed embodiments.

FIG. 20 is an example of traffic managing method 2000, consistent with the disclosed embodiments. Method 2000 may, for example, be executed by the at least one processor configured to receive signal information from the at least one receiver, and associated controller (e.g., controller 120) or any other appropriate hardware and/or software. Further, when executing method 2000, the at least one processor may execute instructions stored in any of the modules discussed above with respect to FIG. 4.

In step 2001, a receiver can be configured to detect, in an area of the intersection, a plurality of non-reflected electromagnetic emissions originating from a plurality of vehicles moving in differing directions in a vicinity of the intersection. In some embodiments, the receiver may identify electromagnetic waveforms associated with more than 50 vehicles and may simultaneously track movements of the more than 50 vehicles In step 2003, a processor may identify in the plurality of non-reflected electromagnetic emissions electromagnetic waveforms associated with the plurality of vehicles, wherein each identified electromagnetic waveform is associated with one of the plurality of vehicles. In some embodiments, the processor may further access stored data associated with the intersection, wherein the stored data includes map data and regulatory data.

In step 2005, the processor may calculate a first value associated with at least one of a Doppler effect, a phase difference, or a time difference of non-reflected electromagnetic emissions corresponding to a first electromagnetic waveform of a first vehicle approaching the intersection from a first direction, and may further calculate a second value associated with at least one of a Doppler effect, a phase difference, or a time difference of non-reflected electromagnetic emissions corresponding to a second electromagnetic waveform of a second vehicle approaching the intersection from a second direction, different from the first direction.

In step 2007, the processor may then identify from the first calculated value and the second calculated value a potential collision course between the first vehicle and the second vehicle.

In step 2009, the processor and system may initiate a collision avoidance action when a potential collision course is identified, consistent with the embodiments described above. For example, the collision avoidance action may include altering a state of a traffic signal or sending a vehicle control signal to at least one of the first vehicle and the second vehicle. In some embodiments, the system may send a first control signal to a first traffic light in the intersection and a second control signal to a second traffic light in the intersection, wherein the first control signal is configured to cause a response in the first traffic light different from a response that the second control signal causes in the second traffic light.

Tracking Pedestrians Based on Mobile Device Emissions

In one embodiment, a traffic management system configured to track the location of pedestrians using the electromagnetic emissions emitted from the pedestrians' mobile devices, is provided. For example, the system could be running a pedestrian detection procedure that functions based on interception of pre-defined radio signals associated with emissions from portable mobile devices, such as cellular phones. This embodiment, which may reduce the risk of collision with pedestrians, is addressed by the system described below.

As used in the present disclosure, the term "pedestrian" may refer to any road user who is not the driver, operator, or otherwise located in an automobile, vehicle, or transportation device that travels along the primary roads of an intersection. Rather, a pedestrian may generally travel along sidewalks and crosswalks adjacent to or crossing portions of the intersection. A pedestrian may travel via walking, or may employ use of a wheeled device, as described in further detail below.

Figure 21:
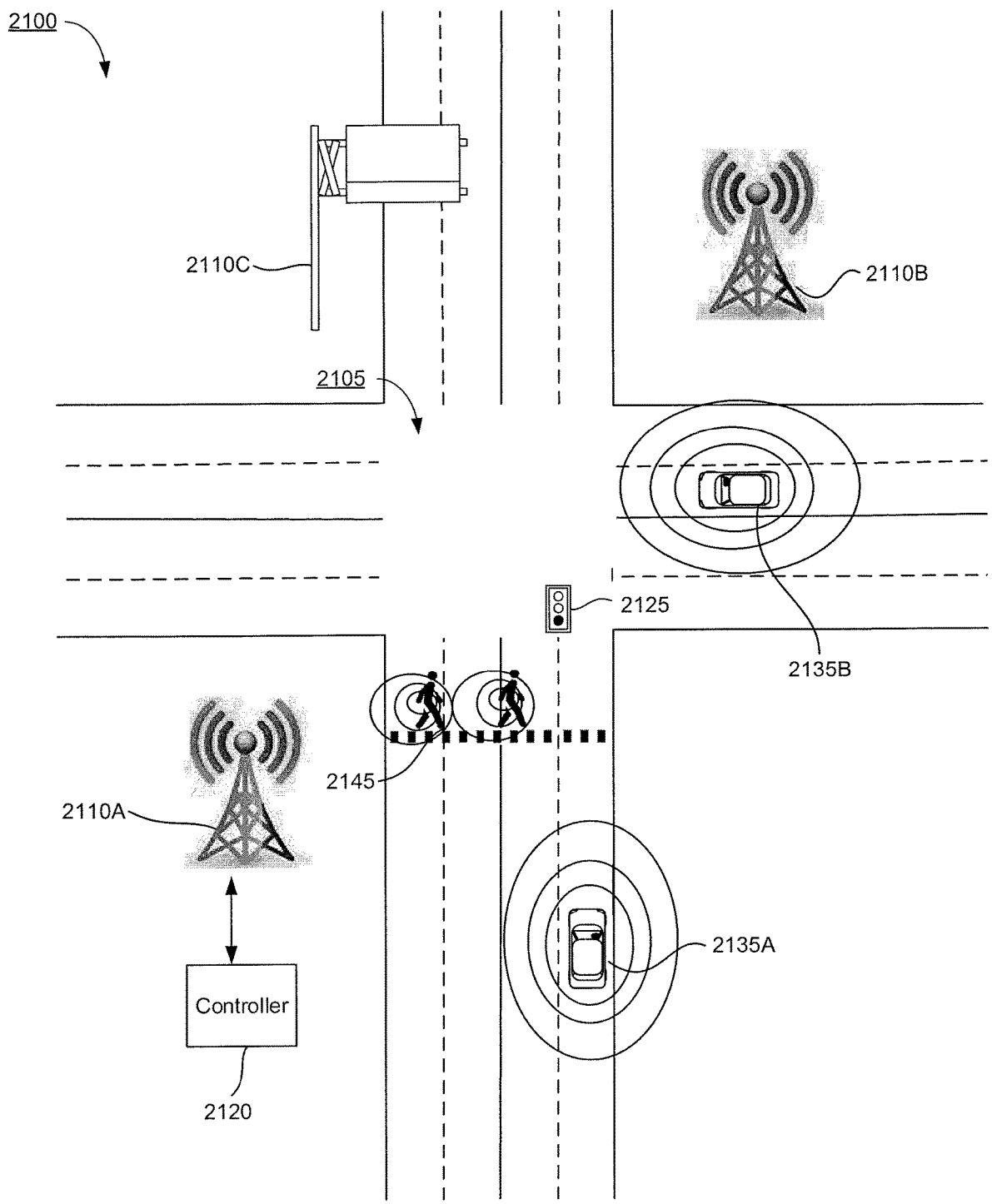
FIG. 21 is a diagrammatic illustration of an example of a local system for an intersection controller for tracking pedestrian mobile devices consistent with disclosed embodiments.

FIG. 21 provides a diagram illustrating an exemplary system 2100 for an intersection controller for tracking pedestrian mobile devices around an intersection 2105. The system may comprise receivers (e.g., receivers 2110A, 2110B, and 2110C) configured to detect a plurality of electromagnetic emissions in at least a first band associated with personal mobile communications devices of a plurality of pedestrians (e.g., pedestrians 2145) and detect a plurality of electromagnetic emissions in at least a second band associated with a plurality of automobiles (e.g., automobiles 2135A and 2135B), wherein the at least a second band is in a different electromagnetic spectrum area than the at least the first band. At least one processor, which may be contained within controller 2120, may be configured to receive signal information from the receivers and to: determine from the plurality of electromagnetic emissions in the at least the first band, locations of pedestrians (e.g., pedestrians 2145) in a vicinity of the intersection 2105 and determine from the plurality of electromagnetic emissions in the at least the second band, locations of automobiles (e.g., automobiles 2135A and 2135B) in a vicinity of the intersection 2105. The at least one processor may further use the determined location information of the pedestrians and the location information of the automobiles to manage traffic in the intersection 2105.

In some embodiments, the at least one receiver may include at least two receivers. For example, as shown in FIG. 21, the system may include a first receiver 2110A, second receiver 2110B, and third receiver 2110C. Additional receivers are also possible.

Consistent with disclosed embodiments, the at least one receiver may include a plurality of spatially separated receivers in proximity to the intersection. For example, as shown in FIG. 21, receivers 2110A, 2110B, and 2110C may be placed in proximity to the intersection 2105, but are spatially separated. In some embodiments, the at least one processor may be further configured to determine at least one of a location, speed, and direction of each of the pedestrians 2145 and automobiles 2135A and 2135B determined to be approaching or traveling through the intersection based on signal information received from the plurality of spatially separated receivers.

In some embodiments, the plurality of spatially separated receivers may be configured for mounting on at least one of a traffic light (e.g. traffic light 2125), a lamppost, or a billboard (e.g. billboard 2110C) in proximity to the intersection 2105. In other embodiments, the plurality of spatially separated receivers may be mounted on a designated post (e.g., designated posts 2110A and 2110B) specially designed for the mounting of the plurality of spatially separated receivers, or any combination of the preceding mounting options.

As noted above, the plurality of spatially separated receivers 2110A, 2110B, and 2110C may be configured to detect pedestrians 2145 at any suitable range. In some cases, pedestrians may be detected (e.g., based on emissions associated with mobile devices carried by the pedestrians) at a range of up to 50 meters, 100 meters, or at a range of about 300 meters or more. Similarly, the receivers may be configured to detect automobiles 2135A and 2135B at various ranges (e.g., up to 50 meters, 100 meters, 300 meters, 500 meters, or up to about 900 meters or more).

In some embodiments, the electromagnetic emissions in the first band (e.g., associated with personal mobile communications devices of a plurality of pedestrians) may be between 2.4 GHz and 2.4835 GHz and the second band (e.g., associated with electronics incorporated into a plurality of automobiles) may be approximately 24 GHz or between 76 GHz and 81 GHz. In other embodiments, one of the first band or second band may include the Federal Communications Commission's allocated 75 MHz of spectrum in the 5.9 GHz band for Dedicated Short Range Communications (DSRC).

As discussed above, a controller (e.g., controller 2120) may include at least one processor. The processor may be configured to perform various functions for detecting and tracking mobile devices of pedestrians 2145, and controlling intersections (e.g., controlling traffic flow in intersections) using information obtained through non-reflected electromagnetic emissions. Below, various exemplary actions for detecting and tracking pedestrian mobile devices, and controlling intersections are described in greater detail.

As discussed above, system 2100 may determine the general properties of road users from tracking their movement while they are in range of receivers 2110A, 2110B, and 2110C. Such general properties of road users may include: an indication whether each road user is a manual-gear vehicle or an automatic-gear vehicle; an indication whether each road user is a manually-driven vehicle or an autonomous automobile; an indication whether the driver of a vehicle is driving under influence, tired, or is operating the vehicle in any other abnormal way that may be dangerous to other road users (e.g., swerving the vehicle across traffic lanes); an indication whether a pedestrian is moving with assistance of a wheeled device, and more. Specifically, system 2100 may determine the driving path or walking path using the determined momentary properties of a road user over a period of time. Thereafter, system 2100 may apply one or more pattern recognition algorithms and machine learning algorithms to the driving path or walking path to determine characteristics of the path. The determined characteristics may be used to determine the general properties of road users. For example, a driving path of an autonomous vehicle may be smoother than a driving path of a manually-driven vehicle. In addition, a walking path of a pedestrian using a wheeled device may be faster and/or smoother than the walking path of a pedestrian not using a wheeled device. As a further example, system 2100 may recognize a specific electromagnetic waveform associated with an automobile or vehicle that is at least partially autonomously driven. As yet another example, when system 2100 assigns a distinct electromagnetic fingerprint to a road user, one characteristic that system 2100 may associate with the distinct electromagnetic fingerprint is whether the road user is operating an autonomous vehicle. Other examples of distinct electromagnetic fingerprints may include whether the road user is a pedestrian, whether a road user that is a pedestrian is using a wheeled device, whether a road user is operating a manually-driven vehicle, and the like.

Figure 22:
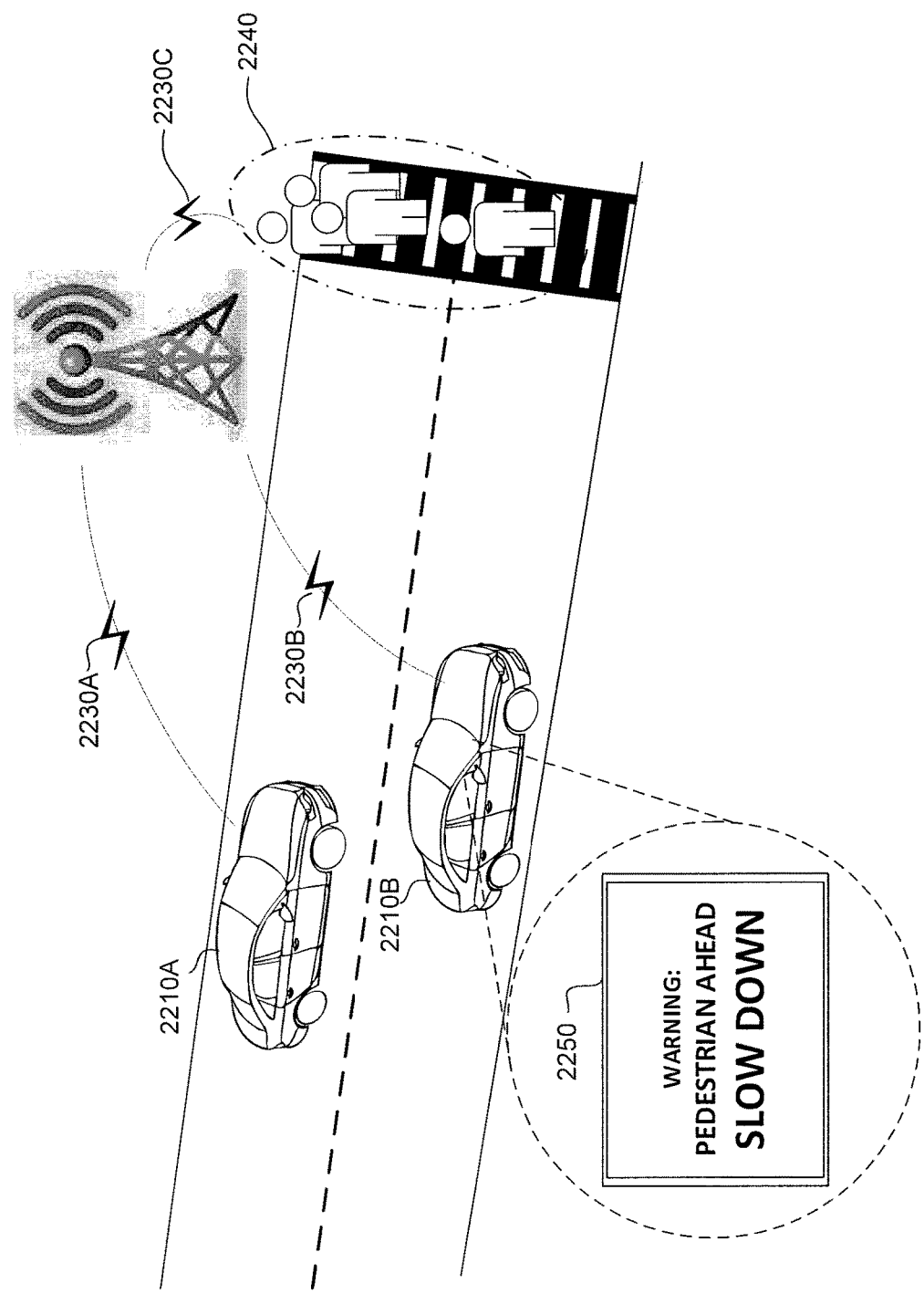
FIG. 22 is a diagrammatic representation of various examples of managing traffic consistent with disclosed embodiments.

In some embodiments, managing traffic in the intersection may include sending messages to at least some of the plurality of automobiles or some of the personal mobile communications devices of the plurality of pedestrians near an intersection. For example, the at least one processor may be further configured to determine whether a pedestrian and an automobile are on a collision course, and to intervene by sending at least one message. As shown in FIG. 22, the processor may determine that automobiles 2210A and 2110B are on a collision course with pedestrians 2240. As a further example, the intervention by sending at least one message may also include simultaneously sending messages to the pedestrian's mobile device and to the automobile on the collision course. As shown in FIG. 22, messages 2230A, 2230B, and 2230C may be simultaneously delivered to two or more of automobiles 2210A, 2210B, and pedestrians 2240. The message may be transmitted through audio (e.g. a warning sound, alarm, or spoken word indicating that a collision is imminent), video (e.g., displaying a warning on a screen already integrated into the vehicle or displaying a warning on the pedestrian's mobile device), tactile feedback (e.g., causing the seat and/or steering wheel to shake in the automobile, causing the pedestrian's mobile device to vibrate), or any combination of the above.

Consistent with disclosed embodiments, the at least one processor may be further configured to determine from the plurality of electromagnetic emissions in the at least the second band if an automobile in the plurality of automobiles is at least partially autonomously driven or manually driven. The processor may make this determination using a variety of techniques and methods, either alone or in combination. For example, as discussed above, the processor may identify an assigned distinct electromagnetic fingerprint associated with a road user, indicating whether the automobile is at least partially autonomously driven or manually driven. The processor may also make this determination based on the driving behavior of the automobile (e.g., a driving path of an autonomous vehicle may be smoother than a driving path of a manually-driven vehicle). The processor may further make this determination based on transmitted signals (e.g., signals capable of identifying a vehicle that is at least partially autonomously driven), or whether the automobile is capable of sending or receiving certain transmitted signals whatsoever. For example, the system may associate a lack of signals coming from an automobile, in combination with the preceding methods and techniques, and may determine that the automobile is manually driven. The system may use additional techniques alone or in combination (e.g., using captured image data from a camera) to enhance this determination. For example, the system may be able to determine the make and model of a car from the captured image data, and may make a determination as to whether the automobile is at least partially autonomously driven or manually driven based on this information.

Once the processor has made such a determination, the processor may send a first type of message when the automobile is at least partially autonomously driven and may send a second type of message when the automobile is manually-driven. Specifically, in some embodiments, the first type of message may include a control signal automatically altering an operation of the automobile without user intervention and the second type of message may include a warning to a driver of the automobile. As discussed above for autonomous vehicles, the system 2100 may serve as a Local Positioning System (LPS) and physically guide autonomous vehicles in the vicinity of an intersection to avoid collision. Further, the system may send a control signal to at least one autonomous vehicle to cause the at least one autonomous vehicle to stop (e.g., by sending a command to cause an automatic application of vehicle brakes or by sending an informational signal configured to cause a braking response by the vehicle) while a pedestrian is crossing the intersection. As shown in FIG. 22, the system may determine that automobile 2210A is autonomously driven and is on a collision course with pedestrians 2240 crossing the intersection, and may send a control signal (e.g., message 2230A) to automobile 2210A to stop. Likewise, as discussed above for manually driven vehicles, the system 2100 may enhance, or function as, the ADAS system by providing it with geo-location information and accurate data about the vehicles' driving surrounding and deliver human-perceptible warning signals to the road user. As mentioned, these human-perceptible warning signals may be transmitted through any combination of audio, video, or tactile feedback. As shown in FIG. 22, manually driven automobile 2210B may receive a message 2230B that triggers a warning message 2250 to be shown on a display screen within automobile 2210B.

Using the same methods and algorithms described above with respect to automobiles, in some embodiments, the at least one processor may be further configured to determine if the pedestrians are moving with assistance of a wheeled device. For example, a wheeled device may include a manually-operated device, such as a bicycle, skateboard, longboard, roller skates, scooter, or wheelchair; or may include electronically-powered devices, such as an electric skateboard, electric longboard, electric scooter, hoverboards and other self-balancing scooters, and the like. For example, as discussed above, a walking path of a pedestrian using a wheeled device may be smoother than the walking path of a pedestrian not using a wheeled device. In addition, the velocity of a pedestrian using a wheeled device may be higher than the velocity of a pedestrian not using a wheeled device. The system may use additional techniques alone or in combination (e.g., using captured image data from a camera) to enhance this determination.

In some embodiments, managing traffic in the intersection may include causing a change in a traffic control signal. For example, a signal may be sent to a traffic control signal to cause a change in the light signal from a red light to green light.

Figure 23:
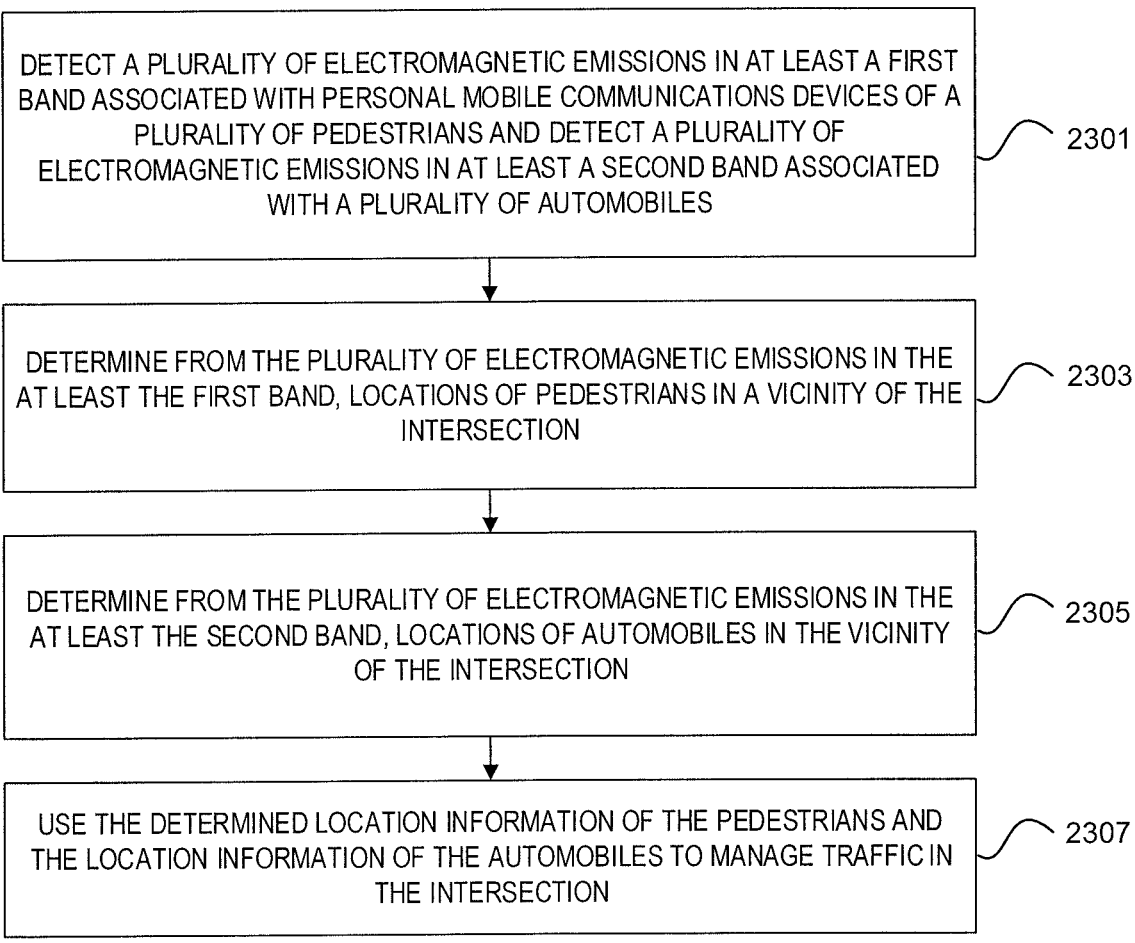
FIG. 23 is a flow chart illustrating an example of a method for tracking pedestrian mobile devices consistent with disclosed embodiments.

FIG. 23 is an example of traffic managing method 2300, consistent with the disclosed embodiments. Method 2300 may, for example, be executed by the at least one processor configured to receive signal information from the at least one receiver, and associated controller (e.g., controller 120) or any other appropriate hardware and/or software. Further, when executing method 2300, the at least one processor may execute instructions stored in any of the modules discussed above with respect to FIG. 4.

In step 2301, a receiver can be configured to detect a plurality of electromagnetic emissions in at least a first band associated with personal mobile communications devices of a plurality of pedestrians and detect a plurality of electromagnetic emissions in at least a second band associated with a plurality of automobiles, wherein the at least a second band is in a different electromagnetic spectrum area than the at least the first band. In some embodiments, the plurality of automobiles may include autonomous vehicles. In other embodiments, the system may send a control signal to at least one autonomous vehicle to cause the at least one autonomous vehicle to stop while a pedestrian is crossing the intersection. In yet further embodiments, the system may determine from the plurality of electromagnetic emissions in the at least the second band if the automobile is at least partially autonomously driven or manually-driven. In such embodiments, the system may then send a first type of message when the automobile is at least partially autonomously driven and send a second type of message when the automobile is manually-driven. The first type of message may include a control signal automatically altering an operation of the automobile without user intervention and the second type of message may include a warning to a driver of the automobile.

In step 2303, a processor may determine from the plurality of electromagnetic emissions in the at least the first band, locations of pedestrians in a vicinity of the intersection.

In step 2305, the processor may determine from the plurality of electromagnetic emissions in the at least the second band, locations of automobiles in the vicinity of the intersection.

In step 2307, the processor may use the determined location information of the pedestrians and the location information of the automobiles to manage traffic in the intersection. For example, in some embodiments, the system may send messages to at least some of the plurality of automobiles or at least some of the personal mobile communications devices of the plurality of pedestrians. In some embodiments, the system may determine whether a pedestrian and an automobile are on a collision course may intervene by sending at least one message, or simultaneous messages to the pedestrian's mobile device and to the automobile on the collision course. The system may further cause a change in a traffic control signal.

Collision Prediction and Warning System

In one embodiment, a collision prediction and warning system is provided. The proposed system suggests placing sensors in a vicinity of roadways to predict collisions and send evasive action messages to one or more of the road users at risk. For example, various sensors may be configured to accomplish this task, including electromagnetic sensors, image-capturing sensors (e.g., cameras), or light sensors, described in greater detail below.

As used in the present disclosure, the term "sensor" may refer to any device capable of detecting, measuring, and collecting information for use in determining the speed and trajectory of a moving road user in the vicinity of the roadway. One or more sensors may use various methods and technologies to detect, measure, and collect this data. The proposed system may use multiple sensors of the same technology area (e.g., only electromagnetic sensors), or may use various combination of sensors using other methods and technologies to augment the data being detected, measured, and collected (e.g., electromagnetic sensors may be used together with image-capturing sensors).

Figure 24:
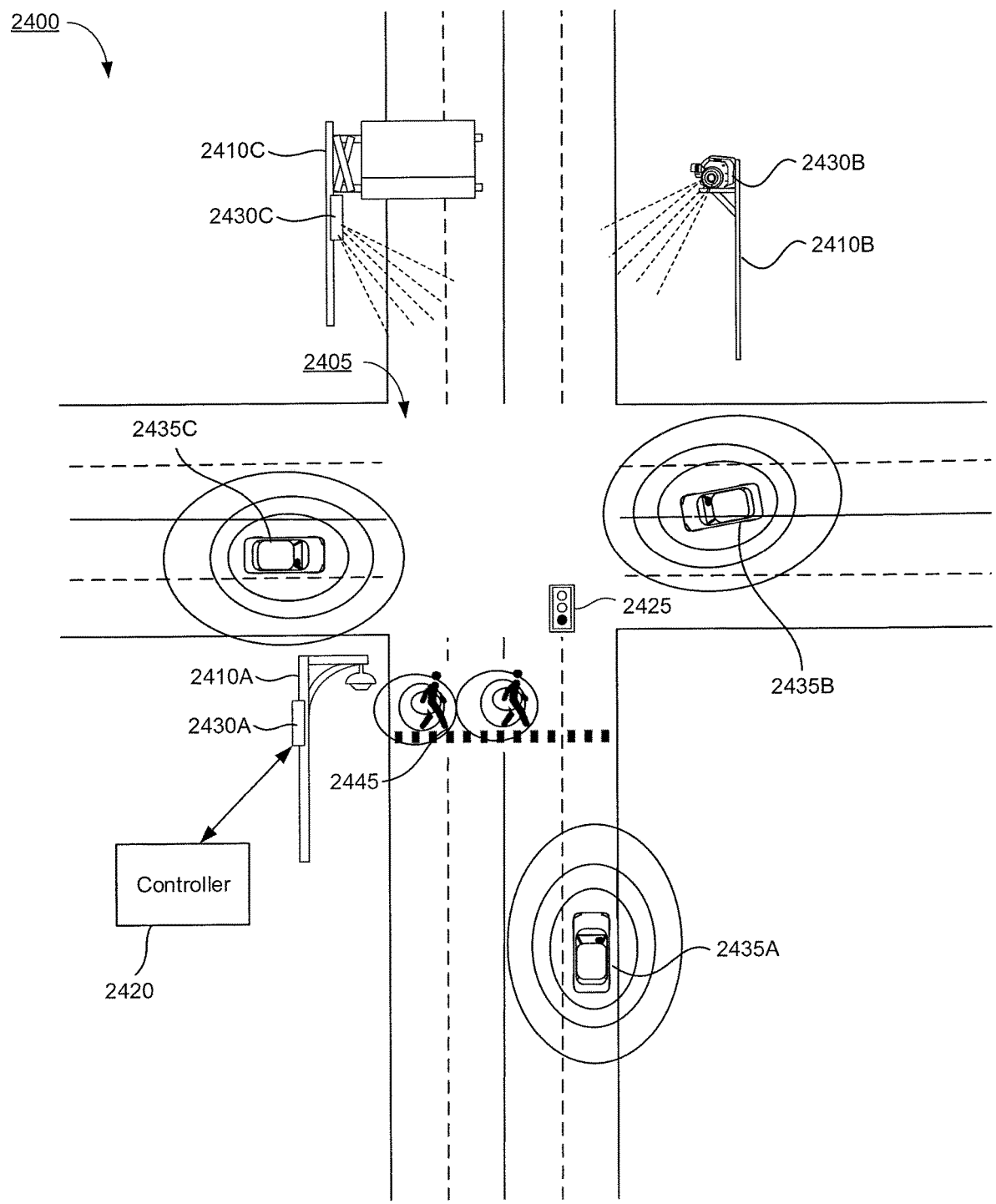
FIG. 24 is a diagrammatic illustration of an example of a local system for a collision prediction and warning system consistent with disclosed embodiments.

FIG. 24 provides a diagram illustrating an exemplary system 2400 for a collision prediction and warning system around an intersection 2405. The system may comprise sensors configured to be fixedly mounted in a vicinity of the roadway area. For example, sensors may be fixedly mounted to structures 2410A (e.g., a lamppost), 2410B (e.g., a specially designed pole for mounting a camera), or 2410C (e.g. a roadway sign). At least one processor, which may also be fixedly mounted in the vicinity of the roadway area, may receive signal information from the at least one sensor. For example, the at least one processor may be mounted to the same structures 2410A, 2410B, and 2410C that the sensor is fixedly mounted to. The at least one processor may determine a speed and a trajectory of a first moving road user (e.g., automobile 2435A) and a second moving road user (e.g., pedestrians 2445) in the roadway area based on the received signal information. The at least one processor may further determine based on the determined speeds and the trajectories that a collision is likely between the first moving road user and the second moving road user, and may wirelessly send to at least one of the first moving road user and the second moving road user a remedial action signal for causing a change associated with at least one of the first moving road user and the second moving road user to avoid the likely collision.

The sensor may use a variety of technologies and techniques to determine the speed or trajectory of a road user in the vicinity of the roadway. For example, in some embodiments, the at least one sensor may be configured to detect electromagnetic emissions emanating from electronic devices carried by the moving road users. As shown in FIG. 24, a sensor fixedly mounted to structure 2410A at location 2430A may be a sensor configured to detect electromagnetic emissions emanating from moving road users (e.g., automobile 2435A and pedestrians 2445). In some embodiments, the at least one sensor may be configured to detect electromagnetic emissions in at least a first band and second band. For example, a first band associated with a range-determining system aboard the first moving road user (e.g., between 76 GHz and 81 GHz) and a second band associated with personal mobile communications devices of a plurality of pedestrians (e.g., between 2.4 GHz and 2.4835 GHz).

In some embodiments, the at least one sensor may be configured to capture image data, for example, using a camera. In such a camera-based system, the system may determine the speed and trajectory of the moving road users by monitoring the locations of the moving road users over time, using the captured image data. As shown in FIG. 24, a sensor fixedly mounted to structure 2410B at location 2430B may be a camera configured to capture image data from intersection 2405. For example, using the captured image data, the system can determine the momentary properties characterizing the movement of the moving road users (such as, velocity, speed, and direction) by monitoring the captured image data over time.

In some embodiments, the at least one sensor may be configured to capture light reflections data, for example, using lasers, in a lidar-based (i.e., light detection and ranging) system. In such a lidar-based system, like the electromagnetic- and camera-based systems described above, the system may determine the speed and trajectory of the moving road users by monitoring the exact locations of the moving road users over time, using the light reflections data. As shown in FIG. 24, a sensor fixedly mounted to structure 2410C at location 2430C may be a sensor configured to capture light reflections data from intersection 2405. For example, using the light reflections data, the system can determine the momentary properties characterizing the movement of the moving road users (such as, velocity, speed, and direction) by monitoring the light reflections data over time.

As discussed above, a controller (e.g., controller 2420) may include at least one processor. The processor may be configured to perform various functions for a collision prediction and warning system, using information obtained through sensors, described in greater detail below.

As discussed above, system 2400 can determine the general properties of road users from tracking their movement while they are in range of sensors fixedly mounted to locations 2430A, 2430B, and 2430C. Such general properties of road users may include an indication whether each road user is a manual-gear vehicle or an automatic-gear vehicle, an indication whether each road user is a manually-driven vehicle or an autonomous automobile, an indication whether the driver of a vehicle is driving under influence or tired, an indication whether a pedestrian is moving with assistance of a wheeled device, and more. Specifically, system 2400 may determine the driving path or walking path using the determined momentary properties of a road user over a period of time. Thereafter, system 2400 may apply one or more pattern recognition algorithms and machine learning algorithms to the driving path or walking path to determine characteristics of the path. The determined characteristics are used to determine the general properties of road users. For example, a driving path of an autonomous vehicle may be smoother than a driving path of a manually-driven vehicle. As a further example, system 2400 may recognize a specific electromagnetic waveform associated with an automobile or vehicle that is at least partially autonomously driven. As yet another example, when system 2400 assigns a distinct electromagnetic fingerprint to a road user, one characteristic that system 2400 may associate with the distinct electromagnetic fingerprint is whether the road user is operating an autonomous vehicle.

Figure 25:
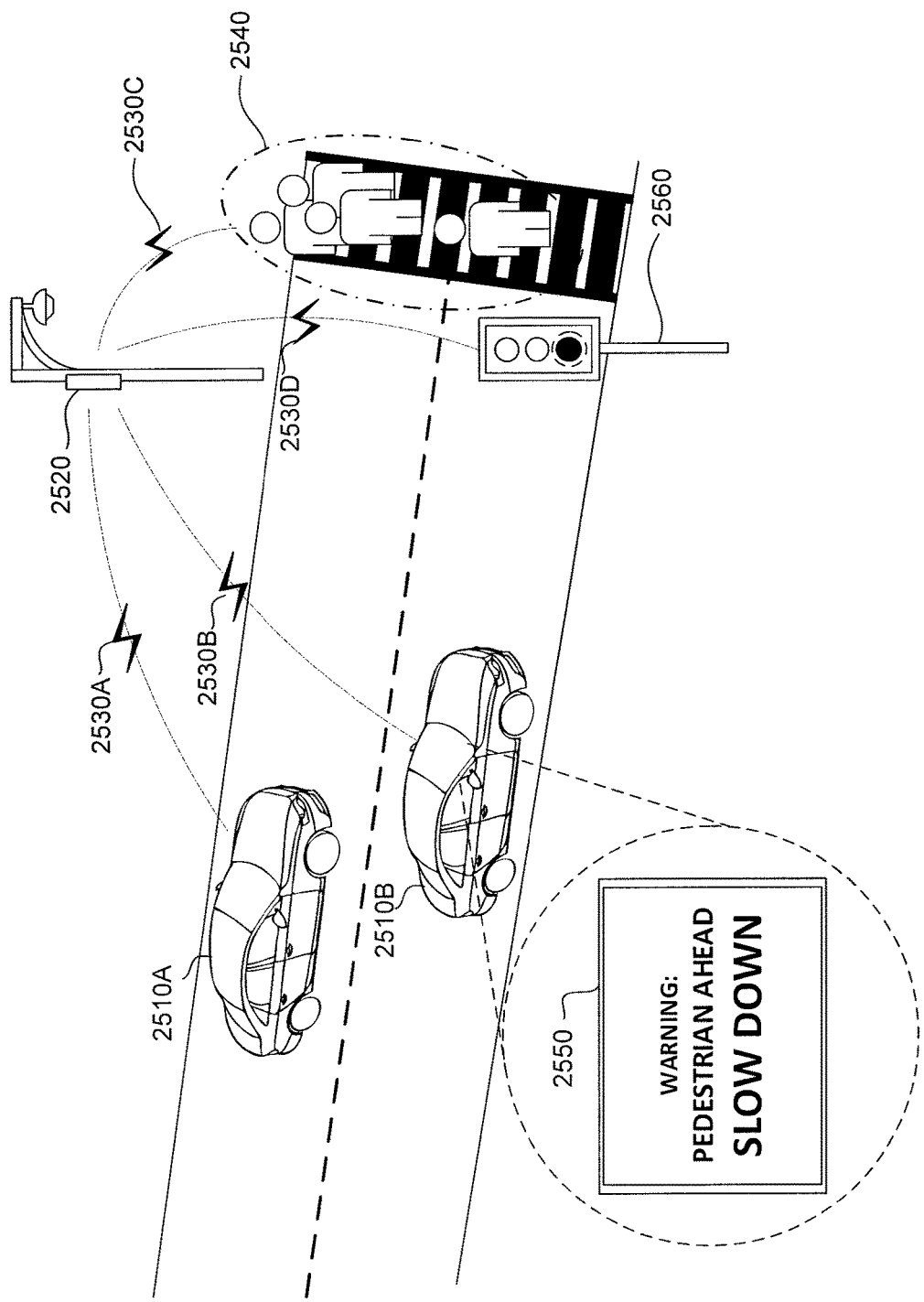
FIG. 25 is a diagrammatic illustration of various examples of collision prediction and warning consistent with disclosed embodiments.

In some embodiments, the at least one processor may be further configured to identify an electronic address of at least one of the first moving road user and the second moving road user and wirelessly send the remedial action signal to the identified electronic address. The electronic address may be any unique identifier associated with a network address, for example, a telephone number, IP address, or a digital license plate. As shown in FIG. 25, a sensor and processor fixedly mounted to location 2520 may send remedial action signals 2530A, 2530B, 2530C, and 2530D to automobile 2510A, automobile 2510B, pedestrians 2540, and crosswalk signal 2560 based on an identified electronic address.

In some embodiments, the remedial action signal may include a human-perceptible message for broadcast to a driver of the automobile (e.g., human-perceptible message 2550 displayed within automobile 2510B), or a warning to the pedestrian (e.g., crosswalk signal 2560). The message may be transmitted through audio (e.g. a warning sound, alarm, or spoken word indicating that a collision is imminent), video (e.g., displaying a warning on a screen already integrated into the vehicle or displaying a warning on the pedestrian's mobile device), tactile feedback (e.g., causing the seat and/or steering wheel to shake in the automobile, causing the pedestrian's mobile device to vibrate), or any combination of the above. The messages may also be transmitted through any nearby structures capable of doing so (e.g., nearby pedestrian crosswalk signals, nearby traffic light signals, video display screens, and the like). In some embodiments, the remedial action signal may include a control signal configured to change at least one of a trajectory or speed of the automobile.

The first moving road user and second moving road user may include any combination of automobiles and pedestrians. For example, in some embodiments, the first moving road user and the second moving road user may each be automobiles. In other embodiments, the first moving road user maybe an automobile and the second moving road user may be a pedestrian operating a mobile device. In such embodiments, the at least one processor may be configured to send remedial action signals to both the first moving road user and the second moving road user. Alternatively, the remedial action signal may be sent to a plurality of traffic lights.

Consistent with disclosed embodiments, the at least one processor may be further configured to determine from data obtained by the sensor if an automobile is at least partially autonomously driven or manually-driven. In such embodiments, the at least one processor may be further configured to identify that the first moving road user is an autonomous vehicle and the second moving road user is a manually driven vehicle. The at least one processor may be configured to send the remedial action signal to the first moving road user (i.e., the autonomous vehicle), and avoid sending the remedial action signal to the second moving road user (i.e., the manually driven vehicle).

The at least one processor may take certain actions in response to identifying or determining that certain events have occurred that are likely to cause a collision. As one example, in some embodiments, the at least one processor may be further configured to identify that the first moving road user is an automobile that strays from a predetermined traffic lane and, in response, sends the remedial action signal the first moving road user. As shown in FIG. 24, system 2400 may determine that a first moving road user (e.g., automobile 2435B) has strayed from a predetermined traffic lane, and is likely to cause a collision with other road users (e.g., automobile 2435C), and may send a remedial action signal to automobile 2435B. Alternatively, system 2400 may send a remedial action signal even if automobile 2435B is the only car in the area (i.e., even if automobile 2435C is not present), to assist automobile 2435B in staying in its lane. As another example, in other embodiments, the at least one processor may be further configured to identify that the first moving road user is an autonomous vehicle, identify that the autonomous vehicle is experiencing a security breach, and, in response, may send the remedial action signal to the first moving road user to cause an override of at least one aspect of a vehicle operating system associated with the first moving road user.

Figure 26:
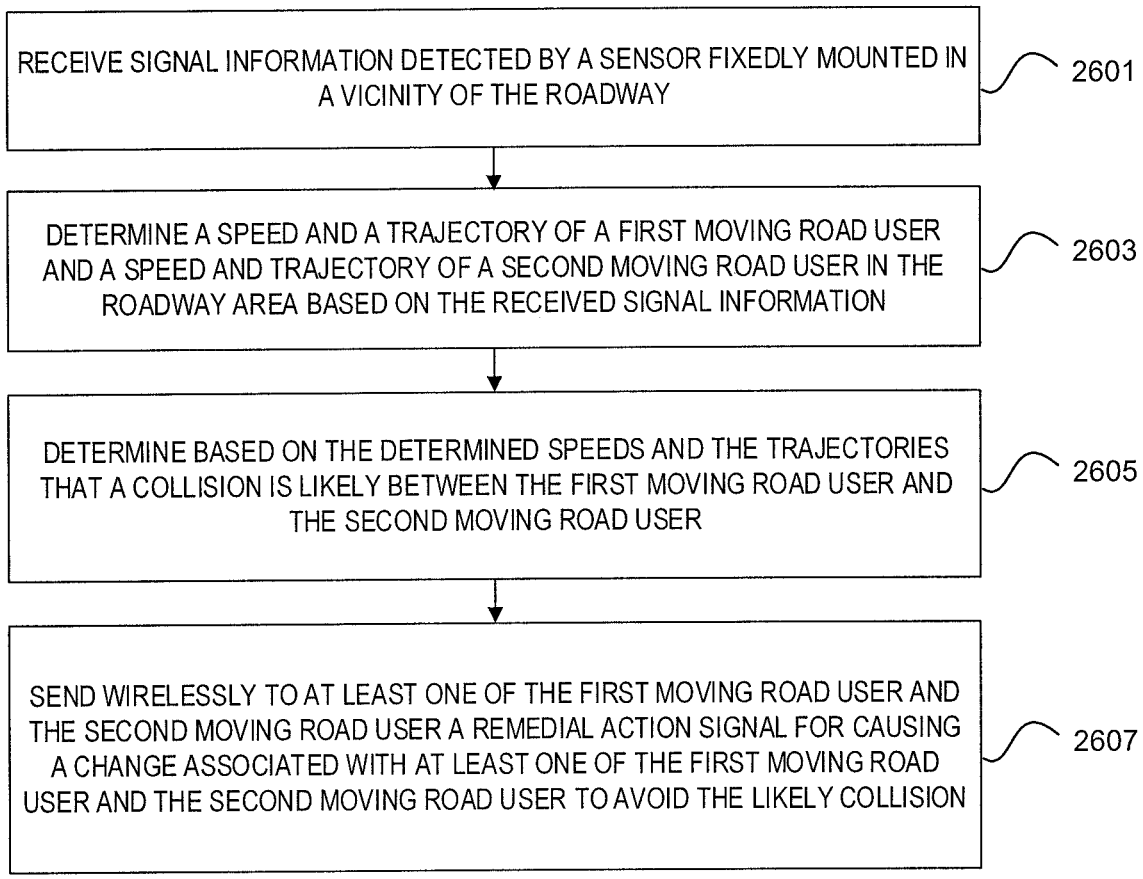
FIG. 26 is a flow chart illustrating an example of a method for predicting a possible collision consistent with disclosed embodiments.

FIG. 26 is an example of traffic managing method 2600, consistent with the disclosed embodiments. Method 2600 may, for example, be executed by the at least one processor configured to receive signal information from the at least one sensor, and associated controller (e.g., controller 120) or any other appropriate hardware and/or software. Further, when executing method 2600, the at least one processor may execute instructions stored in any of the modules discussed above with respect to FIG. 4.

In step 2601, the at least one processor receives signal information detected by a sensor fixedly mounted in a vicinity of the roadway in order to perform the remaining steps of the method. The signal information detected by a sensor may include detecting electromagnetic emissions emanating from electronic devices carried by the moving road users. For example, the electromagnetic emissions may be in at least a first band associated with a range-determining system aboard the first moving road user and in at least a second band associated with personal mobile communications devices of a plurality of pedestrians. In some embodiments, the method may include capturing image data or light reflections data.

In step 2603, the processor may determine a speed and a trajectory of a first moving road user and a speed and a trajectory of a second moving road user in the roadway area based on the received signal information.

In step 2605, the processor may determine based on the determined speeds and the trajectories that a collision is likely between the first moving road user and the second moving road user.

In step 2607, the processor may send wirelessly to at least one of the first moving road user and the second moving road user a remedial action signal for causing a change associated with at least one of the first moving road user and the second moving road user to avoid the likely collision. In some embodiments, the method may further comprise identifying an electronic address of at least one of the first moving road user and the second moving road user and wirelessly sending the remedial action signal to the identified electronic address. In other embodiments, the first moving road user may be an automobile and the remedial action signal may include, for example, a human-perceptible message for broadcast to a driver of the automobile, or a control signal configured to change at least one of a trajectory or speed of the automobile. In other embodiments, the first moving road user may be a pedestrian operating a mobile device, and the remedial action signal may include a warning to the pedestrian. Additionally, or alternatively, the remedial action signal may be sent to a plurality of traffic lights. The method may further comprise identifying that the first moving road user is an automobile that has strayed from a predetermined traffic lane and, in response, sends the remedial action signal the first moving road user. In yet other embodiments, the method may further comprise identifying that the first moving road user is an autonomous vehicle and identifying that it is experiencing a security breach, and, in response, sending the remedial action signal to the first moving road user to cause an override of at least one aspect of a vehicle operating system associated with the first moving road user.

Prioritizing Traffic in Intersections

In one embodiment, a local system for prioritizing traffic in intersections is provided. For example, according to any of the techniques described in other sections of the disclosure, the system may gather information about vehicles or road users (e.g., pedestrians or cyclists) near an intersection, including the location, speed, and type of vehicle or road user. After determining the characteristics of the vehicles near an intersection, the system could then associate various traffic-priority-levels with certain types of vehicles or road users. For example, an ambulance or a police vehicle may have a higher traffic-priority-level as compared to a private vehicle.

Using the information obtained about vehicles near an intersection and associating traffic-priority-levels with the identified vehicles or road users, the system may then determine and initiate traffic management actions to facilitate faster and safer travel for those vehicles or road users with the highest priority levels. For example, the system may ensure that traffic lights for vehicles or road users with higher priority levels change to green and remain green while those vehicles or road users are traveling through an intersection.

Figure 27:
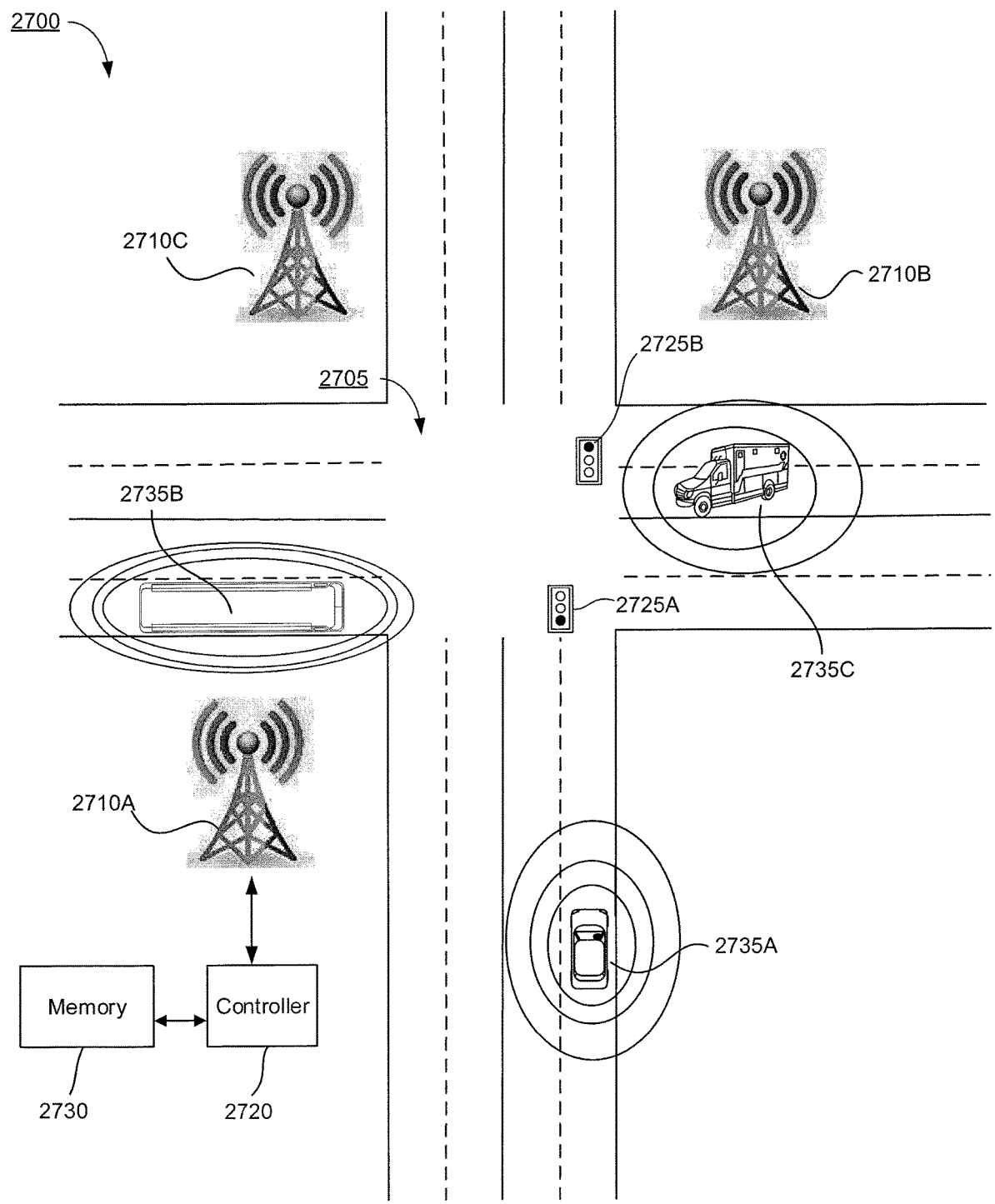
FIG. 27 is a diagrammatic illustration of an example of a local system for prioritizing traffic in intersections consistent with disclosed embodiments.

FIG. 27 is a diagrammatic illustration of an exemplary system 2700 for managing and prioritizing traffic in an intersection 2705. The system may comprise receivers (e.g., receivers 2710A, 2710B, and 2710C) configured to detect a plurality of electromagnetic emissions originating from vehicles in a vicinity of the intersection. At least one processor, which may include or may be contained within controller 2720, may be configured to receive signal information from the receivers, wherein the signal information is representative of at least some of the plurality of electromagnetic emissions. The at least one processor may determine substantially in real-time locations of a plurality of vehicles (e.g., vehicles 2735A and 2735B) approaching the intersection based on the received signal information, and may identify a vehicle type for each of the vehicles. Such an identification may be made by any of the techniques described in other sections of the disclosure. For example, in some embodiments, the vehicle type may be identified based on a unique identifier transmitted together with or as part of the electromagnetic emissions. The unique identifier may include a vehicle type code or any other type of identifier from which a vehicle type may be determined. In some cases, the vehicle type code may be transmitted via a dedicated transmitter for conveying information regarding the host vehicle on which the transmitter is deployed (e.g., vehicle type, vehicle size, plate number, serial number, etc.). In other cases, the vehicle type information may be inferred based on characteristics of the received electromagnetic emissions. For example, based on received electromagnetic emissions, a frequency of a vehicle beacon (e.g., radar, lidar, sonar, etc.) or a type of beacon may be determined, and from this information a vehicle type may be determined (e.g., based on a lookup table, access to a database, etc.).

Based on the identified vehicle type, the at least one processor may further retrieve from a memory 2730 a traffic-priority-level for each of the vehicles approaching the intersection. For example, the vehicles may include at least one first vehicle (e.g., vehicle 2735A) associated with a first traffic-priority-level and at least one second vehicle (e.g., vehicle 2735B) associated with a second traffic-priority-level. The second traffic-priority-level may be greater than the first traffic-priority-level. The at least one processor may further determine a traffic management action based on the determined locations and the traffic-priority-levels of the plurality of vehicles approaching the intersection, and may initiate the traffic management action to enable the at least one second vehicle to cross the intersection earlier than if the at least one second vehicle would have been associated with the first traffic-priority-level. Examples of system 2700's operation are described in greater detail in the sections below.

In some embodiments, the at least one receiver may include a plurality of spatially separated receivers in the vicinity of the intersection. For example, as shown in FIG. 27, receivers 2710A, 2710B, and 2710C may be placed in the vicinity of the intersection 2705, but are spatially separated. In some embodiments, the at least one processor may be further configured to determine the locations of the plurality of vehicles approaching the intersection based on signals received from the plurality of spatially separated receivers.

As noted above, the at least one receiver or plurality of spatially separated receivers (e.g., receivers 2710A, 2710B, and 2710C) may detect a plurality of electromagnetic emissions originating from vehicles in a vicinity of the intersection at any suitable range. For example, the receivers may be configured to detect vehicles at range of up to 50 meters, 100 meters, 300 meters, 500 meters, or up to about 1000 meters or more.

As discussed above, a controller (e.g., controller 2720) may include at least one processor. The processor may be configured to perform various functions for prioritizing traffic in intersections (e.g., managing traffic flow in intersections) using information obtained through electromagnetic emissions. Below, various exemplary actions for prioritizing traffic in intersections, and controlling intersections are described in greater detail.

Consistent with disclosed embodiments, the at least one processor may be configured to identify the traffic-priority-level of the plurality of vehicles approaching the intersection based on the received signal information. For example, in some embodiments, the at least one processor may be configured to identify the traffic-priority-level of the plurality of vehicles approaching the intersection based on image analysis of image data received from one or more image sensors.

In some embodiments, the processor may be configured to determine, from the plurality of electromagnetic emissions, velocities of the at least one first vehicle and the at least one second vehicle. System 2700 may then determine the traffic management action based on the locations and the velocities of the first and second vehicles. For example, system 2700 may determine the amount of time it will take vehicle 2735A to pass through intersection 2705, and may adjust the timing of traffic lights 2725A and 2725B accordingly, to facilitate efficient flow of traffic. For example, system 2700 may cause traffic light 2725A to change to red just after vehicle 2735A has passed through the intersection, where after traffic light 2725B can change to green, to allow traffic flow across the other traffic lanes of intersection 2705.

In some embodiments, the processor may be further configured to communicate with a separate traffic management system associated with an adjacent intersection and to receive an indication that the at least one second vehicle is traveling toward the intersection. For example, as shown in FIG. 3, information from different local systems 100A, 100B, and 100C may be simultaneously transmitted to a main server 320 over network 310. Similarly, system 2700 may receive information from different local systems about vehicles approaching intersection 2705. In such embodiments, the processor may be further configured to initiate a traffic management action before detecting a plurality of electromagnetic emissions associated with the at least one second vehicle traveling toward the intersection. For example, with reference to FIG. 27, system 2700 may receive information about a second vehicle (not pictured) before it is within range of being detected by receivers 2710A, 2710B, and 2710C.

As discussed above, system 2700 may determine a traffic-priority-level for each of the vehicles approaching the intersection (e.g., by accessing a memory, based on a received vehicle type identification signal, or indirectly based on received EM emissions, etc.) and may assign those traffic-priority-levels to each of the vehicles. For example, a first vehicle (e.g., vehicle 2735A) may be associated with a first traffic-priority-level, and a second vehicle (e.g., vehicle 2735B) may be associated with a second traffic-priority-level, and the second traffic-priority-level may be greater than the first traffic-priority-level. In some embodiments, the plurality of vehicles approaching the intersection may further include a third vehicle (e.g., vehicle 2735C) associated with a third traffic-priority-level greater than the second traffic-priority-level. In such embodiments, the processor may be configured to initiate another traffic management action to enable the third vehicle to cross the intersection earlier than the second vehicle. For example, in some embodiments, an emergency vehicle or ambulance (e.g., vehicle 2735C) may have a traffic-priority-level greater than a traffic-priority-level of a public transportation vehicle (e.g., a bus, vehicle 2735B). In such embodiments, the traffic-priority-level of the public transportation vehicle may be greater than a traffic-priority-level of a private vehicle (e.g., vehicle 2735A). Such an example presents three traffic-priority-levels, wherein the emergency vehicle (e.g., vehicle 2735C) has the highest priority level, and the private vehicle (e.g. vehicle 2735A) has the lowest priority level.

In other embodiments, a specific vehicle type may be associated with more than one traffic-priority-level based on time periods. For example, in a first time period, a specific vehicle type may be associated with the first traffic-priority-level, and in a second time period, the specific vehicle type may be associated with the second traffic-priority-level. For example, a municipal authority may decide that between 5:00 a.m. and 8:00 a.m. (the "first time period"), all garbage trucks or school bus vehicles may have a higher traffic-priority-level (the "first traffic-priority-level"), and during all other times (the "second time period"), all garbage truck or school bus vehicles may have a lower traffic-priority-level (the "second traffic-priority-level"). In some embodiments, other road users may be prioritized during specific time periods. For example, road users using bicycles may be prioritized between 6:00 a.m. and 9:00 a.m. by allowing them exclusive access to the right lane (i.e., no other road users other than cyclists may be allowed in the right lane during the specified time period). In other examples, other lanes may be reserved for other groups of vehicles and road users during specific time periods.

As a similar example, in some embodiments, a specific vehicle type may be associated with more than one traffic-priority-level depending on a physical area. For example, in a first area, a specific vehicle type may be associated with the first traffic-priority-level, and in a second area, the specific vehicle type may be associated with the second traffic-priority-level. For example, a municipal authority may decide that in neighborhoods (a "first area"), garbage trucks have a higher traffic-priority-level (the "first traffic-priority-level"), and in all other areas (the "second area"), all garbage truck vehicles may have a lower traffic-priority-level (the "second traffic-priority-level").

As discussed above, prioritizing traffic in intersection 2705 may involve initiating traffic management actions in response to the gathered signal information and the determined location, vehicle type, and associated traffic-priority-level. In some embodiments, initiating the traffic management action may include altering a state of at least one traffic signal. For example, traffic light 2725A may turn from a green light to a red light, and traffic light 2725B may turn from a red light to a green light, in order to prioritize traffic across a specific direction of the intersection 2705.

Figure 28:
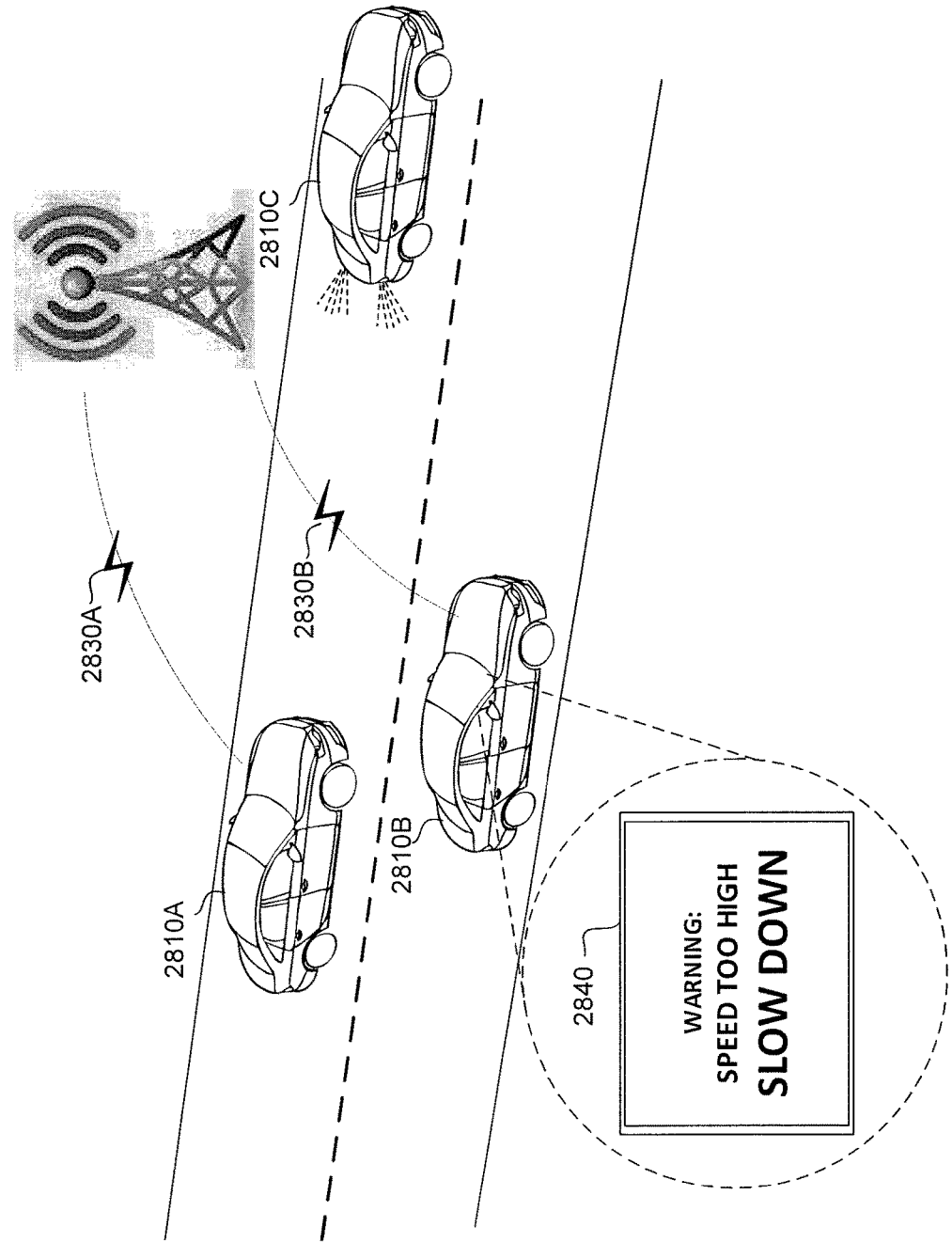
FIG. 28 is a diagrammatic illustration of various examples of managing traffic in an intersection according to disclosed embodiments.

In other embodiments, initiating the traffic management action may include sending a vehicle control signal to at least one vehicle, and the vehicle control signal may be configured to cause a human-perceptible message to be delivered to a driver of the at least one first vehicle. For example, as shown in FIG. 28, vehicle 2810B may receive a vehicle control signal 2830B that causes a human-perceptible message 2840 to be displayed on a screen already installed in vehicle 2810B.

In yet other embodiments, initiating the traffic management action may include sending a vehicle control signal to at least one vehicle, and the vehicle control signal may be configured to automatically alter an operation associated with the vehicle without user intervention. For example, as shown in FIG. 28, vehicle 2810A may be an autonomous vehicle, and vehicle control signal 2830A may automatically alter an operation associated with the vehicle without user intervention. For example, vehicle control signal 2830A may automatically cause vehicle 2810A to slow down or speed up without user intervention (e.g., by causing one or more actuators associated with a vehicle braking system or throttle system to engage). In other embodiments, the vehicle control signal may be configured to cause the first vehicle to yield to another second vehicle. For example, vehicle control signal 2830A may automatically cause vehicle 2810A to change lanes and avoid a stopped vehicle 2810C in front of it.

Figure 29:
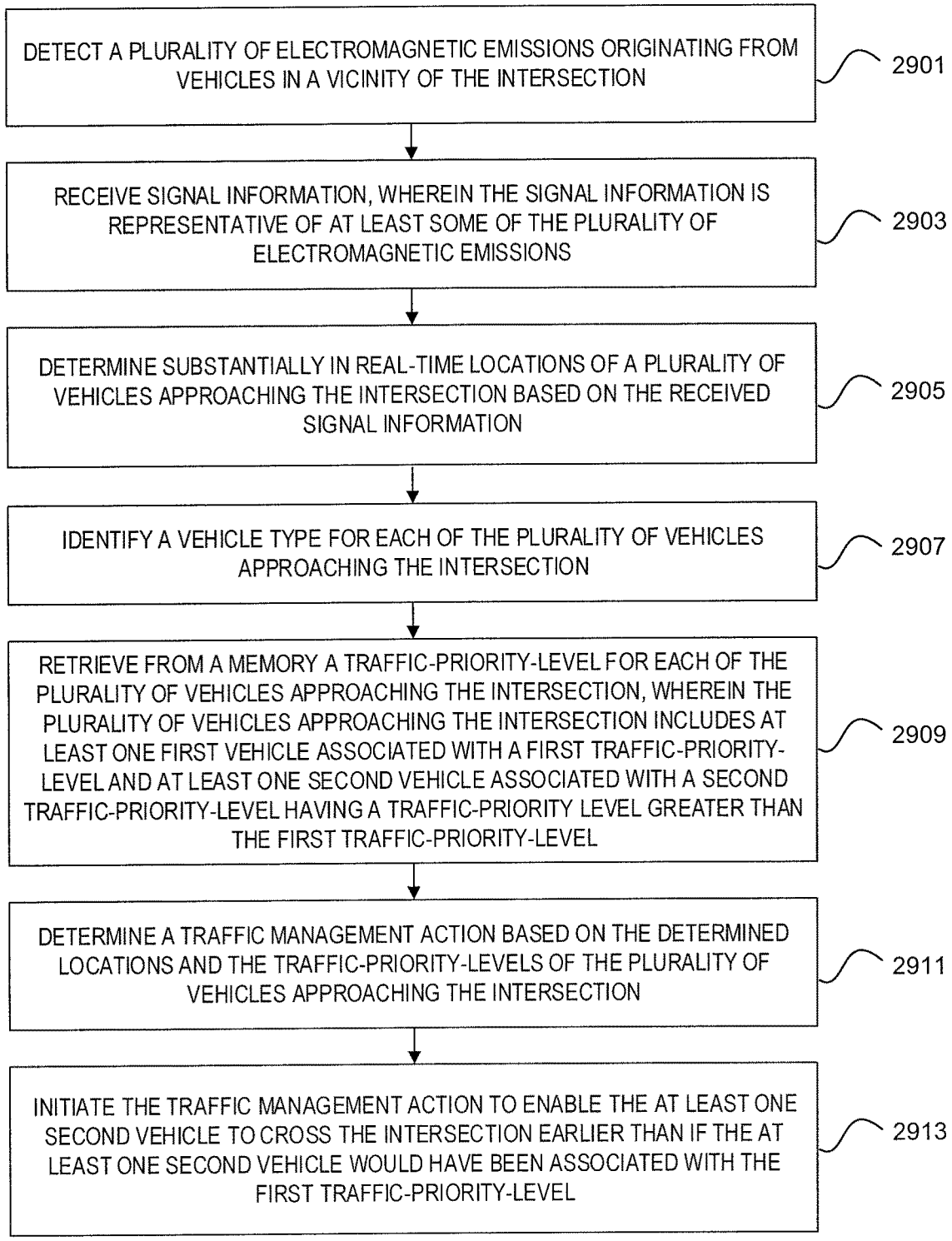
FIG. 29 is a flow chart illustrating an example of a method for prioritizing traffic in intersections consistent with disclosed embodiments.

FIG. 29 is an example of remote controlling method 2900, consistent with the disclosed embodiments. Method 2900 may, for example, be executed by the at least one processor configured to receive signal information from the at least one sensor, and associated controller (e.g., controller 120) or any other appropriate hardware and/or software. Further, when executing method 2900, the at least one processor may execute instructions stored in any of the modules discussed above with respect to FIG. 4.

In step 2901, a receiver can be configured to detect a plurality of electromagnetic emissions originating from vehicles in a vicinity of the intersection.

In step 2903, a processor may receive signal information from the receiver, wherein the signal information is representative of at least some of the plurality of electromagnetic emissions.

In step 2905, the processor may determine substantially in real-time locations of a plurality of vehicles approaching the intersection based on the received signal information. In some embodiments, the processor may further determine, from the plurality of electromagnetic emissions, velocities of the at least one first vehicle and the at least one second vehicle and may determine the traffic management action based on the locations and the velocities of the at least one first vehicle and the at least one second vehicle.

In step 2907, the processor may identify a vehicle type for each of the plurality of vehicles approaching the intersection. In some embodiments, the processor may identify the traffic-priority-level of the plurality of vehicles approaching the intersection based on the received signal information. In other embodiments, the processor may identify the traffic-priority-level of the plurality of vehicles approaching the intersection based on image analysis of image data received from one or more image sensors.

In step 2909, the processor may retrieve from a memory a traffic-priority-level for each of the plurality of vehicles approaching the intersection, wherein the plurality of vehicles approaching the intersection includes at least one first vehicle associated with a first traffic-priority-level and at least one second vehicle associated with a second traffic-priority-level having a traffic-priority level greater than the first traffic-priority-level. For example, in some embodiments, an emergency vehicle may have a traffic-priority-level greater than a traffic-priority-level of a public transportation vehicle, and the traffic-priority-level of a public transportation vehicle may be greater than a traffic-priority-level of a private vehicle. In yet other embodiments, a specific vehicle type may be associated with more than one traffic-priority-level. For example, in some embodiments, in a first time period the specific vehicle type is associated with the first traffic-priority-level, and in a second time period the specific vehicle type is associated with the second traffic-priority-level. As another example, in some embodiments, in a first area the specific vehicle type is associated with the first traffic-priority-level, and in a second area the specific vehicle type is associated with the second traffic-priority-level In step 2911, the processor may determine a traffic management action based on the determined locations and the traffic-priority-levels of the plurality of vehicles approaching the intersection. In some embodiments, the processor may communicate with a traffic management system associated with an adjacent intersection and to receive an indication that the at least one second vehicle is traveling toward the intersection. In other embodiments, the processor may further initiate a traffic management action before detecting a plurality of electromagnetic emissions associated with the at least one second vehicle traveling toward the intersection.

In step 2913, the processor may initiate the traffic management action to enable the at least one second vehicle to cross the intersection earlier than if the at least one second vehicle would have been associated with the first traffic-priority-level. In some embodiments, initiating the traffic management action may further include altering a state of at least one traffic signal. In other embodiments, initiating the traffic management action may further include sending a vehicle control signal to the at least one first vehicle, the control signal being configured to cause a human-perceptible message to be delivered to a driver of the at least one first vehicle. In yet other embodiments, initiating the traffic management action may further include sending a vehicle control signal to the at least one first vehicle, the vehicle control signal being configured to automatically alter an operation associated with the at least one first vehicle without user intervention. The vehicle control signal may be configured to cause the at least one first vehicle to yield to the at least one second vehicle.

Differentiating Between Autonomous and Non-Autonomous Vehicles

In one embodiment, a feature provided by the suggested system is an ability to differentiate between autonomous and non-autonomous vehicles. The system may apply different rules when all the vehicles driving in an area of interest (e.g., an intersection, or a dedicated lane) are fully autonomous (e.g., under SAE International Standard J3016, vehicles operating at automation driving level 4 or 5), and when at least one vehicle driving in the area of interest is manually-driven.

Figure 30:
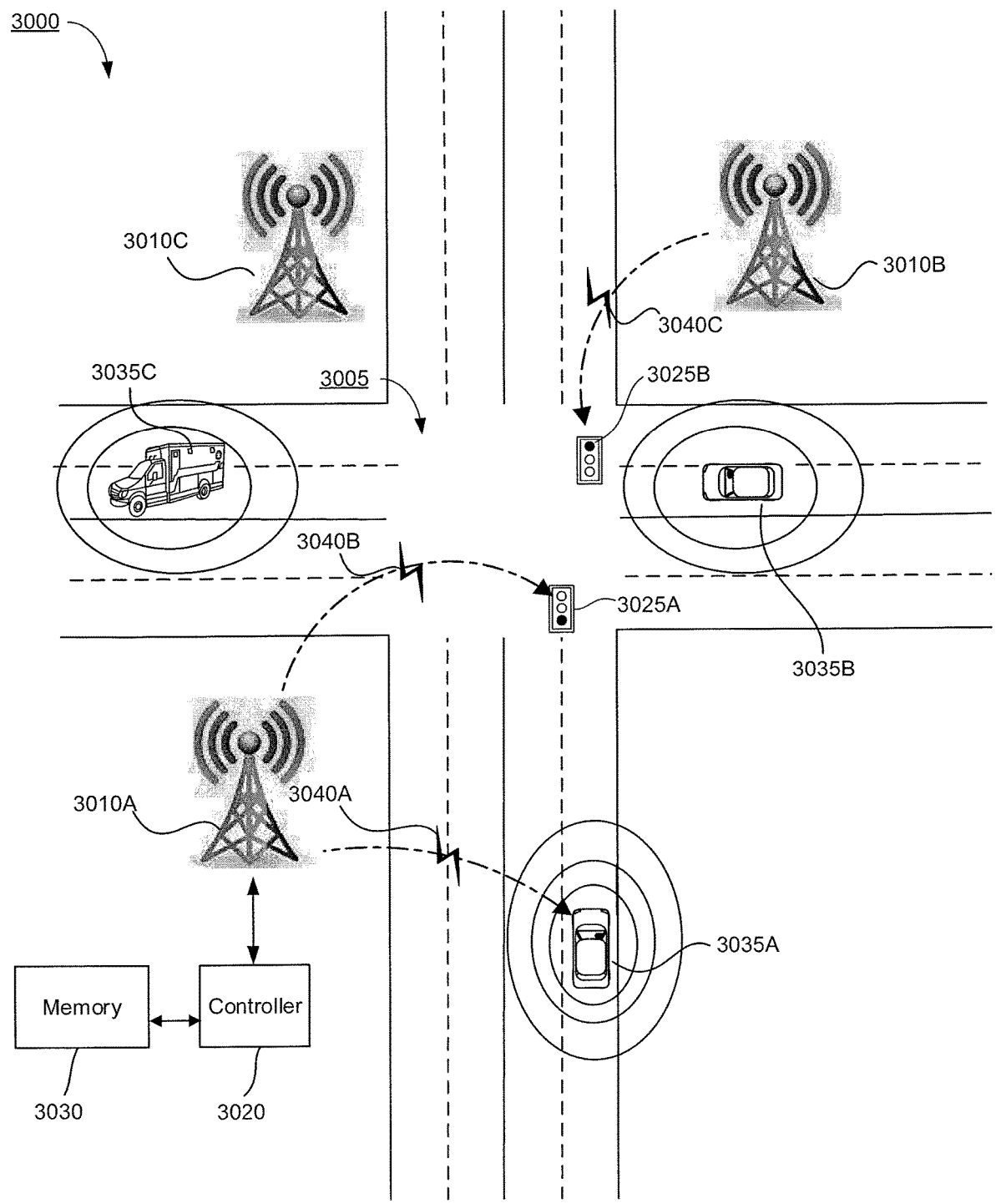
FIG. 30 is a diagrammatic illustration of an example of a traffic management system differentiating between autonomous and non-autonomous vehicles consistent with disclosed embodiments.

FIG. 30 is a diagrammatic illustration of an exemplary system 3000 for differentiating between autonomous and non-autonomous vehicles and for managing traffic in a road area. The system may comprise receivers (e.g., receivers 3010A, 3010B, and 3010C) configured to detect a plurality of electromagnetic emissions originating from a plurality of road-vehicles driving in the road area. In some embodiments, the road area may include at least one of an intersection and a dedicated traffic lane. At least one processor, which may include or which may be contained within controller 3020, may be configured to receive signal information from the receivers, wherein the signal information is representative of at least some of the plurality of electromagnetic emissions. The at least one processor may determine, from the signal information, a velocity and a heading for at least some of the plurality of road-vehicles.

The at least one processor may further determine, from the signal information, which of the plurality of road-vehicles is an autonomous or a manually driven vehicle. Such a determination may be made based on any of the various techniques described in other sections of the disclosure. For example, such a determination may be made by tracking travel paths of the vehicles over time and prediction, based on the tracked paths of travel, which of the vehicles are autonomously controlled and which are not autonomously controlled. In some cases, an identification signal may be transmitted from each vehicle, wherein the transmitted signal may identify the vehicle as autonomously controlled or non-autonomously controlled. Such a determination may also be inferred based on one or more characteristics of a received EM emission. For example, a particular radar, lidar, sonar, or other beacon may be known to be associated with a certain model of autonomous vehicle. In such cases, receipt of EM emissions recognized as originating from a particular beacon may enable an inference of whether an associated vehicle is autonomously controlled or not (e.g., based on memory lookup, etc.).

The at least one processor may selectively send control signals (e.g., control signals 3040A and 3040B), including vehicle control signals, to at least one of the determined autonomous vehicles (e.g., vehicle 3035A) or traffic flow control signals to at least one traffic light (e.g., traffic light 3025A) in the in the road area. The control signals may be determined based on a first set of traffic-management rules after the at least one processor determines that all of the plurality of vehicles are autonomous, and may be determined based on a second set of traffic-management rules when the at least one processor determines that at least one of the plurality of vehicles is manually driven. Examples of system 3000's operation are described in greater detail in the sections below.

As discussed above, a controller (e.g., controller 3020) may include at least one processor. The processor may be configured to perform various functions for differentiating between autonomous and non-autonomous vehicles and managing traffic flow using information obtained through electromagnetic emissions. Below, various exemplary actions for differentiating between autonomous and non-autonomous vehicles and managing traffic flow are described in greater detail.

Consistent with disclosed embodiments, the at least one processor may be configured to send the traffic flow control signals to a plurality of traffic lights. For example, various traffic flow control signals may be sent to change traffic lights 3025A and 3025B. As shown in FIG. 30, the first control signal (e.g., control signal 3040B) sent to the first traffic 3025A light may be configured to cause a change in the light signal from a green light to red light, and the second control signal (e.g. control signal 3040C) sent to the second traffic light 3025B may be configured to cause a change in the light signal from a red light to green light.

In some embodiments, the at least one processor may be further configured to determine whether each of the plurality of road-vehicles is an autonomous vehicle or a manually driven vehicle based on information included in the plurality of electromagnetic emissions. For example, system 3000 may determine that vehicle 3035A is an autonomous vehicle based on the electromagnetic emissions detected by receivers 3010A, 3010B, and 3010C. The electromagnetic emissions originating from vehicle 3035A may convey information as to whether vehicle 3035A is an autonomous vehicle implicitly or explicitly. For example, there may be a control message embedded in the electromagnetic signals emitted by the vehicle that explicitly identify that the vehicle is in an autonomous driving mode, as specified by any applicable industry standard or protocol for identifying an autonomous vehicle. As another example, if the information is not explicitly present, the information may be extracted and derived implicitly through analyzing the electromagnetic signals emitted by the vehicle, which may vary with the driving mode the vehicle is in. For example, system 3000 may compare electromagnetic signals emitted from vehicle 3035A with those stored in a database (e.g., memory 3030), and may determine that the characteristics of the electromagnetic signals match those of a vehicle driving in an autonomous mode. As yet another example, system 3000 may look at the general characteristics of the vehicle's general behavior and driving path to determine whether vehicle 3035A is an autonomous vehicle. For example, a driving path of an autonomous vehicle may be smoother than a driving path of a manually-driven vehicle.

In some embodiments, the at least one processor may be further configured to communicate with the at least some of the plurality of road-vehicles over a Dedicated Short-Range Communications (DSRC), or other type of communication channel to determine which of the plurality of road-vehicles driving in the road area is an autonomous vehicle. In yet other embodiments, the at least one processor may be further configured to communicate or remotely control the plurality of road-vehicles when each of the plurality of road-vehicles is determined to be an autonomous vehicle. For example, when all vehicles surrounding intersection 3005 are determined to be autonomous vehicles, system 3000 may communicate and remotely control any or all vehicles surrounding intersection 3005 to facilitate efficient flow of traffic through intersection 3005.

As discussed above, differentiating between autonomous and non-autonomous vehicles and managing traffic flow using may involve sending vehicle control signals to at least one of the determined autonomous vehicles, or may involve sending traffic flow control signals to at least one traffic light in the in the road area based on electromagnetic emissions originating from a plurality of road-vehicles driving in the road area.

In some embodiments, the vehicle control signals may be configured to automatically alter at least one operation associated with the at least one autonomous vehicle without user intervention.

Figure 31:
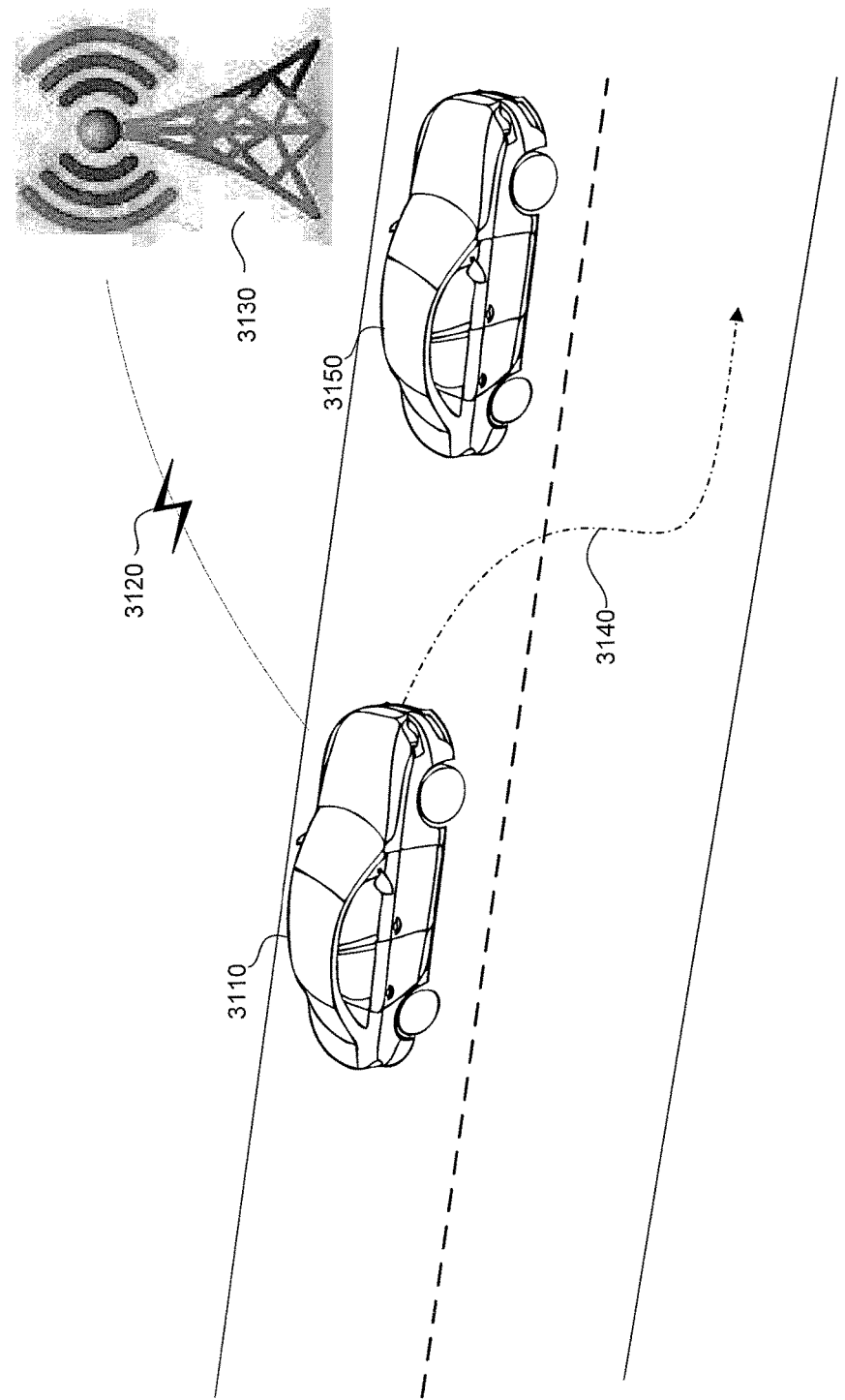
FIG. 31 is a diagrammatic illustration of various examples of managing traffic in an intersection consistent with disclosed embodiments.

In some embodiments, the vehicle control signals may be configured to cause the at least one vehicle to change its course with respect to another vehicle. In other embodiments, the vehicle control signals may be configured to cause the at least one autonomous vehicle to change lanes. For example, as shown in FIG. 31, vehicle 3110 may receive a vehicle control signal 3120 from receiver 3130 and associated processor to change its course with respect to vehicle 3150. For example, vehicle control signal 3120 may cause vehicle 3110 to move along path 3140, changing lanes and changing course with respect to vehicle 3150.

In yet other embodiments, the vehicle control signals may be configured to cause the at least one autonomous vehicle to slow down or to speed up. For example, as shown in FIG. 31, vehicle 3110 may receive a vehicle control signal 3120 from receiver 3130 and associated processor to slow down in order to avoid getting too close to vehicle 3150.

As discussed above, the vehicle control signals may be based on a first set of traffic-management rules when the processor determines that all of the plurality of vehicles are autonomous, or may be determined based on a second set of traffic-management rules when the processor determines that at least one of the plurality of vehicles is manually driven. In some embodiments, each of the first and second sets of traffic-management rules may include at least one of: a maximum speed of the road-vehicles driving in the road area, a minimum distance between the road-vehicles driving in the road area, and waiting times for traffic lights. For example, in some embodiments, the maximum speed of the road-vehicles driving in the road area under the first set of traffic-management rules may be greater than the maximum speed of the road-vehicles driving in the road area under the second set of traffic-management rules. For example, as shown in FIG. 30, emergency vehicle 3035C may operate under a second set of traffic-management rules, and may have a greater maximum speed than private vehicle 3035B operating under a first set of traffic-management rules.

In other embodiments, the minimum distance between the road-vehicles driving in the road area under the first set of traffic-management rules may be lesser than the minimum distance between the road-vehicles driving in the road area under the second set of traffic-management rules. For example, as shown in FIG. 30, emergency vehicle 3035C may operate under a second set of traffic-management rules, and may have a greater minimum distance than private vehicle 3035B operating under a first set of traffic-management rules. In such embodiments, providing extra distance around emergency vehicle 3035C may be necessary to ensure safe travel of emergency vehicle 3035C through the road area.

In yet other embodiments, the waiting times for traffic lights under the first set of traffic-management rules may be longer than the waiting times for traffic lights under the second set of traffic-management rules. For example, traffic lights under the first set of traffic-management rules may have longer waiting times because the traffic lights are located in a road area that has more traffic on average, and the longer waiting times associated with the first set of traffic-management rules may enhance safety in the road area. As a further example, traffic lights under the second set of traffic-management rules may have shorter waiting times in a road area that is located in a remote or rural area, and the shorter waiting times associated with the second set of traffic-management rules may enhance the flow of traffic in the road area, without sacrificing safety.

Figure 32:
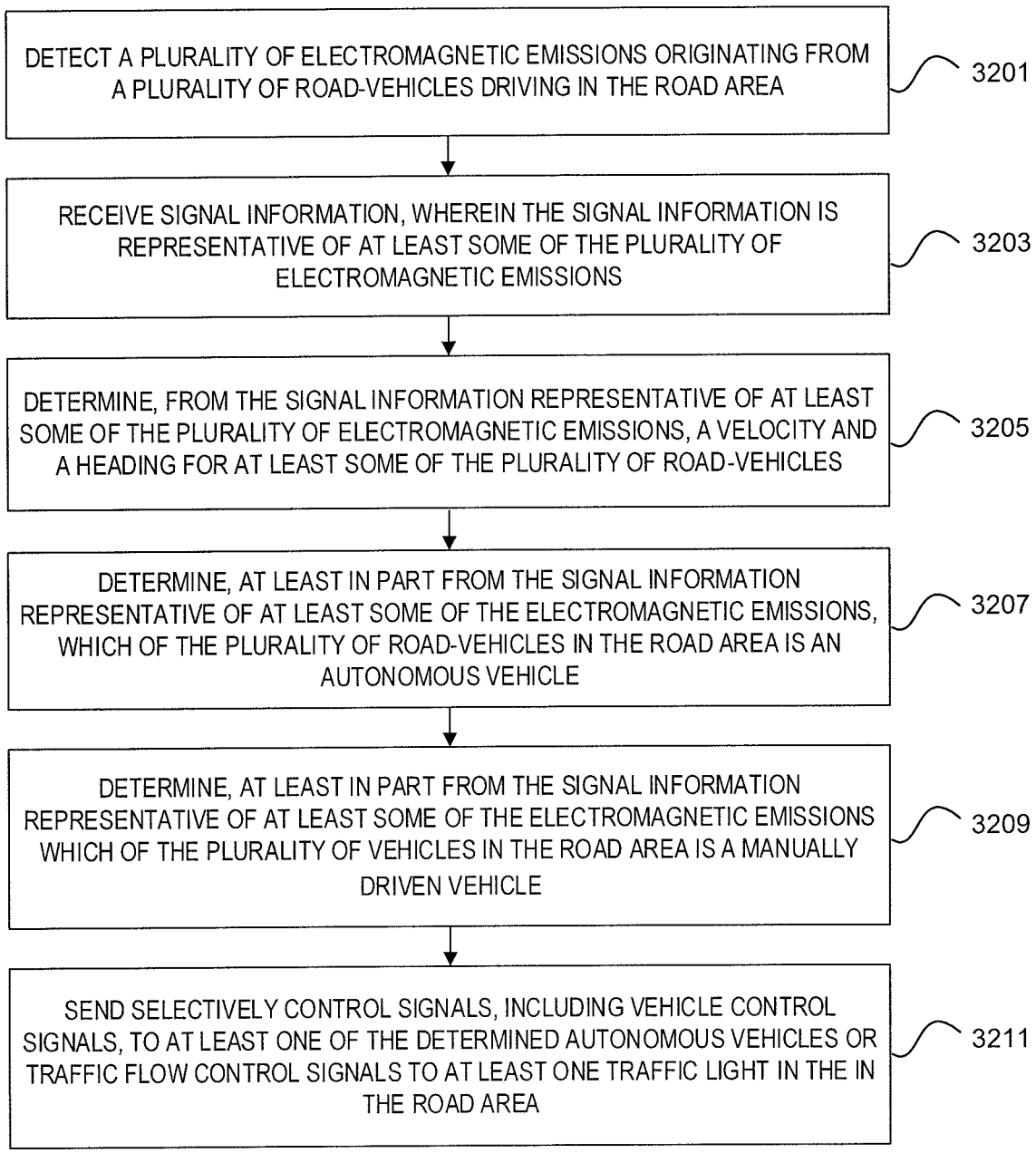
FIG. 32 is a flow chart illustrating an example of a method for differentiating between autonomous and non-autonomous vehicles consistent with disclosed embodiments.

FIG. 32 is an example of remote controlling method 3200, consistent with the disclosed embodiments. Method 3200 may, for example, be executed by the at least one processor configured to receive signal information from the at least one sensor, and associated controller (e.g., controller 120) or any other appropriate hardware and/or software. Further, when executing method 3200, the at least one processor may execute instructions stored in any of the modules discussed above with respect to FIG. 4.

In step 3201, a receiver may detect a plurality of electromagnetic emissions originating from a plurality of road-vehicles driving in the road area. In some embodiments, the road area may include at least one of an intersection and a dedicated traffic lane.

In step 3203, a processor may receive signal information, wherein the signal information is representative of at least some of the plurality of electromagnetic emissions.

In step 3205, the processor may determine, from the signal information representative of at least some of the plurality of electromagnetic emissions, a velocity and a heading for at least some of the plurality of road-vehicles.

In step 3207, the processor may determine at least in part from the signal information representative of at least some of the electromagnetic emissions, which of the plurality of road-vehicles in the road area is an autonomous vehicle.

In step 3209, the processor may determine at least in part from the signal information representative of at least some of the electromagnetic emissions which of the plurality of vehicles in the road area is a manually driven vehicle. In some embodiments, the processor may determine whether each of the plurality of road-vehicles is an autonomous vehicle or a manually driven vehicle based on information included in the plurality of electromagnetic emissions. In other embodiments, the processor may communicate with the at least some of the plurality of road-vehicles over a Dedicated Short-Range Communications (DSRC), or other type of communication channel to determine which of the plurality of road-vehicles driving in the road area is an autonomous vehicle. In yet other embodiments, when each of the plurality of road-vehicles is determined to be an autonomous vehicle, the processor may communicate or remotely control the plurality of road-vehicles.

In step 3211, the processor may send selectively control signals including vehicle control signals to at least one of the determined autonomous vehicles or traffic flow control signals to at least one traffic light in the in the road area. The control signals may be determined based on a first set of traffic-management rules when the processor determines that all of the plurality of vehicles are autonomous, or may be determined based on a second set of traffic-management rules when the processor determines that at least one of the plurality of vehicles is manually driven. In some embodiments, the processor may send the traffic flow control signals to a plurality of traffic lights.

In some embodiments, the vehicle control signals may be configured to automatically alter at least one operation associated with the at least one autonomous vehicle without user intervention. In other embodiments, at least one of the vehicle control signals may be configured to cause the at least one vehicle to change its course with respect to another vehicle. In yet other embodiments, at least one of the vehicle control signals is configured to cause the at least one autonomous vehicle to slow down or to speed up or to change lanes.

In some embodiments, the first and second sets of traffic-management rules may include at least one of: a maximum speed of the road-vehicles driving in the road area, a minimum distance between the road-vehicles driving in the road area, and waiting times for traffic lights. For example, in some embodiments the maximum speed of the road-vehicles driving in the road area under the first set of traffic-management rules may be greater than the maximum speed of the road-vehicles driving in the road area under the second set of traffic-management rules. As another example, the minimum distance between the road-vehicles driving in the road area under the first set of traffic-management rules may be lesser than the minimum distance between the road-vehicles driving in the road area under the second set of traffic-management rules. As yet another example, the waiting times for traffic lights under the first set of traffic-management rules may be longer than the waiting times for traffic lights under the second set of traffic-management rules.

Handing-Off Control of Autonomous Vehicles to Infrastructure

In one embodiment, the suggested traffic management system may take over control of autonomous vehicles passing through high traffic areas such as intersections, and may return control thereafter. In the broadest sense, remote controlled autonomous vehicles in an area of interest may be beneficial in other scenarios (e.g., a fleet of drones), and therefore, the disclosure below is not limited to autonomous road-vehicles. Additional information is available at "Revisiting Street Intersections Using Slot-Based Systems" by Tachet R., Santi P., Sobolevsky S., Reyes-Castro L. I., Frazzoli E., et al. (2016), that is incorporated herein by reference.

Figure 33:
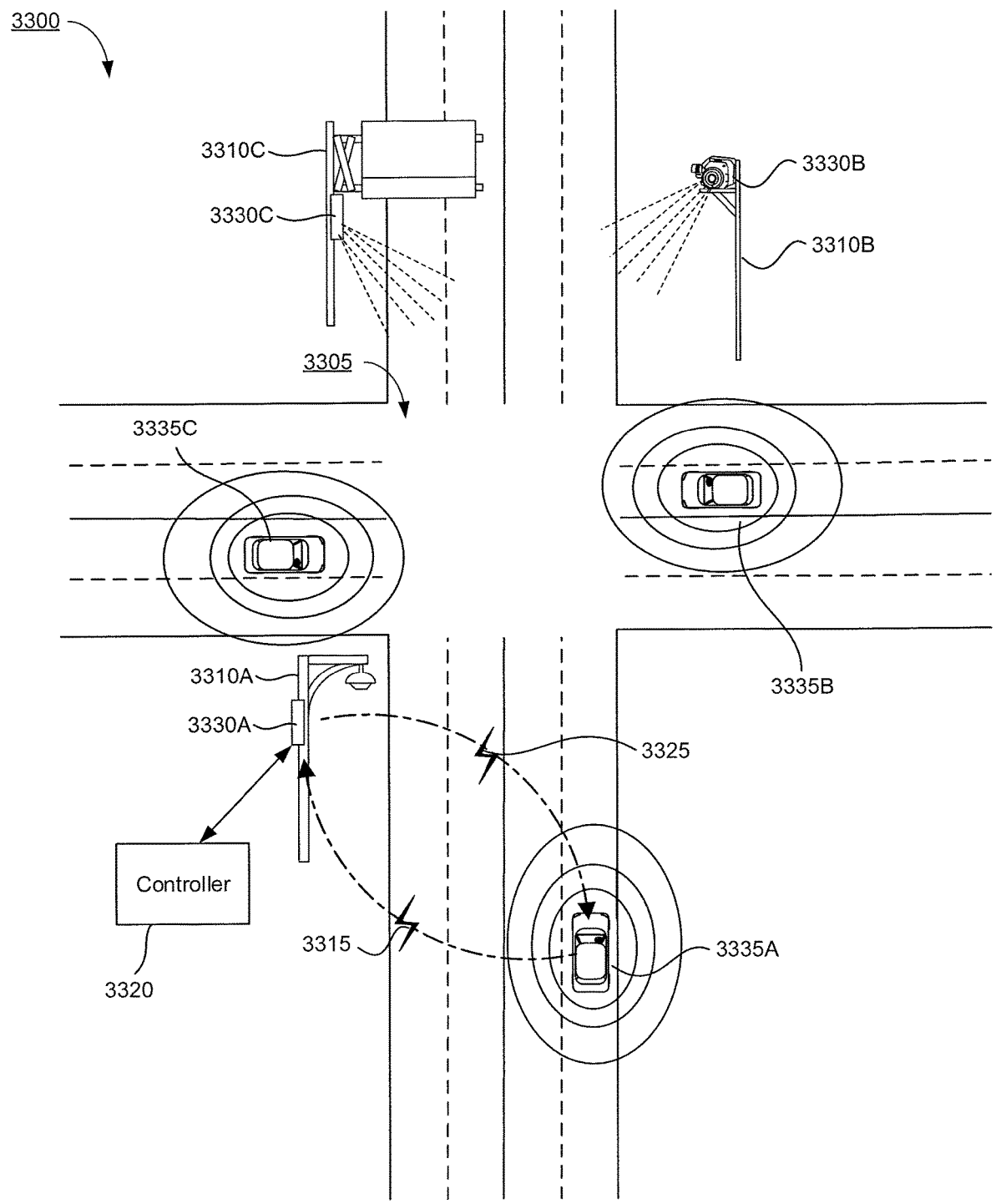
FIG. 33 is a diagrammatic illustration of an example of a local system for handing-off control of autonomous vehicles to infrastructure consistent with disclosed embodiments.

FIG. 33 is a diagrammatic illustration of an exemplary system 3300 for remotely controlling movements of autonomous vehicles in an area of interest 3305. The system may comprise sensors configured to detect autonomous vehicles within the area of interest 3305. In some embodiments, the area of interest may include an intersection, or in other embodiments, may include a parking location. Sensors (e.g., sensors 3310A, 3310B, and 3310C) may detect autonomous vehicles 3335A, 3335B, and 3335C surrounding the area of interest 3305. At least one processor may be configured to receive signal information from the sensors. The at least one processor may receive travel-related information (e.g., travel-related information 3315) from one or more of the autonomous vehicles in the area of interest 3305. The at least one processor may further exercise at least partial control over each of the autonomous vehicles in the area of interest 3305 to facilitate safe navigation through the area of interest 3305, wherein the exercise of at least partial control includes transmission of control signals (e.g., control signal 3325) to each of the autonomous vehicles to remotely control each of the autonomous vehicles. The at least one processor may further cease transmission of control signals to each of the autonomous vehicles when each of the autonomous vehicles exits the area of interest, to thereby permit each of the autonomous vehicles to resume full autonomous self-control. In some embodiments, the autonomous vehicles may include autonomous road-vehicles and the control signals may include driving instructions. Examples of system 3300's operation are described in greater detail in the sections below.

The sensors may use a variety of technologies and techniques to detect autonomous vehicles in the area of interest. For example, in some embodiments, the at least one sensor may include a plurality of receivers configured to be fixedly and separately mounted in the vicinity of an intersection, wherein each of the plurality of receivers is configured to detect electromagnetic emissions originating from vehicles in a vicinity of the intersection.

In some embodiments, the at least one sensor may be configured to detect electromagnetic emissions emanating from the autonomous vehicles. In other embodiments, the at least one sensor may be configured to detect electromagnetic emissions emanating from at least one road user other than the autonomous vehicles, wherein facilitating the safe navigation through the area of interest includes causing the autonomous vehicles to avoid intersecting with the determined location of the at least one road user. For example, as shown in FIG. 33, the system may determine a location, heading, and speed for each of vehicles 3335A-C. This determination may be based, for example, on the received EM emissions from each of the vehicles (as discussed in other sections of the disclosure). In some cases, the system may determine that vehicles 3335A and 3335B are autonomously controlled, while vehicle 3335C is not autonomously controlled. Additionally, based on detection of EM emissions from one or more mobile devices, the system may determine locations associated with pedestrians (not shown) in the vicinity of the intersection.

The system, including controller 3320, for example, may determine that vehicle 3335A and vehicle 3335C are on a collision course (e.g., by predicting a time at which both vehicles will be present in the intersection in view of current heading and speed information (or through tracking a path, velocity, acceleration, of the vehicles over time). In such cases, the controller 3320 may issue a control signal for transmission to vehicle 3335A to cause one or more actuators associated with vehicle 3335A to alter a navigational state of the vehicle (e.g., an actuator may apply brakes or increase a throttle level) such that vehicle 3335A no longer travels on a collision course with vehicle 3335C (or with any other vehicle, pedestrian or other road user that may be present in or near the intersection).

The sensors included in system 3300 may be configured to detect radiation in any suitable wavelength band. In some embodiments, one or more sensors may be configured to detect electromagnetic emissions between 2.4 GHz and 2.4835 GHz (e.g., associated with personal mobile communications devices of a plurality of pedestrians). In other embodiments, one or more sensors may be configured to detect electromagnetic emissions between 76 GHz and 81 GHz (e.g., associated with electronics incorporated into a plurality of automobiles).

The sensor may use other technologies and techniques to detect autonomous vehicles in the area of interest. For example, in some embodiments, the sensor (e.g., sensor 3330B) may be configured to capture image data (e.g., using a camera), wherein the detection of the autonomous vehicles within the area of interest is based on analysis of the image information. In such a camera-based system, the system may determine the speed and trajectory of the moving road users by monitoring the locations of the autonomous vehicles over time, using the captured image data. Using the captured image data, the system may determine the momentary properties characterizing the movement of the autonomous vehicles (such as, velocity, speed, and direction, etc.) by monitoring the captured image data over time. As a further example, the system may be able to determine the make and model of a car from the captured image data, and may make a determination as to whether the automobile is at least partially autonomously driven or manually driven based on this information.

As discussed above, a controller (e.g., controller 3320) may include at least one processor. The processor may be configured to perform various functions for handing-off control of autonomous vehicles and remotely controlling movements of autonomous vehicles in an area of interest using information obtained through the sensors described above. Below, various exemplary actions for handing-off control of autonomous vehicles and remotely controlling movements of autonomous vehicles are described in greater detail.

In some embodiments, the at least one processor may be further configured to receive information indicative of traffic approaching the area of interest from another system monitoring the traffic in a differing area of interest. For example, as shown in FIG. 3, information from different local systems 100A, 100B, and 100C may be simultaneously transmitted to a main server 320 over network 310. Similarly, system 3300 may receive information indicative of traffic approaching the area of interest 3305 from separate systems monitoring the traffic in a different area of interest.

System 3300 may be configured to control one or more aspects of the navigational states (e.g., path of travel, speed of travel, acceleration level, presentation of navigational warnings, etc.) relative to multiple road users in a particular region. In some embodiments, the at least one processor may be configured to at least partially control at least 5, 10, 25, 50 or more road users, including autonomous vehicles, simultaneously.

Autonomous vehicles in the area of interest 3305 may emit travel-information signals (e.g., travel-related information 3315), which can be detected any of the available sensors and received by one or more associated processors. For example, in some embodiments, the travel-information may include indications of a desired destination. For example, autonomous vehicle 3335A may emit travel-related information signal 3315 that includes a desired destination of an airport. In other embodiments, the travel-information may include an estimation of time each autonomous vehicle is likely to remain in a parking location. In yet further embodiments, the received travel-related information from one or more autonomous vehicles may include at least one of: a destination of an autonomous vehicle, an indication if the autonomous vehicle is driving a woman in labor, an indication if the autonomous vehicle has a malfunction, a number of passengers riding the autonomous vehicle, or any of a variety of informational signals regarding characteristics of an autonomous vehicle, its passengers, etc. that may be transmitted to system 3300.

Figure 34:
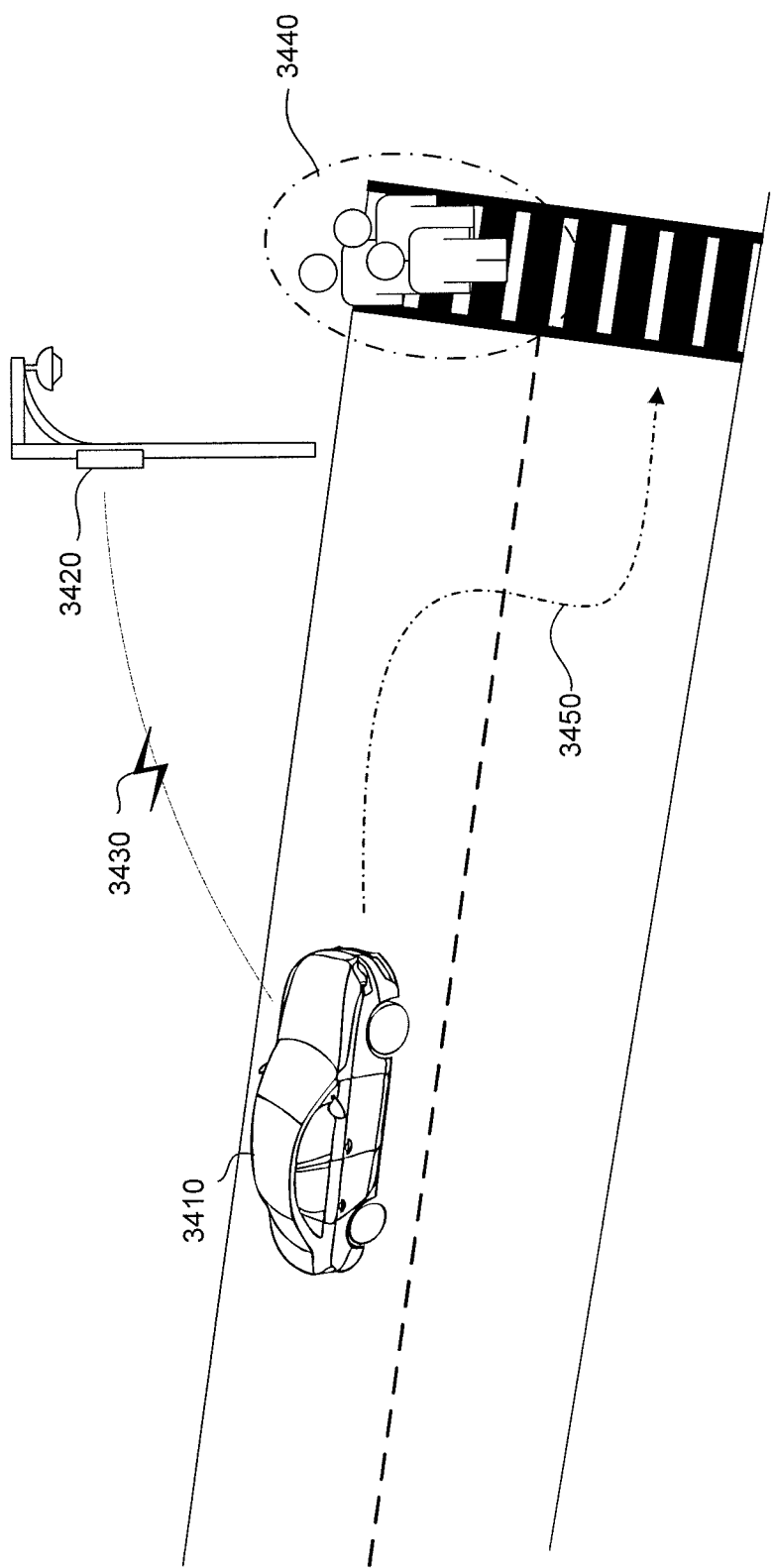
FIG. 34 is a diagrammatic illustration of various examples of remotely controlling movements of autonomous vehicles in an area of interest consistent with disclosed embodiments.

As discussed above, remotely controlling movements of autonomous vehicles in an area of interest may involve sending vehicle control signals to at least one of the determined autonomous vehicles. For example, in some embodiments, the control signals may be configured to alter at least one of velocities and headings of the autonomous vehicles in the area of interest. In other embodiments, the control signals may be configured to not override capabilities of the autonomous vehicles to autonomously take evasive action in response to an identified hazard. For example, as shown in FIG. 34, controller 3420 and associated processor may send a control signal 3430 to vehicle 3410 to attempt to override and take control of vehicle 3410. If, however, the vehicle 3410 senses an identified hazard 3440 (e.g., pedestrians crossing the road), control signal 3430 will not override the control of vehicle 3410, and vehicle 3410 may use its own systems to initiate an evasive action, moving along path 3450 to avoid the identified hazard 3440.

Figure 35:
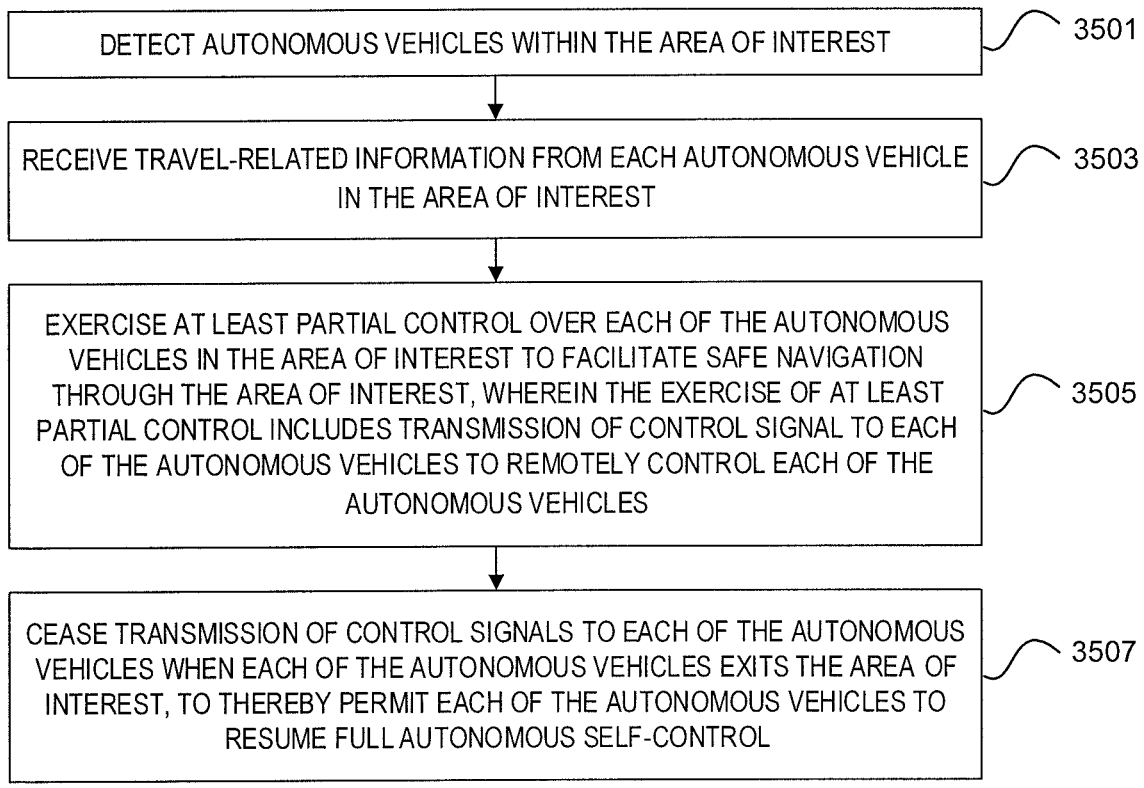
FIG. 35 is a flow chart illustrating an example of a method for handing-off control of autonomous vehicles to infrastructure consistent with disclosed embodiments.

FIG. 35 is an example of remote controlling method 3500, consistent with the disclosed embodiments. Method 3500 may, for example, be executed by the at least one processor configured to receive signal information from the at least one sensor, and associated controller (e.g., controller 120) or any other appropriate hardware and/or software. Further, when executing method 3500, the at least one processor may execute instructions stored in any of the modules discussed above with respect to FIG. 4.

In step 3501, a sensor can be configured to detect autonomous vehicles within the area of interest. In some embodiments, the area of interest may include an intersection. In some embodiments, the autonomous vehicles may include autonomous road-vehicles. In some embodiments, the sensor may be configured to detect electromagnetic emissions emanating from the autonomous vehicles. The detected electromagnetic emissions associated with reception band between 76 GHz and 81 GHz or a reception band between 2.4 GHz and 2.4835 GHz. In other embodiments, the sensor may be configured to capture image data and detect the autonomous vehicles within the area of interest based on analysis of the image information.

In step 3503, the processor may receive travel-related information from each autonomous vehicle in the area of interest. In some embodiments, the processor may receive information indicative of traffic approaching the area of interest from another system monitoring the traffic in a differing area of interest. In some embodiments, the travel-information may include indication of a desired destination or a parking location or an estimation of time each autonomous vehicle is likely to remain in the parking location. In other embodiments, the received travel-related information from each autonomous vehicle includes at least one of: a destination of each autonomous vehicle, an indication if the autonomous vehicle is driving a woman in labor, an indication if the autonomous vehicle has a malfunction, and a number of passengers riding the autonomous vehicle In step 3505, the processor may exercise at least partial control over each of the autonomous vehicles in the area of interest to facilitate safe navigation through the area of interest, wherein the exercise of at least partial control includes transmission of control signal to each of the autonomous vehicles to remotely control each of the autonomous vehicles. In some embodiments, the control signals may include driving instructions or may be configured to alter at least one of velocities and headings of the autonomous vehicles in the area of interest. In some embodiments, the method may control, at least partially, at least 50 autonomous vehicles simultaneously. In some embodiments, the control signals may be configured to not override capabilities of the autonomous vehicles to autonomously take evasive action in response to an identified hazard. In yet other embodiments, the sensor may detect electromagnetic emissions emanating from at least one road user other than the autonomous vehicles, the processor may facilitate the safe navigation through the area of interest by causing the autonomous vehicles to avoid intersecting with the determined location of the at least one road user.

In step 3507, the processor may cease transmission of control signals to each of the autonomous vehicles when each of the autonomous vehicles exits the area of interest, to thereby permit each of the autonomous vehicles to resume full autonomous self-control.

Beacon-Based Messaging

A beacon detector in a vehicle (e.g., radar, Lidar, sonar), may typically detect reflections of the vehicle's own beacon signal for the purpose of navigation/perception. However, current navigational systems may only receive information from reflected signals. Some embodiments of the described system enable messages or control signals to be sent to a vehicle by roadway infrastructure. Thus, a municipality may communicate with individual vehicles, either by sending a message to the driver or by sending a control signal to the vehicle.

In some embodiments, a system may use a distance-measuring beacon detector of a road vehicle as a mechanism to convey a message to the road vehicle. For example, the system may include at least one receiver configured to be located in a vicinity of a roadway and to detect non-reflected electromagnetic emissions originating from the distance-measuring beacon detector of the road vehicle. The system may also include at least one transmitter configured to be located in the vicinity of the roadway and at least one processor configured to receive signal information from the at least one receiver. The at least one processor may be configured to associate the detected non-reflected electromagnetic emissions with the road vehicle and cause the transmitter to transmit the message to the road vehicle via the distance measuring beacon detector of the road vehicle.

Figure 36A:
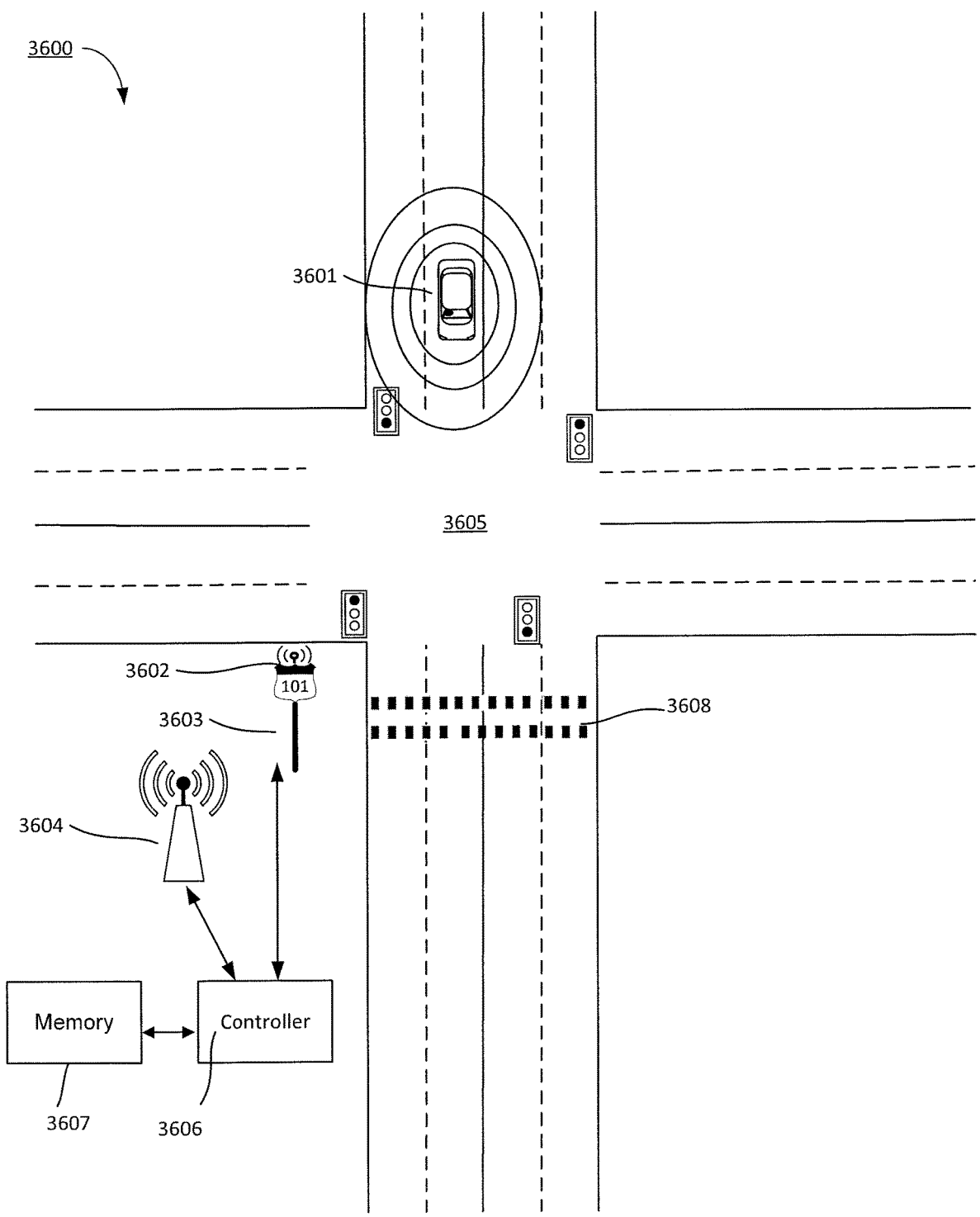
FIGS. 36A and 36B is a schematic illustration of an example of a local system deployed in an intersection consistent with the disclosed embodiments.

FIG. 36A is an illustration of an exemplary local system 3600 for transmitting data to a beacon detector of a vehicle 3601. Local system 3600 may include at least one receiver 3602 mounted on a road sign 3603 and at least one transmitter 3604. The at least one receiver may be configured for mounting on at least one of a traffic light, a lamp post, or a billboard. Similarly, the at least one transmitter may be configured to be mounted on at least one of a traffic light, a lamp post, a road sign, or a billboard. In some embodiments, the transmitter is included together with the at least one receiver in a transceiver configuration.

In the depicted exemplary configuration, receiver 3602 is capable of detecting non-reflected electromagnetic waves emitted by a beacon detector of road vehicle 3601. The beacon detector of vehicle 3601 may be at least one of a radar detector, a lidar detector, or a sonar detector, etc. The road vehicle 3601 may generate electromagnetic emissions represented by three ellipses surrounding the vehicle 3601. The electromagnetic emissions may originate from the vehicle's radars and/or other electronic equipment and devices. The receiver 3602 may be configured to detect and analyze the electromagnetic emissions of road vehicle 3601 and, for example, generate a highly accurate, live dynamic map of the area of intersection 3605.

In some embodiments, transmitter 3604 may passively and/or actively communicate with the distance-measuring beacon detector of the vehicle 3601 to transmit a message including information regarding the surroundings of the receiver 3602 and/or vehicle 3601. The message may be sent to the distance-measuring beacon detector of vehicle 3601 via Direct Communication Channel operating under commercial standards and protocols. For example, the transmitter 3604 may transmit a message to the distance-measuring beacon detector via RF signal. In some embodiments, the transmitter 3604 and distance-measuring beacon detector may communicate via one or more channels at one or more pre-defined frequencies. In other embodiments, the beacon detector and transmitter may communicate via cellular network, wireless network, or the like.

In the illustrated exemplary configuration, the intersection area may be monitored by a single receiver 3602 and a single transmitter 3604. However, in other configurations, for example, the configuration illustrated in FIG. 36B, an intersection area may be monitored by more receivers and/or transmitters. In certain configurations, the system may include one or more receivers and a single transmitter or one or more transmitters and a single receiver.

Consistent with the present disclosure, the generated signals from the receiver 3602 may be conveyed to a controller 3606. Specifically, the generated signals may be inputted to controller 3606 that may include at least one processor configured to associate the detected non-reflected electromagnetic emissions with the road vehicle and cause the transmitter to transmit the message to the road vehicle via the distance measuring beacon detector of the road vehicle. For example, based on the live dynamic map of intersection 3605, the at least one processor may cause transmitter 3604 to generate and transmit a message including location information to the beacon detector of vehicle 3601.

The at least one processor may constitute any physical device having an electric circuit that performs a logic operation on input or inputs. The at least one processor may be the same as processor 214, or may be a separate processor. For example, the at least one processor may include one or more integrated circuits (IC), including Application-specific integrated circuits (ASIC), microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. In one embodiment, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically, or by other means that permit them to interact.

Consistent with the present disclosure, the instructions executed by at least one processor may, for example, be pre-loaded into a memory 130, memory 3607 integrated with or embedded into controller 3606 and/or controller 120, or may be stored in a separate memory. Memory 3607 may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In one embodiment, memory 3607 may be configured to store data defining roadways in an area of interest (e.g., the surroundings of intersection 3605). The stored data may include map data and regulatory data. In addition, memory 3607 may be configured to store data associated with vehicles types and details about their associated radar system, the placement and/or geographical location of receivers 3602 and transmitters 3604 in intersection 3605, and more. In another embodiment, memory 3607 may store past movements of vehicles in an intersection. The stored data may be used as an input to an Artificial Intelligence (AI) machine for determining information about intersection 3605, such as lane lines, driving habits, danger level, and more. In addition, the stored data may be deleted after a predetermined period of time. For example, memory 3607 may store information (e.g., the location, the speed, and/or direction) for road users crossing intersection 3605 in the last 48 hours, in the last 24 hours, or in the last 12 hours. In one use case, after a collision, police investigators may use the stored information to re-create the accident.

In the situation illustrated in FIG. 36A, the vehicle 3601 is approaching a crosswalk 3608. In this example, local system 3600 may access a virtual map of intersection 3605 stored in memory 3607. Based on historical data including the past movement of the pedestrians (assuming they are carrying any device generating electromagnetic transmissions) and/or the past movement of vehicles in the roadway, the system may generate virtual borders of the crosswalk 3608. The at least one processor may be configured to cause the transmitter to transmit a message including indications of the virtual borders of the crosswalk 3608 to the distance-measuring beacon detector of vehicle 3601. The message may also include at least one of an audible communication, a visual display, or a tactile sensation to a driver of the road vehicle, alerting the driver to the potential hazard. A person skilled in the art would recognize that this case is only an example. The disclosed system can be used to prevent collisions involving any type of road users.

Figure 36B:
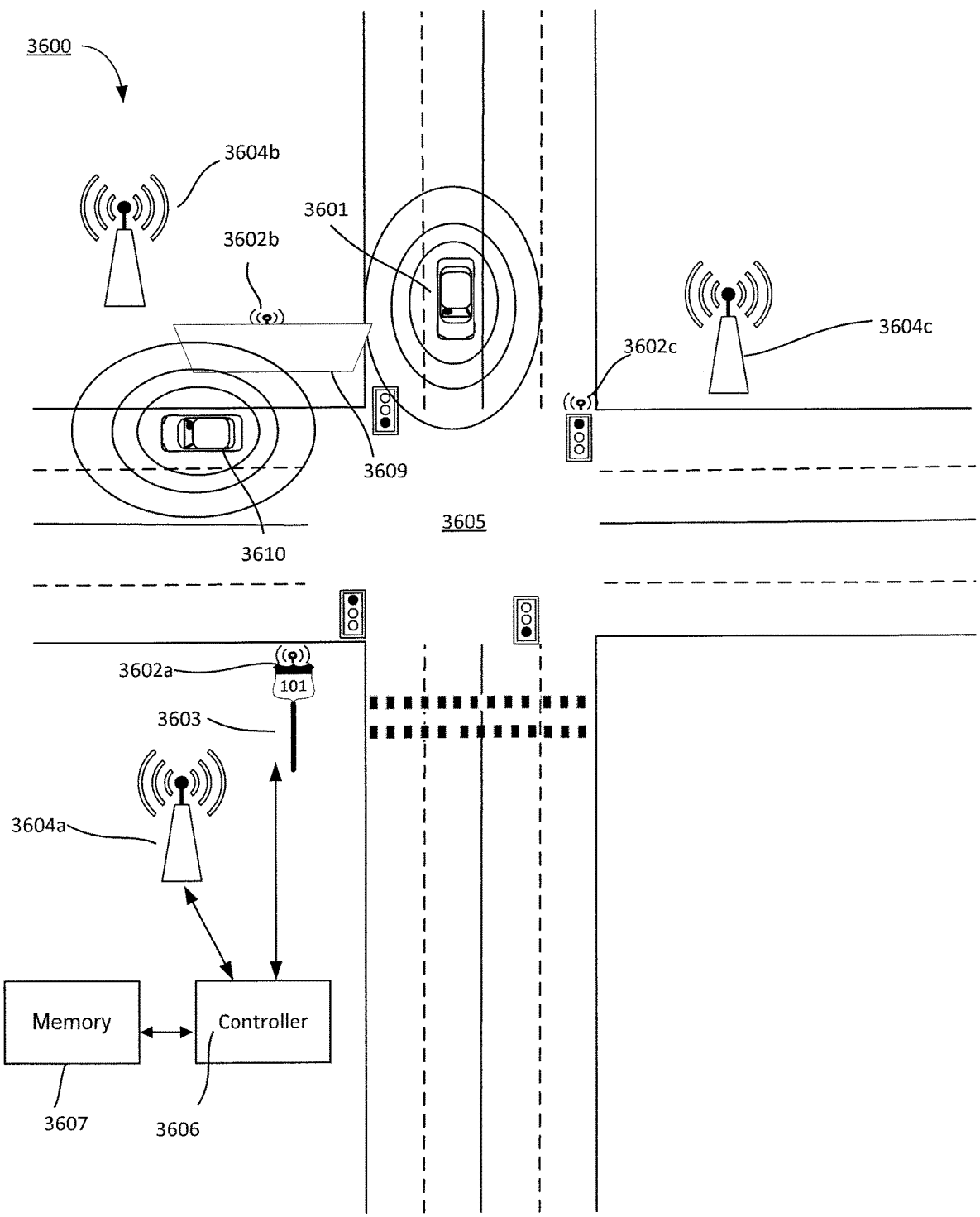

FIG. 36B is an illustration of another configuration of exemplary local system 3600 for transmitting data to a beacon detector of a vehicle 3601. In this example, several receivers (3602a, 3602b, and 3602c) and transmitters (3604a, 3604b, and 3604c) are located in the vicinity of intersection 3605.

In some embodiments, the at least one transmitter includes a plurality of spatially separated transmitters in proximity to an intersection, and the at least one processor is further configured to cause transmission to the road vehicle electromagnetic emissions from each of the plurality of spatially separated transmitters to enable the road vehicle to determine its distance relative to each of the plurality of spatially separated transmitters and to determine its current location using triangulation. Similarly, in other embodiments, the at least one receiver includes a plurality of spatially separated receivers in proximity to an intersection, and the at least one processor is further configured to use measurements of the electromagnetic emissions emanating from the road vehicle as received by the plurality of receivers to determine a location of the road vehicle on the roadway. The at least one transmitter may be configured to transmit the determined location of the road vehicle to the road vehicle.

For example, with reference to FIG. 36B, a blind spot may be created for vehicle 3601 by a billboard 3609. Because of the billboard 3609, vehicle 3601 may be unable to detect another vehicle 3610 idling in the lane vehicle 3601 is about to turn into. Receivers 3602a, 3602b, and 3602c may receive emissions from both vehicles 3601 and 3610. Based on the dynamic map of the intersection 3605 and on the location of vehicles 3601 and 3610, determined by triangulation, controller 3606 may cause at least one of the transmitters 3604a, 3604b, or 3604c to transmit a message to the beacon detector of vehicle 3601. For example, the message may include synthetic signals representing a virtual object (e.g., vehicle 3610) thereby causing the distance measuring beacon detector of vehicle 3601 to generate an output that initiates a collision avoidance action by the road vehicle. A collision avoidance action may be to slow the vehicle 3601 or to cause a navigational change. For example, the processor of system 3600 may determine virtual borders of the traffic lanes of the roadway based on past movement of road vehicles in the roadway. The processor may be configured to cause the transmitter to transmit synthetic signals to the beacon instead of, or in addition to a message. The synthetic signals may allow the measuring sensor to "see" the virtual border determined by the local system. Unlike sending a message, which requires a common language and cooperation between the transmitter and beacon, synthetic signals may be sent without cooperation or adherence to standards and protocols. a message that includes indications of the determined virtual borders of the at least one traffic lane via the distance measuring beacon detector of the road vehicle. The message may include, for example, navigational instructions causing the vehicle 3601 to turn into a different lane of the roadway.

Figure 37:
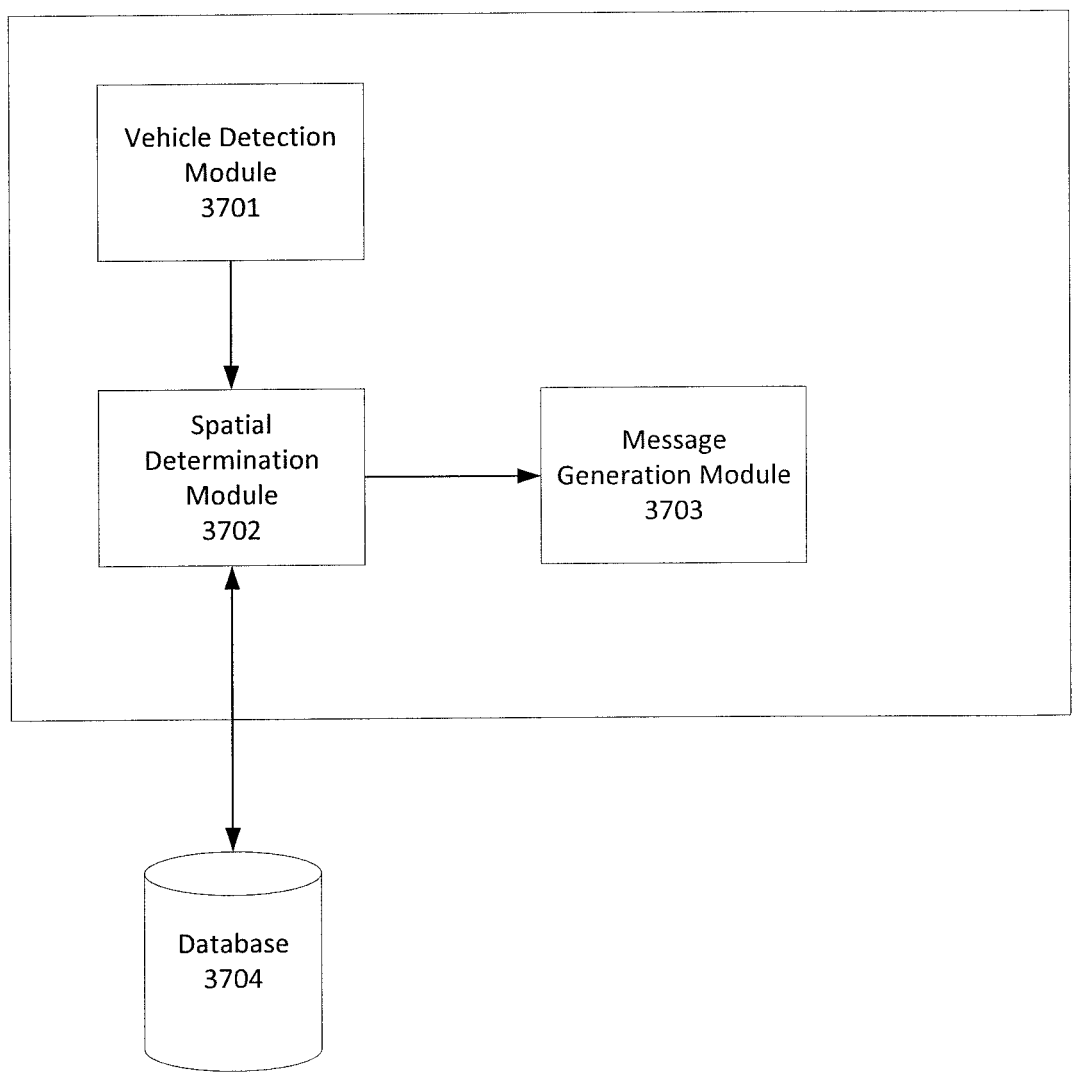
FIG. 37 is a schematic illustration of an exemplary processor of the local system consistent with the disclosed embodiments.

FIG. 37 is an illustration of an exemplary processor 3700 of system 3600. Processor 3700 may include a vehicle detection module 3701, a spatial determination module 3702, and a message generation module 3703. In some embodiments, vehicle detection module 3701, spatial determination module 3702, and message generation module 3703 may be included in processor 214.

Vehicle detection module 3701 may be configured to receive input from one or more receivers. Input from the one or more receivers may include a signal indicating the type of road vehicle originating the electromagnetic emissions. In some embodiments, the at least one processor may further be configured to determine that the road vehicle is a manually-driven automobile. Some autonomous vehicles may be configured to transmit additional signals identifying the vehicle as an autonomous vehicle. If the electromagnetic emission does not contain one or more additional signals, vehicle detection module may determine that the road vehicle is a manually-driven vehicle.

In some embodiments, the at least one processor may further be configured to determine that the road vehicle is at least partially autonomously driven automobile. For example, the local system 3600 may be located in a geographic area in which manually-driven vehicles are not permitted. A road vehicle may emit one or more signals indicating whether it is fully or partially autonomous.

Spatial detection module 3702 may receive vehicle information from vehicle determination module 3701, including whether the road vehicle is fully or partially autonomous, or manually-driven. In some embodiments, spatial detection module 3702 may receive location and/or distance information from the one or more receivers, indicating the distance of the road vehicle from each respective receiver. Spatial detection module 3702 may use the distance and/or location information to triangulate the location of the road vehicle.

In some embodiments, the at least one processor may further be configured to determine virtual borders of at least one traffic lane, crosswalk, stop line, or any road marking or road rules in the roadway based on past movement of road vehicles on the roadway. For example, database 3704 may store historical road vehicle and/or pedestrian data. Spatial determination module 3702 may access historical data and analyze the movements of the road vehicles and/or pedestrians to generate a dynamic, virtual map of the surrounding environment. For example, data may indicate that pedestrians cross a road within a certain geospatial area. That area may be designated by spatial determination module as a crosswalk.

Message generation module 3703 may receive vehicle information from vehicle determination module 3701 and spatial information from spatial determination module 3702. Message generation module 3703 may receive information and generate a message to be transmitted, via the one or more transmitter, to the road vehicle. In some embodiments, the at least one processor may further be configured to determine signal characteristics of the beacon detector of the road vehicle and to cause the transmitter to transmit a message with similar signal characteristics to the road vehicle.

In some embodiments, the transmission may include one or more synthetic signals configured to alter an operation of the road vehicle. In some embodiments, the transmission may include signals representing a virtual object, thereby causing the distance measuring beacon detector to generate an output that initiates a collision avoidance action by the road vehicle. For example, the synthetic signals may include information about virtual objects determined by spatial determination module 3702. Initiating a collision avoidance action may include causing a navigational change in the road vehicle, for example, decreasing the vehicle's acceleration, stopping the vehicle, steering the vehicle away from the virtual object, and the like. In some embodiments, the at least one processor is further configured to cause the transmitter to transmit signals representing the virtual object upon detecting another road user on a collision course with the vehicle.

The described virtual objects concept may include several different implementations. In some embodiments, direct communication of information may displace the need for reliance upon virtual object generation. For example, messages to vehicles may be sent through any of the available communication channels, and these messages may contain information regarding maximal speed allowed, or closed lanes, or road obstacles, etc. This communication layer may not always be available, or it might be attacked, etc. On the other hand, a vehicle radar or other detection system may remain operational, and the use of virtual objects may piggyback on the functionality of these detection systems. Relying on the fact that radar detects objects in its surrounding by emitting electromagnetic energy in form of pulses and sensing the channel for detecting the reflections of these pulses, scattered from physical objects, the disclosed systems may be able to transmit synthesized pulses that would be similar to the reflections the radar or other detection system would expect from physical objects. Therefore, when a radar receives such a synthesized signal, in response to a transmitted pulse, this received signal may be interpreted as a reflection from a physical object, which actually is not there—so it is a virtual one. This capability may enable the disclosed systems to generate virtual objects that the vehicle "senses" and may respond to them as if these were real objects.

In some embodiments, for example, if the vehicle determination module 3701 determines that the road vehicle is a manually-driven vehicle, message generation module 3703 may be configured to cause a response in the road vehicle including at least one of an audible communication, a visual display, or a tactile sensation to a driver of the road vehicle. In some embodiments, the transmitted message may trigger the vehicle proximity alarm even when no object is in proximity to the vehicle. For example, the transmitted message may cause the road vehicle to provide an audible communication to the driver that he is driving too close to a lane line.

Figure 38:
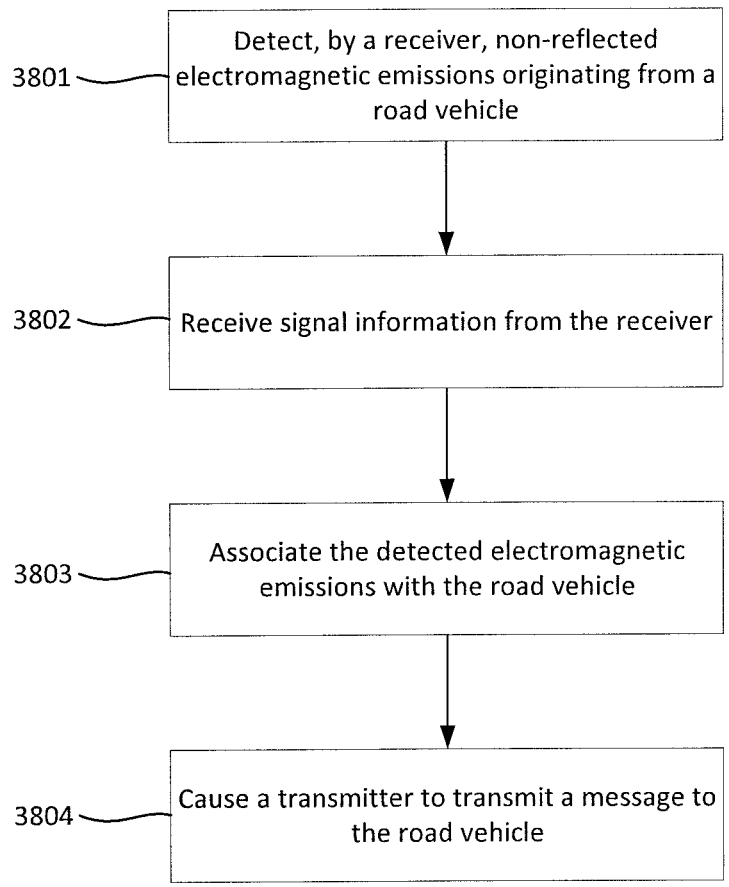
FIG. 38 is a flow chart of a process for using a distance-measuring beacon detector of a road vehicle as a mechanism to convey a message to the road vehicle consistent with the disclosed embodiments.

FIG. 38 is an exemplary process 3800 for using a distance-measuring beacon detector of a road vehicle as a mechanism to convey a message to the road vehicle. At step 3801, the at least one receiver, e.g., receiver 3602, may detect non-reflected electromagnetic emissions originating from the distance measuring beacon detector of the road vehicle.

At step 3802, vehicle determination module 3701 may receive signal information from the at least one receiver. Signal information may include the road vehicle's location and/or the type of vehicle, i.e., manual or autonomous.

At step 3803, the processor may associate the detected non-reflected electromagnetic emissions with the road vehicle. Spatial determination module 3702 may receive road vehicle information and dynamic map information including one or more virtual objects. The processor may associate the electromagnetic emissions with road vehicle to allow the transmitter to transmit a message to the appropriate road vehicle.

In some embodiments, in addition to associating the electromagnetic emissions with the road vehicle, message generation module 3703 may generate a message based on vehicle information and spatial information. The message may be configured to cause the road vehicle to execute an action, for example, implement a navigational change or alert the driver to a road hazard.

At step 3804, the processor causes a transmitter to transmit the message to the road vehicle via the distance measuring beacon detector of the road vehicle. The message may include instructions causing the road vehicle or a system of the road vehicle to execute an action.

Dual Use Beacons

In some embodiments, a local system, e.g., local system 100, may be configured to communicate with one or more components in a dual use beacon system that is part of a road vehicle. In some embodiments, the dual use beacon system may include, e.g., a lidar, radar, or sonar system configured not only to receive reflected signals from objects in a road vehicle's environment for purposes of determining range information, directional orientation, relative velocity, relative acceleration information, etc. between the host vehicle and objects in the host vehicle's environment. The dual use beacon system may also be configured to receive one or more non-reflected signals (e.g., signals different from reflected radar, lidar, or sonar signals originating from the dual use beacon system) from one or more in a host vehicle environment. In some embodiments, the dual use beacon system may receive informational signals, control signals, etc. from the local system 100. Such signals may provide information, commands, etc. as a result of the local system 100 tracking the presence and/or movements, etc., of objects in the host vehicle environment. In some cases, the dual use beacon may also be configured to transmit informational signals to the local system 100.

Figure 39:
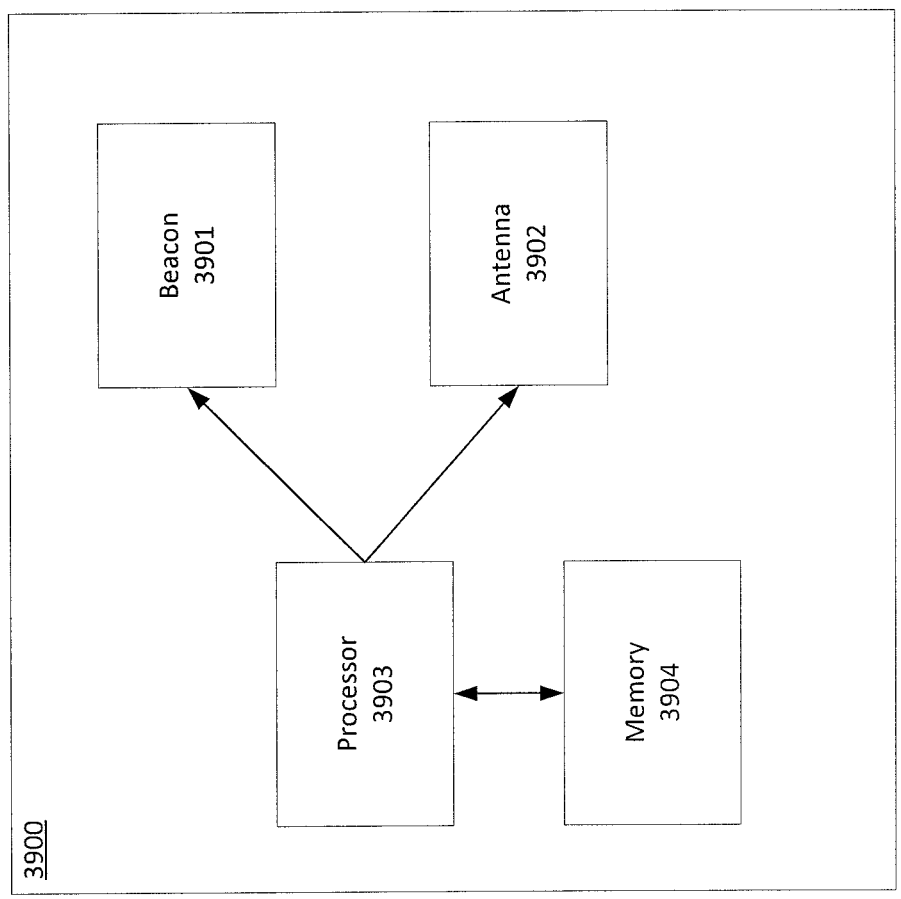
FIG. 39 is a schematic illustration of an example of a local system deployed in an intersection consistent with the disclosed embodiments.

FIG. 39 is a diagrammatic illustration of an exemplary dual usage beacon system 3900 for a vehicle. The beacon system 3900 may be configured to determine distance to an object in a path of the host vehicle, to receive messages originating from outside the host vehicle, and to convey information to a traffic control system, e.g., local system 100. Dual usage beacon system 3900 may include a radar, lidar, or sonar system and may include at least one beacon 3901, at least one antenna 3902, a processor 3903, and memory 3904.

The at least one beacon 3901 may be configured to emit a first electromagnetic signal. If an object is in the path of, or in the environment of, the host vehicle, the electromagnetic signal may be reflected off the object, and the resulting reflected signal may be received by the at least one antenna 3902 associated with beacon 3901. Beacon 3901 may be controlled by processor 3903 such that processor 3903 initiates each electromagnetic emission. For example, processor 3903 may store one or more programs to control the direction and frequency of emissions (or other characteristics of the emissions, such as amplitude, pulse duration, phase, etc.) during vehicle operation. In some embodiments, the at least one beacon 3901 may be configured to emit, e.g., via antenna 3902) a first electromagnetic signal (e.g., a detection signal) and a second electromagnetic signal (e.g., an informational signal). The first electromagnetic signal may be configured for use in determining a distance between the vehicle and the object in the path of the vehicle, and the second electromagnetic signal may be configured for use in conveying the at least one message to a traffic control system.

Antenna 3902 may also be configured to receive a reflection of the first electromagnetic signal from an object in a path of the vehicle. Antenna 3902 may include an RF antenna configured to generate input signals in response to reflected emissions and transfer or otherwise provide the input signals to processor 3903. The reflected signal may be filtered or otherwise processed to reduce noise.

Processor 3903 may obtain from the at least one antenna 3902 associated with the beacon 3901 at least one signal representative of the received reflection of the first electromagnetic signal and determine based on the obtained at least one signal a distance between the vehicle and the object (e.g., an object in a path of the vehicle).

Additionally, processor 3903 may obtain from the at least one antenna 3902 associated with the beacon 3901, at least a second signal (e.g., an informational or control message) representative of a non-reflected electromagnetic signal not associated with (e.g., different from) the first electromagnetic signal. The second signal may include a message sent by at least one transmitter of a traffic control system fixedly mounted in a vicinity of a roadway area. For example, the traffic control system may detect RF emissions from other vehicles to determine their geo-location, speed, and direction of movement, etc. The traffic control system may send a signal containing this information to antenna 3902 of the dual usage beacon system 3900. This second signal or informational/control message may also include one or more commands or control signals to be implemented by systems of the host vehicle of the dual use beacon.

In such cases, the processor 3903 may execute a vehicle control action based on the received message. For example, one or more actuators associated with the host vehicle may be controlled in response to the second signal to cause a navigational change in the host vehicle (e.g., braking, accelerating, changing heading direction, etc.). In other embodiments, the processor 3903 may execute instructions causing one or more alerts be displayed to the operator of the host vehicle. In some embodiments, the processor 3903 may cause an audible message to be delivered to the operator of the vehicle in response to receiving the second signal (e.g., informational/control message) via the dual use beacon system.

In another embodiment, the processor 3903 may generate at least one message for use by a traffic control system. For example, a message may include information about other objects received as a reflection of the first electromagnetic emission or proprieties of the vehicle, e.g., vehicle 4002, itself. Processor 3903 may cause the at least one beacon to emit a second electromagnetic signal including the generated message for use one or more traffic control systems.

The at least one processor 3903 may constitute any physical device having an electric circuit that performs a logic operation on input or inputs. For example, the at least one processor may include one or more integrated circuits (IC), including Application-specific integrated circuits (ASIC), microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. In one embodiment, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically, or by other means that permit them to interact.

Consistent with the present disclosure, the instructions executed by at least one processor 3903 may, for example, be pre-loaded into a memory 3904 or may be stored in a separate memory. Memory 3904 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Figure 40A:
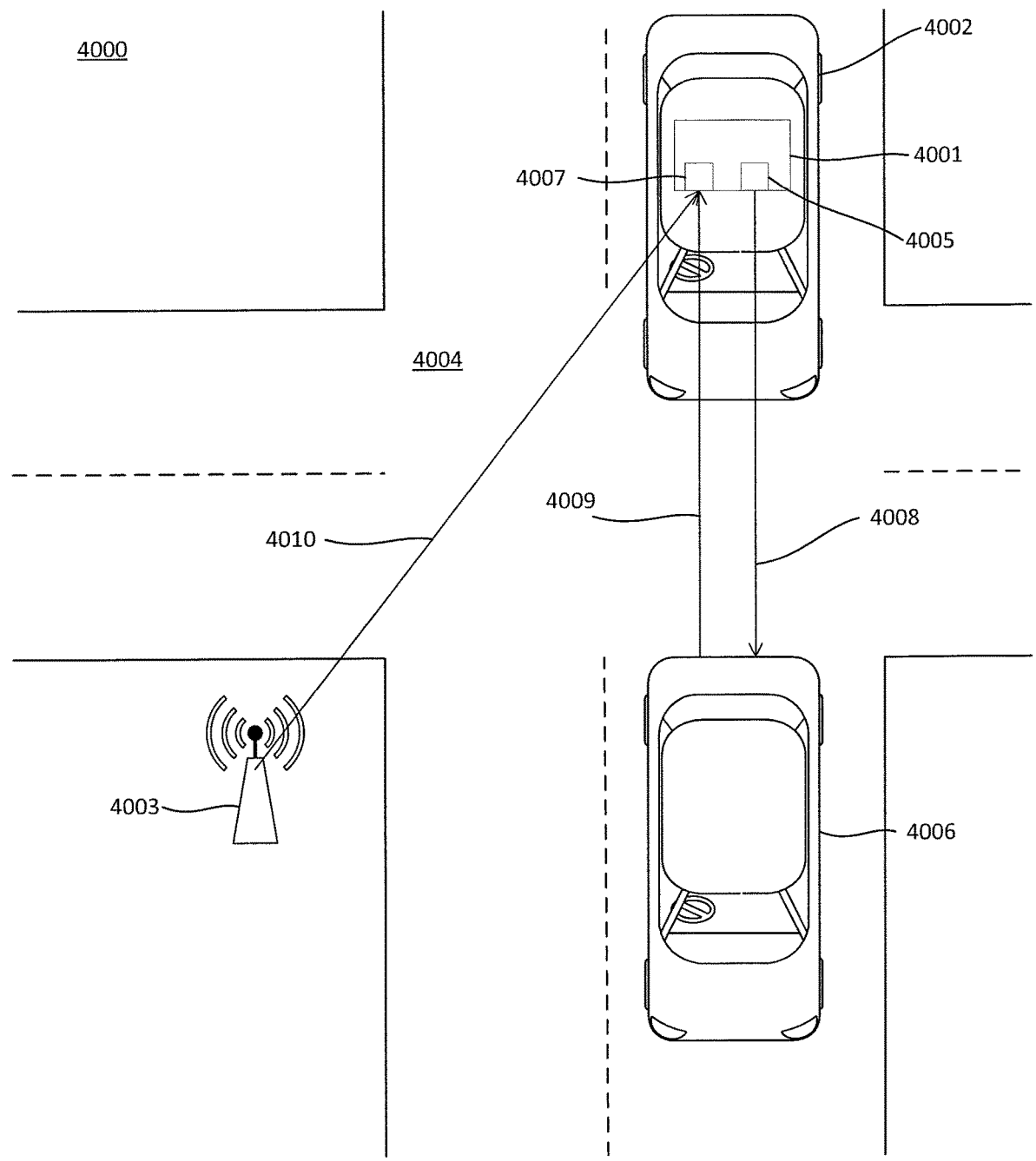
FIGS. 40A-40B are schematic illustrations of an example of a traffic control system and dual usage beacon system deployed in an intersection consistent with the disclosed embodiments.

FIG. 40A is an illustration of an exemplary dual usage system 4001 mounted on vehicle 4002. A transceiver 4003 of a traffic control system may be located in the vicinity of intersection 4004. The at least one transceiver 4003 may be configured for mounting on at least one of a traffic light, a lamp post, or a billboard. In some embodiments, the transceiver 4003 is included together with at least one receiver of the traffic control system in a transceiver configuration. In some embodiments, transceiver 4003 may be a separate transmitter and receiver.

In the depicted exemplary configuration, beacon 4005 of system 4001 may emit an electromagnetic signal. The electromagnetic signal may be reflected off another vehicle 4006, traveling ahead of vehicle 4002. The reflected signal may be detected by antenna 4007 of system 4001. The processor of system 4001 may receive input indicative of the reflected signal from antenna 4007, and thus may determine information about vehicle 4006 including its relative distance from vehicle 4002, its velocity, size, and the like.

In some embodiments, antenna 4007 may be capable of detecting non-reflected electromagnetic waves emitted by transceiver 4003. The transceiver 4003 may be configured to transmit message signals including information about the environment of vehicle 4002 to antenna 4007. For example, the traffic control system may transmit data such as dynamic map information, traffic condition information, or other information about the surroundings of vehicle 4002. In some embodiments, the message sent by transceiver 4003 may include location information for a plurality of road users in an environment of the vehicle. Information from the traffic control system may allow the processor, e.g., processor 3903, of system 4001 to determine an action to take. In some embodiments, the transceiver 4003 may use dynamic map information such that the message includes location information specifying a virtual lane marking associated with a road.

In some embodiments, emitted signal 4008 may be reflected by an object in the path of vehicle 4002, e.g., vehicle 4006. Information from the reflected signal 4009 may enable the processor of system 4001 to determine various characteristics associated with vehicle 4006 (e.g., location, range information, speed, direction of travel, relative velocity, relative acceleration, etc.). In some cases, such information may be determined based on a single reflected pulse. In other cases, such information may be determined by monitoring signals reflected from vehicle 4006 over a period of time.

Signal 4010 transmitted by transceiver 4003 may contain a variety of information or commands for use by systems associated with vehicle 4002. For example, there may be an area of congestion ahead that vehicle 4002 cannot detect. Transceiver 4003 may send a message containing traffic condition information from the traffic control system to the vehicle 4002. In some embodiments, the message may include a command configured to automatically alter operation of the vehicle. For example, the command may be a braking command configured to automatically apply a brake of the vehicle or may be a steering command configured to automatically steer the vehicle.

In response to receiving the message, the processor may cause the host vehicle 4002 to decelerate in anticipation of vehicle 4006 braking before the congestion. In another embodiment, the message received from transceiver 4003 may include an informational message configured to be broadcast to a driver of the vehicle after receipt of the message. The informational message may be at least one of a textual message, a graphical message, an audible message, or a tactile message. For example, the processor may cause the vehicle 4001 to provide a video display (e.g., with text or graphics), output an audio message, or transfer a tactile sensation to the vehicle operator alerting the operator that he may have to slow down or stop and informing the operator of the traffic ahead.

In some embodiments (as described elsewhere in more detail), the traffic system may include a plurality of spatially separated transmitters and/or transceivers. In some embodiments, the second signal may be representative of non-reflected electromagnetic signals including a plurality of electromagnetic signals received from a plurality of spatially separated transmitters. In such cases, the processor may be configured to determine distances between the host vehicle 4002 and each of the plurality of spatially separated transmitters based on the plurality of electromagnetic signals received from the plurality of spatially separated transmitters. In some embodiments, the processor of system 4001 may be further configured to determine a location of the vehicle based on the determined distances between the vehicle and each of the plurality of spatially separated transmitters.

Figure 40B:
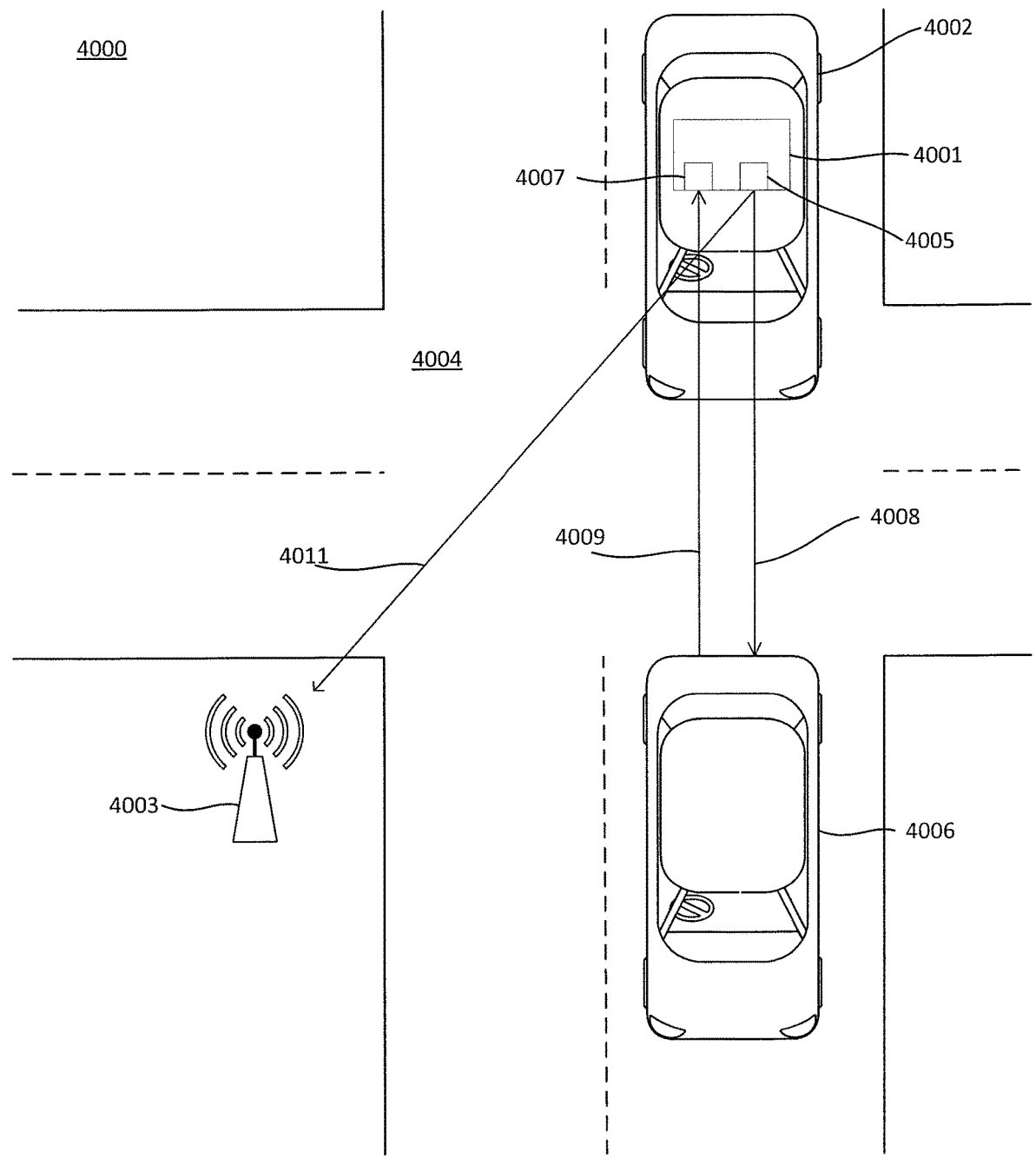

FIG. 40B is an illustration of another exemplary dual usage system 4001 mounted on vehicle 4002. In this embodiment, beacon 4005 may be configured to transmit a message 4011 to transceiver 4003 of a traffic control system. The message 4011 may include information about the vehicle 4002 itself, or about objects in the environment of the vehicle 4002, e.g., vehicle 4006.

In some embodiments, antenna 4007 may receive a reflected signal 4009, and the processor of system 4001 may determine information about the environment. For example, processor 4001 may determine, based on reflected signal 4009 (or by monitoring reflected signals over time), various characteristics associated with objects in the host vehicle environment, such as vehicle 4006. In some cases, message 4011 may be generated to include information regarding the determined characteristics of these objects. For example, based on the received reflected signal(s), processor 4001 may determine the relative acceleration of vehicle 4006, the relative velocity of vehicle 4006, the relative distance of vehicle 4006 from vehicle 4002 (e.g., range information), a relative direction to or orientation of vehicle 4006, vehicle size, etc. In some embodiments, the message 4011 may include any or all of this information determined based on the reflected signals. In some cases (e.g., in systems including high resolution lidar), other information may be detected based on the reflected signals (e.g., license plate number, vehicle make and/or model, vehicle type, etc.), and this information may be included in message 4011. In still other cases, message 4011 may be augmented with information obtained using one or more additional sensors associated with vehicle 4002. Such information may include images obtained from one or more image capture devices, vehicle speed (from a speedometer, GPS, etc.), pitch/yaw/roll information (e.g., from an inertial motion sensor), vehicle location (GPS), or any other type of information supplied by any sensors available to vehicle 4002. Messages 4011 may be transmitted to transceiver 4003 via the dual use beacon of vehicle 4002. In some cases, the message may be modulated. The message signal may be transmitted in one or more pulses separate from the beacon signal or may be piggy-backed on the beacon signal.

In some message 4011 may include information about host vehicle 4002. For example, such information may include information identifying a class of vehicles to which the vehicle 4002 belongs, e.g., a bus, an ambulance, a semitrailer, or a car. Such information may be used by the traffic control system, for example, to prioritize certain vehicles, e.g., emergency vehicles, over the others, or to calculate safety distances according to the different vehicle dimension. Additionally or alternatively, the message may include information that identifies the vehicle 4002 as a manually-driven vehicle or as an autonomous vehicle. In other embodiments, beacon 4005 may transmit navigational data from vehicle 4002. In other embodiments, the message may include, for example, an ID number unique to vehicle 4002, license plate information, registration information, engine number, chassis number, or other unique identifiers. In other embodiments, the beacon 4005 may transmit a message including information indicating a destination of the vehicle 4002 or planned route of the vehicle.

Figure 41A:
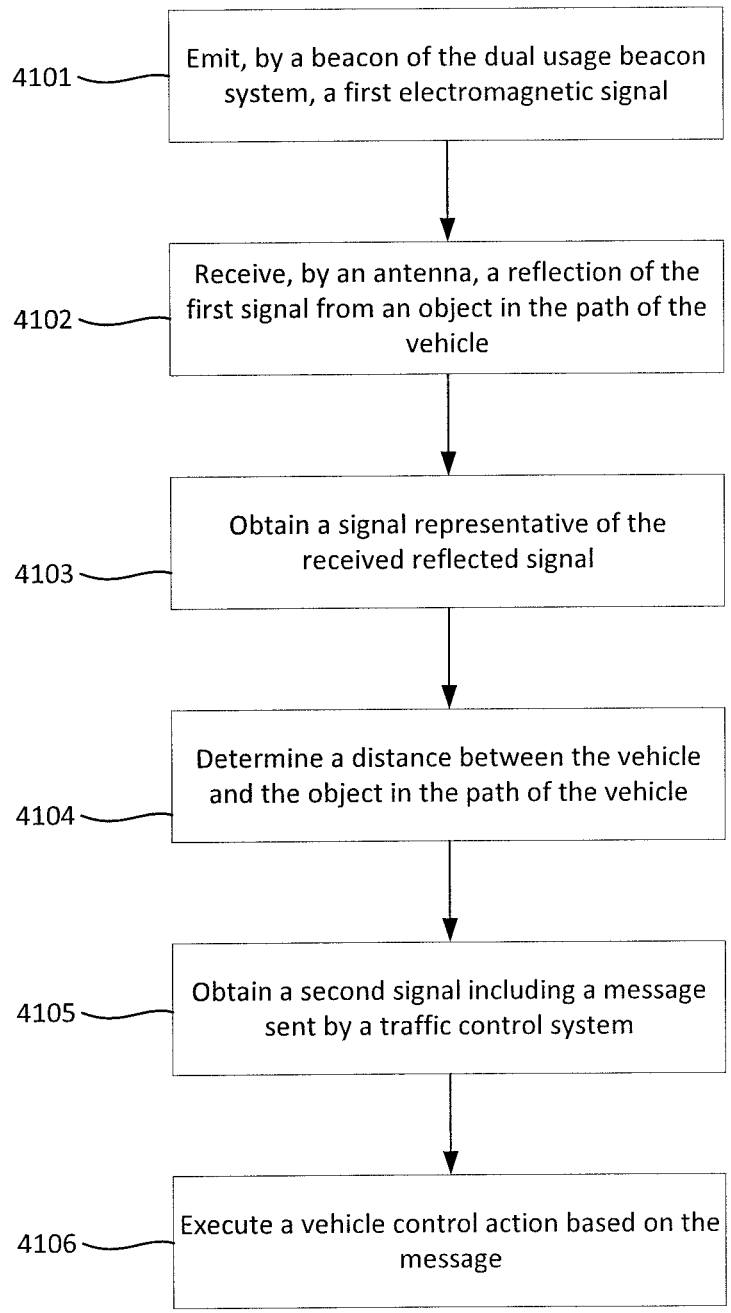
FIGS. 41A-41B are a flow charts of a process for using a dual usage beacon system consistent with the disclosed embodiments.

FIG. 41A is an exemplary process 4100 for using a dual usage beacon system, e.g., system 3900 or 4001, of a vehicle, e.g., vehicle 4002.

At step 4101, a beacon of the dual usage beacon system emits a first electromagnetic signal.

At step 4102, an antenna of the dual usage beacon system receives a reflection of the first electromagnetic signal from an object in a path of the vehicle.

At step 4103, a processor of the dual usage beacon system obtains, from the antenna, a signal representative of the received reflection of the first electromagnetic signal.

At step 4104, the processor determines a distance between the vehicle and the object in a path of the vehicle based on the signal representative of the received reflection of the first electromagnetic signal. At step 4104, the processor may also determine information about objects including, type of object, class of vehicle, velocity, and the like.

At step 4105, the processor may obtain a second, non-reflected signal received by the antenna (i.e., the antenna of the dual use beacon system). The second signal may be unassociated with the first electromagnetic signal and may include a message sent by a transmitter of a traffic control system.

At step 4106, the processor executes a vehicle control action based on the message. For example, the vehicle control action may include one or more navigational changes. In other embodiments the message may include instructions to provide a prompt or alert to the vehicle operator.

Figure 41B:
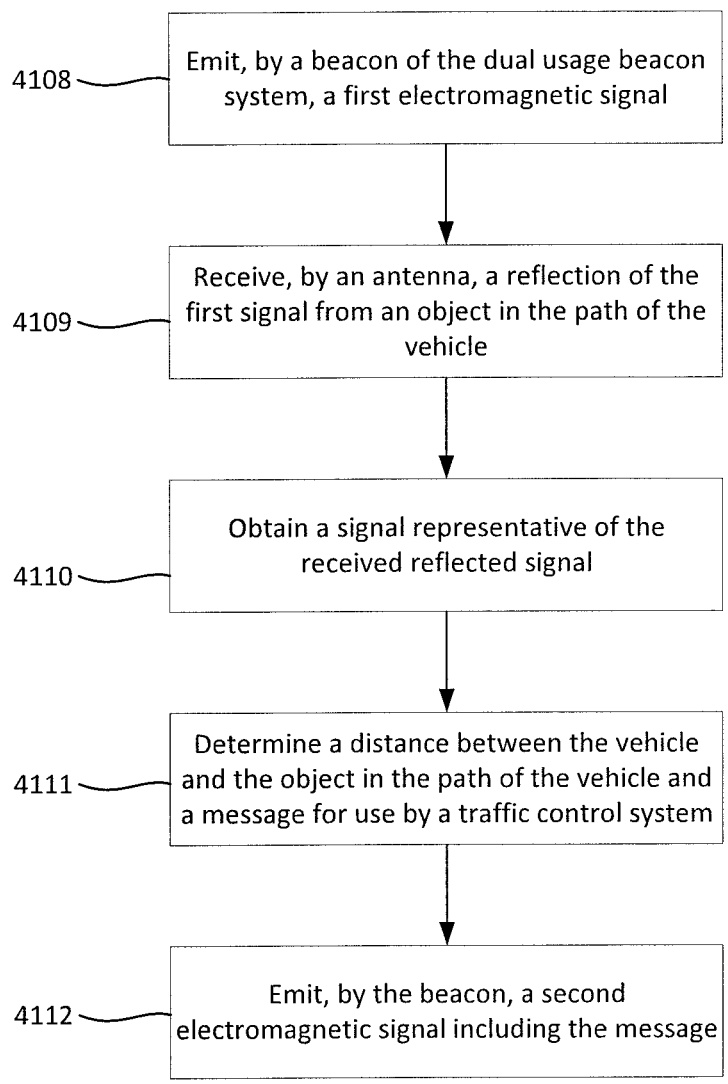

FIG. 41B is another exemplary process 4107 for using a dual usage beacon system, e.g., system 3900 or 4001, of a vehicle, e.g., vehicle 4002.

At step 4108, a beacon of the dual usage beacon system emits a first electromagnetic signal. In some embodiments, the first electromagnetic signal is configured for use in determining a distance between the vehicle and the object in the path of the vehicle.

At step 4109, an antenna of the dual usage beacon system receives a reflection of the first electromagnetic signal from an object in a path of the vehicle.

At step 4110, a processor of the dual usage beacon system obtains, from the antenna, a signal representative of the received reflection of the first electromagnetic signal.

At step 4111, the processor determines a distance between the vehicle and the object in a path of the vehicle and determines at least one message for use by a traffic control system. The message may include information based on the reflected first signal and/or navigation, destination, or classification information about the vehicle.

At step 4112, the processor causes the beacon to emit a second electromagnetic signal including the at least one message.

Transmitter for Non-Autonomous Road Users

While the number of autonomous vehicles present on the roadways in the near future is expected to increase exponentially, there is an expectation that non-autonomous road users will still transit roadways in significant numbers. For example, a long transition period may occur during which roadways will be populated by both autonomous and non-autonomous vehicles. This may be true even while the number of autonomous vehicles continues to grow and the number of non-autonomous vehicles present on the roadways continues to decline. It may also be true because it is expected that at least some number of non-autonomous road users (e.g., cyclists, pedestrians, etc.) may always use the roadways. During this transition period and at other times in the future, the roadway infrastructure may need to be aware of non-autonomous vehicles (and other non-automatically controlled road users) and to take their presence into account when controlling/managing/guiding traffic, including autonomous vehicles. To facilitate identification of these non-autonomous road users, a designated transmitter (e.g., an after-market transmitter device) may be incorporated into manually driven vehicles (or may be worn by pedestrians, etc.) to help the system identify non-autonomous road users in an area of interest.

Figure 42:
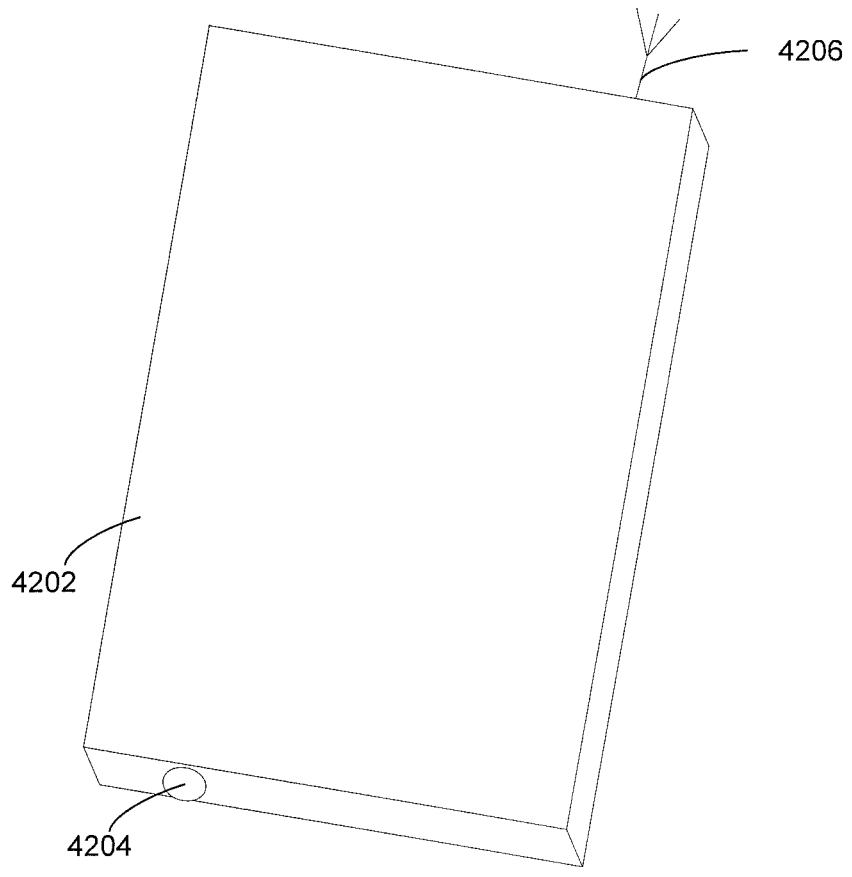
FIG. 42 provides a diagrammatic representation of a transmitter unit for identifying non-autonomous vehicles, consistent with disclosed embodiments.

FIG. 42 provides a diagrammatic illustration of a transmitter unit 4200 according to exemplary disclosed embodiments. As noted, transmitter 4200 may enable a road-vehicle to communicate with a road traffic management system, such as system 100 described above. In some cases, transmitter unit 4200 may include a housing 4202, and an electrical interface 4204 for receiving electrical energy to power the transmitter unit. The transmitter unit 4200 may also include a transmitter (e.g., including antenna 4206) configured to emit modulated electromagnetic signals for detection by road traffic management system 100. Antenna 4206 may include any type of antenna or transmission device. In some cases, antenna 4206 may include a wire antenna, a dipole antenna, reflector antenna, etc. As discussed in further detail below, the modulated electromagnetic signals may be configured to convey information identifying the road-vehicle as a manually-driven vehicle and may enable the traffic management system to monitor movement of the road-vehicle.

Figure 43:
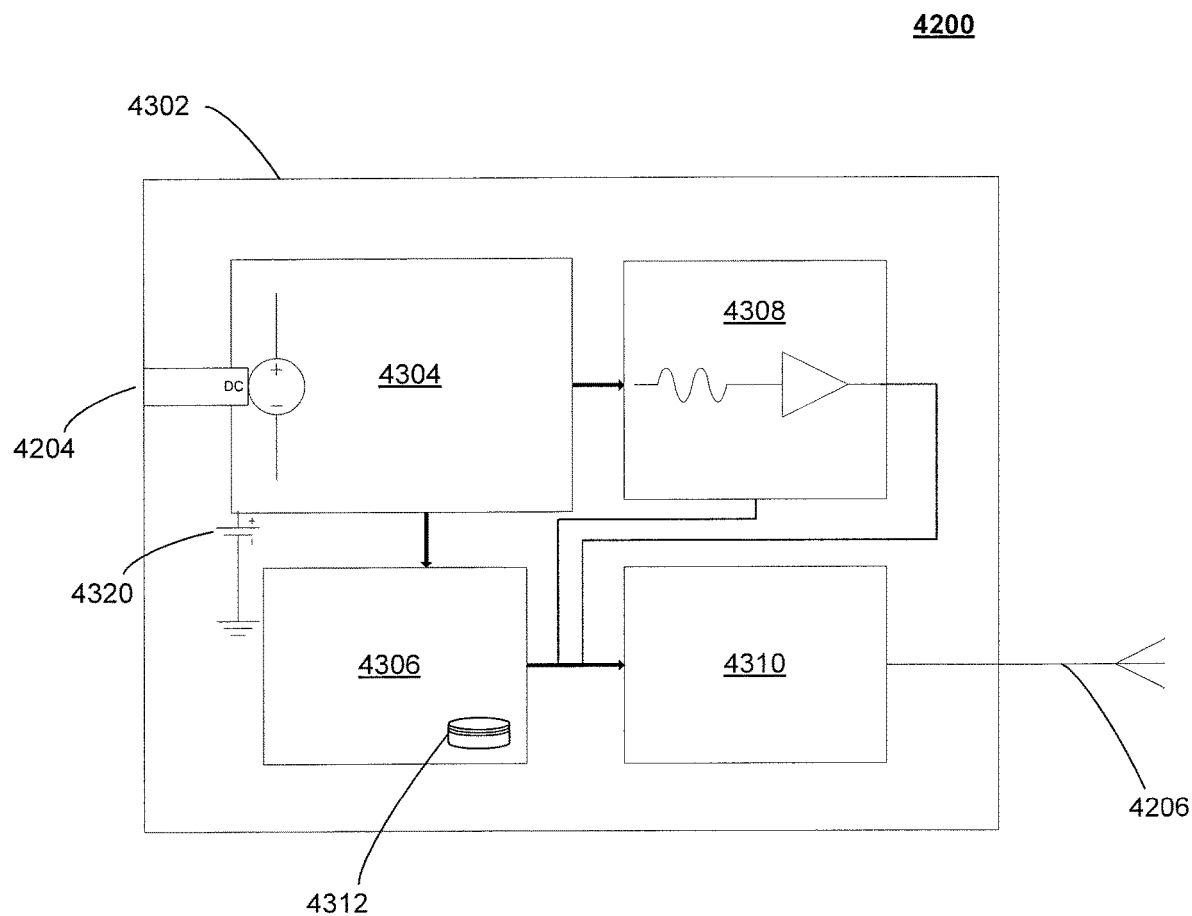
FIG. 43 provides a block diagram representation of a transmission system for identifying non-autonomous vehicles, consistent with disclosed embodiments.

FIG. 43 provides an exemplary block diagram representation of transmitter unit 4200, according to exemplary disclosed embodiments. In some embodiments, transmitter unit 4200 may include a power module 4304 electrically connected to power interface 4204. Power module 4304 may provide power to any or all of the other components of transmitter unit 4200. Such components may include a signal generator 4308, an optional processor 4306, and a transceiver 4310. Signals incoming to or outgoing from transceiver 4310 may be received or emitted by antenna 4206.

Transmitter unit 4200 may be configured for deployment on or together with any type of road user, including non-autonomous road users. In some embodiment, the transmitter unit 4200 may be enclosed in a dedicated housing 4202 and may be made available as an after-market item. For example, a non-autonomous vehicle owner may acquire transmitter unit 4202, connect the transmitter unit to a source of power (e.g., via power interface 4204) and carry the transmitter unit in a non-autonomous vehicle. In some cases, the transmitter unit 4200 may be packed together with mounting hardware such that housing 4202 may be fixedly or removably attached to a portion of the non-autonomous vehicle (e.g., behind a rearview mirror; on a windshield, hood, roof; on a bicycle frame; etc.). In some cases, transmitter unit 4200 may be carried (e.g., in a bag or within a pocket of a pedestrian or cyclist; in the glove box of a vehicle; etc.).

In still other cases, transmitter unit 4200 may be integrated together with a non-autonomous vehicle. For example, in some cases, transmitter 4200 may be mounted to a chassis of a vehicle 4400 (FIG. 44) (e.g., on the roof, under the hood, behind the grill, one or more side panels of the vehicle, in a bumper, etc.). Alternatively, transmitter unit may be mounted together with or formed as an integral part of one or more electronics components included on vehicle 4400. For example, transmitter unit 4200 may be included as part of a vehicle electronic control unit (ECU). In other examples, transmitter unit 4200 may be integrated together with a bicycle frame or electric motor unit for a bicycle.

Transmitter unit 4200 may receive power from any suitable power source. As noted, in some cases, transmitter unit 4200 may include a power interface 4204 configured to convey energy from a road-vehicle to the transmitter unit. Power interface 4204 may include a DC power jack or other type of power port connectable to a DC power supply of a road vehicle (e.g., a 12V power outlet provided on a vehicle, a USB port, etc.). Power interface 4204 may also include a power jack for receiving power from a battery or generator associated with an electric or non-electric bicycle. In other cases, power interface 4204 may be hardwired to one or more sources of power. For example, power interface 4204 may include wiring or other circuit components for connecting to an electrical bus of a vehicle (e.g., a 24V bus, 12V accessory bus, etc.). Power interface 4204 may also be configured to receive power from one or more solar cells associated with a vehicle or one or more batteries associated with a vehicle (e.g., a 12V or 24V battery). Transmitter unit 4200 may also include its own dedicated battery (e.g., internal to housing 4202). In such cases, power interface 4204 may include circuitry for drawing current from the internal battery for powering one or more components of transmitter unit 4200.

Power interface 4204 may be configured to receive DC power. Alternatively or additionally, power interface 4204 may be configured to receive AC power. In such cases, power interface 4204 or power module 4304 may include one or more components for converting AC to DC power (e.g., AC to DC converters; one or more rectifiers; etc.). Power module 4304 may also include one or more logic-based components (e.g., optional microcontroller 4306) or other circuitry to control power intake into transmitter unit 4200. For example, in some cases, transmitter unit 4200 may be disabled (e.g., by switching off electrical current to signal generator 4308) under certain conditions and powered on in other conditions. In some embodiments, transmitter unit 4200 may be configured to be powered by a battery when power from an engine of the road-vehicle is unavailable. For example, when microcontroller 4306 senses that power derived from an engine of the road vehicle is unavailable (e.g., no power appears on power interface 4204; power appears at interface 4204, but one or more sensors indicate that an engine associated with the vehicle is not operational (e.g., engine speed sensor, idle sensor, throttle setting sensor, timing sensor, etc.)), then microcontroller may cause power module 4304 to receive power from an alternative source, such as an integrated battery 4320 or a battery associated with the vehicle. Such power routing may be accomplished through automated control of one or more switches or other controllable circuit components.

In some cases, power interface 4204 may form part of power module 4304. Regardless, either or both of power interface 4204 and power module 4304 may include one or more electronic components configured to regulate and stabilize the DC power supply provided to transmitter unit 4200. For example such components may include voltage regulators, filters, amplifiers, rectifiers, diodes, or any other component suitable for conditioning a voltage signal.

Controller 4306 may be an optional component as some embodiments may not require selective control of the components of the transmitter unit. In such embodiments, when power is available at interface 4204, transmission of a desired signal may be commenced (e.g., by signal generator 4308, transceiver 4310, antenna 4206, etc.). In other cases, however, selective control of one or more components of the transmitter unit may be desired. For example, as discussed above aspect of the power module/power interface may be controlled to selectively receive power from various available power sources, to shut the transmitter down under certain conditions, or to power the transmitter on in other conditions.

In some cases, microcontroller 4306 may be programmed to control one or more other components of transmitter unit 4200. For example in some cases, controller 4306 may be programmed to control transceiver 4310 and/or signal generator 4308 such that modulated electromagnetic signals are emitted from transmitter unit 4200 only during periods of time when both the road vehicle is moving and the engine of the road vehicle is inoperative. For example, electric bicycles may have the option of moving when powered by an electric motor or through manual input by the rider into the bicycle's drivetrain. In such cases, controller 4306 may be programmed such that the transmitter is caused to power on and transmit signals via the antenna 4206 when the electric motor is turned off, but the vehicle is moving under rider-supplied power.

Transmitter unit 4200 may be configured to emit any type of signal that may be used to convey information identifying at least one aspect about a road user (e.g., whether the road user includes or is associated with a non-autonomous vehicle). In some cases, transmitter unit 4200 may emit modulated electromagnetic signals for detection by a road traffic management system (e.g., system 100). Modulated signals emitted by transmitter unit 4200 may include any suitable modulation scheme for encoding information. The modulation may include frequency modulation, amplitude modulation, phase modulation, or any combination thereof. Modulation of the emitted signals may include analog or digital modulation. In some embodiments, the transmitter 4200 may provide secure V2X communication. It may include a transmitter (e.g., an optimized IEEE802.11p modem), ultra-low-latency V2X Hardware Security Module (eHSM), one or more hardware acceleration engines, etc. In addition, transmitter unit 4200 may support IEEE 802.11a/b/g/n/ac to enable external WiFi. Such a feature may, for example, support supplementary value added services.

Any suitable frequency band may be used for signal transmission from transmitter unit 4200. In some embodiments, transmitter unit 4200 may be configured to emit modulated electromagnetic signals within a frequency band between 76 GHz and 81 GHz. In some cases, transmitter unit 4200 may emit more than 500 electromagnetic pulses per second. And, the emitted electromagnetic signals may include at least one feature unique to the transmitter unit. For example, in some embodiments, signal generator 4308 may be configured to generate a signal (e.g., a carrier wave) have a waveform unique to a particular transmitter unit. In other cases, a portion of the encoded information carried by the modulated signal emitted from transmitter unit 4200 may include a unique identifier (e.g., an id code) specific to a particular transmitter unit. The waveform characteristics, unique identifier, or any other information from which the modulated signals may be generated may be stored, for example, in a memory or database 4312 accessible by processor 4306.

In addition to a unique identifier associated with the transmitter unit, any other information may also be conveyed by signals transmitted by transmitter unit 4200. For example, in some cases, the modulated electromagnetic signals transmitted by transmitter unit 4200 may include encoded information that can be received and decoded by one or more components of traffic management system 100. Such encoded information may include a predetermined indicator identifying a road-vehicle as a manually-driven vehicle. For example, an encoded bit may be used in which a 1 indicates a manually driven vehicle. Using this information, system 100 may generate traffic control signals relative to a particular vehicle based on whether it is manually controlled or autonomously controlled. System 100 may also control traffic signals or control the movements of other vehicles in the vicinity of the manually controlled vehicle transmitting from transmitter unit 4200 by virtue of the fact that the vehicle is determined to be manually controlled rather than autonomously controlled. For example, such controls may account for reduced vision capabilities of a manual vehicle driver as compared to an autonomous navigation/driving system that may have access to multiple cameras acquiring images from various areas surrounding a vehicle and/or at multiple focal lengths. Such controls may also account for potential reaction time differences between operators of manually-driven vehicles and computer-based navigation units of autonomous vehicles.

Other information related to a manually-driven vehicle may also be encoded in the modulated signals emitted from transmitter unit 4200. For example, the encoded information may include data specific to the manually operated road-vehicle with which transmitter unit 4200 is associated. Such specific data may include encoded outputs from one or more sensors associated with the vehicle. These sensor outputs may include position information acquired from a GPS receiver; speed information acquired from a speedometer or other speed sensor or speed computing element; pitch, yaw, and/or roll from accelerometers, IMU, etc.; current heading information; etc. The information encoded into the modulated signals transmitted from transmitter unit 4200 may also include information such as the number of occupants in a vehicle associated with the transmitter unit 4200 (e.g., based on seat occupancy sensors, camera output and image processing routines, etc.); or vehicle identification information (e.g., vehicle id, plate number, vehicle type designator, etc.); among other things.

Traffic management system 100 may decode information carried by signals emitted from transmitter unit 4200 and may use this decoded information in managing traffic in a particular area of interest. For example, as noted, determining whether a vehicle is manually driven may impact how system 100 controls traffic signals and other vehicles in the vicinity of the manually driven vehicle. In some cases, for example, traffic management system may change a state of a traffic control sign or signal to accommodate a manually-driven vehicle. For example, a traffic light that would have otherwise remained green for an autonomous vehicle, may be changed to red, and vice-versa.

Additionally, the modulated electromagnetic signals emitted by transmitter unit 4200 may be used by the road traffic management system in determining a velocity of the road-vehicle. For example, as described in other sections of the disclosure, a location of the transmitter unit 4200 (and, therefore, the associated vehicle) may be obtained based on a triangulation technique involving a time of detection of the signals emitted by transmitter unit 4200 at multiple receivers of traffic management system 100. Such location information may be monitored over time to determine a velocity of the vehicle at any point in time, a trajectory of the vehicle etc. Signals emitted by transmitter unit 4200 may also be indicative of a velocity of the vehicle, for example, in view of observed effects of Doppler shifts, etc.

Figure 44:
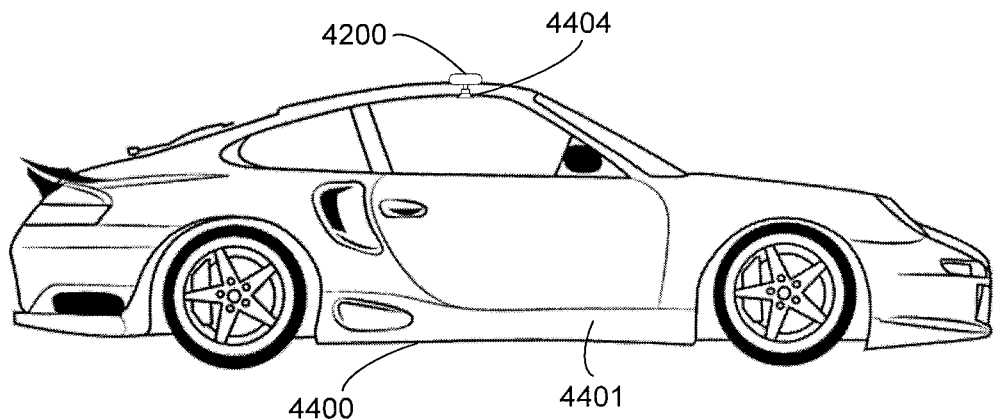
FIG. 44 provides a side view of a vehicle equipped with a transmitter unit for identifying non-autonomous vehicles, consistent with disclosed embodiments.

As noted above, some embodiments may include a transmitter unit 4200 configured for deployment as an integrated component of a vehicle or as an after-market product mountable on a vehicle. For example, as shown in FIG. 44, a vehicle 4400 may include a chassis 4401. Transmission unit 4200 may be integrated with vehicle 4400 or mounted to vehicle 4400 in any suitable location. In some embodiments, transmission unit 42 may be mounted to a roof of vehicle 4400. In other cases, transmitter unit 4200 may be located behind a rearview mirror, on a window, on the windshield, etc. or may be simply carried inside of the vehicle. And, in some cases, transmitter unit 4200 may be integrated together with other vehicle electronics, such as the vehicle ECU. Transmitter unit 4200 may be mounted to or integrated with any type of manually-driven vehicle, including, for example, vehicle 4400, a truck, motorcycle, bicycle, electric bicycle, etc.

In addition to generating the modulated electromagnetic signals for transmission from transmitter unit 4200, transceiver 4310 may also include a receiver function for receiving and decoding signals received via antenna 4206. In some cases, the received signals may originate from a traffic management system (e.g., system 100) and may include information to be conveyed to an operator of a manually driven vehicle associated with transmitter unit 4200. For example, in some cases, transceiver 4310 may receive signals indicative of one or more warnings to be conveyed to the vehicle operator. Such warnings may include messages for display on one or more screens included in vehicle 4400. For example, receipt of an indicator of a warning of a potential collision may result in a warning message being displayed on a navigation display unit of vehicle 4400, illumination of one or more warning lights, changing a state of a heads up display, etc. Such warning information for display may be conveyed from transmitter unit 4200 to one or more control units associated with vehicle 4400 either wirelessly (via antenna 4206, through a Bluetooth connection, etc.) or may be communicated via a wired connection.

In some cases, warning indications received from a traffic management system via transceiver 4310 may be converted to audio signals and reproduced to an operator of vehicle 4400. For example, in some embodiments, vehicle 4400 may be equipped with a speaker 4404 configured to convey audible warnings or other information to the operator of vehicle 4400 from traffic management system 100.

Dispatching Emergency Services

An aspect of the disclosure is directed to a system for monitoring road traffic, consistent with embodiments of the disclosure. In some cases, the system may be configured to determine, based at least in part on signal information received from road users, that at least two of the road users have been involved in an accident. In such cases, a report relating to the accident may be forwarded to an emergency dispatch system.

Figure 45:
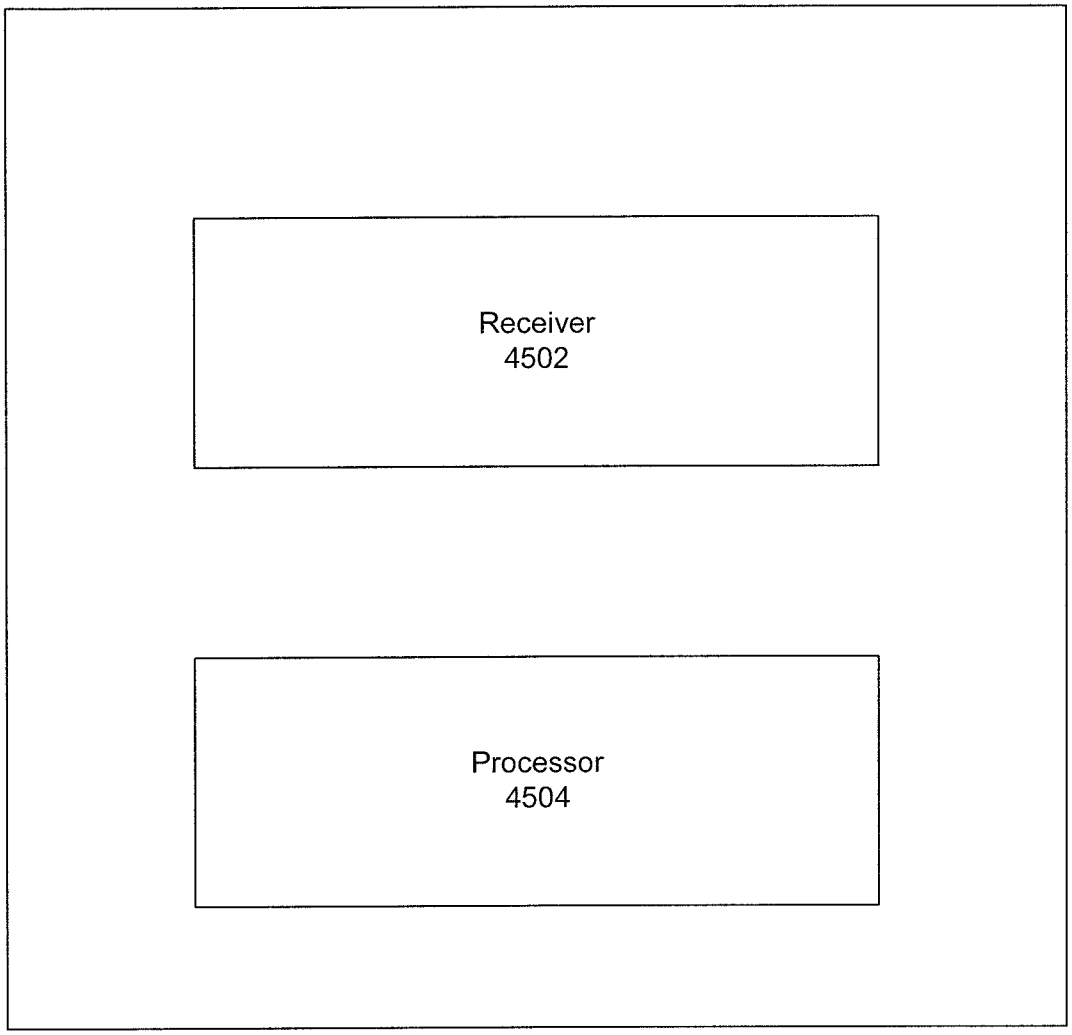
FIG. 45 provides a diagrammatic illustration of a system for monitoring road-vehicle traffic, consistent with embodiments of the disclosure.
Figure 46:
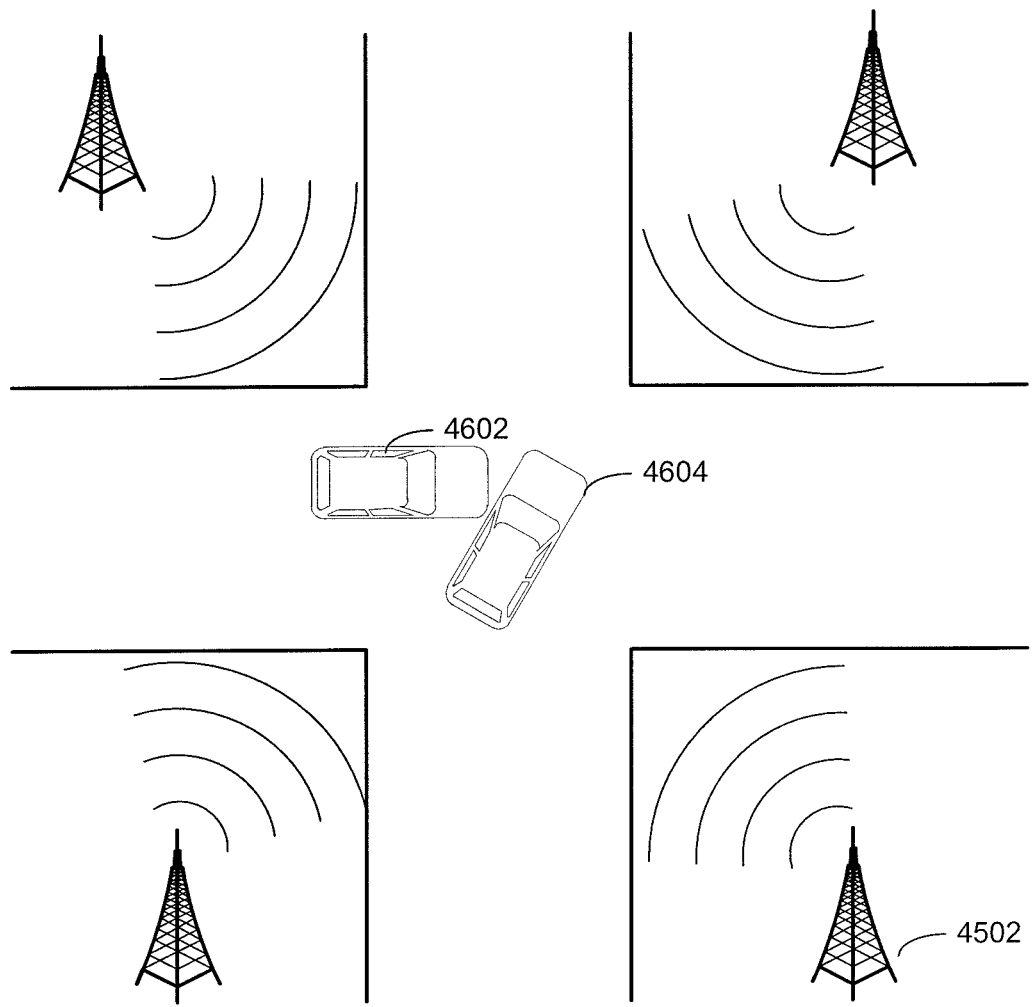
FIG. 46 provides a diagrammatic illustration of an exemplary schematic diagram of monitoring road-vehicle traffic, consistent with embodiments of the disclosure.

FIG. 45 illustrates an exemplary schematic diagram of a system 4500 for monitoring road-vehicle traffic, consistent with embodiments of the disclosure. System 4500, as an example of local system 100 described above, can include at least one receiver 4502 and at least one processor 4504. The at least one receiver 4502 may be similar to or the same as receiver 110 described with reference to FIG. 1. Receiver 4502 can be fixedly positioned in a vicinity of an area of interest on a roadway and may be configured to detect a plurality of non-reflected electromagnetic emissions originating from road users moving in the area of interest. FIG. 46 provides a diagrammatic illustration of an exemplary arrangement of receivers for monitoring road-vehicle traffic in the vicinity of an intersection. As shown in FIG. 46, four receivers 4502 are positioned in the vicinity of an intersection. Two vehicles 4602 and 4604 constitute road users that have just had an accident at the intersection. It is appreciated that the road users can be any type of road user, including, for example, a pedestrian, a vehicle, a motorcyclist, and the like. As discussed above, each road user can generate non-reflected electromagnetic emissions from the vehicles' radars, cellular phones, and/or other electronic equipment and devices associated with each particular road user. For example, a pedestrian can carry a wearable device generating non-reflected electromagnetic emissions, such as a cellular phone or smart watch. Device vehicle may transmit signals associated with a radar, lidar, etc. And in some other examples, a road user may be associated with one or more transmitters configured to transmit unique identification information (e.g., plate numbers, whether a vehicle is or is not autonomously operated, serial numbers, etc.) to receivers 4502. Receivers 4502 in the vicinity of the intersection may detect such non-reflected electromagnetic emissions originating from road users moving in the area of interest.

One or more processors associated with a road traffic monitoring system (e.g., system 100) may be configured to determine various road user characteristics based on the received non-reflected electromagnetic emissions (as discussed elsewhere in more detail). For example, Processor 4504, which may be the same as or similar to controller 120 described with reference to FIGS. 2 and 3, may receive signal information from one or more of receivers 4502. The signal information can be representative of the plurality of non-reflected electromagnetic emissions. For example, the non-reflected electromagnetic emissions can be received and transformed into electric signals. The electric signals can be further processed to generate the signal information. It is appreciated the electric signals can be digital signals or analog signals. In some embodiments, the signal information can reflect information or may contain effects associated with the Doppler Effect, phase difference, or a time difference between one or more non-reflected electromagnetic emissions.

Based on the signal information representative of the plurality of non-reflected electromagnetic emissions, processor 4504 may determine instantaneous velocities and locations of a plurality of road users. As discussed above and in other sections of the disclosure, the location and the velocity (among other attributes) of a road user on the roadway may be determined based on received non-reflected EM emissions. Such determinations may take advantage of, for example, the Doppler Effect, phase differences between emissions, or time differences associated with the identified electromagnetic waveform of each road user.

Processor 4504 may further determine, based on the determined instantaneous velocities and locations of at least two of the plurality of road users (or based on relative accelerations, heading directions, etc. determined for a particular instant or monitored over a period of time), that a at least two road users have been involved in an accident. With the rapid development of computation technologies, the determination of the accident can be substantially in real-time. In some embodiments, processor 4504 can determine respective trajectories of the at least two road users, and determine whether the trajectories cross within a given period of time. An accident may be determined if the determined trajectories intersect with one another at a time or within a time window when two or more road users are determined to be near to or present at the intersection of the trajectories.

In some cases, it may be possible that a signal source generating non-reflected electromagnetic emissions can be catapulted away from the road users as a result of a collision. For example, when the pedestrian is hit by a vehicle, a phone or wearable device carried by the pedestrian can be thrown from the pedestrian. In some cases, such motion may result in an abrupt change in the trajectory or movement characteristics of the signal emitter (e.g., velocity, direction of movement, acceleration, etc.). Such changes may be relied upon to determine an occurrence of a collision with a road user. In other cases, after a collision, a signal emitter thrown from a road user may continue along a trajectory similar to its original trajectory prior to the collision (e.g., due to inertia). Even in such cases, however, a collision may be detected, e.g., based on a determination of where and when two or more road user trajectories cross one another.

In some cases, processor 4504 may further determine an area of impacted by a detected accident. In such cases, at least one action may be executed to prevent a possible collision between other road users and the at least two road users determined to be involved in the accident.

Processor 4504 may also be configured to generate one or more responses to a detected accident between two or more road users. For example, in some cases, in response to a detected accident, processor 4504 may automatically generate and forward a report of an accident to an emergency dispatch system. In response, an emergency bus (e.g., an ambulance) can be dispatched to the accident site immediately after the accident is determined.

Processor 4504 may acquire various details regarding the detected accident and may forward any or all of this information to the emergency dispatch system as part of the automatically transmitted report. In some cases, in addition to information derived from received non-reflected emissions, the accident report may be augmented by images captured of the accident site, for example, by a traffic camera. Such images may enable a receiving system to extract information about the accident either manually or automatically through image analysis techniques.

In the report, processor 4504 may include information such as, but not limited to, a number of road users involved in an accident, the accident location, the types of road users involved (e.g., vehicles, pedestrians, etc.), speeds at which the accident occurred, relative accelerations at the time of the accident, etc. In some cases, processor 4504 may estimate a severity of the accident and forward the report to the emergency dispatch system (e.g., when the severity of the accident exceeds a predetermined threshold). In some embodiments, the severity may be determined based on a number of road users involved in the accident, a speed of each road user when the accident happens, a type of each road user (e.g., a pedestrian, a vehicle, and a motorcyclist), and the like. For example, an accident involving three road users may be associated with a higher severity than the one involving two road users.

In other cases, a number of passengers in vehicles involved in an accident may be estimated. For example, when the road user is a vehicle, processor 4504 may determine a number of passengers associated with the vehicle, for example, based on a number of detected devices emitting electromagnetic signals from the vehicle (e.g., cell phones, wearable devices, etc.). When a vehicle having more than one passenger is involved in an accident, the accident can be estimated with a higher severity than the one with only one passenger. In such cases, processor 4504 may include in the report an estimation of a number of people that may need medical attention.

In some embodiments, at least one processor 4504 can access stored data defining roadways in the area of interest. The stored data can include map data and regulatory data. The map data can provide information of roads in the area of interest, facilities in the area of interest (e.g., hospitals, emergency centers, and the like), traffic volume through the intersection, road markings on roads in the area of interest, and the like. The regulatory data can include regulatory associated with roads, traffic lights, road markings, and the like. Based on the stored data including the map data and the regulatory data, at least one processor 4504 can determine which of the at least two vehicles involved in the accident is responsible for the accident.

In addition to generating and forwarding an accident report to an emergency dispatch system, processor 4504 may take additional actions to assist with an emergency response. For example, processor 4504 may direct traffic in the area of interest (e.g., an area including and/or surrounding the accident site) to give priority to an emergency vehicle on route to the accident. In some embodiments, processor 4504 may initiate a traffic management action after identifying the accident. The traffic management action may facilitate transport of emergency personnel to the accident site. For example, in some cases, the traffic management action may include a change to a state of a plurality of traffic signals. The signals along the emergency vehicle route may remain green, while signals associated with intersecting routes may remain red while one or more emergency vehicles is on route. Additionally, traffic signals controlling flow of road users toward the accident site may be controlled (e.g., changed to red) to reduce or block a flow of road users toward the accident site. As a result, traffic volume through the accident site can be minimized to avoid chain accidents and congestions due to the accident. Processor 4504 may also control signals to facilitate transport of accident victims to hospitals, etc. For example, based on the stored data, processor 4504 may determine a route between an accident site and a nearest hospital, acquire information relating to traffic lights along the route, and alter the traffic lights so that an ambulance can arrive at the accident site as quickly as possible and/or transport victims to the hospital as quickly as possible.

Further, the generated traffic management action can include the generation and transmission of a vehicle control signal to at least one of the vehicles driving in the area of interest. The control signal can cause a human-perceptible message to be delivered to a driver of the at least one vehicle. For example, a short message service (SMS) can be activated to send messages to vehicles in the vicinity of the accident site, so that these vehicles can be alerted of the accident. It is appreciated that the human-perceptible message can be an audio message, a text message, graphical message (e.g., warning symbol, etc.), or any form that can be perceived.

In some embodiments, the traffic management action can include generation and transmission of a control signal or an information signal for causing a change in at least one navigational aspect of at least one vehicle driving in the area of interest. Such a control signal can e.g., automatically alter an operation of the at least one vehicle without user intervention. For example, for a vehicle in a near vicinity of the accident (e.g., within a range of 20 meters), the vehicle can be slowed down until being slowed or fully stopped and/or a heading direction may be changed. Therefore, a risk of chain accidents can be minimized. In addition to control signals configured for execution by navigational systems of receiving vehicles, the transmitted signals may convey information regarding a particular accident site or may include a request for altering a navigational path or speed. In such cases, one or more control systems of the receiving vehicle may generate their own control signals and may implement navigational responses based on the received information or request.

Figure 47:
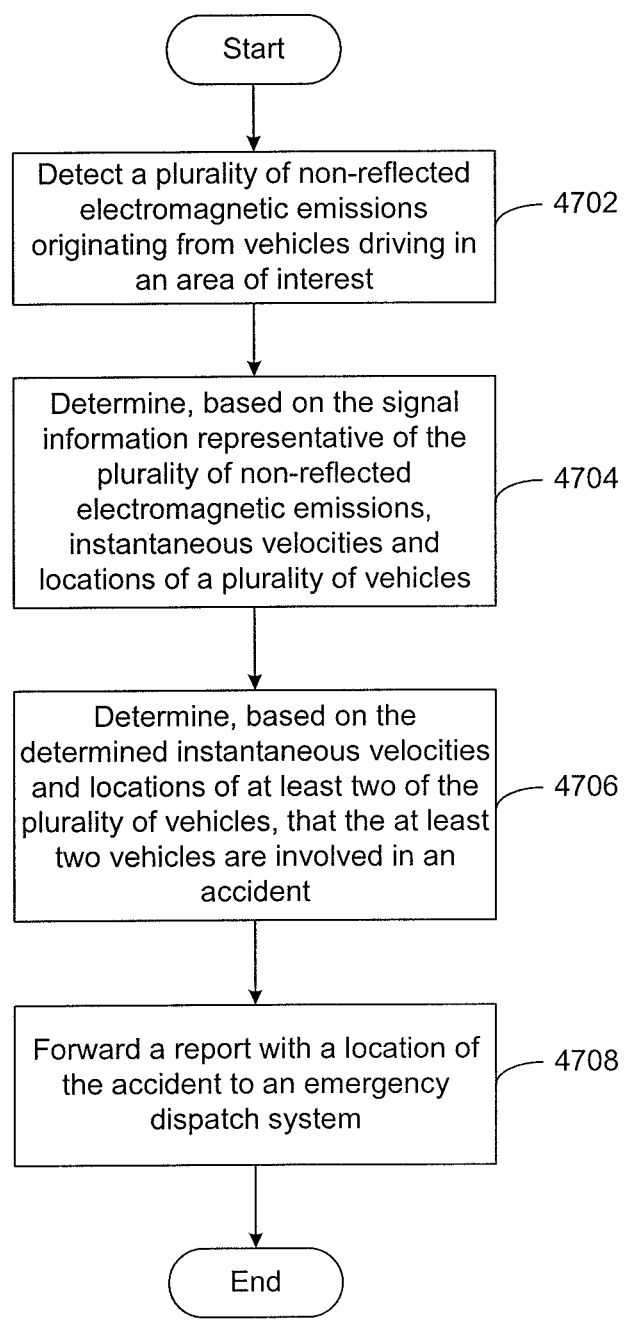
FIG. 47 is a flowchart of a method for monitoring road-vehicle traffic, consistent with embodiments of the disclosure.

Another aspect of the disclosure is directed to a method for monitoring road traffic, consistent with embodiments of the disclosure. FIG. 47 is a flowchart of a method 4700 for monitoring road-vehicle traffic, consistent with embodiments of the disclosure. Method 4700 can include steps 4702-4708, as described below.

In step 4702, a plurality of non-reflected electromagnetic emissions originating from road users in an area of interest can be detected, for example, via system 4500. System 4500 can process the plurality of non-reflected electromagnetic emissions, and receive signal information representative of the plurality of non-reflected electromagnetic emissions. The road users can include at least one of a pedestrian, a vehicle, a motorcyclist, and the like. For example, a pedestrian can carry a wearable device generating non-reflected electromagnetic emissions, such as a smart watch. When at least one vehicle and the pedestrian are involved in an accident, the non-reflected electromagnetic emissions originating the wearable device associated with the pedestrian and the at least one vehicle can be detected, and used to determine that the at least one vehicle is involved in the accident with the pedestrian.

After the accident is determined, at least one action can be executed to prevent a possible collision between other road users and the at least two road users determined to be involved in the accident.

In step 4704, based on the signal information representative of the plurality of non-reflected electromagnetic emissions, instantaneous velocities and locations of a plurality of road users can be determined.

In step 4706, based on the determined instantaneous velocities and locations of at least two of the plurality of road users, it can be determined that the at least two road users are involved in an accident. In some embodiments, in the plurality of non-reflected electromagnetic emissions, an electromagnetic waveform associated with each of the plurality of road users can be identified, and at least one of a Doppler effect, a phase difference, or a time difference analysis can be used to determine velocities, trajectories, locations, etc. of road users involved in the accident or about to be involved in a potential accident.

In some embodiments, stored data defining roadways in the area of interest can be accessed. The stored data includes map data and regulatory data. Based on the map data and the regulatory data, which of the at least two road users is responsible for the accident may be determined (e.g., by determining traffic flow directions, rights of way, speed limits, etc. relative to road user trajectories and speed).

In step 4708, a report with a location of the accident to an emergency dispatch system can be automatically forwarded. In some embodiments, a severity of the accident can be estimated. The severity can be included in the report and the report can be forwarded to the emergency dispatch system when the severity of the accident exceeds a predetermined threshold. In some embodiments, one or more passengers associated with at least two road users (e.g., vehicles) can be determined to be involved in the accident, and an estimation of a number of people that may need medical attention can be included in the report.

In some embodiments, traffic in the area of interest can be directed to give priority to an emergency vehicle (e.g., an ambulance) on route to the accident. Furthermore, a traffic management action can be initiated after identifying the accident. The traffic management action can include altering a state of a plurality of traffic signals. For example, based on the stored data, a route between an accident site and a nearest hospital can be determined, information of traffic lights along the route can be acquired, and the traffic lights can be altered so that an ambulance can arrive at the accident site as fast as possible. The traffic management action can also include sending a vehicle control signal to at least one of the vehicles driving in the area of interest, the control signal being configured to cause a human-perceptible message to be delivered to a driver of the at least one vehicle. The traffic management action can further include sending a vehicle control signal to at least one vehicle driving in the area of interest, the control signal being configured to automatically alter an operation of the at least vehicle without user intervention.

Traffic Incident Re-Creation

Figure 48:
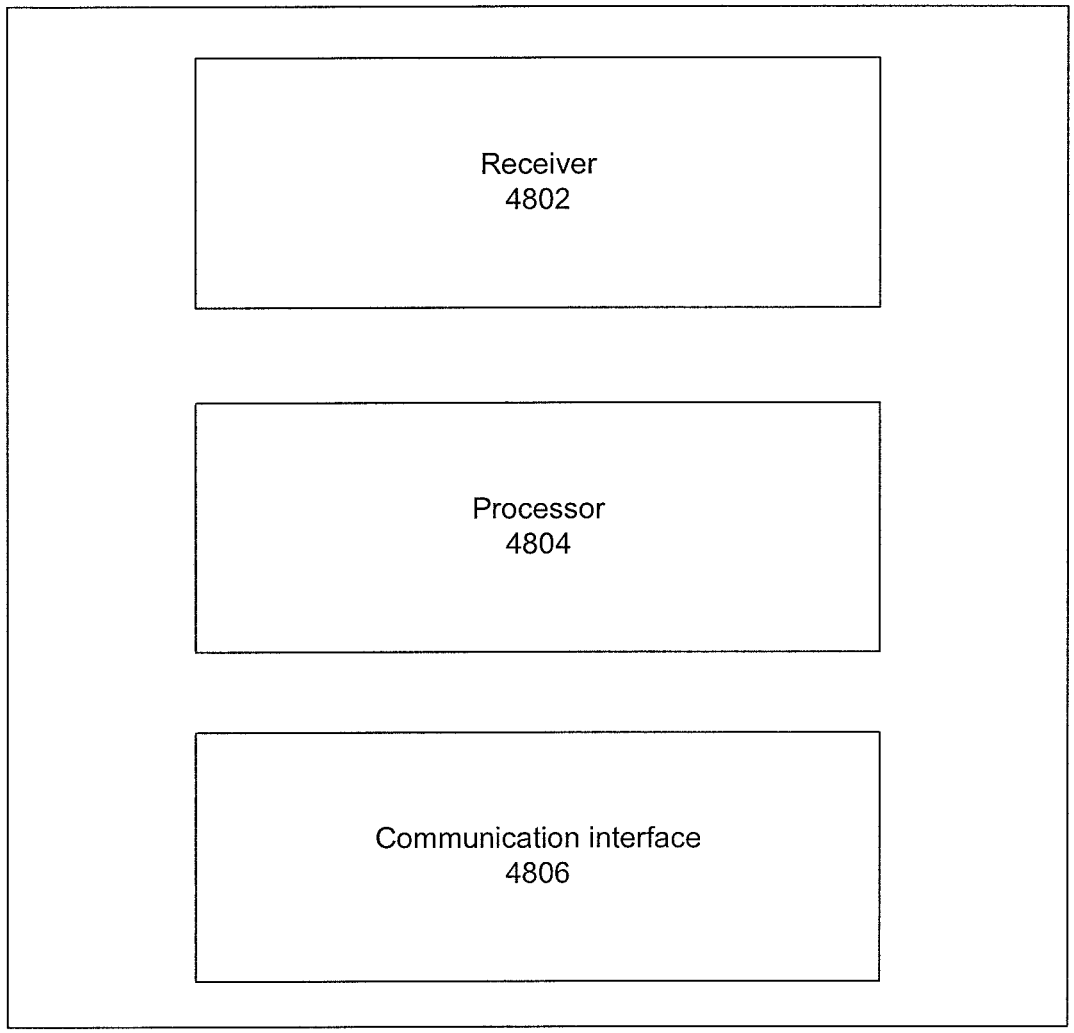
FIG. 48 provides a block diagram representation of a system for re-creating roadway incidents, consistent with embodiments of the disclosure.

Embodiments of the disclosure can be directed to a system for re-creating roadway incidents. FIG. 48 provides a block diagram representation of an exemplary system 4800 for re-creating roadway incidents, consistent with embodiments of the disclosure. System 4800, which may include or may be a part of local system 100 described above, may include at least one receiver 4802 and at least one processor 4804.

Figure 49:
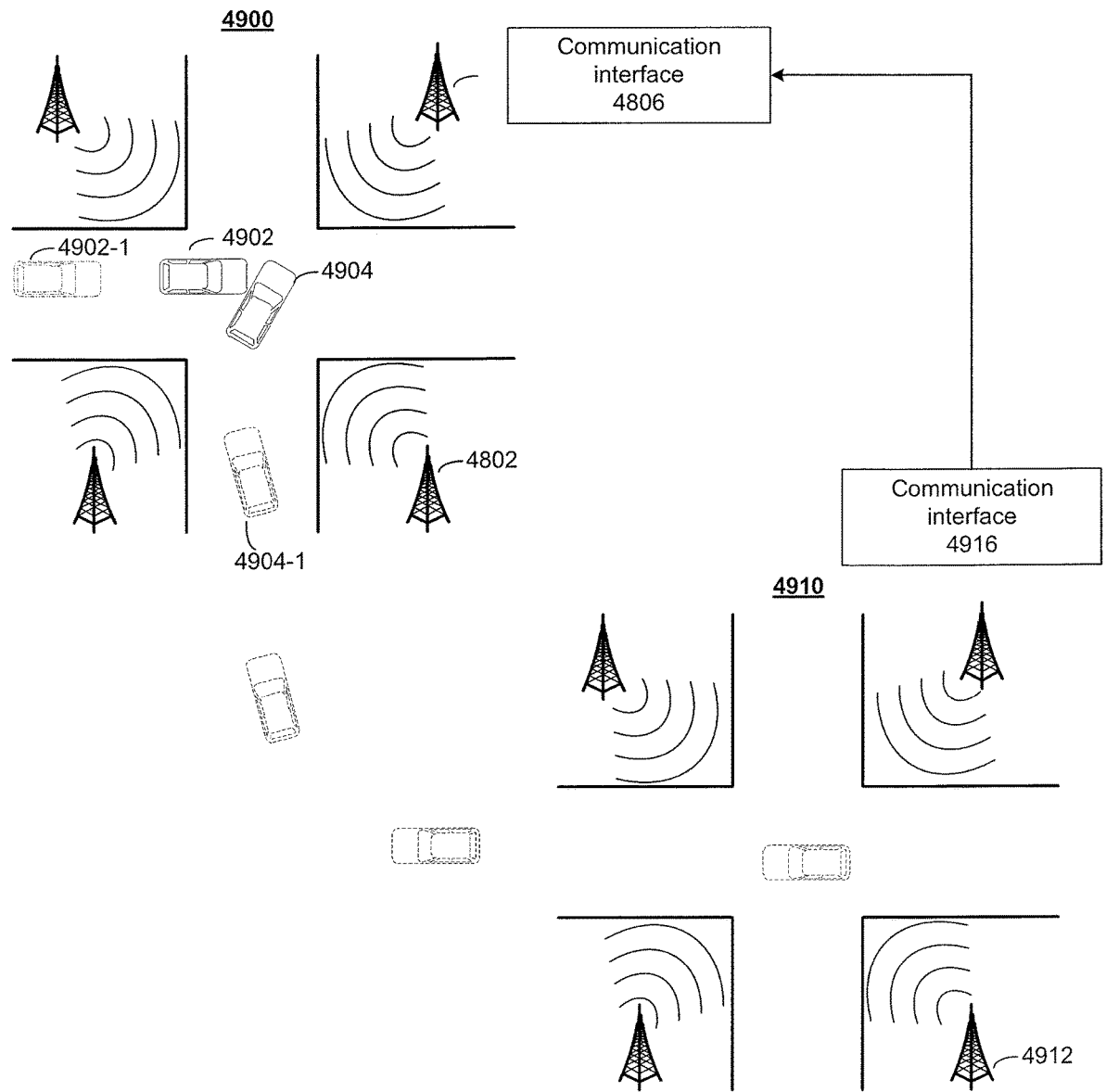
FIG. 49 provides a diagrammatic representation of a roadway incident reconstruction, consistent with embodiments of the disclosure.

Receiver 4802 may be similar to or the same as receiver 110 described with reference to FIG. 1. Receiver 4802 can be fixedly positioned in a vicinity of an area of interest on a roadway and may be configured to detect a plurality of non-reflected electromagnetic emissions originating from road users moving in the area of interest (as described in detail in other sections of the disclosure). FIG. 49 illustrates an exemplary diagram of roadway incident re-creation, consistent with embodiments of the disclosure. As shown in FIG. 49, receiver 4802 may include a plurality of spatially separated receivers (e.g., four receivers 4802) in proximity to the area of interest (e.g., intersection 4900). As shown, two road users constituting vehicles 4902 and 4904 have had an incident at intersection 4900. Four receivers 4802 in the vicinity of intersection 4900 may detect non-reflected electromagnetic emissions originating from the road users moving in the area of interest (e.g., intersection 4900).

It is appreciated that the road users can include at least one of a pedestrian, a vehicle, a motorcyclist, and the like, and the incident can be at least one of an accident, a vehicle failure, a traffic slow down, a traffic jam, or any other type of incident that may occur in or near a roadway. As discussed above, each road user can generate non-reflected electromagnetic emissions from the vehicles' radars, lidars, other types of beacons, cellular phones (e.g., associated with vehicles and/or pedestrians, etc.), other electronic equipment and devices, or any other type of EM emitters. Pedestrian road users may be associated with mobile devices generating non-reflected electromagnetic emissions, such as a mobile phone, a smart watch, and the like. Detecting and tracking the non-reflected electromagnetic emissions from a plurality of road users may include monitoring frequencies in certain bands associated with the EM emitters of road users. In one example, the frequency range of 2.4 gigahertz (GHz) to 2.4835 GHz may be monitored as a frequency band associated with a personal mobile communication devices typically carried by pedestrians.

Processor 4804 may be similar to or the same as controller 120 described with reference to FIGS. 2 and 3. Processor 4804 can receive signal information from receiver 4802 or other receivers present in the system. The signal information can be representative of the plurality of non-reflected electromagnetic emissions. For example, the non-reflected electromagnetic emissions can be received and transformed into electric signals. The electric signals can be further processed to generate the signal information. It is appreciated the electric signals can be digital signals or analog signals. In some embodiments, from the signal information generated in response to received EM emissions, various characteristics of the received EM emissions may be determined. In some cases, such characteristics may include effects associated with the Doppler Effect, a phase difference between two or more received signals, a time difference at which two or more of the non-reflected electromagnetic emissions were received, etc. As described in other sections of the disclosure, such characteristics may be exploited to determine various characteristics associated with one or more road users (e.g., location, direction of travel, velocity, etc.).

In the signal information representative of the plurality of non-reflected electromagnetic emissions, processor 4804 may identify an electromagnetic waveform associated with each of the plurality of road users. As discussed above with reference to FIGS. 2 and 6, the detected electromagnetic emissions of a road user can have an electromagnetic fingerprint that is associated with the road user. In some embodiments, as shown in FIG. 49, the road users having involved in an incident at intersection 4900 may include vehicles, and each vehicle may emit an electromagnetic waveform indicating an identity of the vehicle. For example, each vehicle can be assigned with an unique identity. The identity can be coded into a head field, which can be included with other information that the vehicle may be transmitting. In some cases, determination of an identity of a particular vehicle may involve decoding one or more fields (e.g., a head field) of a data packet received as part of an EM emission transmitted by the vehicle.

Processor 4804 may further determine for each of the plurality of vehicles at least one of a location, speed, and direction, at least in part based the plurality of non-reflected electromagnetic emissions received. For example, in some cases, such information may be determined by associating a specific electromagnetic waveform with a particular vehicle and monitoring a determined location from which the particular waveform was emitted (e.g., based on triangulation or another technique) and monitoring the location over time. As described in other sections of the disclosure, various characteristics of a particular road user (e.g. speed and direction) may be determined based on frequency, phase shifts, Doppler shifts, etc. relative to received EM emissions from the road user.

In some embodiments, processor 4804 may use measurements of the electromagnetic emissions emanating from the plurality of road users as received by the plurality of receivers 4802 to determine the at least one of a location, speed, and direction of the plurality of vehicles. As discussed with reference to FIG. 2, values including the location, the speed, and/or the movement direction of a road user can be determined using the Doppler effect, the phase difference, or the time difference of non-reflected electromagnetic emissions. For example, based on the Frequency Difference of Arrival (FDOA), the location of the road user can be determined based on known locations of receivers 4802, the vector velocities, and the observed Doppler shifts between pairs of receivers 4802.

Processor 4804 may further aggregate and store information about the determined at least one of a location, speed, and direction, for each of the plurality of vehicles that traverse a particular road segment (e.g., an intersection, etc.). As described elsewhere in the present disclosure, road user identifiers may be received via received EM emissions (e.g., encoded identifiers such as plate numbers, registration number, phone number of vehicle occupant or owner, make and model information, vehicle type, etc.). And, the speed, direction, and location of various road users may be determined from the received EM emissions at one or more receivers within a traffic control system. Collecting and storing this information over time may enable creation of a log of road users that traverse a particular road segment over a particular time interval. Not only may the log identify particular road users, but it may also include stored information for each road user including, for example, the location, the speed, the direction, path of travel, etc. associated with each road user in a particular area (e.g., in an intersection). Such information may be useful in accident recreation or recreation of any aspect of the detected traffic flow.

Information gathered for the various road users may be gathered (e.g., determined, sampled, etc.) and logged at any suitable rate. For example, in some embodiments, processor 4804 may store information about the determined location of each of a plurality of road users (e.g., vehicles, pedestrians, etc.) at a sampling rate of between 0.25 second and 1.5 seconds between logged data samples. In other cases, the sampling may be performed at a higher rate (e.g., 5 ms, 10 ms, 50 ms, or up to 100 ms). In some embodiments, the sampling rate may be longer (e.g., greater than 1.5 seconds).

In addition to storing the determined locations, velocities, path of travel, etc. for each road user, the stored information for each road user may include a time indication in which a particular road user (e.g., a vehicle corresponding with a particular identifier) traveled within an area of interest (e.g., an intersection or any other road segment). For example, as shown in FIG. 49, processor 4804 may collect and store information about both vehicles 4902 and 4904, which travel in the area of intersection 4900. Based on this information, which may include locations, paths of travel, velocities, along with timing information (e.g., time stamps for each data log entry), information about how and when road users traversed a particular road segment may be determined. Paths of travel, for example, may be obtained, for example, by extrapolating between logged data points representing sampled road user location and/or motion.

Because the system has the capability of gathering and logging information for a plurality of road users navigating one or more road segments or areas of interest, there is a potential for acquisition of a large amount of data. In some cases, this information may be logged and stored indefinitely. In other cases, some or all of the logged information may be stored only temporarily (e.g., to conserve storage space). For example, in some embodiments, processor 4804 may delete some or all of the stored information after a predetermined period of time. The predetermined period of time can be determined by a user of system 4800 or determined according to regulation or based on any other system requirement. In some cases, the storage and retention policy may be selected based on observed events. For example, in cases where no traffic incidents are detected, a normal acquisition and deletion scheme may be followed. On the other hand, where a traffic incident (e.g., the incident represented by FIG. 49) is detected, storage of acquired traffic information may persist longer than under a normal scheme. For example, information gathered during selected time periods before and/or after a detected incident may be stored indefinitely and not deleted. In some cases, such information gathered and logged before and after a detected incident may be transferred to a predetermined memory or memory location for later access by an incident reconstruction official or automated system.

In some embodiments, the gathered and logged road user information may enable re-creation of the events and movements of road users leading up to and including a detected incident. Such a re-creation may be initiated according to any suitable trigger. For example, in some embodiments, processor 4804 may receive a request, after a roadway incident, to re-create movements of road users on the roadway during a time period associated with the roadway incident. The request may be issued by a user of system 4800 (e.g., an automated function of system 4800 or a system having access to system 4800, a government official, a traffic regulator, an accident investigator, an individual road user, etc.). In response to such a request, system 4800 may generate a log file, video re-creation, etc. detailing the movements of road users during the requested time period. In addition to requests from users of system 4800, an incident re-creation file may be generated automatically. For example, after an incident in a certain monitored road segment is detected (e.g., by detecting crossing paths of motions of two or more road users where the road users are present near or at a common location at a common time or within a certain time window—especially where the crossing trajectories are accompanied by movements or non-movement post-cross indicating a sudden departure from an original trajectory) the system 4800 (e.g., a traffic management center) may automatically generate one or more incident re-creation log files, videos, etc. In some cases, an incident may be automatically identified based on an observed behavior of a road user that departs from an expected behavior (e.g., one or more road users moving significantly below a posted speed limit, which may indicate a traffic jam; at least one road user stopped in a roadway while other road users continue to move around the stopped user, which may indicate a vehicle failure or disabled vehicle; etc.).

As noted, processor 4804 may automatically identify occurrence of a roadway incident involving at least one of a plurality of road users. The automatically detected roadway incident may include at least one of an accident, a collision between one or more road users, a vehicle failure, a traffic slow down, a traffic jam, etc. Upon detection of an incident, processor 4804 may automatically generate an incident log, which may be associated with a particular time period that includes at least some portion of a time period during which the incident was detected. In some embodiments, the time period can cover the whole incident. The time period can be a predetermined period or determined by processor 4804 based on the incident. The incident log may be associated with identifiers corresponding to involved road users. As shown in FIG. 49, vehicles 4902 and 4904 are involved in an accident, and a request to re-create the movements of both vehicles in the area of intersection 4900 can be issued such that a generated incident log includes movements, etc. for each of the identified vehicles 4902 and 4904 involved in the incident. The incident log, or any other type of file for storing movement data associated with road users, may be stored in a memory location for later access by one or more entities or systems.

It is appreciated that, after the accident is identified, processor 4804 may automatically forward a report to an emergency dispatch system. Such an action may ensure that an ambulance or other type of emergency vehicle can be dispatched as soon as possible.

In some embodiments, processor 4804 may use aggregated and stored information, for example, including electromagnetic waveforms specific to road users, to re-create a roadway incident. In some embodiments, processor 4804 may receive a request for re-creation of a roadway incident within a particular time period. In response, processor 4804 may retrieve stored information relating to the detected road users that traversed a particular road segment within the requested time period. Based on the retrieved information (e.g., including a series of locations, velocities, trajectories, or any other logged movement characteristics), an incident re-creation may be generated, wherein the incident re-creation may include a representation of a plurality of road users that traveled within an area of interest during a particular time period. In some cases, the incident recreation may include a data file. In other cases, the incident re-creation may include a graphical component such that a graphical representation (e.g., a video display output) may be shown on a display. For example, as shown in FIG. 49, vehicles 4902 and 4904 are involved in an accident at moment T. Processor 4804 may re-create the accident based on the information stored for a time period including time T. The re-created accident can provide information of both vehicle 4902 and 4904 at, for example, moment T−1, which is earlier than moment T. FIG. 49, for example, illustrates representations of vehicles 4902 and 4904 at time T−1, indicated as 4902-1 and 4904-1 respectively.

It is appreciated that, when the road users include at least one pedestrian, processor 4804 also may determine movements of the at least one pedestrian in the area of interest based on emissions from the personal mobile communications device of the at least one pedestrian. In a similar manner as described above, an incident re-creation may include movements of one or more pedestrians determined to be involved in an incident. The information used in the incident re-creation may include movement information (e.g., detected locations, trajectories, velocities, etc.) for one or more pedestrians traversing a particular road segment.

In some embodiments, processor 4084 may also be configured to analyze movements of one or more road users involved in an incident and, where applicable, assign liability for the roadway incident to at least one of the plurality of road users. For example, based on a re-created accident as shown in FIG. 49, it may be determined based on detected and tracked movements that vehicle 4902 was moving normally and vehicle 4904 was moving erratically or entered intersection 4900 in violation of one or more traffic rules (e.g., a stop sign, a red light (where processor 4902 may also log timing and status for traffic signals based on access to traffic system information). As a result, processor 4804 may determine that vehicle 4904 caused the detected incident and, therefore, liability for the incident may be automatically assigned to vehicle 4904.

The liability determination may also include accessing one or more relevant databases. For example, processor 4084 may access stored data relating to road segments in an area of interest. The stored data may include map data and/or regulatory data associated with the area of interest. The map data can provide information of roads in the area of interest, facilities in the area of interest (e.g., hospitals, emergency centers, and the like), traffic volume through the intersection, road markings on roads in the area of interest, and the like. The regulatory data can include regulatory associated with roads, traffic lights, road markings, and the like. Based on the stored data, processor 4084 may generate a report of the roadway incident, identifying each detected vehicle determined to be not in compliance with accessed regulatory data.

With reference back to FIG. 48, system 4800 may further include a communication interface 4806. Communication interface 4806 may be configured to communicate with at least two pluralities of spatially separated receivers, each plurality of spatially separated receivers being associated with a different area of interest. It may be appreciated that, to re-create movements of at least one of a plurality of vehicles and to determine and assign liability for a roadway incident to that vehicle, information collected from one area of interest may be insufficient. In such situations, communication interface 4806 associated with system 4800 for an area of interest may further receive information from another similar system for another area of interest (or multiple areas of interest). For example, with reference to FIG. 49, communication interface 4806 may receive information from a counterpart communication interface 4916 of another system for intersection 4910. Thus, at least one processor 4804 may be able to re-create movements of at least one of a plurality of vehicles across more than one area of interest. Such a re-creation across multiple areas of interest may contribute to a determination and assignment of incident liability for a particular road user based on detected and tracked movements over multiple regions of interest. For example, the movement of vehicle 4904 from intersection 4910 to intersection 4900 can be re-created as shown in FIG. 49.

Figure 50:
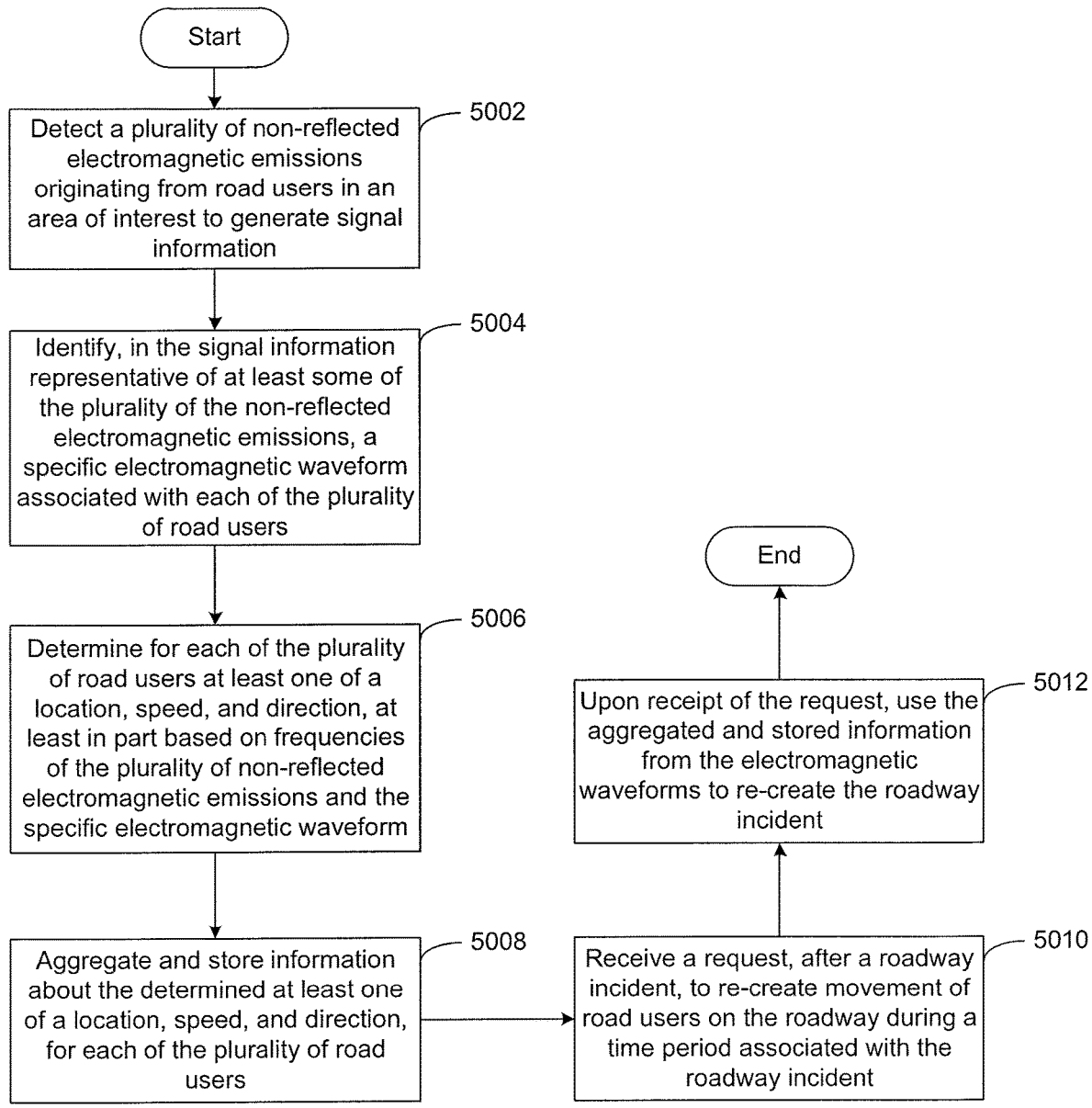
FIG. 50 is a flowchart of a method for re-creating roadway incidents, according to embodiments of the disclosure.

FIG. 50 is a flowchart of a method 5000 for re-creating roadway incidents, according to embodiments of the disclosure. Method 5000 may include steps 5002-5012.

In step 5002, a plurality of non-reflected electromagnetic emissions originating from road users in an area of interest can be detected, for example, via system 4800. System 4800 can process the plurality of non-reflected electromagnetic emissions, and receive signal information representative of the plurality of non-reflected electromagnetic emissions. The road users can include at least one of a pedestrian, a vehicle, a motorcyclist, and the like. For example, a pedestrian can carry a mobile device generating non-reflected electromagnetic emissions, such as a mobile phone, a smart watch, and the like. Therefore, the plurality of non-reflected electromagnetic emissions in a frequency band associated with a personal mobile communication device of at least one pedestrian can be detected. The frequency band of the mobile communication can be between 2.4 gigahertz (GHz) and 2.4835 GHz.

The signal information can be representative of the plurality of non-reflected electromagnetic emissions. For example, the non-reflected electromagnetic emissions can be received and transformed into electric signals, and the electric signals can be further processed to generate the signal information. It is appreciated the electric signals can be digital signals or analog signals. In some embodiments, the signal information can include information associated with the Doppler effect, the phase difference, or the time difference of the non-reflected electromagnetic emissions.

In step 5004, in the signal information representative of at least some of the plurality of the non-reflected electromagnetic emissions, a specific electromagnetic waveform associated with each of the plurality of road users can be identified.

In step 5006, for each of the plurality of road users, at least one of a location, speed, and direction can be determined at least in part based on frequencies of the plurality of non-reflected electromagnetic emissions and the specific electromagnetic waveform.

In some embodiments, measurements of the electromagnetic emissions emanating from the plurality of road users as received by the plurality of receivers can be used to determine the at least one of a location, speed, and direction of the plurality of vehicles. As discussed above, values including the location, the speed, and/or the movement direction of a road user can be determined using the Doppler effect, the phase difference, or the time difference of non-reflected electromagnetic emissions. For example, based on the Frequency Difference of Arrival (FDOA), the location of the road user can be determined based on known locations of the plurality of receivers, the vector velocities, and the observed Doppler shifts between pairs of receivers.

In step 5008, information about the determined at least one of a location, speed, and direction can be aggregated and stored for each of the plurality of road users.

The stored information can include the location, the speed, the direction, and an identifier associated with each road user in the area of the intersection. The identifier can be used to identify a road user. For example, the identifier can include at least one of a vehicle license plate number, a vehicle registration number, or a phone number associated with a vehicle occupant.

The location of a road user can be determined and stored at a given rate. In some embodiment, information about the determined location of each of the plurality of vehicles can be stored at a sampling rate between 0.25 second and 1.5 seconds.

The stored information can further include a time indication in which a vehicle corresponding with the identifier traveled within the area of interest. For example, as discussed with reference to FIG. 49, information about both vehicles 4902 and 4904, which travel in the area of intersection 4900, can be stored.

As the stored information contains a great amount of information, a great amount of storage space can be used. Therefore, the stored information can be deleted after a predetermined period of time. The predetermined period of time can be determined by a user of method 5000 or determined according to regulation.

In step 5010, after a roadway incident, a request can be received to re-create movement of road users on the roadway during a time period associated with the roadway incident.

The request can be issued by a user of method 5000. For example, when the user of method 5000 (e.g., a traffic management center) notices that a roadway incident happened during a time period, the user can issue a request to re-create movements of the road users on the roadway during the time period.

It is also possible that the request can be automatically generated. For example, when a roadway incident is identified, a request can be automatically issued to re-create movements of road users.

It is appreciated that, the roadway incident involving at least one of the plurality of road users can be identified. The roadway incident can be at least one of an accident, a vehicle failure, a traffic slow down, or a traffic jam. For example, an accident can be identified based on movements of the road users. As when an accident involving at least two road users happens, the trajectories of the at least two road users collide. Thus, an accident can be identified based on the trajectories of the movements of the at least two road users. For example, respective trajectories of at least two road users can be determined, and whether the trajectories cross within a given time period can be determined. Therefore, the request can also be associated with a time period. In some embodiments, the time period can cover the whole incident. The time period can be a predetermined period or determined based on the incident. The request can be associated with the identifier corresponding to an involved road user.

It is appreciated that, after the accident is identified, a report can be automatically forwarded to an emergency dispatch system, so that an ambulance can be dispatched as soon as possible.

In step 5012, upon receipt of the request, the aggregated and stored information from the electromagnetic waveforms can be used to re-create the roadway incident.

In some embodiments, the roadway incident within a time period can be re-created so that the roadway incident can be played back. The re-created incident can include a representation of the plurality of road users that traveled within the area of interest during the time period. It is appreciated that, when the road users includes at least one pedestrian, movements of the at least one pedestrian in the area of interest can be determined based on emissions from the personal mobile communications device of the at least one pedestrian.

In some embodiments, liability for the roadway incident can be assigned to at least one of the plurality of road users. To determine the liability, stored data defining roadways in the area of interest can be accessed. The stored data includes map data and regulatory data associated with the area of interest. The map data can provide information of roads in the area of interest, facilities in the area of interest (e.g., hospitals, emergency centers, and the like), traffic volume through the intersection, road markings on roads in the area of interest, and the like. The regulatory data can include regulatory associated with roads, traffic lights, road markings, and the like. Based on the stored data, a report of the roadway incident, identifying each vehicle not in compliance with the regulatory data, can be generated.

Method 5000 can further include communicating with at least two pluralities of spatially separated receivers, each plurality of spatially separated receivers being associated with a different area of interest. It is appreciated that, to re-create movements of the at least one of the plurality of road users that is assigned liability for the roadway incident, information collected from one area of interest is not enough. Therefore, information for another area of interest can be further received. Thus, movements of the at least one of the plurality of vehicles that is assigned liability for the roadway incident across more than one area of interest can be re-created.

Parking Space Management Based on EM Emissions

Parking spaces are limited in major cities. As a result, drivers may spend a considerable amount of time to find an available parking space. A system and a method for electromagnetically monitoring parking spaces in an area of interest may be helpful to drivers. In addition, a system and method for electromagnetically monitoring parking spaces can help autonomous vehicles to find a nearest parking space for parking or for electric vehicles a recharge. The disclosed systems and methods may operate to monitor the status of one or more parking spaces (e.g., as occupied or unoccupied) based on detected electromagnetic emissions emanating from vehicles that have parked in a parking space, that have vacated a parking space, etc.

Figure 51:
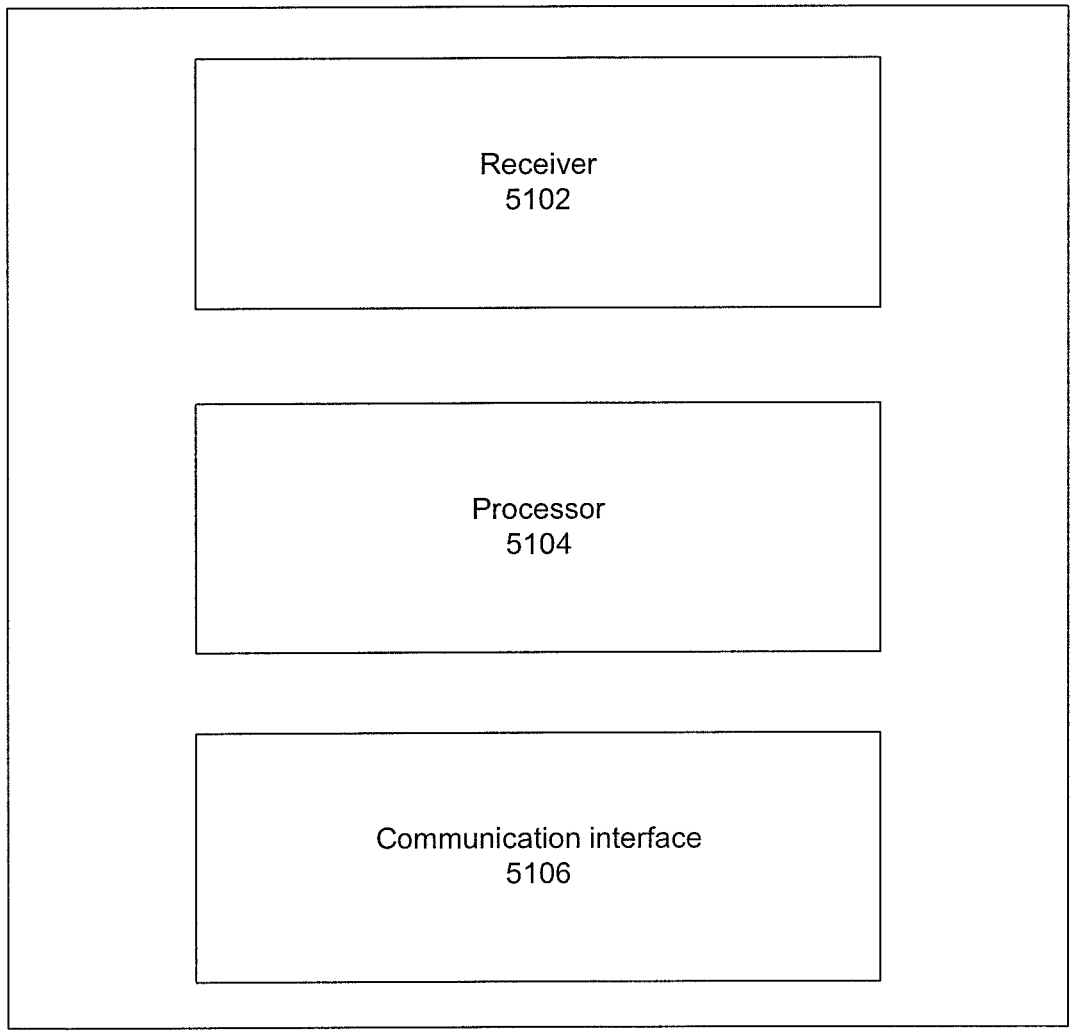
FIG. 51 illustrates an exemplary block diagram representation of a system for electromagnetically monitoring parking spaces in an area of interest, consistent with embodiments of the disclosure.

Embodiments of the disclosure can be directed to a system for electromagnetically monitoring parking spaces in an area of interest. FIG. 51 illustrates an exemplary block diagram of a system 5100 for electromagnetically monitoring parking spaces in an area of interest, consistent with embodiments of the disclosure. System 5100, as an example of local system 100 described above, may include at least one receiver 5202 and at least one processor 5104.

Figure 52:
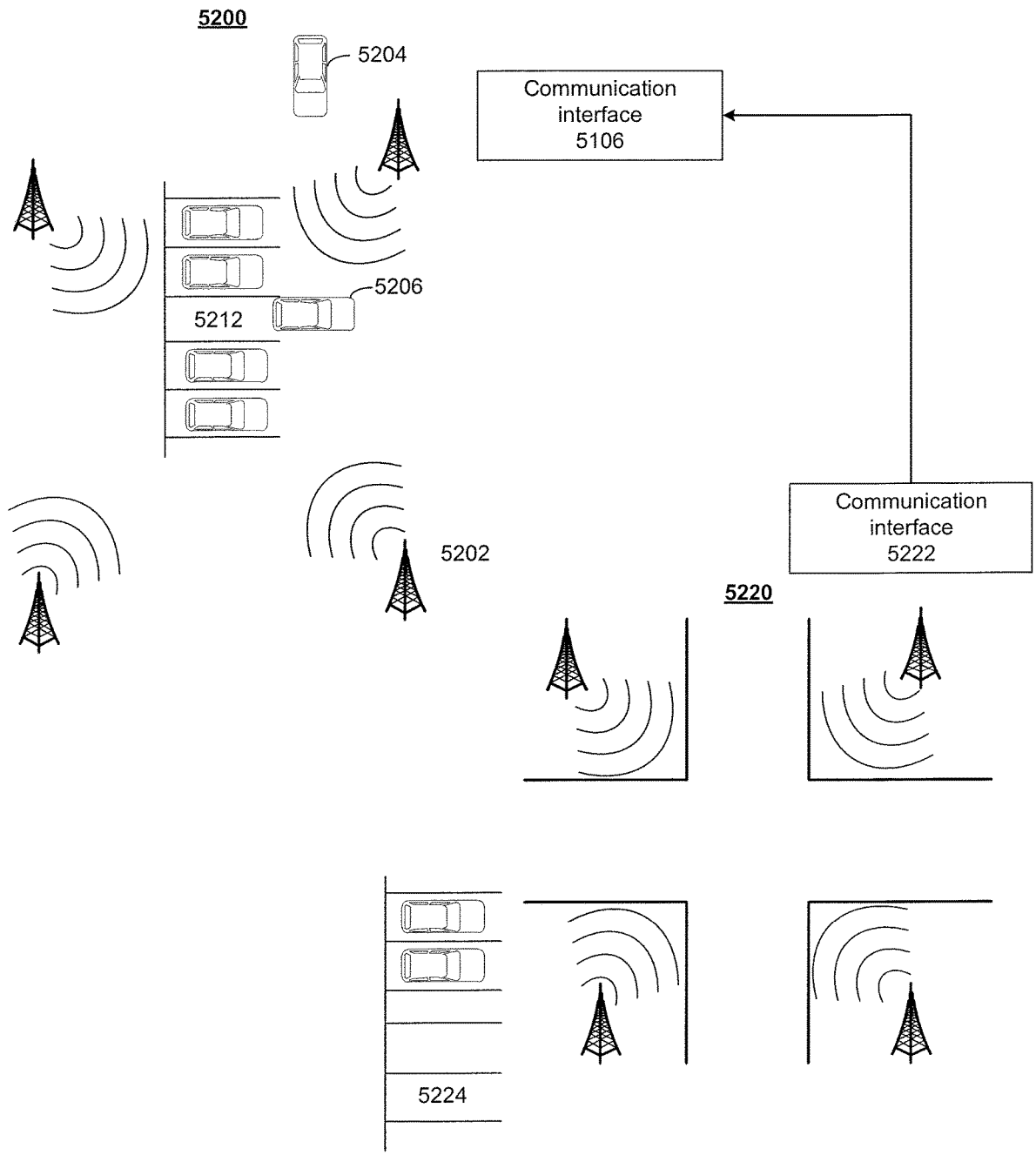
FIG. 52 illustrates an exemplary diagrammatic representation of an area of interest, consistent with embodiments of the disclosure.

Receiver 5202 can be similar to or the same as receiver 110 described with reference to FIG. 1. Receiver 5202 may be fixedly positioned in a vicinity of an area of interest and may be configured to detect a plurality of non-reflected electromagnetic emissions originating from vehicles moving in the area of interest. FIG. 52 illustrates an exemplary schematic diagram of an area of interest 5200, consistent with embodiments of the disclosure. As shown in FIG. 52, in area of interest 5200, at least one receiver 5202 includes a plurality of spatially separated receivers (e.g., four receivers 5202) in proximity to area of interest 5200. Area of interest 5200 can may include a parking lot 5200, which, in turn, may include several parking spaces near to or within parking lot 5200. Four receivers 5202 positioned within or near to parking lot 5200 may detect non-reflected electromagnetic emissions originating from vehicles moving in the area of interest or stationary in the area of interest (e.g., after a vehicle has entered a parking space, just prior to a vehicle leaving a parking space, or while the vehicle is parked (e.g., through detection of an EM signal emitted even when the vehicle is parked an otherwise in an OFF state)). It is appreciated that the area of interest 5200 need not be limited to a parking lot, but may include a certain section of a city. For example, the area of interest may include a neighborhood street, etc. In some cases, receivers 5202, which may be deployed in the vicinity of an intersection of roads may detect not only the vehicles that traverse the intersection, but may also detect vehicles parking in a nearby parking lot, side street, etc.

As discussed above, each vehicle can generate non-reflected electromagnetic emissions from the vehicles' radars, lidars, dedicated transmitters, cellular phones in the vehicle, and/or other electronic equipment and devices. For example, a passenger can carry a mobile device generating non-reflected electromagnetic emissions, such as a mobile phone, a smart watch, and the like. The plurality of non-reflected electromagnetic emissions in a frequency band associated with a vehicle can be detected. For example, receiver 5202 may be configured detect electromagnetic emissions expected to originate with certain vehicle components or other electronic equipment. In some cases, receiver 5202 may be configured to detect signals having frequencies within a band of between 76 GHz and 81 GHz.

Processor 5104 may be similar to or the same as controller 120 described with reference to FIGS. 2 and 3. Processor 5104 may receive signal information from the receivers 5202. The signal information can be representative of the plurality of received non-reflected electromagnetic emissions. For example, the non-reflected electromagnetic emissions can be received by receivers 5202 and transformed into electric signals by the receivers and various other components that may be included for conditioning the received signals (e.g., filters, amplifiers, D/A converters, etc.). The electric signals can be further processed to generate the signal information. It is appreciated the electric signals can be digital signals or analog signals. In some embodiments, the signal information can include information associated with frequencies of the signals, the Doppler effect, a phase difference with one or more other signals, or a time difference relative to one or more other non-reflected electromagnetic emissions. In some cases, frequencies, phase differences, frequency shifts, time of arrival, etc. of the non-reflected electromagnetic emissions can be determined based on the signal information provided by available receivers.

In the signal information representative of the plurality of non-reflected electromagnetic emissions, at least one processor 5104 may identify an electromagnetic waveform associated with each of the detected plurality of vehicles. As discussed above with reference to FIGS. 2 and 6, the detected electromagnetic emissions of a vehicle can have an electromagnetic fingerprint that is associated with the vehicle. In some embodiments, as shown in FIG. 52, the vehicle can emit an electromagnetic waveform that may be used to determine an identity of the vehicle. In some cases, a received electromagnetic emission may carry a unique identifier for a vehicle. For example, a vehicle may be assigned with a unique identity by default that can be transmitted via EM emissions. The identity can be coded into a head field, which can be inserted to any information that the vehicle is sending out. By receiving the information in a form of non-reflected electromagnetic emissions and reading the head field, the identity of the vehicle can be determined and therefore the vehicle can be identified. The identity of the vehicle can include at least one of a plate number, an owner identity, a vehicle type, and the like.

At least one processor 5104 can further determine for each of the plurality of vehicles at least one of a location, speed, and direction, at least in part based on frequencies of the plurality of non-reflected electromagnetic emissions and the specific electromagnetic waveform. Techniques such as triangulation, or any other tracking technique described in other sections of the disclosure, may be used to locate and track one or more vehicles in an area of interest. For example, according to Frequency Difference of Arrival (FDOA), the location of the vehicle can be determined based on known locations of receivers 5102, the vector velocities, and the observed Doppler shifts between pairs of receivers 5102.

Processor 5104 may determine, at least in part based on the determined frequencies associated with the plurality of electromagnetic emissions originating from the plurality of vehicles, whether any of the plurality of vehicles has entered or vacated a parking space. As discussed above, a location of the vehicle and movements of the vehicle can be determined based on the frequencies of the electromagnetic emissions, triangulation of detected emissions, etc. The locations of parking spaces within a lot or along side streets, etc. may be known and stored, for example, in a database accessible by processor 5104 or any other associated processor. In some embodiments, processor 5104 may acquire a location of a parking space (e.g., from a database), determine a current location of a vehicle (e.g., based on triangulation of detected EM emissions originating from the vehicle), and determine whether the vehicle has entered or vacated the parking space based on the location of the parking space and the current location of the vehicle. For example, as shown FIG. 52, parking lot 5200 can include five parking spaces (including a parking space 5212), and a location of each parking space has been stored. When a vehicle 5206 leaves its parking space 5212, at least one processor 5104 can determine that the current location of vehicle 5206 no longer overlaps the location of parking space 5212. Therefore, processor 5104 can determine that vehicle 5206 has vacated parking space 5212. Similarly, processor 5104 may determine when a current location of a vehicle moves toward and overlaps with a location of a parking space, thus indicating that the vehicle has occupied the parking space.

Based on a capability of tracking whether parking spaces are occupied or vacant, processor 5104 may inform a vehicle (or driver) in search of a parking space of at least one parking spot location vacated by at least one of the plurality of vehicles, if any of the plurality of vehicles is determined to have exited a parking space. For example, as shown in FIG. 52, vehicle 5204 is in search of a parking space near intersection 5200, and at least one processor 5104 may identify a parking spot location vacated by vehicle 5206. In turn, processor 5104 may inform vehicle 5204 of the vacated parking spot location. Such information may be transmitted to vehicle 5204 according to any suitable technique. In some cases, processor 5104 may cause transmission of a signal indicating locations of a vacant parking spaces in the vicinity of vehicle 5204, directional instructions for navigating to at least one vacant parking space, etc. In some embodiments, a plurality of parking spaces among several parking spots can be available during a same period of time. Thus, at least one processor 5104 can also identify multiple available parking spaces based on the received signal information, and direct vehicle 5204 in search of a parking space to a closest available parking space.

With reference back to FIG. 51, system 5100 may further include a communication interface 5106 configured to communicate with at least two pluralities of spatially separated receivers. Each plurality of spatially separated receivers may be associated with a different area of interest. It is appreciated that, all parking spaces may be occupied in an area, while some parking spaces are available in another area. Therefore, communication interface 5106 associated with system 5100 for an area of interest can further receive information from another similar system for another area of interest. Thus, at least one processor 5104 can inform a vehicle in search of a parking space within a first area of interest of an available parking space located in a second area of interest. For example, with reference to FIG. 52, communication interface 5106 can further receive information from a counterpart communication interface 5222 of another system for another area of interest (e.g., an area 5220). And at least one processor 5104 can inform vehicle 5204 in search of a parking space within area 5200 of an available parking space 5224 in area 5220.

In addition to causing transmission of information of available parking spaces in a nearby area to a vehicle, at least one processor 5104 may also assist with navigation of the vehicle to the available parking space. In some embodiments, communication interface 5106 may receive a parking request from vehicle 5204 in search of a parking space. In response, processor 5104 may identify a location of vehicle 5204 (either through the received request that may send location information or through triangulation, etc.) and may identify one or more vacant parking spaces near a current location vehicle 5204. Processor 5104 may then cause assembly of navigational instructions (e.g., a specific location of a vacant parking space in spatial coordinates (for example), turn-by-turn directions to the available parking space, distance to the vacant parking space, etc.). In some cases, image information relating to the vacant parking space may be available, and this information may be conveyed to the requesting vehicle for display to a user of the vehicle. In one particular example, when communication interface 5106 receives the parking request from vehicle 5204, at least one processor 5104 can determine that parking space 5212 is available. Processor 5104 may then generate a route directing vehicle 5204 to parking space 5212.

In some embodiments, vehicle 5204 in search of a parking space can be an autonomous vehicle. For example, the autonomous vehicle may be a personal vehicle of a particular user or may serve as part of a fleet of automated vehicles for transporting various individuals from one location to another. When the user of autonomous vehicle 5204 provides a desired destination or drop-off request, autonomous vehicle 5204 may be configured to find a parking space near the requested destination to wait for or drop off the user. It is appreciated that, the drop-off request can be made extempore or in advance. For example, the drop-off request can be made along with the order of the vehicle service or upon initiation of a planned route, even before the trip begins. In another example, the user may decide to stop the trip without any plan. At any time, however, after a vehicle service platform, onboard navigational processor, etc. becomes aware of a drop-off request and/or requested drop-off or trip end location, system 5100 may receive the drop-off request via communication interface 5106 from the user. At least one processor 5104 of system 5100 may then direct the autonomous vehicle to an available parking space in a vicinity of a location associated with the drop-off request or trip end location.

Similarly, at least one processor 5104 can also receive a pick-up request from a user of an autonomous vehicle, and direct the autonomous vehicle from a parking space to a location associated with the pick-up request. In some embodiments, the location associated with the pick-up request can be a street parking space. The requested autonomous vehicle can wait in the street parking space, and pick up the user when the user arrives. In some embodiments, street parking spaces may not be set on a section of a street, and the location associated with the pick-up request can be designated spots for dropping off or picking up the user.

In some embodiments, at least one processor 5104 can determine a vehicle type based on detected electromagnetic emissions originating from vehicle 5204, and to inform the vehicle of a specific parking space associated with its vehicle type. As discussed above, an identity of the vehicle can be coded into electromagnetic emissions originating from the vehicle, and the identity of the vehicle can include at least one of a plate number, an owner identity, a vehicle type, and the like. For example, a track may emit a first type of electromagnetic emissions (e.g., including specific frequencies, specific shapes), and a private car may emit a second type of electromagnetic emissions. Therefore, at least one processor 5104 can determine a vehicle type based on detected electromagnetic emissions originating from a vehicle, and a parking space that fits the vehicle type of vehicle 5204 can be determined. Vehicle 5204 can be informed of such a parking space and directed thereto.

To determine a parking space associated with a particular vehicle type, at least one processor 5104 can access stored data defining roadways in the area of interest, and the stored data can include map data and parking regulatory data. The parking regulatory data can include size information, location information, fee information, and the like of parking spaces. The map data can include information associated with roadways, so that at least one processor 5104 can generate routes to the parking spaces.

In some embodiments, at least one processor 5104 can inform the vehicle in search of a parking space of a location of a first vacant parking space. And after a period of time, a second parking space vacated closer to the vehicle may be identified. After the identification of the second parking space vacated, the vehicle can be informed of a location of the second parking space. Therefore, the parking space that the vehicle is informed of can be updated.

Figure 53:
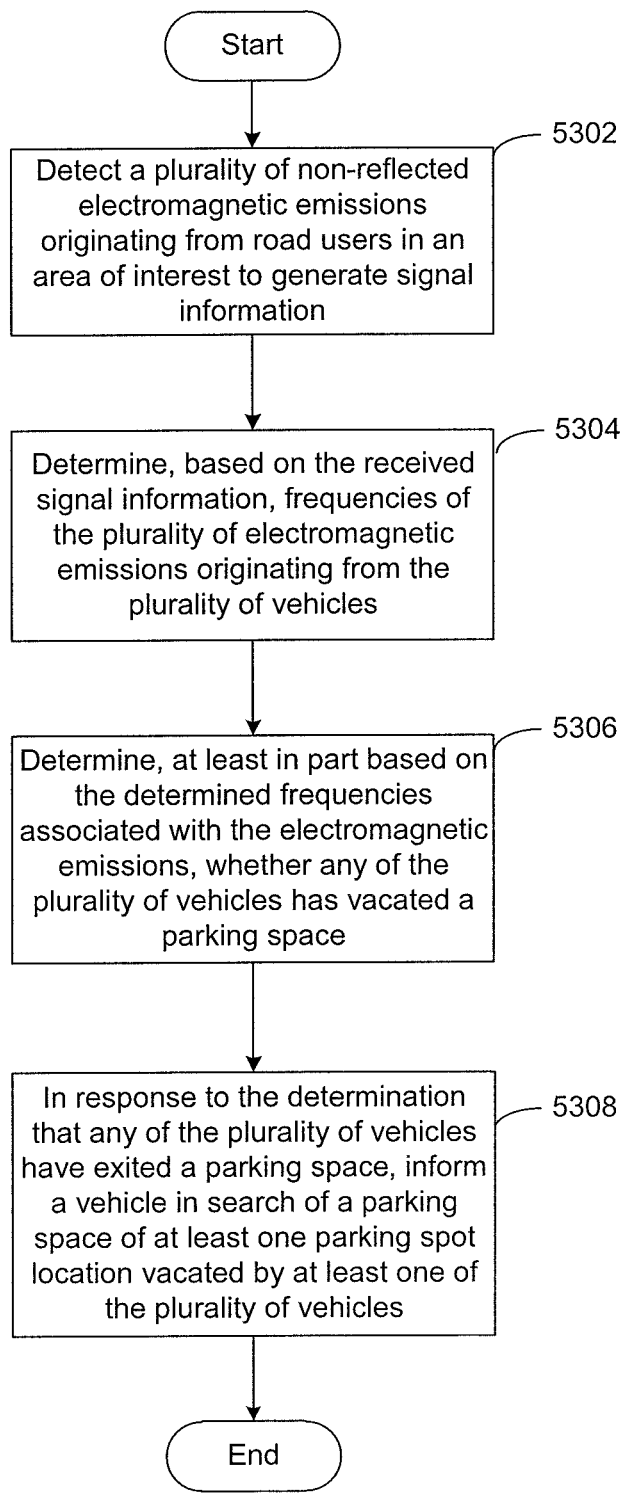
FIG. 53 is a flowchart of a method for electromagnetically monitoring parking spaces in an area of interest, consistent with embodiments of the disclosure.

Embodiments of the disclosure can be further directed to a method for electromagnetically monitoring parking spaces in an area of interest. FIG. 53 is a flowchart of a method 5300 for electromagnetically monitoring parking spaces in an area of interest, consistent with embodiments of the disclosure. Method 5300 can include steps 5302-5308.

In step 5302, a plurality of electromagnetic emissions originating from a plurality of vehicles can be detected. Based on the detected electromagnetic emissions, signal information can be generated, being representative of at least some of the detected plurality of electromagnetic emissions. The electromagnetic emissions can be received by, for example, at least one receiver 5202 described above. At least one receiver 5202 can be fixedly positioned in a vicinity of an area of interest and detect a plurality of non-reflected electromagnetic emissions originating from vehicles moving in the area of interest. It is appreciated that the area of interest can be at least a section of a city. For example, the area of interest can be an intersection and a parking lot is near the intersection, so that receivers around the intersection can also cover the parking lot. The area of interest can also be the parking lot.

As discussed above, each vehicle can generate non-reflected electromagnetic emissions from the vehicles' radars, cellular phones in the vehicle, and/or other electronic equipment and devices. For example, a passenger can carry a mobile device generating non-reflected electromagnetic emissions, such as a mobile phone, a smart watch, and the like. Therefore, the plurality of non-reflected electromagnetic emissions in a frequency band associated with a vehicle can be detected. For example, at least one receiver 5202 can detect electromagnetic emissions with frequencies between 76 GHz and 81 GHz.

In step 5304, based on the received signal information, frequencies of the plurality of electromagnetic emissions originating from the plurality of vehicles can be determined.

The signal information can be representative of the plurality of non-reflected electromagnetic emissions. For example, the non-reflected electromagnetic emissions can be received and transformed into electric signals. The electric signals can be further processed to generate the signal information. It is appreciated the electric signals can be digital signals or analog signals. In some embodiments, the signal information can include information associated with frequencies, the Doppler effect, the phase difference, or the time difference of the non-reflected electromagnetic emissions. Thus, reversely, the frequencies of the non-reflected electromagnetic emissions can be determined based on the received signal information.

In the signal information representative of the plurality of non-reflected electromagnetic emissions, an electromagnetic waveform associated with each of the plurality of vehicles can be identified. In some embodiments, the vehicle can emit an electromagnetic waveform indicating an identity of the vehicle. For example, the vehicle can be assigned with a unique identity by default. The identity can be coded into a head field, which can be inserted to any information that the vehicle is sending out. By receiving the information in a form of non-reflected electromagnetic emissions and reading the head field, the identity of the vehicle can be determined and therefore the vehicle can be identified. The identity of the vehicle can include at least one of a plate number, an owner identity, a vehicle type, and the like.

For each of the plurality of vehicles, at least one of a location, speed, and direction can be further determined at least in part based on frequencies of the plurality of non-reflected electromagnetic emissions and the specific electromagnetic waveform.

In some embodiments, measurements of the electromagnetic emissions emanating from the plurality of vehicles as received by the plurality of receivers 5102 can be used to determine the at least one of a location, speed, and direction of the plurality of vehicles. As discussed with reference to FIG. 2, values including the location, the speed, and/or the movement direction of a vehicle can be determined using the Doppler effect, the phase difference, or the time difference of non-reflected electromagnetic emissions. For example, according to Frequency Difference of Arrival (FDOA), the location of the vehicle can be determined based on known locations of receivers, the vector velocities, and the observed Doppler shifts between pairs of receivers. In other words, the location of the vehicle can be determined based on frequencies of the detected electromagnetic emissions.

In step 5306, whether any of the plurality of vehicles has vacated a parking space can be determined at least in part based on the determined frequencies associated with the plurality of electromagnetic emissions originating from the plurality of vehicles.

As discussed above, a location of the vehicle can be determined based on the frequencies of the electromagnetic emissions. Therefore, in some embodiments, a location of a parking space can be acquired, a current location of a vehicle can be determined, and whether the vehicle has vacated the parking space based on the location of the parking space and the current location of the vehicle can be determined. For example, when a vehicle leaves its parking space, it can be determined that the location of the parking space no longer overlaps the current location of the vehicle. Therefore, it can be determined that the vehicle has vacated the parking space.

In step 5308, in response to the determination that any of the plurality of vehicles have exited a parking space, a vehicle in search of a parking space of at least one parking spot location vacated by at least one of the plurality of vehicles can be informed.

In some embodiments, a plurality of parking spaces among several parking slots can be available during a same period of time. Thus, multiple available parking spaces can also be identified based on the received signal information, and a vehicle in search of a parking space can be directed to a closest available parking space.

Method 5300 can further include communicating with at least two pluralities of spatially separated receivers. Each plurality of spatially separated receivers can be associated with a different area of interest. It is appreciated that, all parking spaces may be occupied in an area, while some parking spaces are available in another area. Therefore, a system for an area of interest can further receive information from another similar system for another area of interest. Thus, a vehicle in search of a parking space within a first area of interest can be informed of an available parking space located in a second area of interest.

Other than transmitting information of available parking space a nearby area to a vehicle, the vehicle can also be navigated to the available parking space. In some embodiments, a vehicle in search of a parking space can be an autonomous vehicle. For example, the autonomous vehicle can provide a vehicle service to a user. When the user of the autonomous vehicle sends a drop-off request, the autonomous vehicle can find a parking space to drop off the user. It is appreciated that, the drop-off request can be made extempore or in advance. For example, the drop-off request can be made along with the order of the vehicle service, even before the trip begins. In another example, the user can decide to stop the trip without any plan. Therefore, after a vehicle service platform becomes aware of the drop-off request, the drop-off request can be received from the user. The autonomous vehicle can then be directed to an available parking space in a vicinity of a location associated with the drop-off request.

Similarly, a pick-up request can also be received from a user of an autonomous vehicle, and direct the autonomous vehicle from a parking space to a location associated with the pick-up request.

In some embodiments, a vehicle type can be determined based on detected electromagnetic emissions originating from a vehicle, and to inform the vehicle of a specific parking space associated with its vehicle type. As discussed above, an identity of the vehicle can be coded into electromagnetic emissions originating from the vehicle, and the identity of the vehicle can include at least one of a plate number, an owner identity, a vehicle type, and the like. For example, a track may emit a first type of electromagnetic emissions (e.g., including specific frequencies, specific shapes), and a private car may emit a second type of electromagnetic emissions. Therefore, a vehicle type can be determined based on detected electromagnetic emissions originating from a vehicle, and a parking space that fits the vehicle type of vehicle 5204 can be further determined. The vehicle can be informed of such a parking space and directed thereto.

Method 5300 can further include accessing stored data defining roadways in the area of interest, to determine a parking space associated with a particular vehicle type. The stored data can include map data and parking regulatory data. The parking regulatory data can include size information, location information, fee information, and the like of parking spaces. The map data can include information associated with roadways, so that routes to the parking spaces can be generated.

In some embodiments, method 5300 can further include informing the vehicle in search of a parking space of a location of a first vacant parking space. And after a period of time, a second parking space vacated closer to the vehicle may be identified. After the identification of the second parking space vacated, method 5300 can include informing the vehicle of a location of the second parking space. Therefore, the parking space that the vehicle is informed of can be updated.

Providing Route Alternatives

An aspect of the disclosure is directed to a system for providing driving route alternatives. Consistent with the present disclosure, the system may offer a pay-per-use service. For example, the system may direct a vehicle along a driving route. During the ride, the system may monitor and manage the traffic according to a predetermined policy. For example, certain areas may be banned for vehicle traffic at certain hours (e.g., around schools) or during big public events. The system may also assure safe and efficient arrival of the vehicle to the destination. In one embodiment, the system may charge a fee that is proportional to the distance that the vehicle has driven or per drop off/pick up. In another embodiment, the system may be further configured to compensate municipal entities for traffic directed in their area. In addition, as depicted in FIG. 4, the system may present a price offer for directing the vehicle along each route alternative. In one example, the price offer may be only for the navigation services. In another example, the price offer may include an estimation of the driving costs (e.g., tolls, patrol, and more). In other words, the price may reflect "Infrastructure as a Service."

Figure 54:
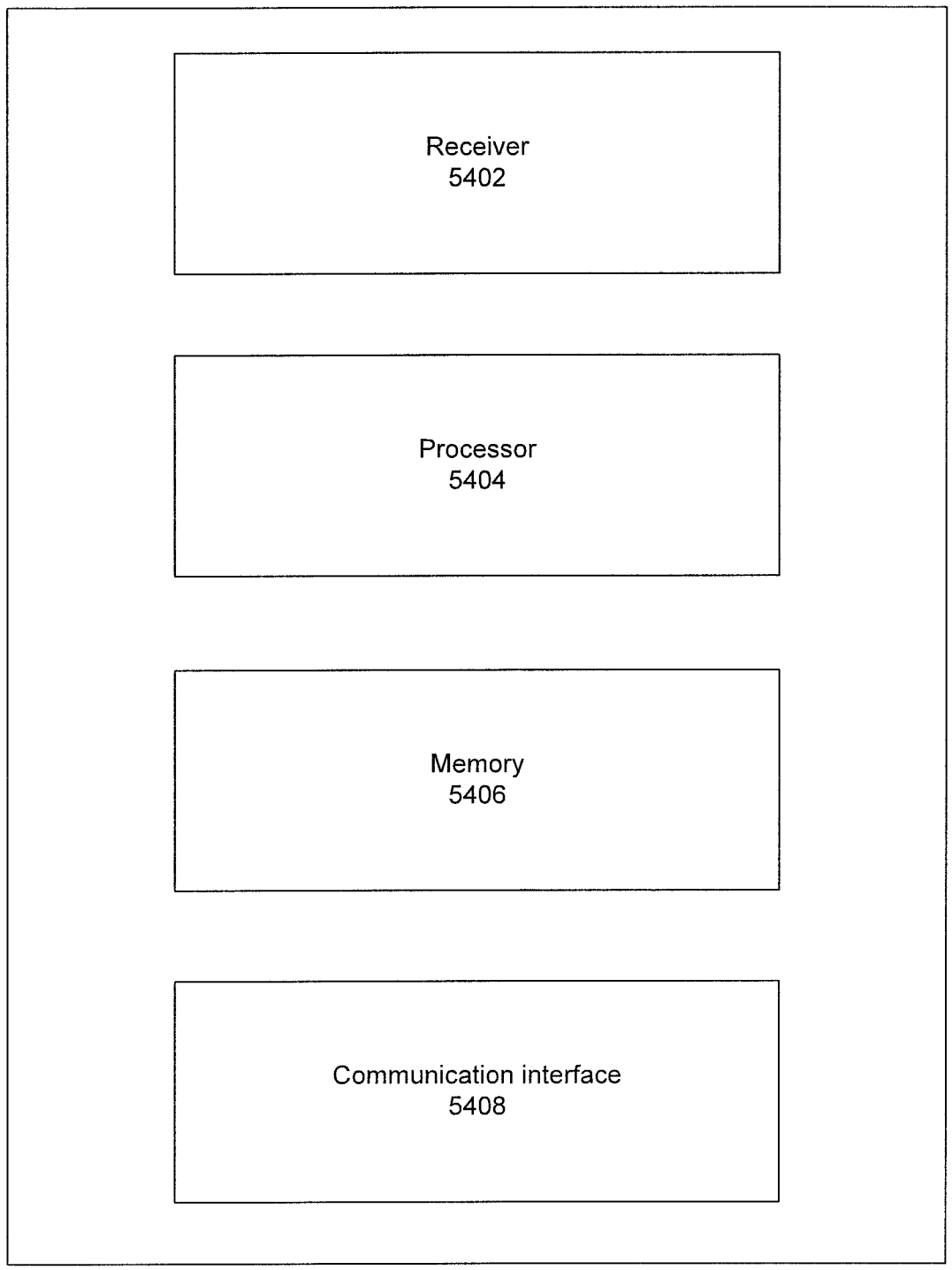
FIG. 54 provides a diagrammatic illustration of a system for providing driving route alternatives, consistent with embodiments of the disclosure.
Figure 55:
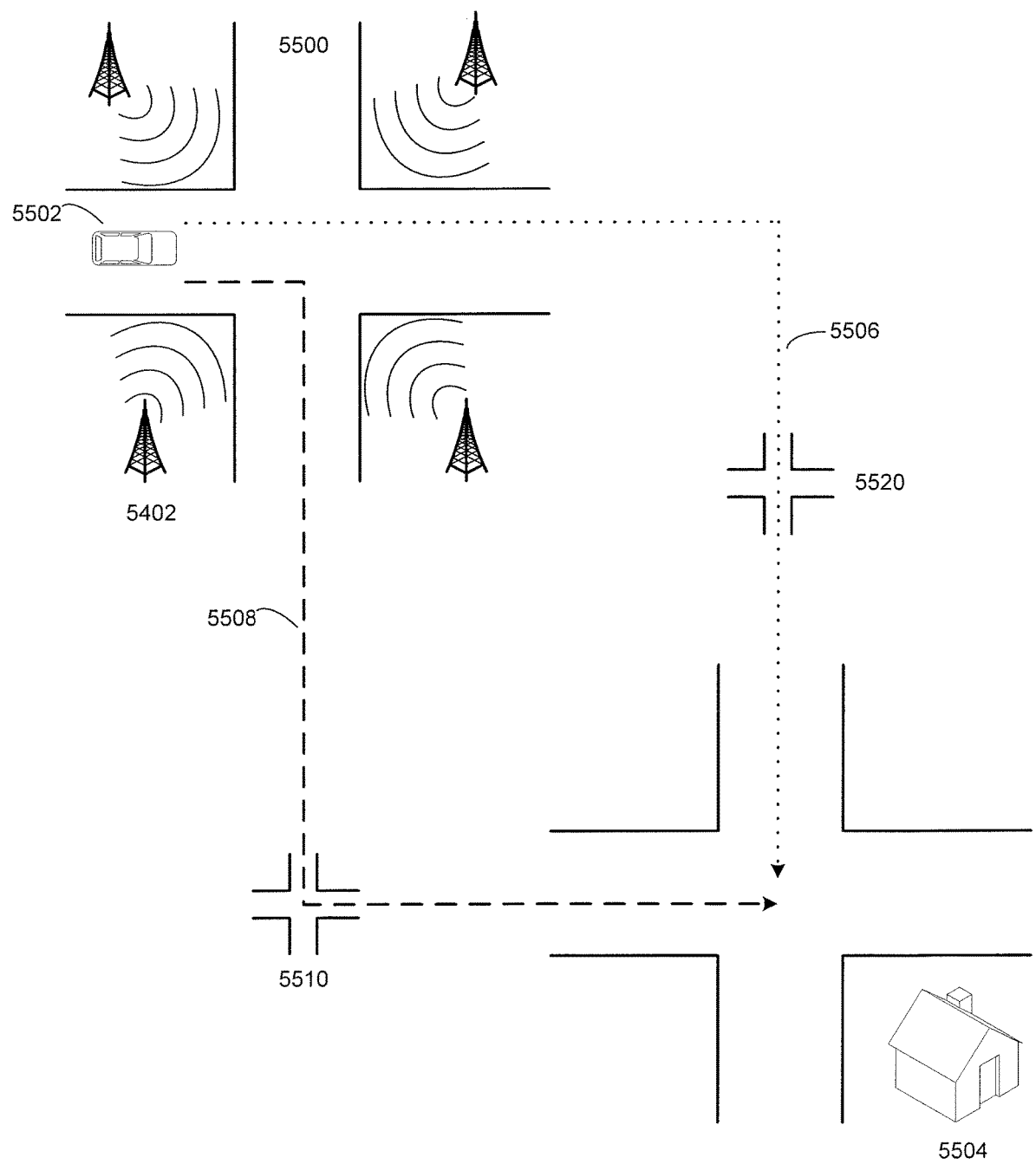
FIG. 55 provides a diagrammatic illustration of exemplary route alternatives, consistent with embodiments of the disclosure.

FIG. 54 provides a diagrammatic illustration of a system 5400 for providing driving route alternatives, consistent with embodiments of the disclosure. System 5400, as an example of local system 100 described above, can include at least one receiver 5402, at least one processor 5404, a memory 5406, and a communication interface 5408. At least one receiver 5402 may be similar to or the same as receiver 110 described with reference to FIG. 1. Receiver 5402 can be fixedly positioned in a vicinity of an area of interest on a roadway and may be configured to detect a plurality of non-reflected electromagnetic emissions originating from users moving in the area of interest. FIG. 55 provides a diagrammatic illustration of exemplary route alternatives, consistent with embodiments of the disclosure. As shown in FIG. 55, four receivers 5402 are positioned in the vicinity of an intersection 5500. In one example, a vehicle 5502 constitutes a road user that requires route alternatives to a destination 5504 (e.g., the user's house). It is appreciated that, in embodiments of the disclosure, the user can be any type of user, including, for example, a pedestrian, a vehicle, a motorcyclist, etc. In some cases, the user may include a package to be delivered, and the like. As discussed above, each user can generate non-reflected electromagnetic emissions that can be used to track locations and movements of the road users (e.g., from vehicles' radars, individuals' cellular phones, and/or other electronic equipment and devices associated with each particular user). For example, a pedestrian can carry a wearable device generating non-reflected electromagnetic emissions, such as a cellular phone or a smart watch. A vehicle may transmit signals associated with a radar, lidar, etc. And in some other examples, a user may be associated with one or more transmitters configured to transmit unique identification information (e.g., identification numbers, plate numbers, whether a vehicle is or is not autonomously operated, serial numbers, etc.) to receivers 5402. Receivers 5402 may detect such non-reflected electromagnetic emissions originating from users moving in an area of interest.

The at least one processor 5404 may be configured to determine various user characteristics based on the received non-reflected electromagnetic emissions (as discussed in other sections of the disclosure in more detail). For example, processor 5404, which may be the same as or similar to controller 120 described with reference to FIGS. 2 and 3, may receive signal information from one or more of receivers 5402. The signal information can be representative of the plurality of non-reflected electromagnetic emissions. For example, the non-reflected electromagnetic emissions can be received and transformed into electric signals. The electric signals can be further processed to generate the signal information. It is appreciated the electric signals can be digital signals or analog signals. In some embodiments, the signal information can reflect information or may contain effects associated with the Doppler Effect, phase difference, or a time difference between one or more non-reflected electromagnetic emissions.

Based on the signal information representative of the plurality of non-reflected electromagnetic emissions, processor 5404 may determine locations of a plurality of users and monitor movements of the users. As discussed above and in other sections of the disclosure, the location (among other attributes) of a user on the roadway may be determined based on received non-reflected EM emissions. Such determinations may take advantage of, for example, the Doppler Effect, phase differences between emissions, or time differences associated with the identified electromagnetic waveform of each user.

Memory 5406 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. Memory 5406 can be configured to store data defining roadways in a geographical area. For example, with reference to FIG. 55, a geographical area covering both the origin (i.e., intersection 5500) and the destination (i.e., house 5504) of the trip can include sections, such as origin 5500, intersections 5510 and 5520, and destination 5504. The stored data may include map data and regulatory data associated with the geographical area, or even information acquired on an ongoing basis regarding an area of interest. The map data can provide information of roads in the area of interest, facilities in the area of interest (e.g., hospitals, emergency centers, convenience stores, and the like), traffic volume through the intersection, road markings on roads in the area of interest, lengths or other dimensions of the roads in the geographical area, road closures, and the like. The regulatory data can include regulatory information (e.g., speed limits, turn lane conventions (e.g., yield on left turn at green light), geographic conventions (e.g., left hand lane driving or right hand lane driving) etc.) associated with roads, traffic lights, road markings, and the like.

With reference back to FIG. 54, communication interface 5408 can be configured to receive a travel request from a user. The travel request may include information indicative of a desired destination and information indicative of a current location of the user, which may be derived at least partially from positioning system information. For example, with reference to FIG. 55, vehicle 5502 may transmit a travel request to system 5400 in a form of an EM emitted signal, a WiFi transmission, cellular transmission, etc. The travel request may indicate that a passenger or a driver of vehicle 5502 is leaving for the destination 5504. The travel request may also indicate a current location of vehicle 5502 is near an intersection 5500. As discussed above, the current location of the user can be determined based on the EM emissions originating from the user. The current location of the user can be determined based on a positioning system (e.g., Global Positioning System) and associated receivers. It is appreciated that, the information indicative of the current location of the user may be included in the travel request automatically. In other words, the user may not have to provide the current location manually.

Communication interface 5408 may also be configured to receive current traffic information from a plurality of local traffic management systems. Each local traffic management system may monitor traffic of a separate section of a geographical area, and communication interface 5406 may receive current traffic information from local traffic management systems associated with the above sections. For example, each of the local traffic management systems may monitor the traffic of a section of the geographical area by detecting a plurality of non-reflected electromagnetic emissions originating from a plurality of vehicles driving in the section of the geographical area. And the current traffic information can be generated based on information associated with the monitored traffic. It is appreciated that, each of the plurality of local traffic management systems can monitor traffic in a different intersection.

Other than receiving the current traffic information, the plurality of local traffic management systems can also detect a user. In some embodiments, the user can be a passenger in a road vehicle. The user can carry a mobile device (e.g., a smartphone) in a pocket. The mobile device can be associated with the user and included in the road vehicle. The mobile device can emit electromagnetic emissions detectable by the plurality of local traffic management systems. Thus, the plurality of local traffic management systems can continuously monitor the user's position and movements through tracking of the mobile device emission. It is appreciated that the user can also be associated with, for example, the vehicle emitting detectable electromagnetic emissions.

At least one processor 5404 may access memory 5406 and receive information from communications interface 5408. Processor 5404 may be further configured to identify at least two route alternatives for use in transporting the user to the desired destination. A route alternative of a trip can include a plurality of attributes. The attributes can include at least one of a route of the trip, an origin of the route, a destination of the route, a departure time of the trip, a number of passengers, and the like. FIG. 55 illustrates two exemplary route alternatives of a trip from intersection 5500 to house 5504. A route alternative 5506 (shown in a dotted line), for example, includes intersection 5500 as the origin and house 5504 as the destination, and passes through intersection 5520 to reach house 5504. A route alternative 5508 (shown in a dashed line), for example, includes intersection 5500 as the origin and house 5504 as the destination, and takes a turn at intersection 5510 to reach house 5504. Furthermore, route alternative 5506 begins the trip at 8:30 PM, and route alternative 5508 begins the trip at 8:36 PM. It is appreciated that, when two route alternatives share the same or similar attributes, except for the departure time, the two route alternatives may be considered two different route alternatives.

At least one processor 5404 may be also configured to determine cost information associated with each of the at least two route alternatives based, at least in part, on the stored data. As discussed above, the stored data can include information regarding the roads and traffic in the geographical area. Therefore, at least one processor 5404 can determine a distance that the trip can travel using each route alternative. The processor may also determine cost information associated with each route alternative in association with the distance. For example, in FIG. 55, route alternative 5506 can cost $30 to arrive at house 5504 and route alternative 5508 can cost $36 to arrive at house 5504. It is appreciated that the determined cost for each route alternative can be further associated with at least one of a service fee for directing the user through the selected driving route, toll road fees, compensation for one or more municipal entities that the route alternative crosses, and the like. The projected price may also depend upon the distance traveled via the alternative routes, etc.

At least one processor 5404 may be configured to determine an estimated time of arrival (ETA) based on the current traffic information for each of the at least two route alternatives. As current traffic information can be received from a plurality of local traffic management systems across the geographical area, at least one processor 5404 can determine if any part on the route alternative may be affected by one or more traffic obstructions (e.g., traffic congestion due to construction zones, accidents, rush hour, etc.) and how long the it may take to transport the user through the traffic obstruction. The current traffic information may further include an average speed of each part on the route alternative, such that the time of arrival may be estimated. For example, in FIG. 55, the ETA of route alternative 5506 can be 8:56 PM, and the ETA of route alternative 5508 may be 8:54 PM.

At least one processor 5404 may be configured to cause a representation (e.g., a display) of the at least two route alternatives including the determined cost information and the determined ETA for enabling the user to select a driving route to the desired destination. For example, the above information of ETA and cost of route alternatives 5506 and 5508 can be displayed on a screen of a mobile device. It is noted that, though route alternative 5508 begins the trip at a later time (i.e., 8:36 PM), the ETA of route alternative 5508 is earlier than that of route alternative 5506. However, the cost of route alternative 5508 can be more expensive than that of route alternative 5506. Thus, the user may have an opportunity to select a driving route to the desired destination between route alternatives 5506 and 5508. The selection of one of the at least two route alternatives can be received by at least one processor 5404, and the user can be directed along a selected driving route (e.g., by selecting one of the presented route alternatives, e.g., via a touch enabled display associated with a smart phone, tablet, vehicle display, etc. and via transmission of the selected signal, e.g., over a wireless Internet connection).

It is appreciated that, during a trip along the selected driving route, a traffic obstruction may occur while en route. The traffic obstruction can include at least one of a road closure, a traffic jam, a parade, an accident, a public safety incident, or an infrastructure repair. In some embodiments, an existence of the traffic obstruction can be identified by at least one processor 5404 using the current traffic information received from the plurality of local traffic management systems. For example, the plurality of local traffic management systems can detect the traffic jam, the accident, and the like based on electromagnetic emissions originating from subjects on roadways, and include the detection of such traffic obstruction in the current traffic information. In some embodiments, information associated of the traffic obstruction can be received from an urban management system. For example, the road closure, the infrastructure repair, the parade, and the like can be registered in the urban management system, and information associated of such traffic obstruction may be broadcast to local traffic management systems. Based on the identified existence of a traffic obstruction, at least one processor 5404 can generate a substitute route to detour the traffic obstruction and direct the user to the desired destination via the substitute route. In some embodiments, the navigation can be changed for directing the user according to the substitute route. In some embodiments, control signals can be sent for remotely controlling an operation of a vehicle associated with the user. For example, the vehicle can be an autonomous vehicle, and the control signals can remotely change the route of the vehicle. Changing to the substitute route may be represented to the user, so that the user may be aware of such a change.

As discussed above with reference to FIG. 55, route alternative 5508 may cost $36 and arrive at 8:54 pm, while route alternative 5506 may cost $30 and arrive at 8:56 pm. Thus, route alternative 5508 may be more expensive but arrive earlier than route alternative 5506. Presentation of the route alternatives in this manner may enable the user to determine which route to select based on whether cost or travel time has the higher priority. In some embodiments, at least one processor 5404 may cause the representation of the at least two route alternatives to be displayed such that a first route alternative is the faster route and a second route alternative is the lower cost route.

Figure 56:
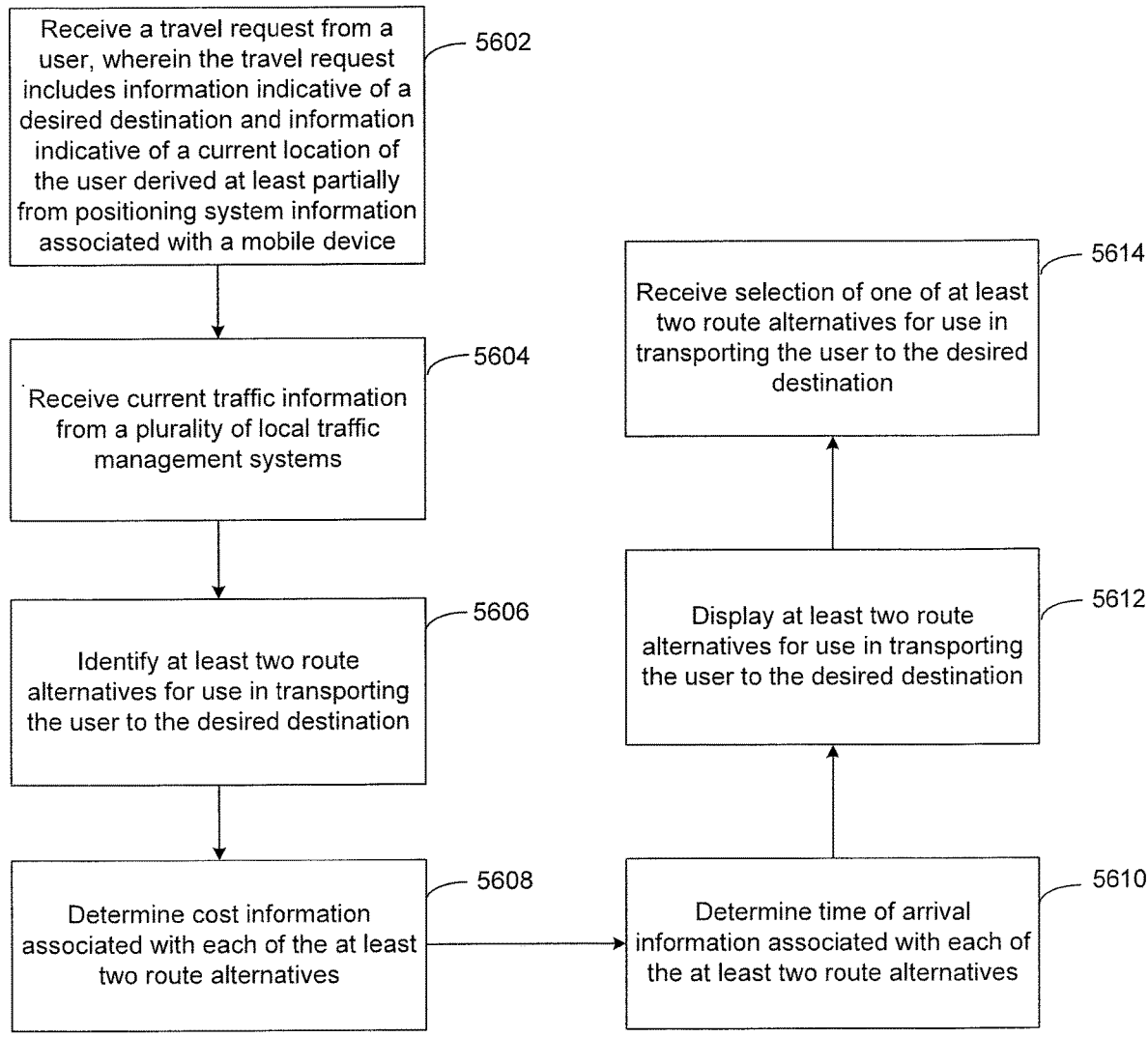
FIG. 56 is a flowchart of a method for providing driving route alternatives, consistent with embodiments of the disclosure.

Another aspect of the disclosure is directed to a method for providing driving route alternatives, consistent with embodiments of the disclosure. FIG. 56 is a flowchart of a method 5600 for providing driving route alternatives, consistent with embodiments of the disclosure. Method 5600 can include steps 5602-5612, as described below.

In step 5602, a travel request may be received from a user. The travel request may include information indicative of a desired destination and information indicative of a current location of the user derived at least partially from positioning system information associated with a mobile device. It is appreciated that the user may include any type of user, including, for example, a pedestrian, a vehicle, a motorcyclist, a package to be delivered, and the like. For example, a vehicle may transmit a travel request in a form of EM emissions. The current location of the user can be determined by a local positioning system (LPS) based on the EM emissions originating from the user. The current location of the user can be also determined based on a Global Positioning System (GPS) and associated receivers. It is appreciated that, the information indicative of the current location of the user may be included in the travel request automatically. In other words, the user may not have to provide the current location manually.

In step 5604, current traffic information may be received from a plurality of local traffic management systems. Each local traffic management system may monitor traffic of a separate section of the geographical area, and current traffic information from local traffic management systems associated with the above sections can be received. For example, each of the local traffic management systems can monitor the traffic of a section of the geographical area by detecting a plurality of non-reflected electromagnetic emissions originating from a plurality of vehicles driving in the section of the geographical area. And the current traffic information can be generated based on information associated with the monitored traffic. It is appreciated that, each of the plurality of local traffic management systems can monitor traffic in a different intersection. In some embodiments, based on the monitored traffic information across different intersections, traffic conditions (e.g., traffic jam) can be foreseen.

Other than receiving the current traffic information, the plurality of local traffic management systems can also detect a user. In some embodiments, the user can be a passenger in a road vehicle. The user can carry a mobile device (e.g., a smartphone) in a pocket. Therefore, the mobile device can be associated with the user and included in the road vehicle. The mobile device can emit electromagnetic emissions detectable by the plurality of local traffic management systems. Thus, the plurality of local traffic management systems can continuously monitor the user through the mobile device. It is appreciated that the user can also be associated with, for example, the vehicle emitting detectable electromagnetic emissions. In this way, it can be determined whether a vehicle is carrying at least one passenger and a number of passengers in the vehicle. In some embodiments, the number of passengers in the vehicle can be associated with safety measures. For example, a maximum speed of a vehicle having at least one passenger can be lower than that of a vehicle having no passenger. In some embodiments, the number of passengers in the vehicle can be associated with the strategy for designing route alternatives. For example, during rush hour, a vehicle carrying a plurality of passengers can have a higher priority to access certain infrastructures (e.g., high speed roads), so that the efficiency of the traffic system of a city can be improved.

In step 5606, at least two route alternatives for use in transporting the user to the desired destination may be identified. A route alternative of a trip can include a plurality of attributes. The attributes can include at least one of a route of the trip, an origin of the route, a destination of the route, a departure time of the trip, a number of passengers, and the like. It is appreciated that, when two route alternatives share same attributes, except for the departure time, the two route alternatives are two different route alternatives.

At step 5608, cost information associated with each of the at least two route alternatives may be determined based, at least in part, on the stored data. As discussed above, the stored data can include information regarding the roads and traffic in the geographical area. Therefore, in some embodiments, a distance that the trip travels can be determined using each route alternative, and determine cost information associated with each route alternative in association with the distance. It is appreciated that the determined cost for each route alternative can be further associated with at least one of a service fee for directing the user through the selected driving route, toll road fees, compensation for one or more municipal entities that the route alternative crosses, and the like.

At step 5610, an estimated time of arrival (ETA) can be determined based on the current traffic information for each of the at least two route alternatives. As current traffic information can be received from a plurality of local traffic management systems across the geographical area, if any part on the route alternative is in traffic obstruction and how long the user can pass the part with traffic obstruction can be determined based on the current traffic information. The current traffic information may further include an average speed of each part on the route alternative, thus the time of arrival can be estimated.

At step 5612, a representation of the at least two route alternatives including the determined cost information and the determined ETA may be displayed for enabling the user to select a driving route to the desired destination. Thus, the user may have to select a driving route to the desired destination between the at least two route alternatives. The selection of one of the at least two route alternatives can be received at step 5614, and the user can be directed along a selected driving route.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for traffic management comprising:
   at least one sensor configured to detect information on road users in a segment of a road;
   at least one processor configured to:
      receive the detected information from the at least one sensor;
      determine from the detected information at least one of location, speed and direction of each of said road users;
      determine whether all of the road users are autonomous vehicles or whether at least one of the road users is a manually driven vehicle;
      if it is determined that all of the road users are autonomous vehicles, based on the determined at least one of location, speed and direction and on a first set of traffic management rules, generate and selectively send a control signal comprising a driving instruction communicated to a communication device of each one or some of said road users instructing said one or some of said road users to drive at a certain speed or on a certain lane; and
      if it is determined that at least one of the road users is a manually driven vehicle, based on the determined at least one of location, speed and direction and on a second set of traffic management rules, generating and selectively sending a control signal comprising a driving instruction communicated to a communication device of each one or some of said road users.

2. The system of claim 1, wherein the control signal comprises direct traffic management action.

3. The system of claim 1, wherein the control signal is selected from the group of control signals consisting of: stop, slow down, accelerate, turn, a collision prevention action, a warning, drive at certain speed, drive at certain lane, change lane.

4. The system of claim 1, wherein the road users are selected from the group consisting of wheeled motor vehicles, autonomous vehicles, cyclists with wearable devices, pedestrians with smartphones.

5. The system of claim 1, wherein said at least one sensor is selected from the group of sensors consisting of: electromagnetic sensors, image capturing sensors, light sensors, receivers configured to detect electromagnetic emissions, sensors configured to detect autonomous vehicles in the area of interest.

6. The system of claim 1, wherein the at least one processor is configured to predict possible collision between two or more of the road users, and wherein the control signal is a collision avoidance action signal to at least one of said two or more of the road users to avoid the possible collision.

7. The system of claim 6, wherein the collision avoidance action is selected form the group of actions consisting of: altering a state of a traffic signal, sending a warning message, sending a control signal to automatically cause a change in at least one operational aspect of one of the two or more of the road users.

8. The system of claim 1, wherein the processor is configured to generate and selectively send a different control signal to different one or some users of said road users.

9. The system of claim 1, wherein the processor is configured, based on the determined at least one of location, speed and direction and on the set of traffic management rules, to generate and selectively send a control signal comprising a driving instruction communicated to the communication device of one of said one or some road users instructing that road user to drive at a certain speed, and to generate and selectively send another control signal comprising a driving instruction communicated to the communication device of another of said one or some road users instructing that other mad user to change lane.

10. The system of claim 1, wherein the at least one processor is further configured to receive travel-related information from one or more autonomous vehicles of the road users and wherein the driving instruction is also based on the traffic-related information.

11. A method for traffic management comprising:
    detecting, by at least one sensor, information on road users in a segment of a road;
    receiving by a processor the detected information from the at least one sensor,
    determining by the processor, from the detected information at least one of location, speed and direction of each of said road users;
    determining whether all of the road users are autonomous vehicles or whether at least one of the road users is a manually driven vehicle;
    if it is determined that all of the road users are autonomous vehicles, based on the determined at least one of location, speed and direction and on a set of traffic management rules, generating and selectively sending by the processor a control signal comprising a driving instruction communicated to a communication device of each one or some of said road users instructing said one or some of said road users to drive at a certain speed or on a certain lane; and if it is determined that at least one of the road users is a manually driven vehicle, based on the determined at least one of location, speed and direction and on a second set of traffic management rules, generating and selectively sending a control signal comprising a driving instruction communicated to a communication device of each one or some of said road users.

12. The method of claim 11, wherein the control signal comprises direct traffic management action.

13. The method of claim 11, wherein the control signal is selected from the group of control signals consisting of: stop, slow down, accelerate, turn, a collision prevention action, a warning, drive at certain speed, drive at certain lane, change lane.

14. The method of claim 11, wherein the road users ae selected from the group consisting of wheeled motor vehicles, autonomous vehicles, cyclists with wearable devices, pedestrians with smartphones.

15. The method of claim 11 wherein said at least one sensor is selected from the group of sensors consisting of: electromagnetic sensors, image capturing sensors, light sensors, receivers configured to detect electromagnetic emissions, sensors configured to detect autonomous vehicles in the area of interest.

16. The method of claim 11, further comprising predicting, by the processor, possible collision between two or more of the road users, and wherein the control signal is a collision avoidance action signal to at least one of said two or more of the road users to avoid the possible collision.

17. The method of claim 16, wherein the collision avoidance action is selected form the group of actions consisting of: altering a state of a traffic signal, sending a warning message, sending a control signal to automatically cause a change in at least one operational aspect of one of the two or more of the road users.

18. The method of claim 11, further comprising generating and selectively sending, by the processor, a different control signal to different one or some users of said road users.

19. The method of claim 11, comprising based on the determined at least one of location, speed and direction and on the set of traffic management rules, generating and selectively sending a control signal comprising a driving instruction communicated to the communication device of one of said one or some road users instructing that road user to drive at a certain speed, and generating and selectively sending another control signal comprising a driving instruction communicated to the communication device of another of said one or some road users instructing that other road user to change lane.

20. The method of claim 11, further comprising receiving by the at least one processor travel-related information from one or more autonomous vehicles of the road users and wherein the driving instruction is also based on the traffic-related information.

* * * * *